United States Patent
Tateishi et al.

(10) Patent No.: US 9,359,503 B2
(45) Date of Patent: *Jun. 7, 2016

(54) AZO PIGMENT, METHOD FOR PREPARING AZO PIGMENT, DISPERSION INCLUDING AZO PIGMENT, COLORING COMPOSITION, AND INKJET RECORDING INK

(71) Applicant: FUJIFILM Corporation, Tokyo (JP)

(72) Inventors: Keiichi Tateishi, Kanagawa (JP); Shinya Hayashi, Kanagawa (JP); Hiroshi Yamada, Kanagawa (JP); Yoshiaki Nagata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,362

(22) Filed: Jan. 28, 2014

(65) Prior Publication Data

US 2014/0141250 A1 May 22, 2014

Related U.S. Application Data

(63) Continuation of application No. PCT/JP2012/069113, filed on Jul. 27, 2012.

(30) Foreign Application Priority Data

| Jul. 29, 2011 | (JP) | 2011-167824 |
| Jul. 29, 2011 | (JP) | 2011-167825 |
| Jul. 29, 2011 | (JP) | 2011-167826 |
| Jul. 29, 2011 | (JP) | 2011-167827 |
| Jul. 29, 2011 | (JP) | 2011-167828 |
| Jul. 29, 2011 | (JP) | 2011-167829 |
| Jul. 29, 2011 | (JP) | 2011-167830 |
| Feb. 17, 2012 | (JP) | 2012-033393 |

(51) Int. Cl.
*C09B 62/03* (2006.01)
*B32B 5/00* (2006.01)
(Continued)

(52) U.S. Cl.
CPC ........... *C09B 67/0028* (2013.01); *C09B 67/009* (2013.01); *C09B 67/0015* (2013.01); *C09D 11/322* (2013.01); *Y10T 428/2982* (2015.01)

(58) Field of Classification Search
CPC .. C09D 11/322; C09D 11/00; C09B 67/0028; C09B 67/009; C09B 67/0015; Y10T 428/2982
USPC .............................. 8/637.1; 428/402; 534/758
See application file for complete search history.

(56) References Cited

U.S. PATENT DOCUMENTS

| 5,194,088 A | 3/1993 | Babler et al. |
| 5,650,520 A | 7/1997 | Hao et al. |

(Continued)

FOREIGN PATENT DOCUMENTS

| EP | 2 230 278 A2 | 9/2010 |
| EP | 2 230 278 A3 | 9/2010 |

(Continued)

OTHER PUBLICATIONS

STIC Search Report dated Apr. 28, 2015.*

(Continued)

*Primary Examiner* — Eisa Elhilo
(74) *Attorney, Agent, or Firm* — Sughrue Mion, PLLC

(57) ABSTRACT

An azo pigment or a tautomer thereof represented by the following Formula (1), and having characteristic X-ray diffraction peaks at Bragg angles (2θ±0.2°) of 6.5°, 7.1° and 21.8° in the CuKα characteristic X-ray diffraction.

Formula (1)

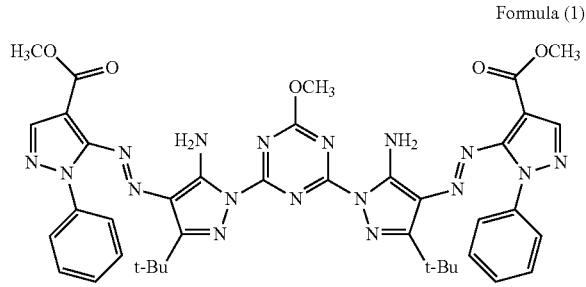

42 Claims, 18 Drawing Sheets

(51) Int. Cl.
  *C09B 39/00*   (2006.01)
  *C09B 67/48*   (2006.01)
  *C09B 67/10*   (2006.01)
  *C09B 67/46*   (2006.01)
  *C09D 11/322*  (2014.01)

(56) References Cited

U.S. PATENT DOCUMENTS

| | | | |
|---|---|---|---|
| 2008/0058531 A1 | 3/2008 | Schmidt et al. | |
| 2011/0021763 A1 | 1/2011 | Tateishi et al. | |
| 2011/0023753 A1 | 2/2011 | Tateishi | |
| 2011/0245475 A1* | 10/2011 | Tateishi et al. | 534/579 |
| 2012/0156449 A1 | 6/2012 | Tateishi et al. | |
| 2014/0141249 A1 | 5/2014 | Tateishi et al. | |

FOREIGN PATENT DOCUMENTS

| | | | | |
|---|---|---|---|---|
| EP | 2 474 574 A1 | 7/2012 | | |
| JP | 58-210084 A | 12/1983 | | |
| JP | 5-222314 A | 8/1993 | | |
| JP | 8-048908 A | 2/1996 | | |
| JP | 10-183005 A | 7/1998 | | |
| JP | 10-298445 A | 11/1998 | | |
| JP | 2003-026951 A | 1/2003 | | |
| JP | 2010-031224 A | 2/2010 | | |
| JP | 2010-159405 A | 7/2010 | | |
| JP | 2011-074375 A | 4/2011 | | |
| JP | 2011-074376 A | 4/2011 | | |
| JP | 201174375 A1 * | 4/2011 | | C09B 67/20 |
| JP | 2011-127042 A | 6/2011 | | |
| JP | 2012-097167 A | 5/2012 | | |
| JP | 2013-49827 A | 3/2013 | | |
| JP | 2013-49831 A | 3/2013 | | |
| TW | 201033294 A1 | 9/2010 | | |
| WO | 2009/110558 A1 | 9/2009 | | |
| WO | 2009110643 A1 | 9/2009 | | |
| WO | 2010067783 A1 | 6/2010 | | |
| WO | 2010067784 A1 | 6/2010 | | |
| WO | WO 2010067784 A1 * | 6/2010 | | C09B 33/12 |
| WO | 2011/027842 A1 | 3/2011 | | |
| WO | 2011027843 A1 | 3/2011 | | |
| WO | 2011027844 A1 | 3/2011 | | |
| WO | 2011074709 A1 | 6/2011 | | |

OTHER PUBLICATIONS

Office Action dated Nov. 18, 2014 issued by the Japanese Patent Office in counterpart Japanese Patent Application No. 2011/167824.
Office Action dated Nov. 18, 2014 issued by the Japanese Patent Office in counterpart Japanese Patent Application No. 2011/167825.
Office Action dated Nov. 18, 2014 issued by the Japanese Patent Office in counterpart Japanese Patent Application No. 2011/167826.
Office Action dated Nov. 18, 2014 issued by the Japanese Patent Office in counterpart Japanese Patent Application No. 2011/167828.
Office Action dated Nov. 18, 2014 issued by the Japanese Patent Office in counterpart Japanese Patent Application No. 2011/167829.
Office Action dated Nov. 18, 2014 issued by the Japanese Patent Office in counterpart Japanese Patent Application No. 2011/167830.
Office Action dated Nov. 18, 2014 issued by the Japanese Patent Office in counterpart Japanese Patent Application No. 2012/033393.
Search Report dated Jan. 5, 2015 issued by the European Patent Office in counterpart European Patent Application No. 12819540.1.
International Search Report (PCT/ISA/210); issued Sep. 4, 2012, in corresponding International Application No. PCT/JP2012/069113.
Written Opinion (PCT/ISA/237); issued Sep. 4, 2012, in corresponding International Application No. PCT/JP2012/069113.
Office Action dated Nov. 4, 2014 issued by the State Intellectual Property Office of the People's Republic of China in counterpart Chinese Patent Application No. 201280048116.1.
Office Action dated Jun. 16, 2015 issued by the Japanese Patent Office in counterpart Japanese Patent Application No. 2011-167824.
Office Action dated Jun. 16, 2015 issued by the Japanese Patent Office in counterpart Japanese Patent Application No. 2011-167825.
Office Action dated Jun. 16, 2015 issued by the Japanese Patent Office in counterpart Japanese Patent Application No. 2011-167826.
Office Action dated Jun. 16, 2015 issued by the Japanese Patent Office in counterpart Japanese Patent Application No. 2011-167828.
Office Action dated Jun. 16, 2015 issued by the Japanese Patent Office in counterpart Japanese Patent Application No. 2011-167830.
Office Action dated Jul. 21, 2015 issued by the Japanese Patent Office in counterpart Japanese Patent Application No. 2012-033393.
Office Action issued Oct. 6, 2015, issued by the Taiwan Intellectual Property Office in counterpart Taiwanese Patent Application No. 101127279.

* cited by examiner

Graph 1-1

ζ-type crystal form azo pigment ζ-(1)-101

Graph 1-2

α-type crystal form azo pigment α-(1)-1

Graph 1-3

β-type crystal form azo pigment β-(1)-2

Graph 1-4

α-type crystal form azo pigment α-(1)-2

Graph 1-5

β-type crystal form azo pigment β-(1)-103

Graph 1-6

α-type crystal form azo pigment α-(1)-3

Graph 1-7

Amorphous azo compound 1-(1)-4

Graph 2-2

β-type crystal form azo pigment β-(1)-1

Graph 2-3

γ-type crystal form azo pigment γ-(1)-102

Graph 2-5

β-type crystal form azo pigment β-(1)-3

Graph 3-1

γ-type crystal form azo pigment γ-(1)-1

Graph 3-2

γ-type crystal form azo pigment γ-(1)-2

Graph 3-3

γ-type crystal form azo pigment γ-(1)-3

Graph 4-1

δ-type crystal form azo pigment δ-(1)-1

Graph 4-2

δ-type crystal form azo pigment δ-(1)-2

Graph 4-3

δ-type crystal form azo pigment δ-(1)-3

Graph 4-4

δ-type crystal form azo pigment δ-(1)-4

Graph 4-5

δ-type crystal form azo pigment δ-(1)-5

Graph 4-6

δ-type crystal form azo pigment δ-(1)-3-A

Graph 4-7

δ-type crystal form azo pigment δ-(1)-7-A

Graph 4-8

δ-type crystal form azo pigment δ-(1)-1-A

Graph 4-9

δ-type crystal form azo pigment δ-(1)-5-A

Graph 4-10

ζ-type crystal form azo pigment δ-(1)-101-A

Graph 5-2

ε-type crystal form azo pigment ε-(1)-1

Graph 5-4

η-type crystal form azo pigment η-(1)-2

Graph 5-5

ε-type crystal form azo pigment ε-(1)-2

Graph 5-6

ε-type crystal form azo pigment ε-(1)-3

Graph 5-7

Amorphous azo compound 5-(1)-4

Graph 5-8

Amorphous azo compound 5-(1)-5

Graph 6-1

ζ-type crystal form pigment ζ-(1)-1

Graph 6-2

ζ-type crystal form pigment ζ-(1)-2

Graph 6-3

ζ-type crystal form pigment ζ-(1)-3

Graph 6-4

ζ-type crystal form pigment ζ-(1)-4

Graph 7-2

η-type crystal form azo pigment η-(1)-1

Graph 7-5

η-type crystal form azo pigment η-(1)-3

AZO PIGMENT, METHOD FOR PREPARING AZO PIGMENT, DISPERSION INCLUDING AZO PIGMENT, COLORING COMPOSITION, AND INKJET RECORDING INK

CROSS REFERENCE TO RELATED APPLICATION

This is a continuation of International Application No. PCT/JP2012/069113 filed on Jul. 27, 2012, and claims priority from Japanese Patent Application Nos. 2011-167824 filed on Jul. 29, 2011, 2011-167825 filed on Jul. 29, 2011, 2011-167826 filed on Jul. 29, 2011, 2011-167827 filed on Jul. 29, 2011, 2011-167828 filed on Jul. 29, 2011, 2011-167829 filed on Jul. 29, 2011, 2011-167830 filed on Jul. 29, 2011, and 2012-033393 filed on Feb. 17, 2012, respectively, the entire disclosure of which are incorporated herein by reference.

TECHNICAL FIELD

The present invention relates to an azo pigment, a method for preparing an azo pigment, a dispersion including an azo pigment, a coloring composition, and an inkjet recording ink.

BACKGROUND ART

Recently, an image-recording material has been dominated particularly by a material for forming a color image and specifically, a recording material of inkjet system, a recording material of heat-sensitive transfer system, a recording material of electrophotographic system, a silver halide photosensitive material of transfer system, a printing ink, a recording pen and the like are popularly used. Further, in an image device such as CCD of photographing equipment or in a display such as LCD and PDP, a color filter is used for recording and reproducing a color image. In these color image recording materials and color filters, colorants (dyes or pigments) using three primary colors for a so-called additive or subtractive color mixing method are used for displaying or recording a full color image, but a colorant having absorption characteristics capable of realizing a preferred color reproduction region and having fastness enough to endure various use conditions or environmental conditions has not been found until now, and accordingly, improvements are keenly demanded.

The dyes and pigments used in each of the aforementioned uses need to commonly have the following properties. That is, the dyes and pigments need to have preferred absorption characteristics for color reproduction, and exhibit good fastness under environmental conditions used, for example, light resistance, heat resistance, resistance to oxidative gases such as ozone and the like. In addition, in the case where the colorant is a pigment, the colorant also need to have properties such as being substantially insoluble in water or an organic solvent, showing good chemical resistance, and not impairing the preferred absorption characteristics in the molecular dispersion state even when used as a particle. The requisite characteristics may be controlled by varying the degree of the intermolecular interaction, but both characteristics are in a trade-off relationship and therefore, it is difficult to satisfy both at the same time.

Furthermore, in using a pigment, other than the properties described above, the pigment also need to have a particle diameter and a particle shape necessary for bringing out a desired transparency, to show good fastness under environment conditions used, for example, light resistance, heat resistance, resistance to an oxidative gas such as ozone, water resistance, and chemical resistance to an organic solvent, a sulfurous acid gas or the like, and to have properties capable of being dispersed even into microparticles in a medium used and keeping the dispersed state stable.

That is, compared to the dye which is required to have performances as a colorant molecule, performances required for the pigment need to satisfy not only performances as a colorant molecule, but also the aforementioned requisite performances as a solid (fine particle dispersion) as an aggregate of colorant molecules in various fields. As a result, a compound group which may be used as a pigment is extremely limited as compared to the dye, and thus even when a high-performance dye is derived into a pigment, a pigment capable of satisfying the requisite performances as a fine particle dispersion is very few in number and may not be easily developed. This is also confirmed from the fact that the number of pigments registered in the Color Index is less than 1/10 of the number of dyes.

Among the pigments, particularly an azo pigment has high lightness and excellent light resistance and heat resistance, and thus is widely used as a pigment for a printing ink, an inkjet ink, an electrophotographic material, and a color filter. Further, as the use is expanded, the pigment also needs to require much better stability over time regardless of a medium used than stability at a level usually used in a printing ink, a gravure ink, and a coloring agent. For example, Patent Document 1 discloses an azo pigment with a specific structure including a pyrazole ring, in which the azo pigment has excellent color characteristics such as color and excellent light resistance.

Simultaneously, in the use of a color filter or an inkjet ink, it is required to further enhance clearness or transparency. In order to enhance clearness or transparency, it is effective to finely disperse a pigment, and therefore, a method of efficiently preparing a pigment fine particle by which a fine dispersion may be formed is also required.

As a method of preparing an organic pigment fine particle, for example, there is a method of obtaining fine and size-regulated particles by selecting an appropriate reaction conditions during synthesis like the azo pigment. In addition, there are a method of preparing a pigment from very fine and aggregated particles produced during synthesis by subjecting the particles to particle growth and size-regulating the particles in subsequent processes like a copper phthalocyanine green pigment, and a method of preparing a pigment from crude and uneven particles produced during synthesis by finely pulverizing and size-regulating the particles in subsequent processes like a copper phthalocyanine blue pigment. For example, a diketopyrrolopyrrole pigment is generally synthesized as a crude pigment by reacting succinic diester with aromatic nitrile in an organic solvent (see, for example, Patent Document 2). Then, the crude diketopyrrolopyrrole pigment is heat-treated in water or an organic solvent, followed by pulverization such as wet grinding into a form suitable for use (see, for example, Patent Document 3). Furthermore, Patent Document 4 discloses a method of preparing an azo pigment with a specific structure, which includes a pyrazole ring, which may be prepared at a high efficiency and a low cost.

Further, among organic pigments, there are some pigments showing polymorphism, and it is known that these pigments may take two or more crystal forms even though these pigments have the same chemical composition. For example, in the C.I. Pigment Red 254, an α-crystal form and a β-crystal form are known. In addition, in the C.I. Pigment Yellow 181 which is an azo pigment, various types of crystal forms are known (see, for example, Patent Document 6).

RELATED ART DOCUMENT

Patent Document

Patent Document 1: Japanese Patent Application Laid-Open No. 2010-31224
Patent Document 2: Japanese Patent Application Laid-Open No. S58-210084
Patent Document 3: Japanese Patent Application Laid-Open No. H5-222314
Patent Document 4: Japanese Patent Application Laid-Open No. 2011-74375
Patent Document 5: Japanese Patent Application Laid-Open No. H8-48908
Patent Document 6: U.S. Patent Application Publication No. 2008/0058531

SUMMARY OF INVENTION

Technical Problem

For the azo pigments described in Patent Documents 5 and 6, a finding on the aforementioned crystal forms is not described. Further, since there is also no description on water resistance which is a performance required for the pigment, there is room for further review.

An object of a first aspect of the present invention is to provide an azo pigment which is excellent in not only color characteristics such as hue, and light resistance, but also particularly water resistance and has a novel crystal form with a specific structure having a pyrazole ring.

In addition, since there is also no description on wettability which is a performance required for the pigment, there is room for further review. The wettability in the pigment denotes affinity of the interface between a solid surface and a fluid which is in contact with the solid surface. For example, the wettability denotes ease of familiarity of pigment particles for a liquid medium when a pigment dispersion is prepared. When the wettability of the liquid medium and the pigment is poor, bead-shaped aggregates are produced, or residues remain because a dispersing agent and the like are not familiarized well enough, and thus may not be dispersed.

The wettability may be evaluated even by measuring a contact angle of the pigment particle to the liquid. That is, it can be said that when a liquid medium is added dropwise to the solid surface, in the case where the contact angle is large, the wettability is poor, and in the case where the contact angle is small, the wettability is good. However, when pigment particles are easily charged with static electricity, the wettability may not be judged as a whole by the contact angle because the contact angle may become more than the actual angle due to static electricity.

An object of a second aspect of the present invention is to provide an azo pigment which is excellent in not only color characteristics such as hue, and light fastness, but also particularly wettability and has a novel crystal form with a specific structure having a pyrazole ring.

Furthermore, since there is also no description on quality stability which is a performance required for the pigment, there is room for further review.

An object of a third aspect of the present invention is to provide an azo pigment which is excellent in not only color characteristics such as hue, and light resistance, but also particularly quality stability and has a novel crystal form with a specific structure having a pyrazole ring.

Further, for monodispersity which is a performance required for the pigment, there is room for further review. The monodispersity in the pigment may be evaluated by judging whether the value of Mv/Mn is close to 1 using, for example, a planetary ball mill when a target particle diameter is obtained. The pigment may be usually dispersed in a medium and used according to the use thereof, and a plurality of additives and processes is needed in order to obtain a uniform dispersion. From a pigment having excellent monodispersity, it is possible to obtain a pigment dispersion containing uniform particles and having a narrow particle size distribution after dispersion. A printed matter using the pigment dispersion containing uniform particles is advantageous in that the color non-uniformity or rough surface caused by difference in particle diameter less occurs.

An object of a fourth aspect of the present invention is to provide an azo pigment which is excellent in not only color characteristics such as hue, but also particularly monodispersity and has a novel crystal form with a specific structure having a pyrazole ring.

In addition, since there is also no description on purity which is a performance required for the pigment, there is room for further review. A high purity in the pigment is advantageous in that it is possible to prevent deterioration in various performances such as, for example, hue, light resistance and solvent resistance due to inclusion of impurities.

An object of a fifth aspect of the present invention is to provide an azo pigment which is excellent in not only color characteristics such as hue, and light resistance, but also particularly high purity and has a novel crystal form with a specific structure having a pyrazole ring.

Furthermore, while demand for enhancing quality of a printed matter has been recently increasing, there is a need for a pigment having excellent heat resistance in addition to light resistance, and there is room for further review because there is no pigment having both light resistance and heat resistance at sufficient levels.

An object of a sixth aspect of the present invention is to provide an azo pigment which is excellent in heat resistance, color characteristics such as hue, and light resistance and has a novel crystal form with a specific structure having a pyrazole ring.

Further, since there is also no description on filterability which is a performance required for the pigment, there is room for further review.

An object of a seventh aspect of the present invention is to provide an azo pigment which has not only color characteristics such as hue, and light resistance, but also particularly filterability and dispersibility and has a novel crystal form with a specific structure having a pyrazole ring.

Then, an object of the present invention is to provide a method for preparing the azo pigment having a novel crystal form, which may be prepared with good reproducibility and high efficiency while being controlled in a specific crystal form.

In addition, another object of the present invention is to provide a dispersion of the azo pigment, a coloring composition including the dispersion of the azo pigment, and an inkjet recording ink.

As a result of intensive investigations in consideration of the aforementioned circumstances, the present inventors have found out the followings.

It has been found out that an azo pigment, which has a characteristic X-ray diffraction peak at a specific position and connects a pyrazole ring having a specific substituent through an azo group and a triazine ring, is excellent in not only color characteristics such as hue, and light resistance, but also particularly water resistance, and that when a coloring composition in which the pigment is dispersed is used as an inkjet recording ink, it is possible to obtain a printed matter having excellent water resistance.

It has been found out that an azo pigment or a tautomer thereof, which is represented by the following Formula (1), and has characteristic X-ray diffraction peaks at Bragg angles (2θ±0.2°) of 6.3°, 6.4° and 22.3° in the CuKα characteristic X-ray diffraction is excellent in not only color characteristics such as hue, and light resistance, but also particularly wettability. Furthermore, it has been found out that when a coloring composition in which a pigment having excellent wettability is dispersed is used as an inkjet recording ink, it is difficult for residues to remain during dispersion, and therefore it is possible to obtain a printed matter whose concentration is stable.

It has been found out that an azo pigment or a tautomer thereof, which is represented by the following Formula (1), and has characteristic X-ray diffraction peaks at Bragg angles (2θ±0.2°) of 5.9° and 7.0° in the CuKα characteristic X-ray diffraction, is excellent in not only color characteristics such as hue, and light fastness, but also particularly quality stabilityan azo pigment or a tautomer thereof. Further, it has been found out that when a coloring composition in which a pigment having excellent quality stability is dispersed is used as an inkjet recording ink, it is possible to obtain a printed matter which has excellent reproducibility with low fluctuation of quality due to difference among lots.

It has been found out that an azo pigment or a tautomer thereof, which is represented by the following Formula (1), and has characteristic X-ray diffraction peaks at Bragg angles (2θ±0.2°) of 4.8°, 7.2° and 9.7° in the CuKα characteristic X-ray diffraction is excellent in not only color characteristics such as hue, and light resistance, but also particularly monodispersibility.

It has been found out that an azo pigment or a tautomer thereof, which is represented by the following Formula (1), and has characteristic X-ray diffraction peaks at Bragg angles (2θ±0.2°) of 4.9°, 8.8° and 13.1° in the CuKα characteristic X-ray diffraction has not only color characteristics such as hue, and light resistance, but also particularly high purity. In addition, it has been found out that when a coloring composition in which a pigment having high purity is dispersed is used as an inkjet recording ink, the content of impurities causing deterioration in performance is small, and therefore it is possible to obtain an excellent printed matter having low non-uniformity of performance due to lots.

It has been found out that an azo pigment, which has a characteristic X-ray diffraction peak at a specific position and connects a pyrazole ring having a specific substituent through an azo group and a triazine ring, is excellent in not only heat resistance, but also color characteristics such as hue, and light resistance, and that when a coloring composition in which the pigment is dispersed is used as an inkjet recording ink, it is possible to obtain a printed matter having excellent water resistance.

It has been found out that an azo pigment or a tautomer thereof, which is represented by the following Formula (1), and has characteristic X-ray diffraction peaks at Bragg angles (2θ±0.2°) of 4.8°, 9.2° and 13.0° in the CuKα characteristic X-ray diffraction, has not only color characteristics such as hue, and light resistance, but also particularly filterability and dispersibility during preparation.

Furthermore, the present inventors have found out a method for preparing an azo pigment, which may prepare the azo pigment with good reproducibility and high efficiency while being controlled in a specific crystal form, thereby completing the present invention.

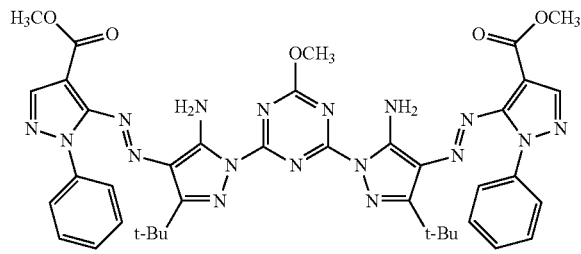 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

Solution to Problem

That is, the present invention is as follows.

[1] An azo pigment or a tautomer thereof represented by the following Formula (1), and having characteristic X-ray diffraction peaks at Bragg angles (2θ±0.2°) of 6.5°, 7.1° and 21.8° in a CuKα characteristic X-ray diffraction.

Formula (1)

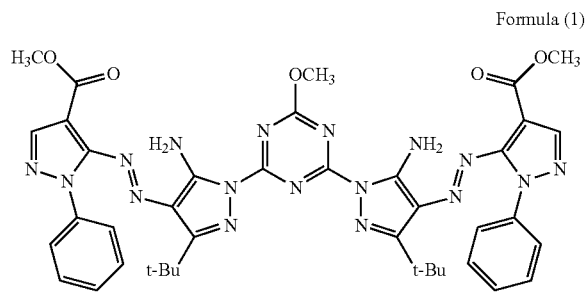 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

[2] The azo pigment or the tautomer thereof described in [1], in which the azo pigment has characteristic X-ray diffraction peaks at Bragg angles (2θ±0.2°) of 6.5°, 7.1°, 14.4°, 21.8° and 23.6° in the CuKα characteristic X-ray diffraction.

[3] An azo pigment or a tautomer thereof represented by the following Formula (1), and having characteristic X-ray diffraction peaks at Bragg angles (2θ±0.2°) of 6.3°, 6.4° and 22.3° in a CuKα characteristic X-ray diffraction.

Formula (1)

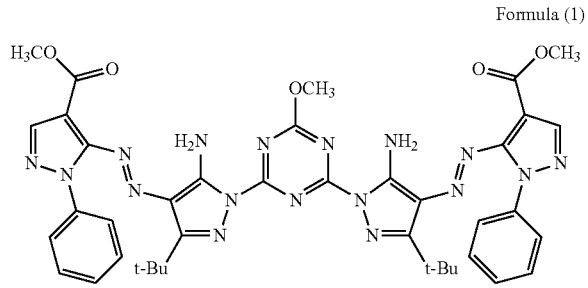 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

[4] The azo pigment or the tautomer thereof described in [3], in which the azo pigment has characteristic X-ray diffraction peaks at Bragg angles (2θ±0.2°) of 6.3°, 6.4°, 12.6°, 13.0° and 22.3° in the CuKα characteristic X-ray diffraction.

[5] An azo pigment or a tautomer thereof represented by the following Formula (1), and having characteristic X-ray diffraction peaks at Bragg angles (2θ±0.2°) of 5.9° and 7.0° in a CuKα characteristic X-ray diffraction.

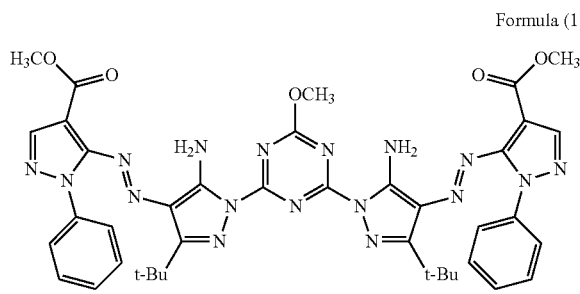

Formula (1)

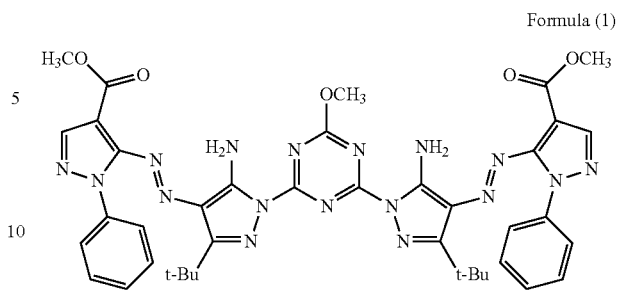

Formula (1)

[6] The azo pigment or the tautomer thereof described in [5], in which the azo pigment has characteristic X-ray diffraction peaks at Bragg angles (2θ±0.2°) of 5.9°, 7.0°, 10.4° and 23.5° in the CuKα characteristic X-ray diffraction.

[7] An azo pigment or a tautomer thereof represented by the following Formula (1), and having characteristic X-ray diffraction peaks at Bragg angles (2θ±0.2°) of 4.8°, 7.2° and 9.7° in a CuKα characteristic X-ray diffraction.

[13] The azo pigment or the tautomer thereof described in [12], in which the azo pigment has characteristic X-ray diffraction peaks at Bragg angles (2θ±0.2°) of 6.6°, 9.2°, 10.3°, 21.5° and 25.6° in the CuKα characteristic X-ray diffraction.

[14] An azo pigment or a tautomer thereof represented by the following Formula (1), and having characteristic X-ray diffraction peaks at Bragg angles (2θ±0.2°) of 4.8°, 9.2° and 13.0° in a CuKα characteristic X-ray diffraction.

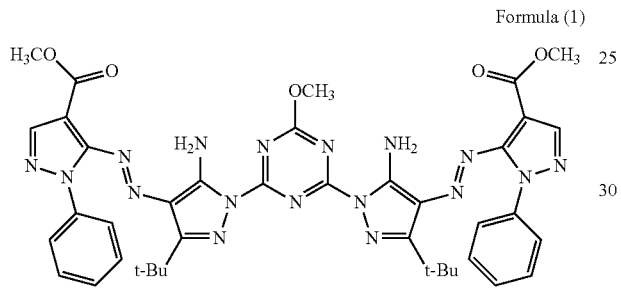

Formula (1)

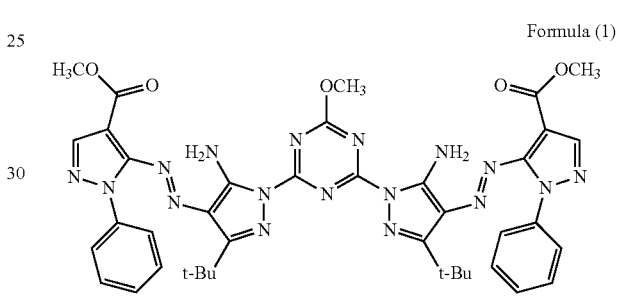

Formula (1)

[8] The azo pigment or the tautomer thereof described in [7], in which the azo pigment has characteristic X-ray diffraction peaks at Bragg angles (2θ±0.2°) of 4.8°, 7.2°, 9.7°, 20.1° and 26.8° in the CuKα characteristic X-ray diffraction.

[9] The azo pigment or the tautomer thereof described in [7] or [8], in which a BET specific surface area by a nitrogen adsorption method is 50 m²/g or more.

[10] An azo pigment or a tautomer thereof represented by the following Formula (1), and having characteristic X-ray diffraction peaks at Bragg angles (2θ±0.2°) of 4.9°, 8.8° and 13.1 in a CuKα characteristic X-ray diffraction.

[15] The azo pigment or the tautomer thereof described in [14], in which the azo pigment has characteristic X-ray diffraction peaks at Bragg angles (2θ±0.2°) of 4.8°, 6.5°, 9.2°, 9.7°, 13.0° and 24.4° in the CuKα characteristic X-ray diffraction.

[16] A method for preparing an azo pigment or a tautomer thereof represented by the following Formula (1), and having characteristic X-ray diffraction peaks at Bragg angles (2θ±0.2°) of 6.5°, 7.1° and 21.8° in a CuKα characteristic X-ray diffraction, the method including: desolvating: desolvating a solvate of an azo compound or a tautomer thereof represented by the following Formula (1), and having characteristic X-ray diffraction peaks at Bragg angles (2θ±0.2°) of 6.3°, 6.4° and 22.3° in the CuKα characteristic X-ray diffraction.

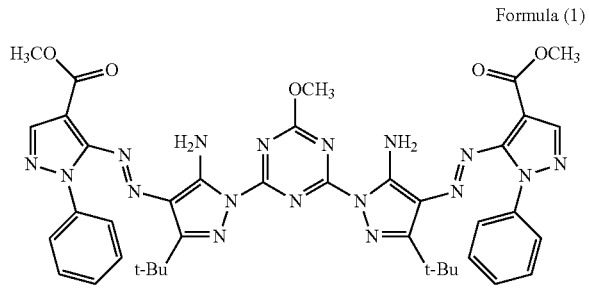 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

Formula (1)

[11] The azo pigment or the tautomer thereof described in [10], in which the azo pigment has characteristic X-ray diffraction peaks at Bragg angles (2θ±0.2°) of 4.9°, 8.8°, 13.1°, 19.7° and 25.2° in the CuKα characteristic X-ray diffraction.

[12] An azo pigment or a tautomer thereof represented by the following Formula (1), and having characteristic X-ray diffraction peaks at Bragg angles (2θ±0.2°) of 6.6°, 9.2° and 21.5° in a CuKα characteristic X-ray diffraction.

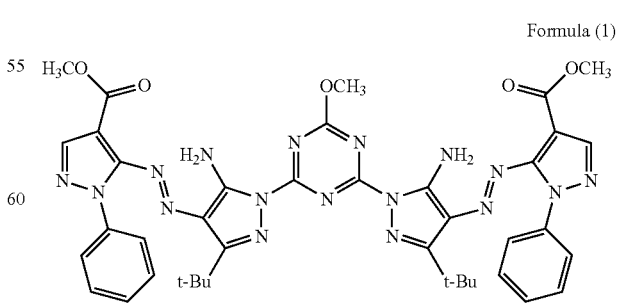

Formula (1)

[17] The method described in [16], in which desolvation is performed by heating the solvate at 60° C. or more.

[18] A method for preparing an azo pigment or a tautomer thereof represented by the following Formula (1), and having characteristic X-ray diffraction peaks at Bragg angles (2θ±0.2°) of 6.3°, 6.4° and 22.3° in a CuKα characteristic X-ray diffraction, the method including: subjecting an azo pigment or a tautomer thereof, which is represented by the following Formula (1), and has a characteristic X-ray diffraction peak at Bragg angles (2θ±0.2°) of any one of (i) 6.6°, 9.2° and 21.5°, (ii) 4.8°, 7.2° and 9.7°, and (iii) 5.9°, 7.0° and 8.9° in the CuKα characteristic X-ray diffraction, to solvent heating treatment.

Formula (1)

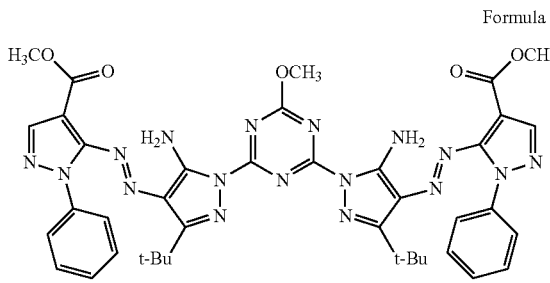

[19] The method described in [18], in which the solvent heating treatment is performed by heating and stirring the azo compound or the tautomer thereof, which is represented by Formula (1), and has a characteristic X-ray diffraction peak at Bragg angles (2θ±0.2°) of any one of (i) 6.6°, 9.2° and 21.5°, (ii) 4.8°, 7.2° and 9.7°, and (iii) 5.9°, 7.0° and 8.9° in the CuKα characteristic X-ray diffraction at 20° C. or more in an organic solvent.

[20] The method described in [19], in which the organic solvent is a ketone-based organic solvent or an aprotic organic solvent.

[21] A method for preparing an azo pigment a or tautomer thereof represented by the following Formula (1), and having characteristic X-ray diffraction peaks at Bragg angles (2θ±0.2°) of 4.8°, 7.2°, 9.5°, 9.7°, 10.7°, 17.4°, 19.0°, 20.1° and 26.8° in a CuKα characteristic X-ray diffraction, the method including: heating and stirring the azo pigment or the tautomer thereof represented by the following Formula (1) at 60° C. or more in an organic solvent.

Formula (1)

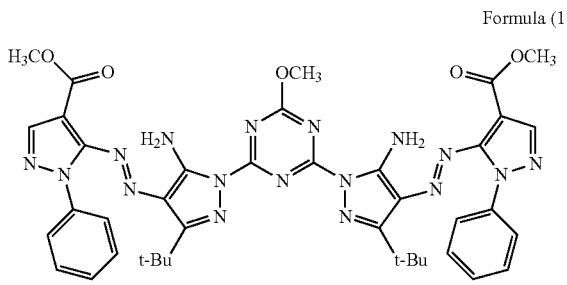

[22] The method described in [21], in which the organic solvent is an alcohol-based organic solvent or a glycol-based organic solvent.

[23] A method for preparing an azo pigment or a tautomer thereof represented by the following Formula (1), the method including: kneading a mixture including the azo pigment or tautomer thereof represented by the following Formula (1), a water-soluble inorganic salt and an aqueous organic solvent, in which the azo pigment or the tautomer thereof has characteristic X-ray diffraction peaks at Bragg angles (2θ±0.2°) of 4.8°, 7.2° and 9.7° in a CuKα characteristic X-ray diffraction, and a BET specific surface area by a nitrogen adsorption method is 50 m²/g or more.

Formula (1)

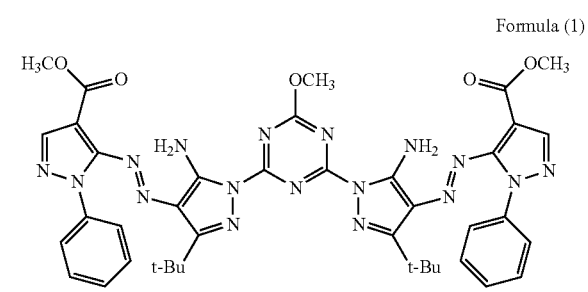 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

[24] The method described in [23], in which the azo pigment or the tautomer thereof represented by Formula (1), which is included in the mixture, has characteristic X-ray diffraction peaks at Bragg angles (2θ±0.2°) of 4.8°, 7.2° and 9.7° in the CuKα characteristic X-ray diffraction.

[25] A method for preparing an azo pigment or a tautomer thereof represented by the following Formula (1), and having characteristic X-ray diffraction peaks at Bragg angles (2θ±0.2°) of 4.9°, 8.8° and 13.1° in a CuKα characteristic X-ray diffraction, the method including: desolvating a solvate of an azo compound or a tautomer thereof represented by the following Formula (1), and having characteristic X-ray diffraction peaks at Bragg angles (2θ±0.2°) of 4.8°, 9.2°, 13.0° and 24.4° in the CuKα characteristic X-ray diffraction.

Formula (1)

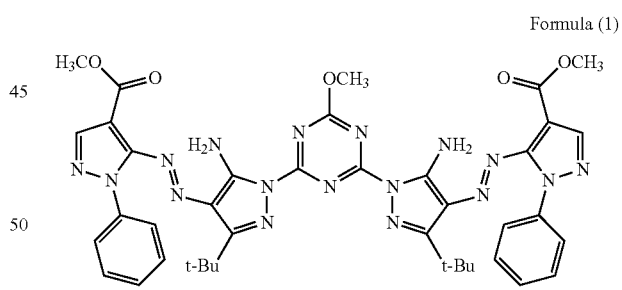

[26] The method described in [25], in which desolvation is performed by heating the solvate at 60° C. or more.

[27] A method for preparing an azo pigment or a tautomer thereof represented by the following Formula (1), and having characteristic X-ray diffraction peaks at Bragg angles (2θ±0.2°) of 4.8°, 9.2° and 13.0° in a CuKα characteristic X-ray diffraction, the method including: subjecting an azo pigment or a tautomer thereof, which is represented by the following Formula (1), and has a characteristic X-ray diffraction peak at Bragg angles (2θ±0.2°) of any one of (i) 6.6°, 9.2° and 21.5°, (ii) 4.8°, 7.2° and 9.7°, and (iii) 5.9°, 7.0° and 8.9° in the CuKα characteristic X-ray diffraction, to solvent heating treatment.

Formula (1)

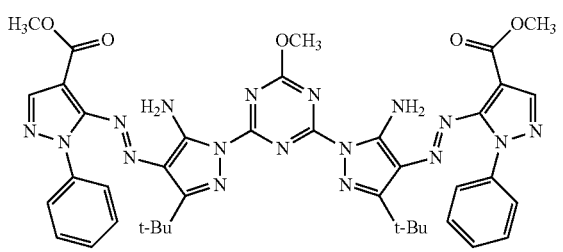

[28] The azo pigment or the tautomer thereof described in [1] or [2], prepared by the method described in [16] or [17].

[29] The azo pigment or the tautomer thereof described in [3] or [4], prepared by the method described in any one of [18] to [20].

[30] The azo pigment or the tautomer thereof described in [7] or [8], prepared by the method described in [21] or [22].

[31] The azo pigment or the tautomer thereof described in [9], prepared by the method described in [23] or [24].

[32] The azo pigment or the tautomer thereof described in [10] or [11], prepared by the method described in [25] or [26].

[33] The azo pigment or the tautomer thereof described in [14] or [15], prepared by the method described in [27].

[34] A solvate of an azo compound or a tautomer thereof represented by the following Formula (1), and having characteristic X-ray diffraction peaks at Bragg angles (2θ±0.2°) of 6.3°, 6.4° and 22.3° in a CuKα characteristic X-ray diffraction.

Formula (1)

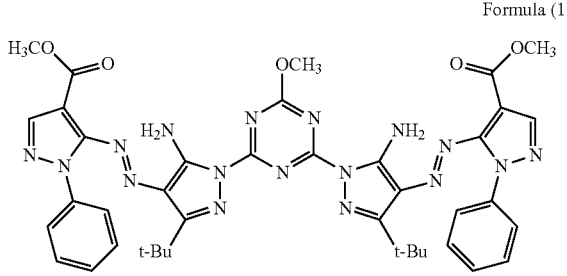 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

[35] A solvate of an azo compound or a tautomer thereof represented by the following Formula (1), and having characteristic X-ray diffraction peaks at Bragg angles (2θ±0.2°) of 4.8°, 9.2°, 13.0° and 24.4° in a CuKα characteristic X-ray diffraction.

Formula (1)

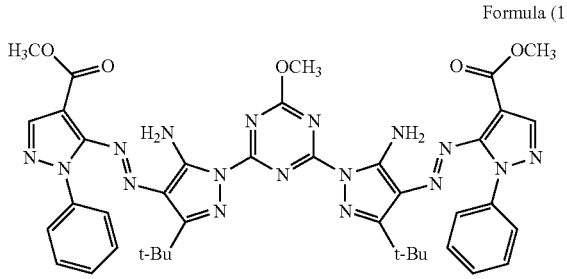

[36] An acetone solvate of an azo compound or a tautomer thereof represented by the following Formula (1), and having characteristic X-ray diffraction peaks at Bragg angles (2θ±0.2°) of 6.6°, 9.2° and 21.5° in a CuKα characteristic X-ray diffraction.

Formula (1)

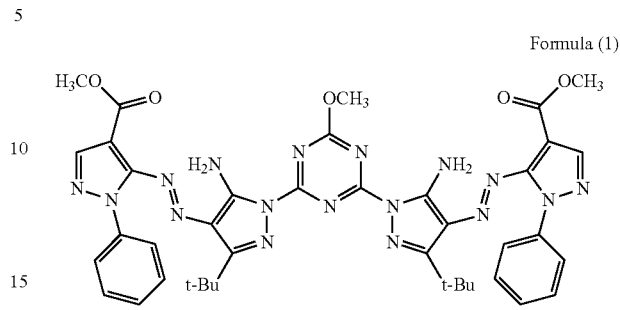

[37] A pigment dispersion containing at least one of the azo pigments described in any one of [1] to [6] and [10] to [15] as a coloring agent.

[38] The pigment dispersion described in [37], in which a volume average particle diameter of pigment particles in the pigment dispersion is 0.01 μm to 0.2 μm.

[39] A pigment dispersion containing the azo pigment or the tautomer thereof described in any one of [7] to [9], [30] and [31].

[40] The pigment dispersion described in [39], in which a volume average particle diameter of pigment particles in the pigment dispersion is 0.01 μm to 0.2 μm.

[41] An aqueous pigment dispersion described in [39] or [40], containing a water-soluble polymer as a dispersing agent.

[42] The aqueous pigment dispersion described in [41], in which the aqueous polymer dispersing agent includes at least one carboxyl group and has an acid value of at least 50 mgKOH/g or more.

[43] The aqueous pigment dispersion described in [41] or [42], in which the aqueous pigment dispersion is cross-linked by a crosslinking agent.

[44] A coloring composition containing the azo pigment or the tautomer thereof described in any one of [1] to [15] and [28] to [33], the pigment dispersion described in any one of [37] to [40], or the aqueous pigment dispersion described in any one of [41] to [43].

[45] An ink containing the azo pigment or the tautomer thereof described in any one of [1] to [15] and [28] to [33], the pigment dispersion described in any one of [37] to [40], the aqueous pigment dispersion described in any one of [41] to [43], or the coloring composition described in [44].

[46] An inkjet recording ink containing the azo pigment or the tautomer thereof described in any one of [1] to [15] and [28] to [33], the pigment dispersion described in any one of [37] to [40], the aqueous pigment dispersion described in any one of [41] to [43], or the coloring composition described in [44].

Advantageous Effects of Invention

According to the first aspect of the present invention, provided are an azo pigment which is excellent in not only color characteristics such as hue, and light resistance, but also particularly water resistance, has a novel crystal form and connects pyrazole rings having a specific substituent through an azo group and a triazine ring, a dispersion of the azo pigment, and a coloring composition. Further, a printed matter having excellent water resistance is provided by using the azo pigment as an inkjet recording ink.

According to the second aspect of the present invention, provided are an azo pigment which is excellent in not only color characteristics such as hue, and light resistance, but also particularly wettability, has a novel crystal form and connects pyrazole rings having a specific substituent through an azo group and a triazine ring, a dispersion of the azo pigment, and a coloring composition. In addition, a printed matter having excellent wettability is provided by using the azo pigment as an inkjet recording ink.

According to the third aspect of the present invention, provided are an azo pigment which is excellent in not only color characteristics such as hue, and light resistance, but also particularly quality stability, has a novel crystal form and connects pyrazole rings having a specific substituent through an azo group and a triazine ring, a dispersion of the azo pigment, a coloring composition, and an inkjet recording ink.

According to the fourth aspect of the present invention, provided are an azo pigment which is excellent in not only color characteristics such as hue, and light resistance, but also particularly monodispersibility, has a novel crystal form and connects pyrazole rings having a specific substituent through an azo group and a triazine ring, a dispersion of the azo pigment, and a coloring composition.

According to the fifth aspect of the present invention, provided are an azo pigment which has not only color characteristics such as hue, and light resistance, but also particularly high purity, has a novel crystal form and connects pyrazole rings having a specific substituent through an azo group and a triazine ring, a dispersion of the azo pigment, and a coloring composition. Furthermore, an excellent printed matter having low non-uniformity in performance due to difference among lots is provided by using the azo pigment as an inkjet recording ink.

According to the sixth aspect of the present invention, provided are an azo pigment which is excellent in color characteristics such as hue, and light resistance, has a novel crystal form and connects pyrazole rings having a specific substituent through an azo group and a triazine ring, a dispersion of the azo pigment, and a coloring composition. Furthermore, a high-quality printed matter is provided by using the azo pigment as an inkjet recording ink.

According to the seventh aspect of the present invention, provided are an azo pigment which has not only color characteristics such as hue, and light resistance, but also particularly filterability and dispersibility, has a novel crystal form and connects pyrazole rings having a specific substituent through an azo group and a triazine ring, a dispersion of the azo pigment, and a coloring composition.

Further, provided is a method for preparing the azo pigment, which may be prepared with good reproducibility and high efficiency while being controlled in a specific crystal form.

DESCRIPTION OF EMBODIMENTS

Figure 1:
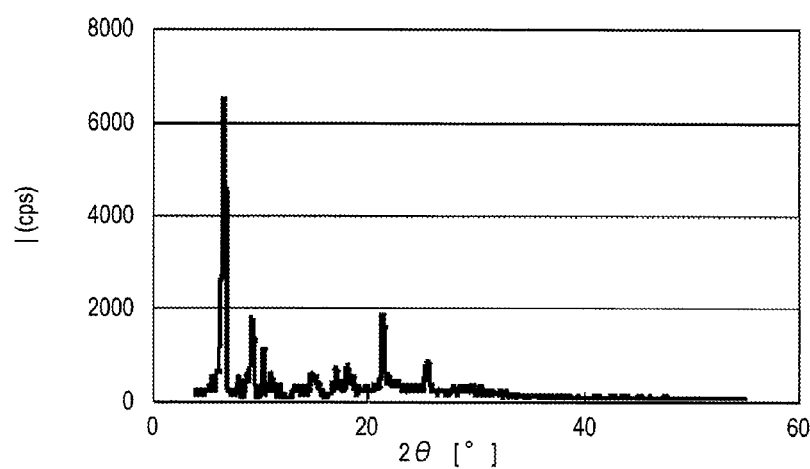
FIG. 1 is a graph of an X-ray diffraction of a ζ-type crystal form azo pigment ζ-(1)-101, which is synthesized in Synthesis Example α-1.

Hereinafter, the present invention will be described in detail.

An azo pigment or a tautomer thereof of the present invention may be a hydrate or a solvate or a salt thereof.

An azo pigment in the first aspect of the present invention is an azo pigment or a tautomer thereof represented by the following Formula (1), and having characteristic X-ray diffraction peaks at Bragg angles (2θ±0.2°) of 6.5°, 7.1° and 21.8° in the CuKα characteristic X-ray diffraction.

An azo pigment in the second aspect of the present invention is an azo pigment or a tautomer thereof represented by the following Formula (1), and having characteristic X-ray diffraction peaks at Bragg angles (2θ±0.2°) of 6.3°, 6.4° and 22.3° in the CuKα characteristic X-ray diffraction.

An azo pigment in the third aspect of the present invention is an azo pigment or a tautomer thereof represented by the following Formula (1), and having characteristic X-ray diffraction peaks at Bragg angles (2θ±0.2°) of 5.9° and 7.0° in the CuKα characteristic X-ray diffraction.

An azo pigment in the fourth aspect of the present invention is an azo pigment or a tautomer thereof represented by the following Formula (1), and having characteristic X-ray diffraction peaks at Bragg angles (2θ±0.2°) of 4.8°, 7.2° and 9.7° in the CuKα characteristic X-ray diffraction.

An azo pigment in the fifth aspect of the present invention is an azo pigment or a tautomer thereof represented by the following Formula (1), and having characteristic X-ray diffraction peaks at Bragg angles (2θ±0.2°) of 4.9°, 8.8° and 13.1° in the CuKα characteristic X-ray diffraction.

An azo pigment in the sixth aspect of the present invention is an azo pigment or a tautomer thereof represented by the following Formula (1), and having characteristic X-ray diffraction peaks at Bragg angles (2θ±0.2°) of 6.6°, 9.2° and 21.5° in the CuKα characteristic X-ray diffraction.

An azo pigment in the seventh aspect of the present invention is an azo pigment or a tautomer thereof represented by the following Formula (1), and having characteristic X-ray diffraction peaks at Bragg angles (2θ±0.2°) of 4.8°, 9.2° and 13.0° in the CuKα characteristic X-ray diffraction.

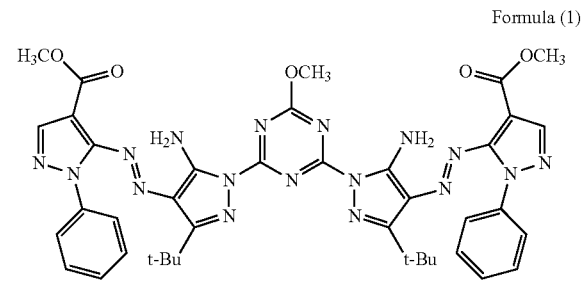 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

Formula (1)

In the present specification, the azo pigment represented by Formula (1) and having characteristic X-ray diffraction peaks at Bragg angles (2θ±0.2°) of 6.5°, 7.1° and 21.8° in the CuKα characteristic X-ray diffraction will be hereinafter referred to as an α-type crystal form azo pigment.

In addition, the azo pigment represented by Formula (1) and having characteristic X-ray diffraction peaks at Bragg angles (2θ±0.2°) of 6.3°, 6.4° and 22.3° in the CuKα characteristic X-ray diffraction will be referred to as a β-type crystal form azo pigment, and the azo pigment represented by Formula (1) and having characteristic X-ray diffraction peaks at Bragg angles (2θ±0.2°) of 5.9° and 7.0° in the CuKα characteristic X-ray diffraction will be referred to as a γ-type crystal form azo pigment.

The azo pigment represented by Formula (1) and having characteristic X-ray diffraction peaks at Bragg angles (2θ±0.2°) of 4.8°, 7.2° and 9.7° in the CuKα characteristic X-ray diffraction will be referred to as a δ-type crystal form azo pigment, and the azo pigment represented by Formula (1) and having characteristic X-ray diffraction peaks at Bragg angles (2θ±0.2°) of 4.9°, 8.8° and 13.1° in the CuKα characteristic X-ray diffraction will be referred to as an ε-type crystal form azo pigment.

The azo pigment represented by Formula (1) and having characteristic X-ray diffraction peaks at Bragg angles (2θ±0.2°) of 6.6°, 9.2° and 21.5° in the CuKα characteristic X-ray diffraction will be referred to as a ζ-type crystal form azo pigment.

The azo pigment represented by Formula (1) and having characteristic X-ray diffraction peaks at Bragg angles (2θ±0.2°) of 4.8°, 9.2° and 13.0° in the CuKα characteristic X-ray diffraction will be referred to as an η-type crystal form azo pigment.

In the present invention, X-ray diffraction of the α-type crystal form azo pigment, the β-type crystal form azo pigment, the γ-type crystal form azo pigment, the ε-type crystal form azo pigment, the ζ-type crystal form azo pigment and the η-type crystal form azo pigment, which are represented by the following Formula (1) may be measured in accordance with the Japanese Industrial Standard JISK0131 (General Rule of X-ray Diffractiometry) using, for example, a powder X-ray diffractometer RINT 2500 (manufactured by Rigaku Corporation).

By illustrating an X-ray diffraction diagram in Graph 1-2, the α-type crystal form azo pigment represented by Formula (1) and having characteristic X-ray diffraction peaks at Bragg angles (2θ±0.2°) of 6.5°, 7.1° and 21.8° in the CuKα characteristic X-ray diffraction will be described in more detail.

When the azo pigment is in a single crystal form, distance between molecules is so close that intermolecular interaction becomes strong. As a result, water resistance, solvent resistance, heat stability, light resistance, gas resistance, and print density are increased, and furthermore, a color reproducible region is expanded. Among them, as a crystal form having excellent water resistance, the azo pigment and the tautomer thereof represented by Formula (1) have preferably a crystal form having characteristic X-ray diffraction peaks at Bragg angles (2θ±0.2°) of 6.5°, 7.1° and 21.8° in the CuKα characteristic X-ray diffraction.

For the crystal form having characteristic X-ray diffraction peaks at 6.5°, 7.1° and 21.8°, a crystal form showing an X-ray diffraction pattern having significant X-ray diffraction lines at 6.5°, 7.1°, 14.4°, 21.8° and 23.6° is more preferred. Among them, a crystal form showing an X-ray diffraction pattern having significant X-ray diffraction lines at 6.5°, 7.1°, 14.4°, 15.8°, 21.8°, 23.6° and 28.5° is most preferred.

The most convenient method of acquiring the α-type crystal form azo pigment represented by Formula (1) is a method of obtaining the α-type crystal form by desolvating a solvate of the compound represented by Formula (1) with an organic solvent. It is assumed that the reason is that the α-type crystal form azo pigment represented by Formula (1) forms a lipophilically specific crystal structure, and it is thought that the pigment becomes hydrophobic and has excellent water resistance.

When primary particles are observed under a transmission microscope, the length in a long axis direction is preferably 0.01 μm to 30 μm. When the length is 0.01 μm or more, fastness to light or ozone is excellent so that aggregation is suppressed and dispersibility is enhanced. Meanwhile, when the length is 30 μm or less, it is difficult for the particles to be in a hyperdispersed state when the particles are dispersed so as to obtain a desired volume average particle diameter, so that aggregation is easily suppressed, and the storage stability of pigment dispersions is excellent.

When the length of the primary particles in a long axis direction is within the aforementioned range, the primary particles show high fastness to light or ozone, and the pigment dispersion thereof has excellent storage stability, which is preferred.

For this reason, when the primary particles of the α-type crystal form azo pigment represented by the following Formula (1) are observed under a transmission microscope, the length in a long axis direction is preferably 0.01 μm to 30 μm, more preferably 0.02 μm to 20 μm, and most preferably 0.03 μm to 10 μm.

Furthermore, the present invention also relates to, in a method for preparing an azo pigment represented by Formula (1) and having characteristic X-ray diffraction peaks at 6.5°, 7.1° and 21.8°, which will be described below, a solvate of an azo pigment or a tautomer thereof represented by the following Formula (1) and having characteristic X-ray diffraction peaks at 6.3°, 6.4° and 22.3°, which is an intermediate thereof.

By illustrating an X-ray diffraction diagram in Graph 2-2, the β-type crystal form azo pigment represented by Formula (1) and having characteristic X-ray diffraction peaks at Bragg angles (2θ±0.2°) of 6.3°, 6.4° and 22.3° in the CuKα characteristic X-ray diffraction will be described in more detail.

When the azo pigment is in a single crystal form, distance between molecules is so close that intermolecular interaction becomes strong. As a result, wettability, solvent resistance, heat stability, light resistance, gas resistance, and print density are increased, and furthermore, a color reproducible region is expanded. Among them, as a crystal form having excellent wettability, the azo pigment and the tautomer thereof represented by Formula (1) have preferably a crystal form having characteristic X-ray diffraction peaks at Bragg angles (2θ±0.2°) of 6.3°, 6.4° and 22.3° in the CuKα characteristic X-ray diffraction.

For the crystal form having characteristic X-ray diffraction peaks at 6.3°, 6.4° and 22.3°, a crystal form showing an X-ray diffraction pattern having significant X-ray diffraction lines at 6.3°, 6.4°, 12.6°, 13.0° and 22.3° is more preferred. Among them, a crystal form showing an X-ray diffraction pattern having significant X-ray diffraction lines at 6.3°, 6.4°, 7.5°, 12.6°, 13.0°, 22.3° and 26.9° is most preferred.

It is thought that the reason that the azo pigment represented by Formula (1) and having characteristic X-ray diffraction peaks at 6.3, 6.4° and 22.3° is excellent in wettability is that since the β-type crystal form azo pigment (1) is a solvate (particularly preferably an acetone solvate), the solvent in the crystal enhances affinity for a liquid medium, thereby improving the wettability.

The β-type crystal form azo pigment represented by Formula (1) may be a solvate including a hydrate or a solvent (for example, a ketone-based organic solvent such as acetone and methyl ethyl ketone, an aprotic organic solvent such as acetonitrile, dimethylsulfoxide, dimethylformamide, dimethylacetamide, N-methyl-2-pyrrolidone and toluene, and the like, preferably acetone and N-methyl-2-pyrrolidone, and more preferably acetone) including water molecules in the crystal.

When primary particles are observed under a transmission microscope, the length in a long axis direction is preferably 0.01 μm to 30 μm. When the length is 0.01 μm or more, fastness to light or ozone is excellent so that aggregation is suppressed and dispersibility is enhanced. Meanwhile, when the length is 30 μm or less, it is difficult for the particles to be in a hyperdispersed state when the particles are dispersed so as to obtain a desired volume average particle diameter, so that aggregation is easily suppressed, and the storage stability of pigment dispersions is excellent.

When the length of the primary particles in a long axis direction is within the aforementioned range, the primary particles show high fastness to light or ozone, and the pigment dispersion thereof has excellent storage stability, which is preferred.

For this reason, when the primary particles of the β-type crystal form azo pigment represented by the following Formula (1) are observed under a transmission microscope, the length in a long axis direction is preferably 0.01 μm to 30 μm, more preferably 0.02 μm to 20 μm, and most preferably 0.03 μm to 10 μm.

Further, the present invention also relates to, in a method for preparing an azo pigment represented by Formula (1) and having characteristic X-ray diffraction peaks at 6.3°, 6.4° and 22.3°, which will be described below, a solvate of an azo pigment or a tautomer thereof represented by the following Formula (1) and having characteristic X-ray diffraction peaks at 6.6°, 9.2°, 10.3°, 21.5° and 25.6° (ζ type), 5.9°, 7.0° and 8.9° (γ type), or 4.8°, 7.2° and 9.7° (δ type), which is an intermediate thereof.

By illustrating an X-ray diffraction diagram in Graph 3-1, the γ-type crystal form azo pigment represented by Formula (1) and having characteristic X-ray diffraction peaks at Bragg angles (2θ±0.2°) of 5.9° and 7.0° in the CuKα characteristic X-ray diffraction will be described in more detail.

When the azo pigment is in a single crystal form, distance between molecules is so close that intermolecular interaction becomes strong. As a result, quality stability, solvent resistance, heat stability, light resistance, gas resistance, and print density are increased, and furthermore, a color reproducible region is expanded. Among them, as a crystal form having excellent quality stability, the azo pigment and the tautomer thereof represented by Formula (1) have preferably a crystal form having characteristic X-ray diffraction peaks at Bragg angles (2θ±0.2°) of 5.9° and 7.0° in the CuKα characteristic X-ray diffraction.

For the crystal form having characteristic X-ray diffraction peaks at 5.9° and 7.0°, a crystal form showing an X-ray diffraction pattern having significant X-ray diffraction lines at 5.9°, 7.0°, 8.9° and 10.4° is more preferred. Among them, a crystal form showing an X-ray diffraction pattern having significant X-ray diffraction lines at 5.9°, 7.0°, 8.9°, 10.4°, 15.5° and 23.5° is most preferred.

The reason that the azo pigment by Formula (1) and having characteristic X-ray diffraction peaks at 5.9° and 7.0° has excellent quality stability is that the azo pigment is efficiently obtained under hydrous conditions during preparation, and it is difficult for the azo pigment to be dissolved in a reaction solution once precipitated, so that it is difficult for the crystal growth to proceed. In addition, it is thought that since the crystal transformation is not needed, particles having a stable quality may be obtained.

When primary particles are observed under a transmission microscope, the length in a long axis direction is preferably 0.01 μm to 10 μm. When the length is 0.01 μm or more, fastness to light or ozone is excellent so that aggregation is suppressed and dispersibility is enhanced. Meanwhile, when the length is 10 μm or less, it is difficult for the particles to be in a hyperdispersed state when the particles are dispersed so as to obtain a desired volume average particle diameter, so that aggregation is easily suppressed, and the storage stability of pigment dispersions is excellent.

When the length of the primary particles in a long axis direction is within the aforementioned range, the primary particles show high fastness to light or ozone, and the pigment dispersion thereof has excellent storage stability, which is preferred.

For this reason, when the primary particles of the γ-type crystal form azo pigment represented by the following Formula (1) are observed under a transmission microscope, the length in a long axis direction is preferably 0.01 μm to 10 μm, more preferably 0.02 μm to 5 μm, and most preferably 0.03 μm to 3 μm.

By illustrating an X-ray diffraction diagram in Graph 4-2, the δ-type crystal form azo pigment represented by Formula (1) and having characteristic X-ray diffraction peaks at Bragg angles (2θ±0.2°) of 4.8°, 7.2° and 9.7° in the CuKα characteristic X-ray diffraction will be described in more detail.

When the pigment has a crystal form, it is thought that molecules are regularly arranged, and thus intermolecular interaction becomes strong. As a result, it can be expected that monodispersibility, solvent resistance, heat stability, light resistance, gas resistance, and print density are increased, and furthermore, a color reproducible region is expanded. Among them, as a crystal form having excellent monodispersibility, the azo pigment and the tautomer thereof represented by Formula (1) have preferably a crystal form having characteristic X-ray diffraction peaks at Bragg angles (2θ±0.2°) of 4.8°, 7.2° and 9.7° in the CuKα characteristic X-ray diffraction.

For the crystal form having characteristic X-ray diffraction peaks at 4.8°, 7.2° and 9.7°, a crystal form showing an X-ray diffraction pattern having significant X-ray diffraction lines at 4.8°, 7.2°, 9.7°, 20.1° and 26.8° is more preferred. Among them, a crystal form showing an X-ray diffraction pattern having significant X-ray diffraction lines at 4.8°, 7.2°, 9.5°, 9.7°, 10.7°, 17.4°, 19.0°, 20.1° and 26.8° is most preferred.

The reason that the azo pigment represented by Formula (1) and having characteristic X-ray diffraction peaks at 4.8°, 7.2° and 9.7° has excellent monodispersibility is that it is thought that the δ-type crystal form is the most stable crystal form, and it is assumed that even a small crystal unit may be stably present. For this reason, it is expected that the size of a crystallite which is the smallest unit of a crystal is smaller than those of other crystals, and is uniform, and therefore, when particles are dispersed and micronized, it is thought that it is not necessary to break down particles even into crystallites, the particle diameter becomes relatively uniform, and therefore, monodispersibility is excellent.

When primary particles are observed under a transmission microscope, the length in a long axis direction is preferably 0.01 μm to 50 μm. When the length is 0.01 μm or more, fastness to light or ozone is excellent so that aggregation is suppressed and monodispersibility is enhanced. Meanwhile, when the length is 50 μm or less, it is difficult for the particles to be in a hyperdispersed state when the particles are dispersed so as to obtain a desired volume average particle diameter, so that aggregation is easily suppressed, and the storage stability of pigment dispersions is excellent.

When the length of the primary particles in a long axis direction is within the aforementioned range, the primary particles show high fastness to light or ozone, and the pigment dispersion thereof has excellent storage stability, which is preferred.

For this reason, when the primary particles of the δ-type crystal form azo pigment represented by the following Formula (1) are observed under a transmission microscope, the length in a long axis direction is preferably 0.01 μm to 50 μm, more preferably 0.02 μm to 30 μm, and most preferably 0.03 μm to 10 μm.

From the viewpoint that tinctorial strength is further enhanced by making dispersibility of the pigment more preferred, a BET specific surface area of the δ-type crystal form azo pigment represented by the following Formula (1) by a nitrogen adsorption method is preferably 50 m$^2$/g or more, and particularly preferably 60 m$^2$/g.

Here, the BET specific surface area by a nitrogen adsorption method is referred to as a specific surface area obtained by adsorbing a nitrogen gas on powder particles to obtain the adsorption equilibrium pressure in the adsorption equilibrium state, and calculating the adsorption amount of the monomolecular layer by the relationship equation of the BET. The BET specific surface area by a nitrogen adsorption method may be measured, for example, by "Method for Measurement of Amount of Gas Adsorbed by One Point Method" defined in Appendix 2 of, for example, the Japanese Industrial Standard JIS Z8830. Specifically, the BET specific surface area may be measured by using a specific surface area measurement apparatus "MONOSORB MS-17" (manufactured by Yuasa Ionics Co., Ltd.) and the like.

Primary particles of the pigment are sufficiently micronized by setting the BET specific surface area by a nitrogen adsorption method to the aforementioned range, and in the δ-type crystal form azo pigment represented by Formula (1) even in the micronized state, dispersibility and tinctorial strength are further enhanced without degrading light resistance.

It is possible to prepare the δ-type crystal form azo pigment represented by Formula (1) and having a BET specific surface area of 50 m$^2$/g or more by a nitrogen adsorption method preferably by a process including a solvent salt milling to be described below.

By illustrating an X-ray diffraction diagram in Graph 5-2, the ε-type crystal form azo pigment represented by Formula (1) and having characteristic X-ray diffraction peaks at Bragg angles (2θ±0.2°) of 4.9°, 8.8° and 13.1° in the CuKα characteristic X-ray diffraction will be described in more detail.

When the azo pigment is in a single crystal form, distance between molecules is so close that intermolecular interaction becomes strong. As a result, purity is high, solvent resistance, heat stability, light resistance and gas resistance are excellent, and print density is increased, and furthermore, a color reproducible region is expanded. Among them, as a crystal form having high purity, the azo pigment and the tautomer thereof represented by Formula (1) have preferably a crystal form having characteristic X-ray diffraction peaks at Bragg angles (2θ±0.2°) of 4.9°, 8.8° and 13.1° in the CuKα characteristic X-ray diffraction.

For the crystal form having characteristic X-ray diffraction peaks at 4.9°, 8.8° and 13.1°, a crystal form showing an X-ray diffraction pattern having significant X-ray diffraction lines at 4.9°, 6.5°, 8.8°, 9.7° and 13.1° is more preferred. Among them, a crystal form showing an X-ray diffraction pattern having significant X-ray diffraction lines at 4.9°, 6.5°, 8.8°, 9.7°, 13.1°, 19.7° and 25.2° is most preferred.

It may be thought that the reason that the azo pigment represented by Formula (1) and having characteristic X-ray diffraction peaks at 4.9°, 8.8° and 13:10 has high purity is that when a solvate (particularly preferably an acetone solvate) to be a precursor is synthesized, impurities except for the solvent less likely remain. For this reason, it is thought that the purity of the desolvated azo pigment (1) of the present invention is increased.

When primary particles are observed under a transmission microscope, the length in a long axis direction is preferably 0.01 μm to 30 μm. When the length is 0.01 μm or more, fastness to light or ozone is excellent so that aggregation is suppressed and dispersibility is enhanced. Meanwhile, when the length is 30 μm or less, it is difficult for the particles to be in a hyperdispersed state when the particles are dispersed so as to obtain a desired volume average particle diameter, so that aggregation is easily suppressed, and the storage stability of pigment dispersions is excellent.

When the length of the primary particles in a long axis direction is within the aforementioned range, the primary particles show high fastness to light or ozone, and the pigment dispersion thereof has excellent storage stability, which is preferred.

For this reason, when the primary particles of the ε-type crystal form azo pigment represented by the following Formula (1) are observed under a transmission microscope, the length in a long axis direction is preferably 0.01 μm to 30 μm, more preferably 0.02 μm to 20 μm, and most preferably 0.03 μm to 10 μm.

Furthermore, the present invention also relates to, in a method for preparing an azo pigment represented by Formula (1) and having characteristic X-ray diffraction peaks at 4.9°, 8.8° and 13.1°, which will be described below, a solvate of an azo pigment or a tautomer thereof represented by the following Formula (1) and having characteristic X-ray diffraction peaks at 4.8°, 9.2°, 13.0° and 24.4° (η type), which is an intermediate thereof.

By illustrating an X-ray diffraction diagram in Graph 6-2, the ζ-type crystal form azo pigment represented by Formula (1) and having characteristic X-ray diffraction peaks at Bragg angles (2θ±0.2°) of 6.6°, 9.2° and 21.5° in the CuKα characteristic X-ray diffraction will be described in more detail.

When the azo pigment is in a single crystal form, distance between molecules is so close that intermolecular interaction becomes strong. As a result, solvent resistance, heat stability, light resistance, gas resistance, and print density are increased, and furthermore, a color reproducible region is expanded. As a crystal form, the azo pigment and the tautomer thereof represented by Formula (1) have preferably a crystal form having characteristic X-ray diffraction peaks at Bragg angles (2θ±0.2°) of 6.6°, 9.2° and 21.5° in the CuKα characteristic X-ray diffraction.

For the crystal form having characteristic X-ray diffraction peaks at 6.6°, 9.2° and 21.5°, a crystal form showing an X-ray diffraction pattern having significant X-ray diffraction lines at 6.6°, 9.2, 10.3°, 21.5° and 25.6° is more preferred. Among them, a crystal form showing an X-ray diffraction pattern having significant X-ray diffraction lines at 6.6°, 9.2°, 10.3°, 17.1°, 18.1°, 21.5° and 25.6° is most preferred.

It may be thought that the reason that heat resistance is excellent when the azo pigment represented by Formula (1) and having characteristic X-ray diffraction peaks at 6.6°, 9.2° and 21.5° is used is that the crystal form of the present invention is a stable crystal form. That is, it is assumed that the crystal form of the present invention is efficiently obtained when an organic solvent or a soluble solvent is used during preparation, and thus precipitated as a stable crystal form in a reaction solvent. It is thought that since the crystal form of the present invention is a stable crystal form, the arrangement of molecules stable to heat is obtained in the crystal.

When primary particles of the pigment in a liquid dispersion of a pigment, in which the ζ-type crystal form azo pigment is dispersed are observed under a transmission microscope, the length in a long axis direction is preferably 0.01 μm to 30 μm. When the length is 0.01 μm or more, fastness to light or ozone is excellent so that aggregation is suppressed and dispersibility is enhanced. Meanwhile, when the length is 30 μm or less, it is difficult for the particles to be in a hyperdispersed state when the particles are dispersed so as to obtain a desired volume average particle diameter, so that aggregation is easily suppressed, and the storage stability of pigment dispersions is excellent.

When the length of the primary particles in a long axis direction is within the aforementioned range, the primary particles show high fastness to light or ozone, and the pigment dispersion thereof has excellent storage stability, which is preferred.

For this reason, when the primary particles of the ζ-type crystal form azo pigment represented by the following Formula (1) are observed under a transmission microscope, the length in a long axis direction is preferably 0.01 μm to 30 μm, more preferably 0.02 μm to 10 μm, and most preferably 0.03 μm to 5 μm.

By illustrating an X-ray diffraction diagram in Graph 7-2, the η-type crystal form azo pigment represented by Formula (1) and having characteristic X-ray diffraction peaks at Bragg angles (2θ±0.2°) of 4.8°, 9.2° and 13.0° in the CuKα characteristic X-ray diffraction will be described in more detail.

When the azo pigment is in a single crystal form, distance between molecules is so close that intermolecular interaction becomes strong. As a result, filterability, dispersibility, solvent resistance, heat stability, light resistance, gas resistance, and print density are increased, and furthermore, a color reproducible region is expanded. Among them, as a crystal form having excellent filterability and dispersibility, the azo pigment and the tautomer thereof represented by Formula (1) have preferably a crystal form having characteristic X-ray diffraction peaks at Bragg angles (2θ±0.2°) of 4.8°, 9.2° and 13.0° in the CuKα characteristic X-ray diffraction.

For the crystal form having characteristic X-ray diffraction peaks at 4.8°, 9.2° and 13.0°, a crystal form showing an X-ray diffraction pattern having significant X-ray diffraction lines at 4.8°, 6.5°, 9.2°, 9.7°, 13.0° and 24.4° is more preferred. Among them, a crystal form showing an X-ray diffraction pattern having significant X-ray diffraction lines at 4.8°, 6.5°, 9.2°, 9.7°, 13.0°, 22.0° and 24.4° is most preferred.

It is thought that the reason that the azo pigment represented by Formula (1) and having characteristic X-ray diffraction peaks at 4.8°, 9.2° and 13.0° has filterability and dispersibility is that the degree of crystal growth in the crystal form is controlled, thereby allowing particles to be filtered with a particle diameter capable of improving filterability. When the crystal growth excessively proceeds, the particle diameter becomes excessively increased, thereby increasing load during dispersion. The azo pigment having the specific crystal form according to the present invention has filterability and dispersibility without excessively increasing the particle diameter. The reason that the particle diameter may be obtained is that solubility peculiar to the crystal form is obtained by taking a specific molecular arrangement, and the surface area is large when the particle diameter is small, so that dissolution proceeds and crystals to become nuclei are growing. When the particle diameter is grown to some degrees, the rates of growth and dissolution are balanced, thereby making it difficult to achieve crystal growth. It is thought that the particle diameter become suitable to achieve filterability and dispersibility by the balance.

The η-type crystal form azo pigment represented by Formula (1) may be a solvate including a hydrate or a solvent (for example, ketones such as acetone and methyl ethyl ketone, an aprotic solvent such as acetonitrile, dimethylsulfoxide, dimethylformamide, dimethylacetamide, N-methyl-2-pyrrolidone and toluene, and the like, preferably acetone and N-methyl-2-pyrrolidone, and more preferably acetone) including water molecules in the crystal.

When primary particles are observed under a transmission microscope, the length in a long axis direction is preferably 0.01 μm to 30 μm. When the length is 0.01 μm or more, fastness to light or ozone is excellent so that aggregation is suppressed and dispersibility is enhanced. Meanwhile, when the length is 30 μm or less, it is difficult for the particles to be in a hyperdispersed state when the particles are dispersed so as to obtain a desired volume average particle diameter, so that aggregation is easily suppressed, and the storage stability of pigment dispersions is excellent.

When the length of the primary particles in a long axis direction is within the aforementioned range, the primary particles show high fastness to light or ozone, and the pigment dispersion thereof has excellent storage stability, which is preferred.

For this reason, when the primary particles of the η-type crystal form azo pigment represented by the following Formula (1) are observed under a transmission microscope, the length in a long axis direction is preferably 0.01 μm to 30 μm, more preferably 0.02 μm to 20 μm, and most preferably 0.03 μm to 10 μm.

Further, the present invention also relates to, in a method for preparing an azo pigment represented by Formula (1) and having characteristic X-ray diffraction peaks at 4.8°, 9.2° and 13.0°, which will be described below, a solvate of an azo pigment or a tautomer thereof represented by the following Formula (1) and having characteristic X-ray diffraction peaks at 6.6°, 9.2°, 10.3°, 21.5° and 25.6° (ζ), 5.9°, 7.0° and 8.9° (γ), or 4.8°, 7.2° and 9.7° (δ), which is an intermediate thereof.

In addition, for the α-type, β-type, γ-type, δ-type, ε-type, ζ-type and η-type crystal form azo pigments represented by Formula (1), the tautomer (for example, a tautomer of azo-hydrazone) as in Scheme (1) or a geometric isomer represented by Scheme (2) is also included in the general formulae in the present invention. Formula (4):

Scheme (1)
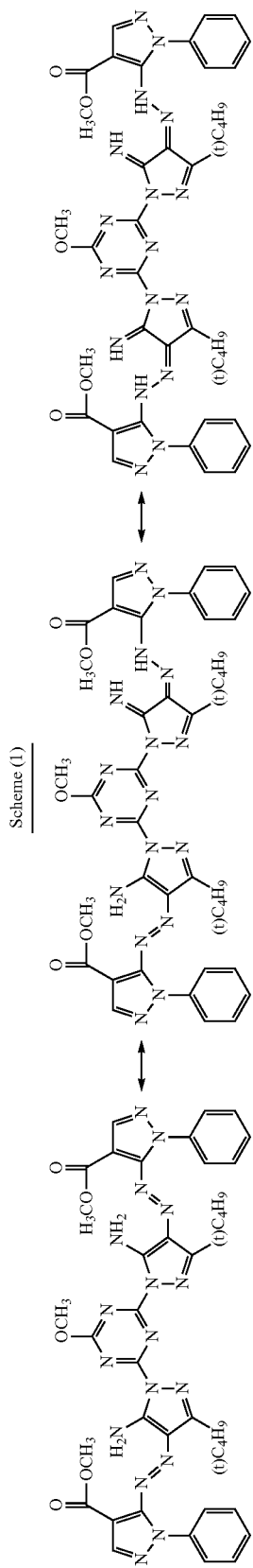
Scheme (2)
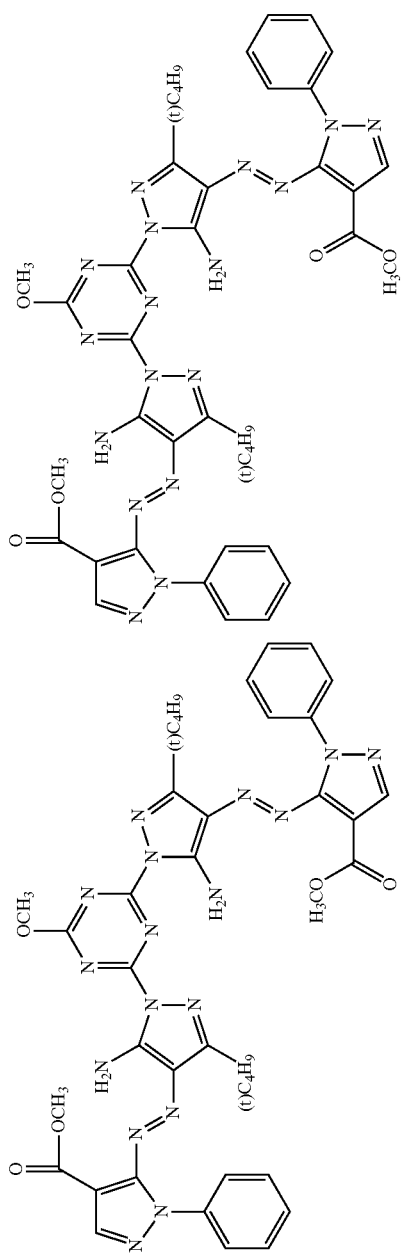

-continued
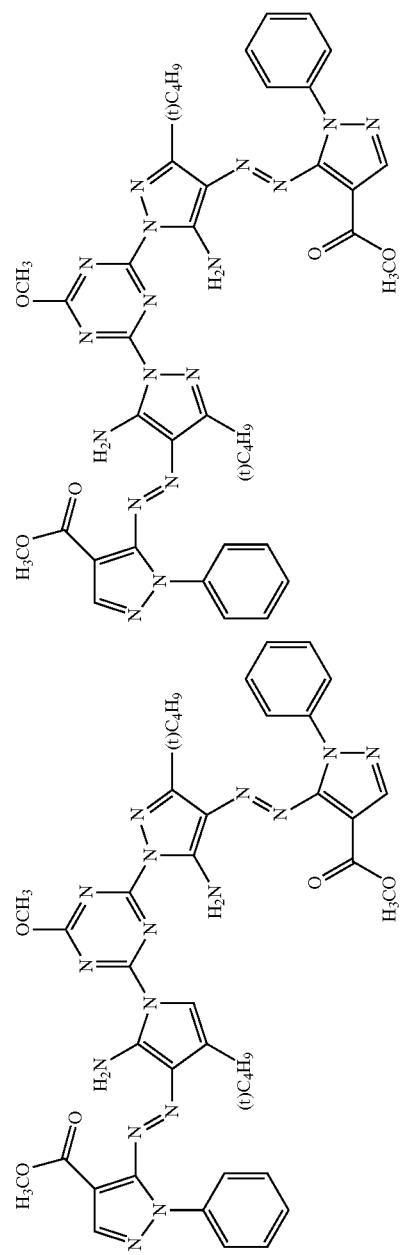

[Synthesis of α-Type Crystal Form Azo Pigment]

Hereinafter, synthesis of the α-type crystal form azo pigment represented by Formula (1) will be described in detail.

The α-type crystal form azo pigment represented by Formula (1) (hereinafter, simply referred to as "azo pigment" or "pigment" in some cases) may be synthesized by the following preparation method.

It is preferred that the preparation method of the present invention includes a process of subjecting a diazonium salt derived from a heterocyclic amine represented by the following Formula (2) and a compound represented by the following Formula (3) to azo coupling reaction.

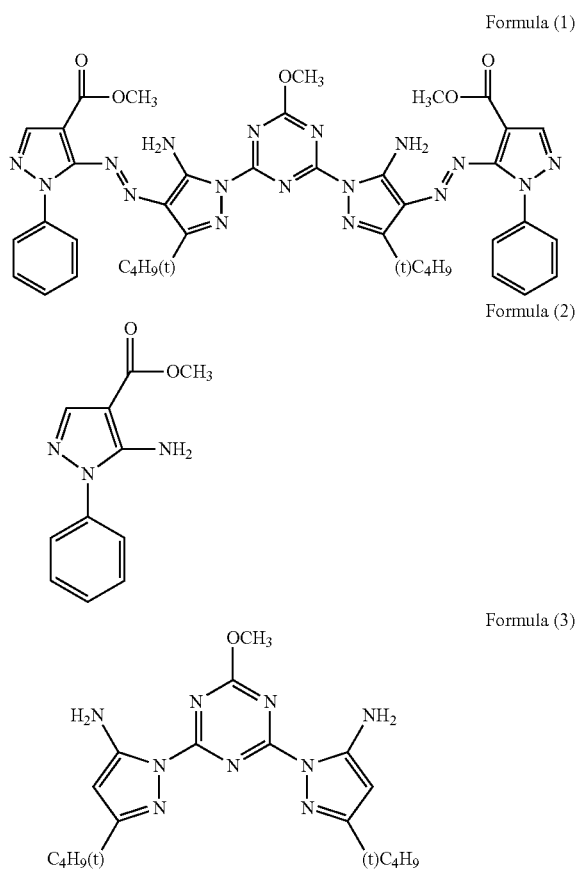

It is preferred that the method for preparing an α-type crystal form azo pigment of the present invention includes a process of obtaining a crude azo pigment and a process of transforming the crude azo pigment into an α-type crystal form azo pigment by subjecting the crude azo pigment to solvent treatment.

It is preferred that the method for preparing a crude azo pigment includes (a) a process of mixing a diazotizing agent with a heterocyclic amine represented by Formula (2), and (b) a process of performing a reaction by mixing a reaction product obtained in process (a) with a compound represented by Formula (3), and obtaining a solution in which an azo compound produced by the reaction and represented by Formula (1) is dissolved at least in part, and it is more preferred that the method also includes (c) a process of crystallizing the pigment represented by Formula (1) by mixing the solution obtained in process (b) with a poor solvent for the azo compound represented by Formula (1).

In process (b), when the ratio at which the azo compound is dissolved is high, the yield becomes high, which is preferred.

Process (a) according to the present invention will be described in detail.

In process (a), a diazonium compound is derived by a reaction of a heterocyclic amine represented by Formula (2) with a diazotizing agent by mixing a diazotizing agent with a heterocyclic amine represented by Formula (2). It is preferred that this reaction is performed in a medium including an acid. In the present specification, a liquid including the diazonium compound is referred to as "diazonium compound liquid preparation". The method of mixing the heterocyclic amine represented by Formula (2) with the acid and the diazotizing agent is not particularly limited, but it is preferred that the diazotizing agent is added to a solution of the heterocyclic amine represented by Formula (2) and the acid. The diazotizing agent in process (a) is used to derive the heterocyclic amine represented by Formula (2) into the diazonium compound, and is not limited as long as the diazotizing agent has such an action. Representative examples of the diazotizing agent include nitrite esters (examples thereof include isopentyl nitrite), nitrite salts (examples thereof include sodium nitrite or potassium nitrite), isoamyl nitrite and nitrosylsulfuric acid, the diazotizing agent is more preferably sodium nitrite, potassium nitrite and nitrosylsulfuric acid, and among them, nitrosylsulfuric acid is particularly preferred from the viewpoint that the diazonium compound may be stably and efficiently prepared.

The acid used in process (a) means an acid which may even slightly dissolve the heterocyclic amine represented by Formula (2) even though the acid does not completely dissolve the heterocyclic amine, and is preferably an acid which completely dissolves an amino compound. As the acid, an inorganic acid and an organic acid may be used, and examples of the inorganic acid include hydrochloric acid, phosphoric acid and sulfuric acid, and the inorganic acid is preferably phosphoric acid and sulfuric acid, and more preferably sulfuric acid. Examples of the organic acid include formic acid, acetic acid, propionic acid and methanesulfonic acid, and the organic acid is preferably acetic acid, propionic acid and methanesulfonic acid, and more preferably acetic acid and propionic acid. Furthermore, these acids may be used either alone or in a mixture thereof. Examples of a mixed acid include phosphoric acid/acetic acid, sulfuric acid/acetic acid, methanesulfonic acid/acetic acid and acetic acid/propionic acid, the mixed acid is preferably phosphoric acid/acetic acid, sulfuric acid/acetic acid, sulfuric acid/acetic acid/propionic acid and acetic acid/propionic acid, and among them, sulfuric acid/acetic acid and acetic acid/propionic acid are particularly preferred. The mass ratio of these mixed acids is preferably 1/(0.1 to 20), more preferably 1/(0.5 to 10), and still more preferably 1/(1 to 10).

In process (a), the amount of acid added to the heterocyclic amine represented by Formula (2) is, in terms of mass ratio, 1 time to 100 times, more preferably 2 times to 50 times, and still more preferably 3 times to 25 times. When the mass ratio is 1 time or more, stirrability is improved so that the diazonium compound may be derived more securely. On the other hand, when the mass ratio is 100 times or less, productivity is enhanced so that economic efficiency is improved.

Further, in process (a), the amount of the diazotizing agent added to the heterocyclic amine represented by Formula (2) is, in terms of molar ratio, 1.0 time to 20 times, more preferably 1.0 time, to 10 times, and still more preferably 1.0 time to 5 times. When the amount of the diazotizing agent to the amino compound is, in terms of molar ratio, 1 time or more, the diazonium compound may be derived more securely, and when the amount is 20 times or less, it is possible to suppress the diazonium compound from being decomposed by a side reaction.

The mixing of the diazotizing agent with the heterocyclic amine represented by Formula (2) in process (a) is performed preferably at 50° C. or less, more preferably at 40° C. or less, and still more preferably at 30° C. or less. In the preparation of the diazo solution at a high temperature more than 50° C., there is a concern in that the diazotizing agent may be decomposed. A stirring time to derive the heterocyclic amine into the diazonium compound is preferably 0.3 to 10 hours, more preferably 0.5 to 5 hours, and still more preferably 1 to 3 hours. When the stirring time is 0.3 hour or more, it is easy to completely derive the heterocyclic amine into the diazonium compound, and when the stirring time is 10 hours or less, it is difficult for the decomposition of the diazonium compound to occur. In addition, a typical stirrer is used in the mixing, and the stirrer is not particularly limited. The number of revolutions of the stirring may be different depending on the manufacturing facility in some cases, but is preferably 30 rpm to 300 rpm, more preferably 40 rpm to 200 rpm, and still more preferably 50 rpm to 200 rpm. When the stirring speed is 30 rpm or more in terms of the number of revolutions, the stirring efficiency of the diazonium compound liquid preparation is improved, and therefore, a desired reaction may proceed securely.

The solvent which may be mixed in process (a) is not particularly limited as long as the derived diazonium compound is not decomposed. Examples of the solvent which may be mixed include a hydrocarbon-based solvent such as hexane, benzene and toluene, an ether-based solvent such as diethyl ether and tetrahydrofuran, a ketone-based solvent such as acetone and methyl ethyl ketone, an amide-based solvent such as dimethylformamide, dimethylacetamide, pyrrolidone and N-methyl-2-pyrrolidone, and dimethylsulfoxide, sulfolane, acetonitrile and water.

A preferred pH of the diazonium compound liquid preparation in process (a) is preferably 7 or less, more preferably 5 or less, and still more preferably 3 or less. When the pH of the diazonium compound liquid preparation in process (a) is more than 7, there is a concern in that the diazonium compound derived may be decomposed.

Next, process (b) according to the present invention will be described in detail.

Process (b) is a process of mixing the reaction product obtained in process (a) with a compound represented by Formula (3) for a reaction to occur, and obtaining a solution in which an azo compound produced by the reaction and represented by Formula (1) is dissolved at least in part.

In the present specification, the solution in which the azo compound is dissolved at least in part is referred to as "an azo compound dissolved solution".

Examples of a method of preparing the azo compound dissolved solution include (I) a method of obtaining the azo compound dissolved solution including: performing a coupling reaction by mixing the reaction product obtained in process (a) with the compound represented by Formula (3), and as a result of the reaction, dissolving the precipitated azo pigment represented by Formula (1) in a solvent, and (II) a method of obtaining the azo compound dissolved solution including: performing the coupling reaction such that the compound obtained by the coupling reaction and represented by Formula (1) is dissolved at least in part in a reaction solution, and adopting the resulting reaction solution as the azo compound dissolved solution as it is, or a method of obtaining the azo compound dissolved solution including: further dissolving a (crystallized) azo pigment, which is obtained by applying the thus-obtained azo compound dissolved solution to process (c) to be described below in detail, in a solvent.

In any of types (I) and (II), a method of mixing the diazonium compound liquid preparation obtained in process (a) with a coupling component is not particularly limited, but it is preferred that the coupling component is partly or completely dissolved in a solvent and the resulting solution is added to the liquid preparation, or the coupling component is added as a solid to the liquid preparation without using the solvent, and it is more preferred that a solution of the coupling component is added to the diazonium compound liquid preparation obtained in process (a), or the coupling component is added as a solid to the diazonium compound liquid preparation obtained in process (a).

In addition, the amount of the diazonium compound in the diazonium compound liquid preparation obtained in process (a) to the compound represented by Formula (3) in process (b) is preferably 0.8 to 3 equivalents to the coupling position of the compound represented by Formula (3), more preferably 0.9 to 2 equivalents to the coupling position, and still more preferably 0.95 to 1.5 equivalents to the coupling position. When the amount is 0.8 equivalents or more, a coupling component having an unreacted coupling position may be suppressed from remaining, and when the amount is 3 equivalents or less, an unreacted diazonium compound may be suppressed from remaining, and therefore, the amount range is more economical.

Meanwhile, in type (II), since the azo compound represented by Formula (1) is dissolved at least in part in process (b), the coupling reaction proceeds more smoothly, thereby preparing a high-purity azo compound. The reason is assumed as follows. Since Formula (3) has two coupling positions, for example, only one coupling position goes through a reaction intermediate which is reacted. When the reaction intermediate is precipitated into the reaction system, the reaction rate of the second coupling reaction is slowed down. Meanwhile, since the diazonium compound is unstable, there is a concern in that decomposition may occur when a long time elapses. Accordingly, it is important to allow the coupling reaction to proceed rapidly, and consequently, the type (II) preparation method, which does not produce a precipitate in process (b), is more suitable for preparing a high-purity pigment.

In process (b), the coupling component may be added without using a solvent, or may be added by being mixed with a solvent, but it is preferred that the coupling component is added without using the solvent. In process (b), when a solvent is used in the coupling component, the solvent is not particularly limited, but is preferably a solvent which allows type (II) to be used, that is, a solvent by which it is possible to obtain a solution in which the azo compound produced after the reaction and represented by the general Formula (1) is dissolved at least in part.

In the case of type (I), that is, when the pigment is precipitated, as an example of the solvent, water, an organic acid, an inorganic acid and an organic solvent may be used, and an organic solvent is particularly preferred, and a solvent causing no liquid separation phenomenon during reaction and providing a uniform solution with the solvent is preferred. Examples thereof include water, an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the organic solvent may be a glycol-based solvent having two or more hydroxyl groups in the solvent molecule, an alcohol-based solvent having 3 or less carbon atoms, or a ketone-based solvent having a total carbon number of 5 or less, preferably an alcohol solvent having 2 or less carbon atoms (for example, methanol and ethylene glycol) and a ketone-based solvent having a total carbon number of 4 or less (for example, acetone and methyl ethyl ketone). Furthermore, a mixed solvent of these solvents is also included in the organic solvent.

Further, in the case of type (II), that is, when a coupling reaction is performed such that the compound represented by Formula (1) is dissolved at least in part in the reaction solution, examples of the solvent include an alcohol-based solvent such as methanol, isopropanol and ethylene glycol, a ketone-based solvent such as acetone and methyl ethyl ketone, an organic acid solvent such as acetic acid, propionic acid and methanesulfonic acid, an inorganic acid solvent such as sulfuric acid, hydrochloric acid and phosphoric acid, an amide-based solvent such as dimethylformamide, dimethylacetamide, pyrrolidone and N-methyl-2-pyrrolidone, dimethylsulfoxide, sulfolane, and acetonitrile. Among them, a ketone-based solvent such as acetone and methyl ethyl ketone, an organic acid solvent such as acetic acid, propionic acid and methanesulfonic acid, and an inorganic acid solvent such as sulfuric acid, hydrochloric acid and phosphoric acid are preferred, an acidic solvent of organic acid or inorganic acid is more preferred, and acetic acid, methanesulfonic acid, phosphoric acid and sulfuric acid are most preferred. In addition, a mixed solvent of the aforementioned solvents is also suitable.

Particularly, in the case of type (II), in process (b), it is preferred that an acidic solution obtained by dissolving or suspending the coupling component in an acidic solvent is mixed with the reaction product obtained in process (a), or the coupling component is added to the reaction product obtained in process (a) without using a solvent. Particularly, it is preferred that the acidic solvent is a solvent including at least one of acetic acid and sulfuric acid.

In any of types (I) and (II), the amount of the solvent added to the coupling component is, in terms of mass ratio, preferably 0.5 times to 200 times, more preferably 1 time to 100 times, and still more preferably 1 time to 50 times. As for the preferred amount of the solvent added to the coupling component, when the mass ratio is less than 0.5 time, it is difficult to stir the coupling component and the solvent in a preparation machine and a desired reaction does not proceed. In addition, the case where the mass ratio is more than 200 times is not economical.

When the preparation method of the azo compound dissolved solution is type (I) or when the preparation method of the azo compound dissolved solution is type (II) and an azo pigment, which is obtained by applying the coupling reaction solution in which the compound represented by Formula (1) is dissolved at least in part to process (c), is further dissolved in the solvent to prepare an azo compound dissolved solution, the solvent for dissolving the obtained azo pigment is not particularly limited as long as the solvent may dissolve at least a part of the azo pigment, but examples thereof include the preferred examples of the solvent previously described in type (II).

Even though any process of types (I) and (II) is employed, the azo compound dissolved solution finally obtained in process (b) is preferably an acidic solution, and particularly preferably a solution including at least one of acetic acid and sulfuric acid.

As for the azo compound dissolved solution obtained in process (b), the ratio of the azo compound represented by Formula (1), which is dissolved in the azo compound dissolved solution to the total amount of the azo compound produced by process (b) (the sum of the azo compound represented by Formula (1), which is dissolved in the azo compound dissolved solution and the azo pigment represented by Formula (1), which is precipitated from the azo compound dissolved solution) is preferably 50% by mass or more, more preferably 75% by mass or more, still more preferably 90% by mass or more, and most preferably 100% by mass (a state where the azo compound produced in process (b) is completely dissolved in the reaction solution), and accordingly, the particle diameter of the pigment tends to be further reduced. Furthermore, as the ratio at which the azo compound is dissolved is high, the yield becomes high, which is preferred.

In process (b), the diazonium compound liquid preparation of process (a) and the coupling component are preferably mixed at a temperature of 50° C. or less, more preferably 30° C. or less, and still more preferably 25° C. or less. When the mixing temperature is 50° C. or more, there is a concern in that the diazonium compound derived in process (a) and the produced azo compound represented by Formula (1) are decomposed. Further, a typical stirrer is used in the mixing, and the stirrer is not particularly limited. The number of revolutions of the stirring may be different depending on the manufacturing facility in some cases, but is preferably 30 rpm to 400 rpm, more preferably 40 rpm to 300 rpm, and still more preferably 50 rpm to 200 rpm. When the stirring speed is 30 rpm or less in terms of the number of revolutions, the stirring efficiency of the mixed solution deteriorates, and therefore, a desired reaction may not proceed. The stirring time in process (b) is preferably 0.1 to 10 hours, more preferably 0.3 to 5 hours, and still more preferably 0.3 to 3 hours. When the stirring time is less than 0.1 hours, it is difficult for the pigment to be completely derived, and when the stirring time is more than 10 hours, there is a concern in that the azo compound represented by Formula (1) may be decomposed.

Next, process (c) according to the present invention will be described in detail.

Process (c) is a process of crystallizing a pigment by mixing the azo compound dissolved solution obtained in process (b) with a poor solvent with the azo compound having low solubility therein. The method of mixing the azo compound dissolved solution obtained in process (b) with a poor solvent is not particularly limited, but it is preferred that the azo compound dissolved solution obtained in process (b) is added to a poor solvent and at this time, it is preferred that the poor solvent is in a state of being stirred.

The stirring speed is preferably 100 rpm to 10,000 rpm, more preferably 150 rpm to 8,000 rpm, and particularly preferably 200 rpm to 6,000 rpm. For the addition, a pump or the like may also be used. In this case, either in-liquid addition or out-of-liquid addition may be employed, but in-liquid addition is more preferred. In addition, continuous supply into liquid through a supply pipe by using a pump is preferred.

The poor solvent is not particularly limited, but is preferably a poor solvent with the azo compound represented by Formula (1) having a solubility of 1 g/L or less therein, and more preferably a poor solvent with the azo compound represented by Formula (1) having a solubility of 0.1 g/L or less therein. This solubility may be a solubility when the azo compound is dissolved in the presence of an acid or an alkali. As for the compatibility or uniform mixing property between the azo compound dissolved solution obtained in process (b) and the poor solvent, the amount of the azo compound dissolved in a poor solvent is preferably 30% by mass or more, and more preferably 50% by mass or more based on the amount of the azo compound dissolved in a good solvent. In the present specification, the solubility indicates a solubility at 25° C.

Examples of the poor solvent include an aqueous solvent such as water, hydrochloric acid, ammonia water and an aqueous sodium hydroxide solution, an alcohol-based solvent such as methanol, ethanol, isopropyl alcohol and 1-methoxy-2-propanol, a glycol-based solvent such as ethylene glycol and diethylene glycol, a ketone compound solvent such as acetone, methyl ethyl ketone, methyl isobutyl ketone and cyclohexanone, an ether-based solvent such as diethyl ether and tetrahydrofuran, a hydrocarbon-based solvent such as hexane, benzene and toluene, a nitrile-based solvent such as acetonitrile, a halogen-based solvent such as dichloromethane and trichloroethylene, and an ester-based solvent such as ethyl acetate, ethyl lactate and 2-(1-methoxy)propyl acetate, and the poor solvent is preferably an aqueous solvent such as water, hydrochloric acid, ammonia water and an aqueous sodium hydroxide solution, an alcohol-based solvent such as methanol, ethanol, isopropyl alcohol and 1-methoxy-2-propanol, a glycol-based solvent such as ethylene glycol and diethylene glycol, and a ketone compound solvent such as acetone, methyl ethyl ketone, methyl isobutyl ketone and cyclohexanone, and more preferably an aqueous solvent such as water and ammonia water, an alcohol solvent having 1 to 3 carbon atoms, and a glycol-based solvent having 1 to 6 carbon atoms. Furthermore, a mixed solvent of the aforementioned solvents is also suitable. The poor solvent is most preferably one or more solvents selected from the group consisting of water, an alcohol having 1 to 3 carbon atoms and a glycol having 1 to 6 carbon atoms.

In the aspect of the present invention, the azo compound dissolved solution obtained in process (b) is in a state where the azo compound is completely dissolved in a reaction solution, and it is preferred that an alcohol having 1 to 3 carbon atoms, preferably methanol is mixed as a poor solvent with the azo compound dissolved solution. A finally high purity and desired α-type crystal form azo pigment may be efficiently obtained by preparing a crude azo pigment by the aspect.

The mixing ratio between the azo compound dissolved solution obtained in process (b) and the poor solvent is, in terms of volume ratio, preferably 1/50 to 2/3, more preferably 1/40 to 1/2, and particularly preferably 1/20 to 1/2. When the volume ratio is 2/3 or less, sufficient crystallization of a pigment occurs and the reaction yield is increased, and when the volume ratio is 1/50 or more, productivity is enhanced which is economical.

The temperature at which the azo compound dissolved solution obtained in process (b) is mixed with the poor solvent is not particularly limited, but the mixing is preferably performed at −10° C. to 50° C., more preferably at −5° C. to 30° C., and most preferably at 10° C. to 25° C.

In the mixing of the azo compound dissolved solution obtained in process (b) with the poor solvent, the particle diameter of the organic nanoparticle produced by precipitation may be controlled by adjusting the Reynolds number. Here, the Reynolds number is a dimensionless number which indicates the flowing state of a fluid and is represented by the following equation.

$$Re = \rho UL/\mu \qquad \text{Equation (1)}$$

(In Equation (1), Re represents the Reynolds number, $\rho$ represents the density [kg/m$^3$] of the azo compound dissolved solution obtained in process (b), U represents the relative velocity [m/s] when the azo compound dissolved solution meets the poor solvent, L represents the equivalent diameter [m] of a flow channel or a supply inlet at a portion where the azo compound dissolved solution meets the poor solvent, and $\mu$ represents the viscosity coefficient [Pa·s] of the azo compound dissolved solution.)

The equivalent diameter L refers to the diameter of an equivalent circular tube when a circular tube which is equivalent to the opening diameter or flow channel of a pipe having an arbitrary cross-section shape is envisaged. The equivalent diameter L is represented by the following Equation (2), in which the cross-sectional area of the pipe is designated as A and the wetted perimeter length (circumference) of the pipe or the outer perimeter of the flow channel is designated as p.

$$L = 4A/p \qquad \text{Equation (2)}$$

The relative velocity U when the azo compound dissolved solution meets the poor solvent is defined as the relative velocity in a direction perpendicular to a surface of the portion where the two liquids meet each other. That is, for example, in the case of mixing by injecting the azo compound dissolved solution into the poor solvent which is stationary, the velocity of injecting from the supply inlet is identical to the relative velocity U. The value of the relative velocity U is not particularly limited, but for example, the value is preferably set to 0.5 m/s to 100 m/s, and more preferably to 1.0 m/s to 50 m/s.

The density $\rho$ of the azo compound dissolved solution is a value which is determined depending on the type of the selected material, but it is practical that $\rho$ is, for example, 0.8 kg/m$^3$ to 2.0 kg/m$^3$. Further, the viscosity coefficient $\mu$ of the azo compound dissolved solution is also a value which is determined depending on the material used, the environment temperature and the like, and for example, a value of 0.5 mPa·s to 100 mPa·s is preferred, and a value of 1.0 mPa·s to 50.0 mPa·s is more preferred.

A smaller value of the Reynolds number is likely to form a laminar flow, and a larger value is likely to form a turbulent flow. For example, the particle diameter of the pigment nanoparticles may be obtained while being controlled by adjusting the Reynolds number to 60 or more, and it is preferred to adjust the Reynolds number to 100 or more, and more preferably to 150 or more. The Reynolds number has no particular upper limit, but pigment particles having a desired average particle diameter may be obtained while being controlled by adjusting and controlling the Reynolds number, for example, in a range of 100,000 or less. In this case, within the aforementioned range, pigment particles having a smaller particle diameter may be obtained while being controlled usually by increasing the Reynolds number.

When the primary particles of the crude azo pigment particle obtained by the preparation method of the present invention are observed under a transmission microscope, the length in a long axis direction is preferably 1 nm to 10 μm, more preferably 5 nm to 5 μm, still more preferably 10 nm to 2 μm, and particularly preferably 10 nm to 1 μm.

Meanwhile, with respect to the particle diameter of the pigment particle, there is a method of digitizing the particle diameter by a measuring technique and expressing the particle diameter in terms of an average size of a group, and examples of the size frequently used includes a mode diameter indicating the maximum value of distribution, a median diameter corresponding to the median value in the integral distribution curve, Various average diameters (number average, length average, area average, mass average, volume average and the like), and the like, and in the present invention, unless otherwise indicated, the average particle diameter refers to a number average particle diameter.

Examples of the method of measuring the particle diameter of the pigment particle include a microscopic method, a mass method, a light scattering method, a light shielding method, an electric resistance method, an acoustic method, and a dynamic light scattering method, and a microscopic method and a dynamic light scattering method are particularly preferred. Examples of a microscope used in the microscopic method include a scanning electron microscope, a transmission electron microscope and the like. Examples of a particle measuring apparatus using a dynamic light scattering method include Nanotrac UPA-EX150 manufactured by Nikkiso Co., Ltd., Dynamic Light Scattering Photometer DLS-7000 Series manufactured by Otsuka Electronics Co., Ltd., and the like.

The aforementioned preferred average particle diameter of the pigment particle is achieved by appropriately adjusting (1) the temperature in process (c), (2) the solubility of the azo compound for the poor solvent, and (3) the stirring speed (or Reynolds number).

In preparing a liquid dispersion by precipitating crude azo pigment fine particles, at least one of the azo compound dissolved solution and the poor solvent may contain a dispersing agent. In this case, it is preferred that the dispersing agent is contained into the azo compound dissolved solution. The dispersing agent has actions of (1) quickly being adsorbed to the surface of the precipitated pigment to form fine nanoparticles and (2) preventing these particles from aggregating again.

As the dispersing agent, for example, an anionic, cationic, amphoteric or nonionic, low molecular or polymer dispersing agent may be used.

As for the polymer dispersing agent, the mass average molecular weight thereof is preferably 1,000 to 500,000, more preferably 10,000 to 500,000, and particularly preferably 10,000 to 100,000.

Specific examples thereof include polyvinylpyrrolidone, polyvinyl alcohol, polyvinyl methyl ether, polyethylene glycol, polypropylene glycol, polyacrylamide, a vinyl alcohol-vinyl acetate copolymer, partially formalised polyvinyl alcohol, partially butyralized polyvinyl alcohol, a vinylpyrrolidone-vinyl acetate copolymer, a polyethylene oxide/propylene oxide block copolymer, polyacrylate, polyvinyl sulfate, poly(4-vinylpyridine) salt, polyamide, polyallylamine salt, condensed naphthalenesulfonate, a cellulose derivative, a starch derivative and the like. In addition, natural polymers such as alginate, gelatin, albumin, casein, gum arabic, gum traganth and lignin sulfonate may also be used. Among them, polyvinylpyrrolidone is preferred. These polymer compounds may be used either alone or in combination of two or more thereof, and may also be used by combining a low molecular dispersing agent. The dispersing agent used for dispersion of a pigment is described in detail in "Dispersion Stabilization of Pigment and Surface Treatment Technique Evaluation" (Japan Association for International Chemical Information, published on December 2001), pp. 29 to 46.

Examples of the anionic dispersing agent (anionic surfactant) include an N-acyl-N-alkyltaurine salt, a fatty acid salt, an alkylsulfonic ester salt, alkylbenzenesulfonate, alkylnaphthalenesulfonate, dialkylsulfosuccinate, an alkylphosphonic ester salt, a naphthalenesulfonic acid-formalin condensate, a polyoxyethylene alkylsulfonic ester salt and the like. Among them, an N-acyl-N-alkyltaurine salt is preferred. As the N-acyl-N-alkyltaurine salt, those described in Japanese Patent Application Laid-Open No. H3-273067 are preferred. These anionic dispersing agents may be used either alone or in combination of two or more kinds thereof.

Examples of the cationic dispersing agent (cationic surfactant) include a quaternary ammonium salt, alkoxylated polyamine, aliphatic amine polyglycol ether, aliphatic amine, diamine and polyamine derived from aliphatic amine and aliphatic alcohol, imidazoline derived from aliphatic acid, and salts of these cationic substances. These cationic dispersing agents may be used either alone or in combination of two or more kinds thereof.

The amphoteric dispersing agent is a dispersing agent having, in the molecule thereof, both an anionic group moiety that is contained in the molecule of the anionic dispersing agent, and a cationic group moiety that is contained in the molecule of the cationic dispersing agent.

Examples of the nonionic dispersing agent (nonionic surfactant) include polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, a glycerin fatty acid ester and the like. Among them, polyoxyethylene alkylaryl ether is preferred. These nonionic dispersing agents may be used either alone or in combination of two or more kinds thereof.

The content of the dispersing agent is preferably in a range of 0.1 parts by mass to 1,000 parts by mass, more preferably in a range of 1 part by mass to 500 parts by mass, and still more preferably in a range of 5 parts by mass to 200 parts by mass, based on 100 parts by mass of the pigment. Furthermore, the dispersing agents may be used either alone or in combination of a plurality thereof.

By the aforementioned preparation method, the compound represented by Formula (1) is obtained as a crude azo pigment. As a method of obtaining an azo pigment in the form of crystal, a post-treatment is preferably performed. Examples of the method of this post-treatment include a process of controlling the pigment particle by a grinding treatment such as solvent salt milling, salt milling, dry milling, solvent milling and acid pasting, a solvent heating treatment, desolvation and the like.

For example, a ζ-type crystal form azo pigment is precipitated by mixing the azo compound dissolved solution obtained in process (b) with methanol as a poor solvent, and a β-type crystal form azo pigment may be obtained by subjecting the ζ-type crystal form azo pigment to crystal transformation.

Hereinafter, crystal transformation will be described.

The crystal transformation in the present invention indicates transforming the crystal form, and before transformation, even an amorphous form may have a crystal form different from the crystal form after transformation. Examples of the method of crystal transformation include the aforementioned post-treatment, a grinding treatment such as solvent salt milling, salt milling, dry milling, solvent milling and acid pasting, a solvent heating treatment and desolvation are preferred, salt milling, solvent milling, a solvent heating treatment and desolvation are more preferred, and a solvent heating treatment and desolvation are particularly preferred.

According to the crystal transformation, a compound may be transformed from an amorphous state to a crystal form, and may also be transformed from one crystal form to another crystal form.

For example, a γ-type crystal form azo pigment may be precipitated by adding the azo compound dissolved solution obtained in process (b) to methanol containing 30% of water. A β-type crystal form azo pigment is obtained by subjecting the γ-type crystal form azo pigment to solvent heating treatment, and an α-type crystal form azo pigment may be obtained by desolvating a solvate (preferably, acetone solvate) of the β-type crystal form azo pigment.

In addition, a ζ-type crystal form azo pigment is precipitated by adding the azo compound dissolved solution obtained in process (b) to methanol, a β-type crystal form azo pigment is obtained by subjecting the ζ-type crystal form azo pigment to crystal transformation, and an α-type crystal form azo pigment may be obtained by desolvating the β-type crystal form azo pigment.

(Solvent Heating Treatment)

The solvent heating treatment in the present invention specifically refers to heating and stirring an amorphous azo compound or a crystalline azo pigment represented by Formula (1) or a salt, hydrate or solvate thereof in a solvent.

A crystal transformation may be efficiently performed by the solvent heating treatment.

A β-type crystal form azo pigment may be obtained by heating and stirring a ζ-type crystal form azo pigment or a γ-type crystal form azo pigment.

As a solvent used for the solvent heating treatment, a solvent with an α-type crystal form azo pigment represented by Formula (1) having low solubility therein after the crystal transformation is preferred from the viewpoint of suppressing the crystal growth.

As the solvent used when the ζ-type crystal form azo pigment and the γ-type crystal form azo pigment are subjected to crystal transformation into a β-type crystal form azo pigment, for example, a ketone-based compound, an aromatic-based compound and acetonitrile are preferred, and among them, examples thereof include a polar aprotic organic solvent such as acetone, methyl ethyl ketone, toluene, acetonitrile, N,N-dimethylformamide, N,N-dimethylacetamide, and N-methyl-2-pyrrolidone or a mixture thereof, and among them, acetone, methyl ethyl ketone, toluene, acetonitrile and N-methyl-2-pyrrolidone are preferred, N-methyl-2-pyrrolidone or acetone is more preferred, and acetone is still more preferred. An inorganic or organic acid or base may be further added to the solvent exemplified above.

The amount of the solvent used in the solvent heating treatment is preferably 1 time to 100 times, more preferably 5 times to 50 times, and still more preferably 8 times to 30 times based on the amount of the amorphous azo compound represented by Formula (1). When the amount is less than 1 time, stirrability may not be secured, which is not preferred. Further, when the amount is more than 100 times, productivity deteriorates, and economic efficiency deteriorates, which is not preferred.

The temperature of heating and stirring in the solvent heating treatment varies depending on the size of the primary particle diameter of a desired pigment, but is preferably 15° C. to 150° C., more preferably 20° C. to 120° C., and still more preferably 20° C. to 100° C. At a low temperature less than 15° C., it takes a long time for a crystal transformation to occur, which is not efficient. On the other hand, at a high temperature more than 150° C., a part of an azo pigment (1) is decomposed, which is not preferred.

The stirring time for crystal transformation is not particularly limited as long as the crystal transformation is occurring, but is preferably 5 minutes to 1,500 minutes, more preferably 10 minutes to 600 minutes, and still more preferably 30 minutes to 300 minutes. When the stirring time is shorter than 5 minutes, partially amorphous moieties are likely to remain, which is not preferred. On the other hand, when the stirring time is longer than 1,500 minutes, the time is inefficient, which is not preferred.

(Desolvation)

An α-type crystal form azo pigment may be obtained by desolvating a β-type crystal form azo pigment.

Examples of a desolvation method include treatment with a solvent which is not solvated with the α-type crystal form azo pigment represented by Formula (1), and drying, the method is preferably drying, and drying under heating and/or reduced pressure is most preferred. In the case of drying by adding heat, the temperature is not particularly limited as long as a solvent is removed at the temperature, and is preferably 40° C. or more, more preferably 60° C. or more, and still more preferably 60° C. to 100° C.

(Solvent Salt Milling)

Examples of the solvent salt milling include a method including placing, into a kneading machine, a crude azo pigment, an inorganic salt, and an organic solvent that does not dissolve it, and performing kneading and grinding therein. A water-soluble inorganic salt may be suitably used as the inorganic salt, and it is preferred that for example, an inorganic salt such as sodium chloride, potassium chloride and sodium sulfate is used. Furthermore, it is more preferred that an inorganic salt having an average particle diameter of 0.5 μm to 50 μm is used. The amount of the inorganic salt used is preferably 3 times by mass to 20 times by mass, and more preferably 5 times by mass to 15 times by mass based on the amount of the crude azo pigment. An aqueous organic solvent may be suitably used as the organic solvent, and since the solvent may easily evaporate due to an increase in temperature at the time of kneading, a solvent having a high boiling temperature is preferred from the viewpoint of safety. Examples of the organic solvent include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, or a mixture thereof. The amount of the aqueous organic solvent used is preferably 0.1 times by mass to 5 times by mass based on the amount of the crude azo pigment. The kneading temperature is preferably 20° C. to 130° C. and particularly preferably 40° C. to 110° C. As the kneading machine, for example, a kneader, a mix Muller or the like may be used.

The α-type crystal form azo pigment represented by Formula (1) according to the present invention may be further subjected to post-treatment, and may be subjected to surface treatment with, for example, a resin, a surfactant, a dispersing agent and the like.

The azo pigment represented by Formula (1) may also be prepared by the following method. That is, the azo pigment represented by Formula (1) may be prepared by modifying a heterocyclic amine represented by the following Formula (2) into diazonium, and subsequently performing a coupling reaction with a compound represented by the following Formula (3).

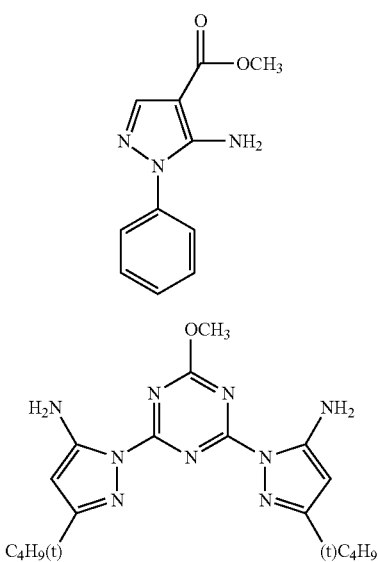

Formula (2)

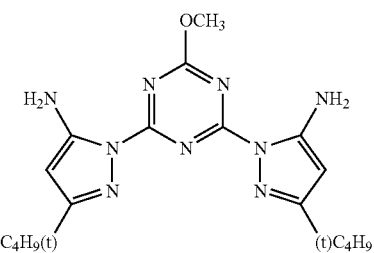

Formula (3)

The azo pigment of the present invention may be synthesized, for example, by performing an azo coupling reaction between a diazonium salt, which is prepared by an already known method using the diazo component of Formula (2) and the coupling component of Formula (3).

The preparation and coupling reaction of the diazonium salt may be performed by a common method.

For the preparation of the diazonium salt of Formula (2), it is possible to apply, for example, a common method of adjusting a diazonium salt by using a nitrosonium ion source, for example, nitrous acid, nitrite or nitrosylsulfuric acid, in a reaction medium containing an acid (for example, hydrochloric acid, sulfuric acid, phosphoric acid, acetic acid, propionic acid, methanesulfonic acid, trifluoromethanesulfonic acid and the like).

More preferred examples of the acid include a case of using acetic acid, propionic acid, methanesulfonic acid, phosphoric acid and sulfuric acid either alone or in combination thereof, and among them, phosphoric acid or a combination use system of acetic acid and sulfuric acid is particularly preferred.

As preferred examples of the reaction medium (solvent), an organic acid and an inorganic acid are preferably used, and in particular, phosphoric acid, sulfuric acid, acetic acid, propionic acid and methanesulfonic acid are preferred, and among them, acetic acid and/or propionic acid are preferred.

As a preferred example of the nitrosonium ion source, it is stable to use nitrtosyl sulfuric acid in the aforementioned preferred reaction medium containing an acid, and further, the diazonium salt may be efficiently prepared.

The amount of the solvent used is preferably 0.5 times by mass to 50 times by mass, more preferably 1 time by mass to 20 times by mass, and particularly preferably 3 times by mass to 10 times by mass based on the amount of the diazo component of Formula (2).

In the present invention, the diazo component of Formula (2) may be in a state of being dispersed in a solvent, or in a state of a dissolved solution depending on the type of the diazo component.

The amount of the nitrosonium ion source used is preferably 0.95 equivalents to 5.0 equivalents, more preferably 1.00 equivalent to 3.00 equivalents, and particularly preferably 1.00 to 1.10 equivalents with respect to the diazo component.

The reaction temperature is preferably $-15°$ C. to $30°$ C., more preferably $-10°$ C. to $10°$ C., and still more preferably $-5°$ C. to $5°$ C. At less than $-10°$ C., the reaction rate is significantly slowed down, and a time for synthesis is significantly increased, which is not economical, and when the synthesis is performed at a high temperature more than $30°$ C., the amount of a side product produced is increased, which is not preferred.

The reaction time is preferably 30 minutes to 300 minutes, more preferably 30 minutes to 200 minutes, and still more preferably 30 minutes to 150 minutes.

The coupling reaction may be performed in an acidic reaction medium to a basic reaction medium, but is preferably performed in an acidic to neutral reaction medium for the azo pigment of the present invention, and the components may be efficiently derived into the azo pigment by suppressing the decomposition of the diazonium salt particularly when the coupling reaction is performed in an acidic reaction medium.

As a preferred example of the reaction medium (solvent), an organic acid, an inorganic acid and an organic solvent may be used, and an organic solvent is particularly preferred, and a solvent causing no liquid separation phenomenon during reaction and providing a uniform solution with the solvent is preferred. Examples thereof include an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the solvent may be a glycol-based solvent having two or more hydroxyl groups, or an alcohol-based solvent having 3 or less carbon atoms, and preferably an alcohol solvent (for example, methanol and ethylene glycol) having 2 or less carbon atoms, in a solvent molecule. Further, a mixed solvent of these solvents is also included in the organic solvent.

The amount of the solvent used is preferably 1 time by mass to 100 times by mass, more preferably 1 time by mass to 50 times by mass, and still more preferably 2 times by mass to 10 times by mass based on the amount of the coupling component represented by Formula (3).

In the present invention, the coupling component which forms Formula (1) may be in a state of being dispersed in a solvent, or in a state of a dissolved solution depending on the type of the coupling component.

For the amount of the coupling component used, the diazo component is preferably 0.95 equivalents to 5.0 equivalents, more preferably 1.00 equivalent to 3.00 equivalents, and particularly preferably 1.00 to 1.50 equivalents per the azo coupling moiety.

The reaction temperature is preferably $-30°$ C. to $30°$ C., more preferably $-15°$ C. to $10°$ C., and still more preferably $-10°$ C. to $5°$ C. At less than $-30°$ C., the reaction rate is significantly slowed down, and a time for synthesis is significantly increased, which is not economical, and when the synthesis is performed at a high temperature more than $30°$ C., the amount of a side product produced is increased, which is not preferred.

The reaction time is preferably 30 minutes to 300 minutes, more preferably 30 minutes to 200 minutes, and still more preferably 30 minutes to 150 minutes.

In the method of synthesizing an azo pigment according to the present invention, a product (crude azo pigment) obtained by these reactions may be treated by a typical post-treatment method of an organic synthesis reaction, and then used with or without purification.

That is, for example, a product isolated from the reaction system may be used without purification or by performing a purification operation such as recrystallization and salt formation either alone or in combination.

In addition, after the reaction is completed, the reaction solvent may or may not be removed by distillation, the reaction solution may or may not be neutralized by pouring the reaction solvent in water or ice, and the product isolated or extracted with an organic solvent/aqueous solution may be used without purification or after performing a purification operation such as recrystallization, crystallization and salt formation either alone or in combination.

The synthesizing method of an azo pigment composition according to the present invention will be described in more detail.

As the method for preparing an azo pigment according to the present invention, in a coupling reaction between a diazonium compound obtained by modifying the heterocyclic amine represented by Formula (2) into diazonium and the compound represented by Formula (3), the compound of Formula (3) is preferably subjected to coupling reaction.

The reaction of modifying the heterocyclic amine represented by Formula (2) into diazonium may be performed, for example, by reacting the heterocyclic amine with a reagent such as sodium nitrite and nitrosylsulfuric acid in an acidic solvent such as sulfuric acid, phosphoric acid and acetic acid at a temperature of 15° C. or less for approximately 10 minutes to 6 hours. It is preferred that the coupling reaction is performed by reacting a diazonium salt obtained by the above-described method and the compound represented by Formula (3) at 40° C. or less, preferably 15° C. or less for approximately 10 minutes to 12 hours.

The tautomerism and/or crystalline polymorphism described above may be controlled by the preparation conditions during the coupling reaction. For example, a method in which the coupling reaction is preformed after once dissolving the compound represented by Formula (3) in an organic solvent may be used, or a method in which the coupling reaction is performed without dissolving the compound may be used. Examples of the organic solvent which may be used in this case include an alcohol solvent. As an example of the alcohol solvent, methanol, ethanol, isopropanol, ethylene glycol, diethylene glycol and the like are preferred, and among them, methanol is particularly preferred.

Another method for preparing an azo pigment includes, in a coupling reaction between a diazonium compound obtained by modifying the heterocyclic amine represented by Formula (2) into diazonium and the compound represented by Formula (3), performing coupling reaction in the presence of a polar aprotic solvent.

The azo pigment of Formula (1) may be efficiently prepared even by the method of performing the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, a mixed solvent thereof and the like. When these solvents are used, the compound of Formula (3) may or may not be completely dissolved in the solvent.

By the aforementioned preparation method, the compound represented by Formula (1) is obtained as a ζ-type crystal form azo pigment. As a method of obtaining an α-type crystal form azo pigment, the above-described post-treatment is preferably performed. Examples thereof include a method of obtaining a β-type crystal form azo pigment by subjecting the ζ-type crystal form azo pigment to solvent heating treatment, and desolvating the β-type crystal form azo pigment. The solvent heating treatment and desolvation may be performed by the above-described method.

[Synthesis of β-Type Crystal Form Azo Pigment]

Hereinafter, the method for preparing an azo pigment will be described in detail.

It is preferred that the method for preparing an azo pigment includes a process of obtaining a crude azo pigment and a process of transforming the crude azo pigment into a β-type crystal form azo pigment by subjecting the crude azo pigment to solvent treatment.

It is preferred that the method for preparing a crude azo pigment includes (a) a process of mixing a diazotizing agent with a heterocyclic amine represented by Formula (2), and (b) a process of performing a reaction by mixing a reaction product obtained in process (a) with a compound represented by Formula (3), and obtaining a solution in which an azo compound produced by the reaction and represented by Formula (1) is dissolved at least in part, and it is more preferred that the method also includes (c) a process of crystallizing the pigment represented by Formula (1) by mixing the solution obtained in process (b) with a poor solvent for the azo compound represented by Formula (1).

In process (b), when the ratio at which the azo compound is dissolved is high, the yield becomes high, which is preferred.

Process (a) according to the present invention will be described in detail.

In process (a), a diazonium compound is derived by a reaction of a heterocyclic amine represented by Formula (2) with a diazotizing agent by mixing a diazotizing agent with a heterocyclic amine represented by Formula (2). It is preferred that this reaction is performed in a medium including an acid. In the present specification, a liquid including the diazonium compound is referred to as "diazonium compound liquid preparation". The method of mixing the heterocyclic amine represented by Formula (2) with the acid and the diazotizing agent is not particularly limited, but it is preferred that the diazotizing agent is added to a solution of the heterocyclic amine represented by Formula (2) and the acid. The diazotizing agent in process (a) is used to derive the heterocyclic amine represented by Formula (2) into the diazonium compound, and is not limited as long as the diazotizing agent has such an action. Representative examples of the diazotizing agent include nitrite esters (examples thereof include isopentyl nitrite), nitrite salts (examples thereof include sodium nitrite or potassium nitrite), isoamyl nitrite and nitrosylsulfuric acid, the diazotizing agent is more preferably sodium nitrite, potassium nitrite and nitrosylsulfuric acid, and among them, nitrosylsulfuric acid is particularly preferred from the viewpoint that the diazonium compound may be stably and efficiently prepared.

The acid used in process (a) means an acid which may even slightly dissolve the heterocyclic amine represented by Formula (2) even though the acid does not completely dissolve the heterocyclic amine, and is preferably an acid which completely dissolves an amino compound. As the acid, an inorganic acid and an organic acid may be used, and examples of the inorganic acid include hydrochloric acid, phosphoric acid and sulfuric acid, and the inorganic acid is preferably phosphoric acid and sulfuric acid, and more preferably sulfuric acid. Examples of the organic acid include formic acid, acetic acid, propionic acid and methanesulfonic acid, and the organic acid is preferably acetic acid, propionic acid and methanesulfonic acid, and more preferably acetic acid and propionic acid. Furthermore, these acids may be used either alone or in a mixture thereof. Examples of a mixed acid include phosphoric acid/acetic acid, sulfuric acid/acetic acid, methanesulfonic acid/acetic acid and acetic acid/propionic acid, the mixed acid is preferably phosphoric acid/acetic acid, sulfuric acid/acetic acid, sulfuric acid/acetic acid/propionic acid and acetic acid/propionic acid, and among them, sulfuric acid/acetic acid and acetic acid/propionic acid are particularly preferred. The mass ratio of these mixed acids is preferably 1/(0.1 to 20), more preferably 1/(0.5 to 10), and still more preferably 1/(1 to 10).

In process (a), the amount of acid added to the heterocyclic amine represented by Formula (2) is, in terms of mass ratio, 1 time to 100 times, more preferably 2 times to 50 times, and still more preferably 3 times to 25 times. When the mass ratio is 1 time or more, stirrability is improved so that the diazonium compound may be derived more securely. On the other hand, when the mass ratio is 100 times or less, productivity is enhanced so that economic efficiency is improved.

Further, in process (a), the amount of the diazotizing agent added to the heterocyclic amine represented by Formula (2) is, in terms of molar ratio, 1.0 time to 20 times, more preferably 1.0 time to 10 times, and still more preferably 1.0 time to 5 times. When the amount of the diazotizing agent to the amino compound is, in terms of molar ratio, 1 time or more, the diazonium compound may be derived more securely, and when the amount is 20 times or less, it is possible to suppress the diazonium compound from being decomposed by a side reaction.

The mixing of the diazotizing agent with the heterocyclic amine represented by Formula (2) in process (a) is performed preferably at 50° C. or less, more preferably at 40° C. or less, and still more preferably at 30° C. or less. In the preparation of the diazo solution at a high temperature more than 50° C., there is a concern in that the diazotizing agent may be decomposed. A stirring time to derive the heterocyclic amine into the diazonium compound is preferably 0.3 to 10 hours, more preferably 0.5 to 5 hours, and still more preferably 1 to 3 hours. When the stirring time is 0.3 hour or more, it is easy to completely derive the heterocyclic amine into the diazonium compound, and when the stirring time is 10 hours or less, it is difficult for the decomposition of the diazonium compound to occur. In addition, a typical stirrer is used in the mixing, and the stirrer is not particularly limited. The number of revolutions of the stirring may be different depending on the manufacturing facility in some cases, but is preferably 30 rpm to 300 rpm, more preferably 40 rpm to 200 rpm, and still more preferably 50 rpm to 200 rpm. When the stirring speed is 30 rpm or more in terms of the number of revolutions, the stirring efficiency of the diazonium compound liquid preparation is improved, and therefore, a desired reaction may proceed securely.

The solvent which may be mixed in process (a) is not particularly limited as long as the diazonium compound derived is not decomposed. Examples of the solvent which may be mixed include a hydrocarbon-based solvent such as hexane, benzene and toluene, an ether-based solvent such as diethyl ether and tetrahydrofuran, a ketone-based solvent such as acetone and methyl ethyl ketone, an amide-based solvent such as dimethylformamide, dimethylacetamide, pyrrolidone and N-methyl-2-pyrrolidone, and dimethylsulfoxide, sulfolane, acetonitrile and water.

A pH of the diazonium compound liquid preparation in process (a) is preferably 7 or less, more preferably 5 or less, and still more preferably 3 or less. When the pH of the diazonium compound liquid preparation in process (a) is more than 7, there is a concern in that the diazonium compound derived may be decomposed.

Next, process (b) according to the present invention will be described in detail.

Process (b) is a process of mixing the reaction product obtained in process (a) with a compound represented by Formula (3) for a reaction to occur, and obtaining a solution in which an azo compound produced by the reaction and represented by Formula (1), which is produced by the reaction, is dissolved at least in part.

In the present specification, the solution in which the azo compound is dissolved at least in part is referred to as "an azo compound dissolved solution".

Examples of a method of preparing the azo compound dissolved solution include (I) a method of obtaining the azo compound dissolved solution including: performing a coupling reaction by mixing the reaction product obtained in process (a) with the compound represented by Formula (3), and as a result of the reaction, dissolving the precipitated azo pigment represented by Formula (1) in a solvent, and (II) a method of obtaining the azo compound dissolved solution including: performing the coupling reaction such that the compound obtained by the coupling reaction and represented by Formula (1) is dissolved at least in part in a reaction solution, and adopting the resulting reaction solution as the azo compound dissolved solution as it is, or a method of obtaining the azo compound dissolved solution including: further dissolving a (crystallized) azo pigment, which is obtained by applying the thus-obtained azo compound dissolved solution to process (c) to be described below in detail in a solvent.

In any of types (I) and (II), a method of mixing the diazonium compound liquid preparation obtained in process (a) with a compound represented by Formula (3) is not particularly limited, but it is preferred that the compound represented by Formula (3) is partly or completely dissolved in a solvent and the resulting solution is added to the liquid preparation, or the compound represented by Formula (3) is added as a solid to the liquid preparation without using the solvent, and it is more preferred that a solution of the compound represented by Formula (3) is added to the diazonium compound liquid preparation obtained in process (a), or the coupling component is added as a solid to the diazonium compound liquid preparation obtained in process (a).

In addition, the amount of the diazonium compound in the diazonium compound liquid preparation obtained in process (a) to the compound represented by Formula (3) in process (b) is preferably 0.8 to 3 equivalents to the coupling position of the compound represented by Formula (3), more preferably 0.9 to 2 equivalents to the coupling position, and still more preferably 0.95 to 1.5 equivalents to the coupling position. When the amount is 0.8 equivalents or more, a coupling component having an unreacted coupling position may be suppressed from remaining, and when the amount is 3 equivalents or less, an unreacted diazonium compound may be suppressed from remaining, and therefore, the amount range is more economical.

Meanwhile, in type (II), since the azo compound represented by Formula (1) is dissolved at least in part in process (b), the coupling reaction proceeds more smoothly, thereby preparing a high-purity azo compound. The reason is assumed as follows. Since there are two coupling positions, for example, only one coupling position goes through a reaction intermediate which is reacted. When the reaction intermediate is precipitated into the reaction system, the reaction rate of the second coupling reaction is slowed down. Meanwhile, since the diazonium compound is unstable, there is a concern in that decomposition may occur when a long time elapses. Accordingly, it is important to allow the coupling reaction to proceed rapidly, and consequently, the type (II) preparation method, which does not produce a precipitate in process (b), is more suitable for preparing a high-purity pigment.

In process (b), the coupling component may be added without using a solvent, but it is preferred that the coupling component is added while being mixed with the solvent. In process (b), when a solvent is used in the coupling component, the solvent is not particularly limited, but is preferably a solvent which allows type (II) to be used, that is, a solvent by which it is possible to obtain a solution in which the azo compound produced after the reaction and represented by general Formula (1) is dissolved at least in part.

In the case of type (I), that is, when the pigment is precipitated, as an example of the solvent, water, an organic acid, an inorganic acid and an organic solvent may be used, and an organic solvent is particularly preferred, and a solvent causing no liquid separation phenomenon during reaction and providing a uniform solution with the solvent is preferred. Examples thereof include water, an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the organic solvent may be a glycol-based solvent having two or more hydroxyl groups in the solvent molecule, an alcohol-based solvent having 3 or less carbon atoms, or a ketone-based solvent having a total carbon number of 5 or less, preferably an alcohol solvent having 2 or less atoms (for example, methanol and ethylene glycol) and a ketone-based solvent having a total carbon number of 4 or less (for example, acetone and methyl ethyl ketone). Furthermore, a mixed solvent of these solvents is also included in the organic solvent.

Further, in the case of type (II), that is, when a coupling reaction is performed such that the compound represented by Formula (1) is dissolved at least in part in the reaction solution, examples of the solvent include an alcohol-based solvent such as methanol, isopropanol and ethylene glycol, a ketone-based solvent such as acetone and methyl ethyl ketone, an organic acid solvent such as acetic acid, propionic acid and methanesulfonic acid, an inorganic acid solvent such as sulfuric acid, hydrochloric acid and phosphoric acid, an amide-based solvent such as dimethylformamide, dimethylacetamide, pyrrolidone and N-methyl-2-pyrrolidone, dimethylsulfoxide, sulfolane, and acetonitrile. Among them, a ketone-based solvent such as acetone and methyl ethyl ketone, an organic acid solvent such as acetic acid, propionic acid and methanesulfonic acid, and an inorganic acid solvent such as sulfuric acid, hydrochloric acid and phosphoric acid are preferred, an acidic solvent of organic acid or inorganic acid is more preferred, and acetic acid, methanesulfonic acid, phosphoric acid and sulfuric acid are most preferred. In addition, a mixed solvent of the aforementioned solvents is also suitable.

Particularly, in the case of type (II), in process (b), it is preferred that an acidic solution obtained by dissolving or suspending the coupling component in an acidic solvent is mixed with the reaction product obtained in process. Particularly, it is preferred that the acidic solvent is a solvent including at least one of acetic acid and sulfuric acid.

In any of types (I) and (II), the preferred amount of the solvent added to the coupling component is, in terms of mass ratio, preferably 0.5 times to 200 times, more preferably 1 time to 100 times, and still more preferably 1 time to 50 times. As for the preferred amount of the solvent added based on the coupling component, when the mass ratio is less than 0.5 times, it is difficult to stir the coupling component and the solvent in a preparation machine and a desired reaction does not proceed. In addition, the case where the mass ratio is more than 200 times is not economical.

When the preparation method of the azo compound dissolved solution is type (1) or when the preparation method of the azo compound dissolved solution is the type (II) and an azo pigment, which is obtained by applying the coupling reaction solution in which the compound represented by Formula (1) is dissolved at least in part to process (c) is further dissolved in the solvent to prepare an azo compound dissolved solution, the solvent, for dissolving the obtained azo pigment is not particularly limited as long as the solvent may dissolve at least a part of the azo pigment, but examples thereof include the preferred examples of the solvent previously described in type (II).

As for the azo compound dissolved solution obtained in process (b), the ratio of the azo compound represented by Formula (1), which is dissolved in the azo compound dissolved solution to the total amount of the azo compound produced by process (b) (the sum of the azo compound represented by Formula (1), which is dissolved in the azo compound dissolved solution and the azo pigment represented by Formula (1), which is precipitated from the azo compound dissolved solution) is preferably 50% by mass or more, more preferably 75% by mass or more, still more preferably 90% by mass or more, and most preferably 100% by mass (a state where the azo compound produced in process (b) is completely dissolved in the reaction solution), and accordingly, the particle diameter of the pigment tends to be further reduced.

In process (b), the diazonium compound liquid preparation of process (a) and the coupling component is preferably mixed at a temperature of 50° C. or less, more preferably 30° C. or less, and still more preferably 25° C. or less. When the mixing temperature is 50° C. or more, there is a concern in that the diazonium compound derived in process (a) and the produced azo compound represented by Formula (1) may be decomposed. Furthermore, a typical stirrer is used in the mixing, and the stirrer is not particularly limited. The number of revolutions of the stirring may be different depending on the manufacturing facility in some cases, but is preferably 30 rpm to 400 rpm, more preferably 40 rpm to 300 rpm, and still more preferably 50 rpm to 200 rpm. When the stirring speed is 30 rpm or less in terms of the number of revolutions, the stirring efficiency of the mixed solution deteriorates, and therefore, a desired reaction may not proceed. The stirring time in process (b) is preferably 0.1 to 10 hours, more preferably 0.3 to 5 hours, and still more preferably 0.3 to 3 hours. When the stirring time is less than 0.1 hours, it is difficult for the pigment to be completely derived, and when the stirring time is more than 10 hours, there is a concern in that the azo compound represented by Formula (1) may be decomposed.

Next, process (c) according to the present invention will be described in detail.

Process (c) is a process of crystallizing a pigment by mixing the azo compound dissolved solution obtained in process (b) with a poor solvent with the azo compound having low solubility therein. The method of mixing the azo compound dissolved solution obtained in process (b) with a poor solvent is not particularly limited, but it is preferred that the azo compound dissolved solution obtained in process (b) is added to a poor solvent and at this time, it is preferred that the poor solvent is in a state of being stirred.

The stirring speed is preferably 100 rpm to 10,000 rpm, more preferably 150 rpm to 8,000 rpm, and particularly preferably 200 rpm to 6,000 rpm. For the addition, a pump or the like may also be used. In this case, either in-liquid addition or out-of-liquid addition may be employed, but in-liquid addition is more preferred. In addition, continuous supply into liquid through a supply pipe by using a pump is preferred.

The poor solvent is not particularly limited, but is preferably a poor solvent with the azo compound represented by Formula (1) having a solubility of 1 g/L or less therein, and more preferably a poor solvent with the azo compound represented by Formula (1) having a solubility of 0.1 g/L or less therein. This solubility may be a solubility when the azo compound is dissolved in the presence of an acid or an alkali. As for the compatibility or uniform mixing property between the azo compound dissolved solution obtained in process (b) and the poor solvent, the amount of the azo compound dissolved in a poor solvent is preferably 30% by mass or more, and more preferably 50% by mass or more based on the amount of the azo compound dissolved in a good solvent. In the present specification, the solubility indicates a solubility at 25° C.

Examples of the poor solvent include an aqueous solvent such as water, hydrochloric acid, ammonia water and an aqueous sodium hydroxide solution, an alcohol-based solvent such as methanol, ethanol, isopropyl alcohol and 1-methoxy-2-propanol, a ketone compound solvent such as acetone, methyl ethyl ketone, methyl isobutyl ketone and cyclohexanone, an ether-based solvent such as diethyl ether and tetrahydrofuran, a hydrocarbon-based solvent such as hexane, benzene and toluene, a nitrile-based solvent such as acetonitrile, a halogen-based solvent such as dichloromethane and trichloroethylene, and an ester-based solvent such as ethyl acetate, ethyl lactate and 2-(1-methoxy)propyl acetate, and the poor solvent is preferably an aqueous solvent such as water, hydrochloric acid, ammonia water and an aqueous sodium hydroxide solution, an alcohol-based solvent such as methanol, ethanol, isopropyl alcohol and 1-methoxy-2-propanol, and a ketone compound solvent such as acetone, methyl ethyl ketone, methyl isobutyl ketone and cyclohexanone, and more preferably an aqueous solvent such as water and ammonia water, and an alcohol solvent having 1 to 3 carbon atoms. Furthermore, a mixed solvent of the aforementioned solvents is also suitable. The poor solvent is most preferably one or more solvents selected from the group consisting of water and an alcohol having 1 to 3 carbon atoms.

The mixing ratio between the azo compound dissolved solution obtained in process (b) and the poor solvent is, in terms of volume ratio, preferably 1/50 to 2/3, more preferably 1/40 to 1/2, and particularly preferably 1/20 to 1/2. When the volume ratio is 2/3 or less, sufficient crystallization of a pigment occurs and the reaction yield is increased, and when the volume ratio is 1/50 or more, productivity is enhanced, which is economical.

The temperature at which the azo compound dissolved solution obtained in process (b) is mixed with the poor solvent is not particularly limited, but the mixing is preferably performed at −10° C. to 50° C., more preferably at −5° C. to 30° C., and most preferably at −5° C. to 25° C.

In the mixing of the azo compound dissolved solution obtained in process (b) with the poor solvent, the particle diameter of the organic nanoparticle produced by precipitation may be controlled by adjusting the Reynolds number. Here, the Reynolds number is a dimensionless number which indicates the flowing state of a fluid and is represented by the following equation.

$$Re = \rho UL/\mu \qquad \text{Equation (1)}$$

(In Equation (1), Re represents the Reynolds number, $\rho$ represents the density [kg/m$^3$] of the azo compound dissolved solution obtained in process (b), U represents the relative velocity [m/s] when the azo compound dissolved solution meets the poor solvent, L represents the equivalent diameter [m] of a flow channel or a supply inlet at a portion where the azo compound dissolved solution meets the poor solvent, and $\mu$ represents the viscosity coefficient [Pa·s] of the azo compound dissolved solution.)

The equivalent diameter L refers to the diameter of an equivalent circular tube when a circular tube which is equivalent to the opening diameter or flow channel of a pipe having an arbitrary cross-section shape is envisaged. The equivalent diameter L is represented by the following Equation (2), in which the cross-sectional area of the pipe is designated as A and the wetted perimeter length (circumference) of the pipe or the outer perimeter of the flow channel is designated as p.

$$L = 4A/p \qquad \text{Equation (2)}$$

The relative velocity U when the azo compound dissolved solution meets the poor solvent is defined as the relative velocity in a direction perpendicular to a surface of the portion where the two liquids meet each other. That is, for example, in the case of mixing by injecting the azo compound dissolved solution into the poor solvent which is stationary, the velocity of injecting from the supply inlet is identical to the relative velocity U. The value of the relative velocity U is not particularly limited, but for example, the value is preferably set to 0.5 m/s to 100 m/s, and more preferably to 1.0 m/s to 50 m/s.

The density $\rho$ of the azo compound dissolved solution is a value which is determined depending on the type of the selected material, but it is practical that p is, for example, 0.8 kg/m$^3$ to 2.0 kg/m$^3$. Further, the viscosity coefficient $\mu$ of the azo compound dissolved solution is also a value which is determined depending on the material used, the environment temperature and the like, but for example, a value of 0.5 mPa·s to 100 mPa·s is preferred, and a value of 1.0 mPa·s to 50.0 mPa·s is more preferred.

A smaller value of the Reynolds number is likely to form a laminar flow, and a larger value is likely to form a turbulent flow. For example, the particle diameter of the pigment nanoparticles may be obtained while being controlled by adjusting the Reynolds number to 60 or more, and it is preferred to adjust the Reynolds number to 100 or more, and more preferably to 150 or more. The Reynolds number has no particular upper limit, but pigment particles having a desired average particle diameter may be obtained while being controlled by adjusting and controlling the Reynolds number, for example, in a range of 100,000 or less. In this case, within the aforementioned range, pigment particles having a smaller particle diameter may be obtained while being controlled usually by increasing the Reynolds number.

When the primary particles of the crude azo pigment particle obtained by the preparation method of the present invention are observed under a transmission microscope, the length in a long axis direction is preferably 1 nm to 10 µm, more preferably 5 nm to 5 µm, still more preferably 10 nm to 2 µm, and particularly preferably 10 nm to 1 µm.

Meanwhile, with respect to the particle diameter of the pigment particle, there is a method of digitizing the particle diameter by a measuring technique and expressing the particle diameter in terms of an average size of a group, examples of the size frequently used includes a mode diameter indicating the maximum value of distribution, a median diameter corresponding to the median value in the integral distribution curve, various average diameters (number average, length average, area average, mass average, volume average and the like), and the like, and in the present invention, unless otherwise indicated, the average particle diameter refers to a number average particle diameter.

Examples of the method of measuring the particle diameter of the pigment particle include a microscopic method, a mass method, a light scattering method, a light shielding method, an electric resistance method, an acoustic method, and a dynamic light scattering method, and a microscopic method and a dynamic light scattering method are particularly preferred. Examples of a microscope used in the microscopic method include a scanning electron microscope, a transmission electron microscope and the like. Examples of a particle measuring apparatus using a dynamic light scattering method include Nanotrac UPA-EX150 manufactured by Nikkiso Co., Ltd., Dynamic Light Scattering Photometer DLS-7000 Series manufactured by Otsuka Electronics Co., Ltd., and the like.

The aforementioned preferred average particle diameter of the pigment particle is achieved by appropriately adjusting (1) the temperature in process (c), (2) the solubility of the azo compound for the poor solvent, and (3) the stirring speed (or Reynolds number).

In preparing a liquid dispersion by precipitating crude azo pigment fine particles, at least any one of the azo compound dissolved solution and the poor solvent may contain a dispersing agent. In this case, it is preferred that the dispersing agent is contained into the azo compound dissolved solution. The dispersing agent has actions of (1) quickly being adsorbed to the surface of the precipitated pigment to form fine nanoparticles and (2) preventing these particles from aggregating again.

As the dispersing agent, for example, an anionic, cationic, amphoteric or nonionic, low molecular or polymer dispersing agent may be used.

As for the polymer dispersing agent, the mass average molecular weight thereof is preferably 1,000 to 500,000, more preferably 10,000 to 500,000, and particularly preferably 10,000 to 100,000.

Specific examples thereof include polyvinylpyrrolidone, polyvinyl alcohol, polyvinyl methyl ether, polyethylene glycol, polypropylene glycol, polyacrylamide, a vinyl alcohol-vinyl acetate copolymer, partially formalised polyvinyl alcohol, partially butyralized polyvinyl alcohol, a vinylpyrrolidone-vinyl acetate copolymer, a polyethylene oxide/propylene oxide block copolymer, polyacrylate, polyvinyl sulfate, poly(4-vinylpyridine) salt, polyamide, polyallylamine salt, condensed naphthalenesulfonate, a cellulose derivative, a starch derivative and the like. In addition, natural polymers such as alginate, gelatin, albumin, casein, gum arabic, gum traganth and lignin sulfonate may also be used. Among them, polyvinylpyrrolidone is preferred. These polymer compounds may be used either alone or in combination of two or more thereof, and may also be used by combining a low molecular dispersing agent. The dispersing agent used for dispersion of a pigment is described in detail in "Dispersion Stabilization of Pigment and Surface Treatment Technique Evaluation" (Japan Association for International Chemical Information, published on December 2001), pp. 29 to 46.

Examples of the anionic dispersing agent (anionic surfactant) include an N-acyl-N-alkyltaurine salt, a fatty acid salt, an alkylsulfonic ester salt, alkylbenzenesulfonate, alkylnaphthalenesulfonate, dialkylsulfosuccinate, an alkylphosphonic ester salt, a naphthalenesulfonic acid-formalin condensate, a polyoxyethylene alkylsulfonic ester salt and the like. Among them, an N-acyl-N-alkyltaurine salt is preferred. As the N-acyl-N-alkyltaurine salt, those described in Japanese Patent Application Laid-Open No. H3-273067 are preferred. These anionic dispersing agents may be used either alone or in combination of two or more kinds thereof.

Examples of the cationic dispersing agent (cationic surfactant) include a quaternary ammonium salt, alkoxylated polyamine, aliphatic amine polyglycol ether, aliphatic amine, aiamine or polyamine derived from aliphatic amine and aliphatic alcohol, imidazoline derived from aliphatic acid, and salts of these cationic substances. These cationic dispersing agents may be used either alone or in combination of two or more kinds thereof.

The amphoteric dispersing agent is a dispersing agent having, in the molecule thereof, both an anionic group moiety that is contained in the molecule of the anionic dispersing agent, and a cationic group moiety that is contained in the molecule of the cationic dispersing agent. Examples of the nonionic dispersing agent (nonionic surfactant) include polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and the like. Among them, polyoxyethylene alkylaryl ether is preferred. These nonionic dispersing agents may be used either alone or in combination of two or more kinds thereof.

The content of the dispersing agent is preferably in a range of 0.1 parts by mass to 1,000 parts by mass, more preferably in a range of 1 part by mass to 500 parts by mass, and still more preferably in a range of 5 parts by mass to 200 parts by mass, based on 100 parts by mass of the pigment. Furthermore, the dispersing agents may be used either alone or in combination of a plurality thereof.

In the aspect of the present invention, the azo compound dissolved solution obtained in process (b) is in a state where the azo compound is completely dissolved in a reaction solution, and it is preferred that an alcohol having 1 to 3 carbon atoms, preferably methanol is mixed as a poor solvent with the azo compound dissolved solution. A finally desired β-type crystal form azo pigment having a small particle diameter may be efficiently obtained by preparing a crude azo pigment by the aspect.

By the aforementioned preparation method, the compound represented by Formula (1) is obtained as a crude azo pigment. As a method of obtaining an azo pigment in the form of crystal, a post-treatment is preferably performed. Examples of the method of this post-treatment include a process of controlling the pigment particle by a grinding treatment such as solvent salt milling, salt milling, dry milling, solvent milling and acid pasting, a solvent heating treatment, and the like.

For example, a ζ-type crystal form azo pigment is precipitated by mixing the azo compound dissolved solution obtained in process (b) with methanol as a poor solvent, and a β-type crystal form azo pigment may be obtained by subjecting the ζ-type crystal form azo pigment to crystal transformation.

Hereinafter, crystal transformation will be described.

The crystal transformation in the present invention indicates transforming the crystal form, and before transformation, even an amorphous form may have a crystal form different from the crystal form after transformation. Examples of the method of crystal transformation include the aforementioned post-treatment, a grinding treatment such as solvent salt milling, salt milling, dry milling, solvent milling and acid pasting and a solvent heating treatment are preferred, salt milling, solvent milling and a solvent heating treatment are more preferred, and a solvent heating treatment is particularly preferred.

According to the crystal transformation, a compound may be transformed from an amorphous state to a crystal form, and may also be transformed from one crystal form to another crystal form.

The method for preparing an azo pigment or a tautomer thereof, which is represented by the following Formula (1), and has characteristic X-ray diffraction peaks at Bragg angles (2θ±0.2°) of 6.3°, 6.4° and 22.3° in the CuKα characteristic X-ray diffraction according to the present invention is characterized by subjecting an azo compound or a tautomer thereof, which is represented by the following Formula (1), and has characteristic X-ray diffraction peaks at Bragg angles (2θ±0.2°) of any one of (i) 6.6°, 9.2° and 21.5° (ζ-type crystal form azo pigment)

(ii) 4.8°, 7.2° and 9.7° (δ-type crystal form azo pigment), and (iii) 5.9°, 7.0° and 8.9° (γ-type crystal form azo pigment) in the CuKα characteristic X-ray diffraction, to solvent heating treatment.

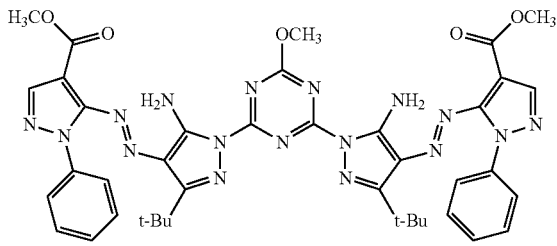

Formula (1)

(Solvent Heating Treatment)

The solvent heating treatment in the present invention specifically refers to heating and stirring an amorphous azo compound or a crystalline azo pigment represented by Formula (1) or a salt, hydrate or solvate thereof in a solvent.

A crystal transformation may be efficiently performed by the solvent heating treatment.

A β-type crystal form azo pigment may be obtained by subjecting any one of a ζ-type crystal form azo pigment, a δ-type crystal form azo pigment and a γ-type crystal form azo pigment to solvent heating treatment.

For example, the ζ-type crystal form azo pigment and the δ-type crystal form azo pigment may be obtained by the above-described preparation method. Further, the γ-type crystal form azo pigment may be obtained by a preparation method to be described below.

As a solvent used for the solvent heating treatment, a solvent with an azo pigment represented by Formula (1) having low solubility therein after the crystal transformation is preferred from the viewpoint of suppressing the crystal growth.

As the solvent used when the ζ-type crystal form azo pigment, the δ-type crystal form azo pigment and the γ-type crystal form azo pigment are subjected to crystal transformation into a β-type crystal form azo pigment, for example, a ketone-based compound, an aromatic-based compound and acetonitrile are preferred, and among them, examples thereof include a polar aprotic organic solvent such as acetone, methyl ethyl ketone, toluene, acetonitrile, N,N-dimethylformamide and N,N-dimethylacetamide, and N-methyl-2-pyrrolidone or a mixture thereof, and among them, acetone, methyl ethyl ketone, toluene, acetonitrile and N-methyl-2-pyrrolidone are preferred, N-methyl-2-pyrrolidone or acetone is more preferred, and acetone is still more preferred. An inorganic or organic acid or base may be further added to the solvent exemplified above, and the solvent may be a mixed solvent with another solvent (for example, an alcohol-based organic solvent such as methanol, ethanol, 2-propanol and t-butyl alcohol).

The amount of the solvent used in the solvent heating treatment is preferably 1 time to 100 times, more preferably 5 times to 50 times, and still more preferably 8 times to 30 times based on the amount of the amorphous azo compound represented by Formula (1). When the amount is less than 1 time, stirrability may not be secured, which is not preferred. Further, when the amount is more than 100 times, productivity deteriorates, and economic efficiency deteriorates, which is not preferred.

The temperature of heating and stirring in the solvent heating treatment varies depending on the size of the primary particle diameter of a desired pigment, but is preferably 15° C. to 150° C., more preferably 20° C. to 120° C., and still more preferably 20° C. to 10° C. At a low temperature less than 15° C., it takes a long time for a crystal transformation to occur, which is not efficient. On the other hand, at a high temperature more than 150° C., a part of an azo pigment (1) is decomposed, which is not preferred. It is most preferred that the solvent heating treatment is performed under reflux.

The stirring time for crystal transformation is not particularly limited as long as the crystal transformation is occurring, but is preferably 5 minutes to 1,500 minutes, more preferably 10 minutes to 600 minutes, and still more preferably 30 minutes to 300 minutes. When the stirring time is shorter than 5 minutes, partially amorphous moieties are likely to remain, which is not preferred. On the other hand, when the stirring time is longer than 1,500 minutes, the time is inefficient, which is not preferred.

(Solvent Salt Milling)

Examples of the solvent salt milling include a method including placing, into a kneading machine, a crude azo pigment, an inorganic salt, and an organic solvent that does not dissolve it, and performing kneading and grinding therein. A water-soluble inorganic salt may be suitably used as the inorganic salt, and it is preferred that for example, an inorganic salt such as sodium chloride, potassium chloride and sodium sulfate is used. Furthermore, it is more preferred that an inorganic salt having an average particle diameter of 0.5 μm to 50 μm is used. The amount of the inorganic salt used is preferably 3 times by mass to 20 times by mass, and more preferably 5 times by mass to 15 times by mass based on the amount of the crude azo pigment. An aqueous organic solvent may be suitably used as the organic solvent, and since the solvent may easily evaporate due to an increase in temperature at the time of kneading, a solvent having a high boiling temperature is preferred from the viewpoint of safety. Examples of the organic solvent include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, or a mixture thereof. The amount of the aqueous organic solvent used is preferably 0.1 times by mass to 5 times by mass based on the amount of the crude azo pigment. The kneading temperature is preferably 20° C. to 130° C. and particularly preferably 40° C. to 110° C. As the kneading machine, for example, a kneader, a mix Muller or the like may be used.

The α-type crystal form azo pigment represented by Formula (1) of the present invention may be further subjected to post-treatment, and may be subjected to surface treatment with, for example, a resin, a surfactant, a dispersing agent and the like.

The azo pigment represented by Formula (1) may also be prepared by the following method. That is, the azo pigment represented by Formula (1) may be prepared by modifying a heterocyclic amine represented by the following Formula (2) into diazonium, and

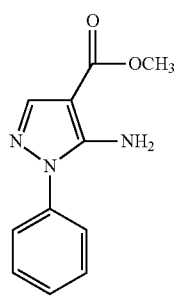

Formula (2)

subsequently, performing a coupling reaction with a compound represented by the following Formula (3).

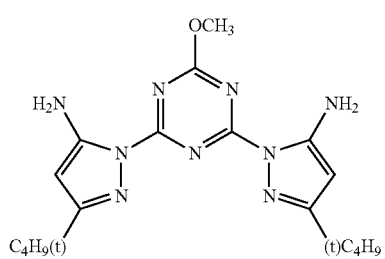

Formula (3)

The azo pigment of the present invention may be synthesized, for example, by performing an azo coupling reaction between a diazonium salt prepared by an already known method using the diazo component of Formula (2) and the coupling component of Formula (3).

The preparation and coupling reaction of the diazonium salt may be performed by a common method.

For the preparation of the diazonium salt of Formula (2), it is possible to apply, for example, a common method of adjusting a diazonium salt by using a nitrosonium ion source, for example, nitrous acid, nitrite or nitrosylsulfuric acid, in a reaction medium containing an acid (for example, hydrochloric acid, sulfuric acid, phosphoric acid, acetic acid, propionic acid, methanesulfonic acid, trifluoromethanesulfonic acid and the like).

More preferred examples of the acid include a case of using acetic acid, propionic acid, methanesulfonic acid, phosphoric acid and sulfuric acid either alone or in combination thereof, and among them, phosphoric acid or a combination use system of acetic acid and sulfuric acid is particularly preferred.

As preferred examples of the reaction medium (solvent), an organic acid and an inorganic acid are preferably used, and particularly, phosphoric acid, sulfuric acid, acetic acid, propionic acid and methanesulfonic acid are preferred, and among them, acetic acid and/or propionic acid are preferred.

As a preferred example of the nitrosonium ion source, it is stable to use nitrtosyl sulfuric acid in the aforementioned preferred reaction medium containing an acid, and further, the diazonium salt may be efficiently prepared.

The amount of the solvent used is preferably 0.5 times by mass to 50 times by mass, more preferably 1 time by mass to 20 times by mass, and particularly preferably 3 times by mass to 10 times by mass based on the amount of the diazo component of Formula (2).

In the present invention, the diazo component of Formula (2) may be in a state of being dispersed in a solvent, or in a state of a dissolved solution depending on the type of the diazo component.

The amount of the nitrosonium ion source used is preferably 0.95 equivalents to 5.0 equivalents, more preferably 1.00 equivalent to 3.00 equivalents, and particularly preferably 1.00 to 1.10 equivalents with respect to the diazo component.

The reaction temperature is preferably −15° C. to 30° C., more preferably −10° C. to 10° C., and still more preferably −5° C. to 5° C. At less than −10° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

The coupling reaction may be performed in an acidic reaction medium to a basic reaction medium, but is preferably performed in an acidic to neutral reaction medium for the azo pigment of the present invention, and the components may be efficiently derived into the azo pigment by suppressing the decomposition of the diazonium salt particularly when the coupling reaction is performed in an acidic reaction medium.

As a preferred example of the reaction medium (solvent), an organic acid, an inorganic acid and an organic solvent may be used, and an organic solvent is particularly preferred, and a solvent causing no liquid separation phenomenon during reaction and providing a uniform solution with the solvent is preferred. Examples thereof include an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the solvent may be a glycol-based solvent having two or more hydroxyl groups, or an alcohol-based solvent having 3 or less carbon atoms, and preferably an alcohol solvent (for example, methanol and ethylene glycol) having 2 or less carbon atoms, in a solvent molecule. Further, a mixed solvent of these solvents is also included in the organic solvent.

The amount of the solvent used is preferably 1 time by mass to 100 times by mass, more preferably 1 time by mass to 50 times by mass, and still more preferably 2 times by mass to 10 times by mass based on the amount of the coupling component represented by Formula (3).

In the present invention, the coupling component which forms Formula (1) may be in a state of being dispersed in a solvent, or in a state of a dissolved solution depending on the type of the coupling component.

For the amount of the coupling component used, the diazo component is preferably 0.95 equivalents to 5.0 equivalents, more preferably 1.00 equivalent to 3.00 equivalents, and particularly preferably 1.00 to 1.50 equivalents per the azo coupling moiety.

The reaction temperature is preferably −30° C. to 30° C., more preferably −15° C. to 10° C., and still more preferably −10° C. to 5° C. At less than −30° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

In the method of synthesizing an azo pigment according to the present invention, a product (crude azo pigment) obtained by these reactions may be treated by a typical post-treatment method of an organic synthesis reaction, and then used with or without purification.

That is, for example, a product isolated from the reaction system may be used without purification or by performing a purification operation such as recrystallization and salt formation either alone or in combination.

In addition, after the reaction is completed, the reaction solvent may or may not be removed by distillation, the reaction solution may or may not be neutralized by pouring the reaction solvent in water or ice, and the product isolated or extracted with an organic solvent/aqueous solution may be used without purification or after performing a purification operation such as recrystallization, crystallization and salt formation either alone or in combination.

The synthesizing method of an azo pigment composition according to the present invention will be described in more detail.

The method for preparing an azo pigment according to the present invention includes, in a coupling reaction between a diazonium compound, which is obtained by modifying the heterocyclic amine represented by Formula (2) into diazonium and the compound represented by Formula (3), dissolving the compound of Formula (3) in an organic solvent, and then performing the coupling reaction.

The reaction of modifying the heterocyclic amine represented by Formula (2) into diazonium may be performed, for example, by reacting the heterocyclic amine with a reagent such as sodium nitrite and nitrosylsulfuric acid in an acidic solvent such as sulfuric acid, phosphoric acid and acetic acid at a temperature of 15° C. or less for approximately 10 minutes to 6 hours. It is preferred that the coupling reaction is performed by reacting a diazonium salt obtained by the above-described method and the compound represented by Formula (3) at 40° C. or less, preferably 15° C. or less for approximately 10 minutes to 12 hours.

The tautomerism and/or crystalline polymorphism described above may be controlled by the preparation conditions during the coupling reaction. As the method of preparing the β-type crystal, for example, it is preferred to use the method of the present invention including dissolving the compound represented by Formula (3) one time in an organic solvent, and then performing the coupling reaction. Examples of the organic solvent which may be used in this case include an alcohol solvent. As an example of the alcohol solvent, methanol, ethanol, isopropanol, ethylene glycol, diethylene glycol and the like are preferred, and among them, methanol is particularly preferred.

Another method for preparing an azo pigment includes, in a coupling reaction between a diazonium compound, which is obtained by modifying the heterocyclic amine represented by Formula (2) into diazonium and the compound represented by Formula (3), performing the coupling reaction in the presence of a polar aprotic solvent.

The β-type crystal may be efficiently prepared even by the method of performing the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, and a mixed solvent thereof. When these solvents are used, the compound of Formula (3) may or may not be completely dissolved in the solvent.

By the aforementioned preparation method, the compound represented by Formula (1) is obtained as a crude azo pigment, and when the compound is used as the pigment of the present invention, a post-treatment is preferably performed. Examples of the method of this post-treatment include a process of controlling the pigment particle by a grinding treatment such as solvent salt milling, salt milling, dry milling, solvent milling and acid pasting, a solvent heating treatment, and the like, and a process of performing a surface treatment with a resin, a surfactant, a dispersing agent and the like.

It is preferred that the compound represented by Formula (1) of the present invention is subjected to solvent heating treatment and/or solvent salt milling as the post-treatment.

The method and conditions of the solvent heating treatment and the solvent salt milling are the same as those described above.

[Synthesis of γ-Type Crystal Form Azo Pigment]

Hereinafter, synthesis of the γ-type crystal form azo pigment represented by Formula (1) will be described in detail.

The γ-type crystal form azo pigment represented by Formula (1) (hereinafter, simply referred to as "azo pigment" or "pigment" in some cases) may be synthesized by the following preparation method.

It is preferred that the preparation method of the present invention includes a process of subjecting a diazonium salt, which is derived from a heterocyclic amine represented by the following Formula (2), and a compound represented by the following Formula (3) to azo coupling reaction.

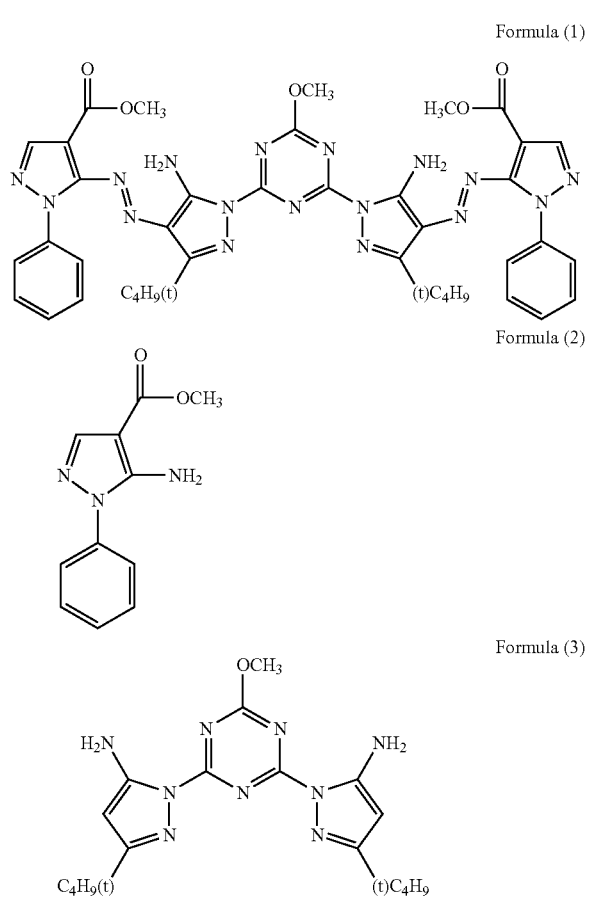

Hereinafter, the preparation method of the present invention will be described in detail.

It is preferred that the method for preparing an azo pigment according to the present invention includes a process of obtaining a crude azo pigment and a process of transforming the crude azo pigment into a γ-type crystal form azo pigment by subjecting the crude azo pigment to solvent treatment.

It is preferred that the method for preparing a crude azo pigment includes (a) a process of mixing a diazotizing agent with a heterocyclic amine represented by Formula (2), and (b) a process of performing a reaction by mixing a reaction product obtained in process (a) with a compound represented by Formula (3), and obtaining a solution in which an azo compound produced by the reaction and represented by Formula (1) is dissolved at least in part, and it is more preferred that the method also includes (c) a process of crystallizing the pigment represented by Formula (1) by mixing the solution obtained in process (b) with a poor solvent for the azo compound represented by Formula (1).

In process (b), when the ratio at which the azo compound is dissolved is high, the yield becomes high, which is preferred.

Process (a) according to the present invention will be described in detail.

In process (a), a diazonium compound is derived by a reaction of a heterocyclic amine represented by Formula (2) with a diazotizing agent by mixing a diazotizing agent with a heterocyclic amine represented by Formula (2). It is preferred that this reaction is performed in a medium including an acid. In the present specification, a liquid including the diazonium compound is referred to as "diazonium compound liquid preparation". The method of mixing the heterocyclic amine represented by Formula (2) with the acid and the diazotizing agent is not particularly limited, but it is preferred that the diazotizing agent is added to a solution of the heterocyclic amine represented by Formula (2) and the acid. The diazotizing agent in process (a) is used to derive the heterocyclic amine represented by Formula (2) into the diazonium compound, and is not limited as long as the diazotizing agent has such an action. Representative examples of the diazotizing agent include nitrite esters (examples thereof include isopentyl nitrite), nitrite salts (examples thereof include sodium nitrite or potassium nitrite), isoamyl nitrite and nitrosylsulfuric acid, the diazotizing agent is more preferably sodium nitrite, potassium nitrite and nitrosylsulfuric acid, and among them, nitrosylsulfuric acid is particularly preferred from the viewpoint that the diazonium compound may be stably and efficiently prepared.

The acid used in process (a) means an acid which may even slightly dissolve the heterocyclic amine even though the acid does not completely dissolve the heterocyclic amine represented by Formula (2), and is preferably an acid which completely dissolves an amino compound. As the acid, an inorganic acid and an organic acid may be used, and examples of the inorganic acid include hydrochloric acid, phosphoric acid and sulfuric acid, and the inorganic acid is preferably phosphoric acid and sulfuric acid, and more preferably sulfuric acid. Examples of the organic acid include formic acid, acetic acid, propionic acid and methanesulfonic acid, and the organic acid is preferably acetic acid, propionic acid and methanesulfonic acid, and more preferably acetic acid and propionic acid. Furthermore, these acids may be used either alone or in a mixture thereof. Examples of a mixed acid include phosphoric acid/acetic acid, sulfuric acid/acetic acid, methanesulfonic acid/acetic acid and acetic acid/propionic acid, the mixed acid is preferably phosphoric acid/acetic acid, sulfuric acid/acetic acid, sulfuric acid/acetic acid/propionic acid and acetic acid/propionic acid, and among them, sulfuric acid/acetic acid and acetic acid/propionic acid are particularly preferred. The mass ratio of these mixed acids is preferably 1/(0.1 to 20), more preferably 1/(0.5 to 10), and still more preferably 1/(1 to 10).

In process (a), the amount of acid added to the heterocyclic amine represented by Formula (2) is, in terms of mass ratio, 1 time to 100 times, more preferably 2 times to 50 times, and still more preferably 3 times to 25 times. When the mass ratio is 1 time or more, stirrability is improved so that the diazonium compound may be derived more securely. On the other hand, when the mass ratio is 100 times or less, productivity is enhanced so that economic efficiency is improved.

Further, in process (a), the amount of the diazotizing agent added to the heterocyclic amine represented by Formula (2) is, in terms of molar ratio, 1.0 time to 20 times, more preferably 1.0 time to 10 times, and still more preferably 1.0 time to 5 times. When the amount of the diazotizing agent to the amino compound is, in terms of molar ratio, 1 time or more, the diazonium compound may be derived more securely, and when the amount is 20 times or less, it is possible to suppress the diazonium compound from being decomposed by a side reaction.

The mixing of the diazotizing agent with the heterocyclic amine represented by Formula (2) in process (a) is performed preferably at 50° C. or less, more preferably at 40° C. or less, and still more preferably at 30° C. or less. In the preparation of the diazo solution at a high temperature more than 50° C., there is a concern in that the diazotizing agent may be decomposed. A stirring time to derive the heterocyclic amine into the diazonium compound is preferably 0.3 to 10 hours, more preferably 0.5 to 5 hours, and still more preferably 1 to 3 hours. When the stirring time is 0.3 hour or more, it is easy to completely derive the heterocyclic amine into the diazonium compound, and when the stirring time is 10 hours or less, it is difficult for the decomposition of the diazonium compound to occur. In addition, a typical stirrer is used in the mixing, and the stirrer is not particularly limited. The number of revolutions of the stirring may be different depending on the manufacturing facility in some cases, but is preferably 30 rpm to 300 rpm, more preferably 40 rpm to 200 rpm, and still more preferably 50 rpm to 200 rpm. When the stirring speed is 30 rpm or more in terms of the number of revolutions, the stirring efficiency of the diazonium compound liquid preparation is improved, and therefore, a desired reaction may proceed securely.

The solvent which may be mixed in process (a) is not particularly limited as long as the diazonium compound derived is not decomposed. Examples of the solvent which may be mixed include a hydrocarbon-based solvent such as hexane, benzene and toluene, an ether-based solvent such as diethyl ether and tetrahydrofuran, a ketone-based solvent such as acetone and methyl ethyl ketone, an amide-based solvent such as dimethylformamide, dimethylacetamide, pyrrolidone and N-methyl-2-pyrrolidone, and dimethylsulfoxide, sulfolane, acetonitrile and water.

A preferred pH of the diazonium compound liquid preparation in process (a) is preferably 7 or less, more preferably 5 or less, and still more preferably 3 or less. When the pH of the diazonium compound liquid preparation in process (a) is more than 7, there is a concern in that the diazonium compound derived may be decomposed.

Next, process (b) according to the present invention will be described in detail.

Process (b) is a process of mixing the reaction product obtained in process (a) with a compound represented by Formula (3) for a reaction to occur, and obtaining a solution in which an azo compound produced by the reaction and represented by Formula (1) is dissolved at least in part.

In the present specification, the solution in which the azo compound is dissolved at least in part is referred to as "an azo compound dissolved solution".

Examples of a method of preparing the azo compound dissolved solution include (I) a method of obtaining the azo compound dissolved solution including: performing a coupling reaction by mixing the reaction product obtained in process (a) with the compound represented by Formula (3), and as a result of the reaction, dissolving the precipitated azo pigment represented by Formula (1) in a solvent, and (II) a method of obtaining the azo compound dissolved solution including: performing the coupling reaction such that the compound obtained by the coupling reaction and represented by Formula (1) is dissolved at least in part in a reaction solution, and adopting the resulting reaction solution as the azo compound dissolved solution as it is, or a method of obtaining the azo compound dissolved solution including: further dissolving a (crystallized) azo pigment, which is obtained by applying the thus-obtained azo compound dissolved solution to process (c) to be described below in detail in a solvent.

In any of types (I) and (II), a method of mixing the diazonium compound liquid preparation obtained in process (a) with a compound represented by Formula (3) is not particularly limited, but it is preferred that the compound represented by Formula (3) is partly or completely dissolved in a solvent and the resulting solution is added to the liquid preparation, or the compound represented by Formula (3) is added as a solid to the liquid preparation without using the solvent, and it is more preferred that a solution of the compound represented by Formula (3) is added to the diazonium compound liquid preparation obtained in process (a), or the coupling component is added as a solid to the diazonium compound liquid preparation obtained in process (a).

In addition, the amount of the diazonium compound in the diazonium compound liquid preparation obtained in process (a) to the compound represented by Formula (3) in process (b) is preferably 0.8 to 3 equivalents to the coupling position of the compound represented by Formula (3), more preferably 0.9 to 2 equivalents to the coupling position, and still more preferably 0.95 to 1.5 equivalents to the coupling position. When the amount is 0.8 equivalents or more, a coupling component having an unreacted coupling position may be suppressed from remaining, and when the amount is 3 equivalents or less, an unreacted diazonium compound may be suppressed from remaining, and therefore, the amount range is more economical.

Meanwhile, in type (II), since the azo compound represented by Formula (1) is dissolved at least in part in process (b), the coupling reaction proceeds more smoothly, thereby preparing a high-purity azo compound. The reason is assumed as follows. Since there are two coupling positions, for example, only one coupling position goes through a reaction intermediate which is reacted. When the reaction intermediate is precipitated into the reaction system, the reaction rate of the second coupling reaction is slowed down. Meanwhile, since the diazonium compound is unstable, there is a concern in that decomposition may occur when a long time elapses. Accordingly, it is important to allow the coupling reaction to proceed rapidly, and consequently, the type (II) preparation method, which does not produce a precipitate in process (b), is more suitable for preparing a high-purity pigment.

In process (b), the coupling component may be added without using a solvent, but it is preferred that the coupling component is added while being mixed with the solvent. In process (b), when a solvent is used in the coupling component, the solvent is not particularly limited, but is preferably a solvent which allows type (II) to be used, that is, a solvent by which it is possible to obtain a solution in which the azo compound produced after the reaction and represented by the general Formula (1) is dissolved at least in part.

In the case of type (I), that is, when the pigment is precipitated, as an example of the solvent, water, an organic acid, an inorganic acid and an organic solvent may be used, and an organic solvent is particularly preferred, and a solvent causing no liquid separation phenomenon during reaction and providing a uniform solution with the solvent is preferred. Examples thereof include water, an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the organic solvent may be a glycol-based solvent having two or more hydroxyl groups in the solvent molecule, an alcohol-based solvent having 3 or less carbon atoms, or a ketone-based solvent having a total carbon number of 5 or less, preferably an alcohol solvent having 2 or less atoms (for example, methanol and othylene glycol) and a ketone-based solvent having a total carbon number of 4 or less (for example, acetone and methyl ethyl ketone). Furthermore, a mixed solvent of these solvents is also included in the organic solvent.

Further, in the case of type (II), that is, when a coupling reaction is performed such that the compound represented by Formula (1) is dissolved at least in part in the reaction solution, examples of the solvent include an alcohol-based solvent such as methanol, isopropanol and ethylene glycol, a ketone-based solvent such as acetone and methyl ethyl ketone, an organic acid solvent such as acetic acid, propionic acid and methanesulfonic acid, an inorganic acid solvent such as sulfuric acid, hydrochloric acid and phosphoric acid, an amide-based solvent such as dimethylformamide, dimethylacetamide, pyrrolidone and N-methyl-2-pyrrolidone, dimethylsulfoxide, sulfolane, and acetonitrile. Among them, a ketone-based solvent such as acetone and methyl ethyl ketone, an organic acid solvent such as acetic acid, propionic acid and methanesulfonic acid, and an inorganic acid solvent such as sulfuric acid, hydrochloric acid and phosphoric acid are preferred, an acidic solvent of organic acid or inorganic acid is more preferred, and acetic acid, methanesulfonic acid, phosphoric acid and sulfuric acid are most preferred. In addition, a mixed solvent of the aforementioned solvents is also suitable.

Particularly, in the case of type (II), in process (b), it is preferred that an acidic solution obtained by dissolving or suspending the coupling component in an acidic solvent is mixed with the reaction product obtained in process. Particularly, it is preferred that the acidic solvent is a solvent including at least one of acetic acid and sulfuric acid.

In any of types (I) and (II), the preferred amount of the solvent added is, in terms of mass ratio, preferably 0.5 times to 200 times, more preferably 1 time to 100 times, and still more preferably 1 time to 50 times, based on the coupling component. As for the preferred amount of the solvent added based on the coupling component, when the mass ratio is less than 0.5 times, it is difficult to stir the coupling component and the solvent in a preparation machine and a desired reaction does not proceed. In addition, the case where the mass ratio is more than 200 times is not economical.

When the preparation method of the azo compound dissolved solution is type (I) or when the preparation method of the azo compound dissolved solution is type (II) and an azo pigment, which is obtained by applying the coupling reaction solution in which the compound represented by Formula (1) is dissolved at least in part to process (c), is further dissolved in the solvent to prepare an azo compound dissolved solution, the solvent for dissolving the obtained azo pigment is not particularly limited as long as the solvent may dissolve at least a part of the azo pigment, but examples thereof include the preferred examples of the solvent previously described in type (II).

As for the azo compound dissolved solution obtained in process (b), the ratio of the azo compound represented by Formula (1), which is dissolved in the azo compound dissolved solution to the total amount of the azo compound produced by process (b) (the sum of the azo compound represented by Formula (1), which is dissolved in the azo compound dissolved solution and the azo pigment represented by Formula (1), which is precipitated from the azo compound dissolved solution) is preferably 50% by mass or more, more preferably 75% by mass or more, still more preferably 90% by mass or more, and most preferably 100% by mass (a state where the azo compound produced in process (b) is completely dissolved in the reaction solution), and accordingly, the particle diameter of the pigment tends to be further reduced.

In process (b), the mixing of the diazonium compound liquid preparation of process (a) and the coupling component is preferably performed at a temperature of 50° C. or less, more preferably 30° C. or less, and still more preferably 25° C. or less. When the mixing temperature is 50° C. or more, there is a concern in that the diazonium compound derived in process (a) and the produced azo compound represented by Formula (1) are decomposed. Furthermore, a typical stirrer is used in the mixing, and the stirrer is not particularly limited. The number of revolutions of the stirring may be different depending on the manufacturing facility in some cases, but is preferably 30 rpm to 400 rpm, more preferably 40 rpm to 300 rpm, and still more preferably 50 rpm to 200 rpm. When the stirring speed is 30 rpm or less in terms of the number of revolutions, the stirring efficiency of the mixed solution deteriorates, and therefore, a desired reaction may not proceed. The stirring time in process (b) is preferably 0.1 to 10 hours, more preferably 0.3 to 5 hours, and still more preferably 0.3 to 3 hours. When the stirring time is less than 0.1 hours, it is difficult for the pigment to be completely derived, and when the stirring time is more than 10 hours, there is a concern in that the azo compound represented by Formula (1) may be decomposed.

Next, process (c) according to the present invention will be described in detail.

Process (c) is a process of crystallizing a pigment by mixing the azo compound dissolved solution obtained in process (b) with a poor solvent with the azo compound having low solubility therein. The method of mixing the azo compound dissolved solution obtained in process (b) with a poor solvent is not particularly limited, but it is preferred that the azo compound dissolved solution obtained in process (b) is added to a poor solvent and at this time, it is preferred that the poor solvent is in a state of being stirred.

The stirring speed is preferably 100 rpm to 10,000 rpm, more preferably 150 rpm to 8,000 rpm, and particularly preferably 200 rpm to 6,000 rpm. For the addition, a pump or the like may also be used. In this case, either in-liquid addition or out-of-liquid addition may be employed, but in-liquid addition is more preferred. Further, continuous supply into liquid through a supply pipe by using a pump is preferred.

The poor solvent is not particularly limited, but is preferably a poor solvent with the azo compound represented by Formula (1) having a solubility of 1 g/L or less therein, and more preferably a poor solvent with the azo compound represented by Formula (1) having a solubility of 0.1 g/L or less therein. This solubility may be a solubility when the azo compound is dissolved in the presence of an acid or an alkali. As for the compatibility or uniform mixing property between the azo compound dissolved solution obtained in process (b) and the poor solvent, the amount of the azo compound dissolved in a poor solvent is preferably 30% by mass or more, and more preferably 50% by mass or more based on the amount of the azo compound dissolved in a good solvent. In the present specification, the solubility indicates a solubility at 25° C.

Examples of the poor solvent include an aqueous solvent such as water, hydrochloric acid, ammonia water and an aqueous sodium hydroxide solution, an alcohol-based solvent such as methanol, ethanol, isopropyl alcohol and 1-methoxy-2-propanol, a glycol-based solvent such as ethylene glycol and diethylene glycol, a ketone compound solvent such as acetone, methyl ethyl ketone, methyl isobutyl ketone and cyclohexanone, an ether-based solvent such as diethyl ether and tetrahydrofuran, a hydrocarbon-based solvent such as hexane, benzene and toluene, a nitrile-based solvent such as acetonitrile, a halogen-based solvent such as dichloromethane and trichloroethylene, and an ester-based solvent such as ethyl acetate, ethyl lactate and 2-(1-methoxy)propyl acetate, and the poor solvent is preferably an aqueous solvent such as water, hydrochloric acid, ammonia water and an aqueous sodium hydroxide solution, an alcohol-based solvent such as methanol, ethanol, isopropyl alcohol and 1-methoxy-2-propanol, a glycol-based solvent such as ethylene glycol and diethylene glycol, and a ketone compound solvent such as acetone, methyl ethyl ketone, methyl isobutyl ketone and cyclohexanone, and more preferably an aqueous solvent such as water and ammonia water, an alcohol solvent having 1 to 3 carbon atoms, and a glycol-based solvent having 1 to 6 carbon atoms. In addition, a mixed solvent of the aforementioned solvents is also suitable. The poor solvent is most preferably one or more solvents selected from the group consisting of water, alcohol having 1 to 3 carbon atoms and glycol having 1 to 6 carbon atoms.

The mixing ratio between the azo compound dissolved solution obtained in process (b) and the poor solvent is, in terms of volume ratio, preferably 1/50 to 2/3, more preferably 1/40 to 1/2, and particularly preferably 1/20 to 1/2. When the volume ratio is 2/3 or less, sufficient crystallization of a pigment occurs and the reaction yield is increased, and when the volume ratio is 1/50 or more, productivity is enhanced, which is economical.

The temperature at which the azo compound dissolved solution obtained in process (b) is mixed with the poor solvent is not particularly limited, but the mixing is preferably performed at −10° C. to 50° C., more preferably at −5° C. to 30° C., and most preferably at −5° C. to 25° C.

In the mixing of the azo compound dissolved solution obtained in process (b) with the poor solvent, the particle diameter of the organic nanoparticle produced by precipitation may be controlled by adjusting the Reynolds number. Here, the Reynolds number is a dimensionless number which indicates the flowing state of a fluid and is represented by the following equation.

$$Re = \rho UL/\mu \qquad \text{Equation (1)}$$

(In Equation (1), Re represents the Reynolds number, $\rho$ represents the density [kg/m$^3$] of the azo compound dissolved solution obtained in process (b), U represents the relative velocity [m/s] when the azo compound dissolved solution meets the poor solvent, L represents the equivalent diameter [m] of a flow channel or a supply inlet at a portion where the azo compound dissolved solution meets the poor solvent, and $\mu$ represents the viscosity coefficient [Pa·s] of the azo compound dissolved solution.)

The equivalent diameter L refers to the diameter of an equivalent circular tube when a circular tube which is equivalent to the opening diameter or flow channel of a pipe having an arbitrary cross-section shape is envisaged. The equivalent diameter L is represented by the following Equation (2), in which the cross-sectional area of the pipe is designated as A and the wetted perimeter length (circumference) of the pipe or the outer perimeter of the flow channel is designated as p.

$$L = 4A/p \qquad \text{Equation (2)}$$

The relative velocity U when the azo compound dissolved solution meets the poor solvent is defined as the relative velocity in a direction perpendicular to a surface of the portion where the two liquids meet each other. That is, for example, in the case of mixing by injecting the azo compound dissolved solution into the poor solvent which is stationary, the velocity of injecting from the supply inlet is identical to the relative velocity U. The value of the relative velocity U is not particularly limited, but for example, the value is preferably set to 0.5 m/s to 100 m/s, and more preferably to 1.0 m/s to 50 m/s.

The density $\rho$ of the azo compound dissolved solution is a value which is determined depending on the type of the selected material, but it is practical that p is, for example, 0.8 kg/m$^3$ to 2.0 kg/m$^3$. Furthermore, the viscosity coefficient $\mu$ of the azo compound dissolved solution is also a value which is determined depending on the material used, the environment temperature and the like, but for example, a value of 0.5 mPa·s to 100 mPa·s is preferred, and a value of 1.0 mPa·s to 50.0 mPa·s is more preferred.

A smaller value of the Reynolds number is likely to form a laminar flow, and a larger value is likely to form a turbulent flow. For example, the particle diameter of the pigment nanoparticles may be obtained while being controlled by adjusting the Reynolds number to 60 or more, and it is preferred to adjust the Reynolds number to 100 or more, and more preferably to 150 or more. The Reynolds number has no particular upper limit, but pigment particles having a desired average particle diameter may be obtained while being controlled by adjusting and controlling the Reynolds number, for example, in a range of 100,000 or less. In this case, within the aforementioned range, pigment particles having a smaller particle diameter may be obtained while being controlled usually by increasing the Reynolds number.

When the primary particles of the crude azo pigment particle obtained by the preparation method of the present invention are observed under a transmission microscope, the length in a long axis direction is preferably 1 nm to 10 μm, more preferably 5 nm to 5 μm, still more preferably 10 nm to 2 μm, and particularly preferably 10 nm to 1 μm.

Meanwhile, with respect to the particle diameter of the pigment particle, there is a method of digitizing the particle diameter by a measuring technique and expressing the particle diameter in terms of an average size of a group, examples of the size frequently used includes a mode diameter indicating the maximum value of distribution, a median diameter corresponding to the median value in the integral distribution curve, various average diameters (number average, length average, area average, mass average, volume average and the like), and the like, and in the present invention, unless otherwise indicated, the average particle diameter refers to a number average particle diameter.

Examples of the method of measuring the particle diameter of the pigment particle include a microscopic method, a mass method, a light scattering method, a light shielding method, an electric resistance method, an acoustic method, and a dynamic light scattering method, and a microscopic method and a dynamic light scattering method are particularly preferred. Examples of a microscope used in the microscopic method include a scanning electron microscope, a transmission electron microscope and the like. Examples of a particle measuring apparatus using a dynamic light scattering method include Nanotrac UPA-EX150 manufactured by Nikkiso Co., Ltd., Dynamic Light Scattering Photometer DLS-7000 Series manufactured by Otsuka Electronics Co., Ltd., and the like.

The aforementioned preferred average particle diameter of the pigment particle is achieved by appropriately adjusting (1) the temperature in process (c), (2) the solubility of the azo compound for the poor solvent, and (3) the stirring speed (or Reynolds number).

In preparing a liquid dispersion by precipitating crude azo pigment fine particles, at least any one of the azo compound dissolved solution and the poor solvent may contain a dispersing agent. In this case, it is preferred that the dispersing agent is contained into the azo compound dissolved solution. The dispersing agent has actions of (1) quickly being adsorbed to the surface of the precipitated pigment to form fine nanoparticles and (2) preventing these particles from aggregating again.

As the dispersing agent, for example, an anionic, cationic, amphoteric or nonionic, low molecular or polymer dispersing agent may be used.

As for the polymer dispersing agent, the mass average molecular weight thereof is preferably 1,000 to 500,000, more preferably 10,000 to 500,000, and particularly preferably 10,000 to 100,000.

Specific examples thereof include polyvinylpyrrolidone, polyvinyl alcohol, polyvinyl methyl ether, polyethylene glycol, polypropylene glycol, polyacrylamide, a vinyl alcohol-vinyl acetate copolymer, partially formalised polyvinyl alcohol, partially butyralized polyvinyl alcohol, a vinylpyrrolidone-vinyl acetate copolymer, a polyethylene oxide/propylene oxide block copolymer, polyacrylate, polyvinyl sulfate, poly(4-vinylpyridine) salt, polyamide, polyallylamine salt, condensed naphthalenesulfonate, a cellulose derivative, a starch derivative and the like. In addition, natural polymers such as alginate, gelatin, albumin, casein, gum arabic, gum traganth and lignin sulfonate may also be used. Among them, polyvinylpyrrolidone is preferred. These polymer compounds may be used either alone or in combination of two or more thereof, and may also be used by combining a low molecular dispersing agent. The dispersing agent used for dispersion of a pigment is described in detail in "Dispersion Stabilization of Pigment and Surface Treatment Technique Evaluation" (Japan Association for International Chemical Information, published on December 2001), pp. 29 to 46.

Examples of the anionic dispersing agent (anionic surfactant) include an N-acyl-N-alkyltaurine salt, a fatty acid salt, an alkylsulfonic ester salt, alkylbenzenesulfonate, alkylnaphthalenesulfonate, dialkylsulfosuccinate, an alkylphosphonic ester salt, a naphthalenesulfonic acid-formalin condensate, a polyoxyethylene alkylsulfonic ester salt and the like. Among them, an N-acyl-N-alkyltaurine salt is preferred. As the N-acyl-N-alkyltaurine salt, those described in Japanese Patent Application Laid-Open No. H3-273067 are preferred. These anionic dispersing agents may be used either alone or in combination of two or more kinds thereof.

Examples of the cationic dispersing agent (cationic surfactant) include a quaternary ammonium salt, alkoxylated polyamine, aliphatic amine polyglycol ether, aliphatic amine, adiamine or polyamine derived from aliphatic amine and aliphatic alcohol, imidazoline derived from aliphatic acid, and salts of these cationic substances. These cationic dispersing agents may be used either alone or in combination of two or more kinds thereof.

The amphoteric dispersing agent is a dispersing agent having, in the molecule thereof, both an anionic group moiety that is contained in the molecule of the anionic dispersing agent, and a cationic group moiety that is contained in the molecule of the cationic dispersing agent.

Examples of the nonionic dispersing agent (nonionic surfactant) include polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and the like. Among them, polyoxyethylene alkylaryl ether is preferred. These nonionic dispersing agents may be used either alone or in combination of two or more kinds thereof.

The content of the dispersing agent is preferably in a range of 0.1 parts by mass to 1,000 parts by mass, more preferably in a range of 1 part by mass to 500 parts by mass, and still more preferably in a range of 5 parts by mass to 200 parts by mass, based on 100 parts by mass of the pigment. Further, the dispersing agents may be used either alone or in combination of a plurality thereof.

In the aspect of the present invention, the azo compound dissolved solution obtained in process (b) is in a state where the azo compound is completely dissolved in a reaction solution, and it is preferred that an alcohol having 1 to 3 carbon atoms, preferably methanol is mixed as a poor solvent with the azo compound dissolved solution. A finally desired γ-type crystal form azo pigment having a small particle diameter may be efficiently obtained by preparing a crude azo pigment by the aspect.

By the aforementioned preparation method, the compound represented by Formula (1) is obtained as a crude azo pigment. As a method of obtaining an azo pigment in the form of crystal, a post-treatment is preferably performed. Examples of the method of this post-treatment include a process of controlling the pigment particle by a grinding treatment such as solvent salt milling, salt milling, dry milling, solvent milling and acid pasting, a solvent heating treatment, and the like.

The crystal transformation in the present invention indicates transforming the crystal form, and before transformation, even an amorphous form may have a crystal form different from the crystal form after transformation. Examples of the method of crystal transformation include the aforementioned post-treatment, a grinding treatment such as solvent salt milling, salt milling, dry milling, solvent milling and acid pasting and a solvent heating treatment are preferred, salt milling, solvent milling and a solvent heating treatment are more preferred, and a solvent heating treatment is particularly preferred.

According to the crystal transformation, a compound may be transformed from an amorphous state to a crystal form, and may also be transformed from one crystal form to another crystal form.

(Solvent Heating Treatment)

The solvent heating treatment in the present invention specifically refers to heating and stirring an amorphous azo compound or a crystalline azo pigment represented by Formula (1) or a salt, hydrate or solvate thereof in a solvent.

A crystal transformation may be efficiently performed by the solvent heating treatment.

As a solvent used for the solvent heating treatment, a solvent with an azo pigment represented by Formula (1) having low solubility therein after the crystal transformation is preferred from the viewpoint of suppressing the crystal growth.

As the solvent used during the crystal transformation, for example, a ketone-based compound, an aromatic-based compound and acetonitrile are preferred, and among them, examples thereof include a polar aprotic organic solvent such as acetone, methyl ethyl ketone, toluene, acetonitrile, N,N-dimethylformamide, N,N-dimethylacetamide and N-methyl-2-pyrrolidone, or a mixture thereof, and among them, acetone, methyl ethyl ketone, toluene, acetonitrile and N-methyl-2-pyrrolidone are preferred, N-methyl-2-pyrrolidone or acetone is more preferred, and acetone is still more preferred. An inorganic or organic acid or base may be further added to the solvent exemplified above.

The amount of the solvent used in the solvent heating treatment is preferably 1 time to 100 times, more preferably 5 times to 50 times, and still more preferably 8 times to 30 times based on the amount of the amorphous azo compound represented by Formula (1). When the amount is less than 1 time, stirrability may not be secured, which is not preferred. Further, when the amount is more than 100 times, productivity deteriorates, and economic efficiency deteriorates, which is not preferred.

Temperature of heating and stirring in the solvent heating treatment varies depending on the size of the primary particle diameter of a desired pigment, but is preferably 150° C. to 150° C., more preferably 20° C. to 120° C., and still more preferably 20° C. to 100° C. At a low temperature less than 15° C., it takes a long time for a crystal transformation to occur, which is not efficient. On the other hand, at a high temperature more than 150° C., a part of an azo pigment (1) is decomposed, which is not preferred. It is most preferred that the solvent heating treatment is performed under reflux.

The stirring time for crystal transformation is not particularly limited as long as the crystal transformation is occurring, but is preferably 5 minutes to 1,500 minutes, more preferably 10 minutes to 600 minutes, and still more preferably 30 minutes to 300 minutes. When the stirring time is shorter than 5 minutes, partially amorphous moieties are likely to remain, which is not preferred. On the other hand, when the stirring time is longer than 1,500 minutes, the time is inefficient, which is not preferred.

(Solvent Salt Milling)

Examples of the solvent salt milling include a method including placing, into a kneading machine, a crude azo pigment, an inorganic salt, and an organic solvent which does not dissolve it, and performing kneading and grinding therein. A water-soluble inorganic salt may be suitably used as the inorganic salt, and it is preferred that for example, an inorganic salt such as sodium chloride, potassium chloride and sodium sulfate is used. Furthermore, it is more preferred that an inorganic salt having an average particle diameter of 0.5 µm to 50 µm is used. The amount of the inorganic salt used is preferably 3 times by mass to 20 times by mass, and more preferably 5 times by mass to 15 times by mass based on the amount of the crude azo pigment. An aqueous organic solvent may be suitably used as the organic solvent, and since the solvent may easily evaporate due to an increase in temperature at the time of kneading, a solvent having a high boiling temperature is preferred from the viewpoint of safety. Examples of the organic solvent include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1 ethoxy-2-propanol, dipropylene glycol, dipropylene glycol monomethyl ether, dipropylene glycol monomethyl ether, dipropylene glycol, or a mixture thereof. The amount of the aqueous organic solvent used is preferably 0.1 times by mass to 5 times by mass based on the amount of the crude azo pigment. The kneading temperature is preferably 20° C. to 130° C. and particularly preferably 40° C. to 110° C. As the kneading machine, for example, a kneader, a mix Muller or the like may be used.

The α-type crystal form azo pigment represented by Formula (1) according to the present invention may be further subjected to post-treatment, and may be subjected to surface treatment with, for example, a resin, a surfactant, a dispersing agent and the like.

The azo pigment represented by Formula (1) may also be prepared by the following method. That is, the azo pigment represented by Formula (1) may be prepared by modifying a heterocyclic amine represented by the following Formula (2) into diazonium, and

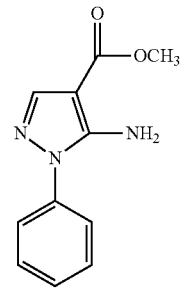

Formula (2)

subsequently, performing a coupling reaction with a compound represented by the following Formula (3).

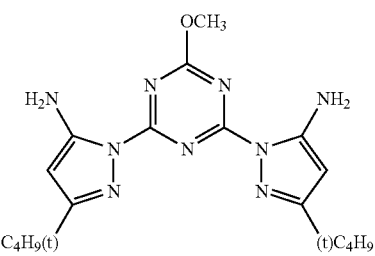

Formula (3)

The azo pigment of the present invention may be synthesized, for example, by performing an azo coupling reaction between a diazonium salt prepared by an already known method using the diazo component of Formula (2) and the coupling component of Formula (3).

The preparation and coupling reaction of the diazonium salt may be performed by a common method.

For the preparation of the diazonium salt of Formula (2), it is possible to apply, for example, a common method of adjusting a diazonium salt by using a nitrosonium ion source, for example, nitrous acid, nitrite or nitrosylsulfuric acid, in a reaction medium containing an acid (for example, hydrochloric acid, sulfuric acid, phosphoric acid, acetic acid, propionic acid, methanesulfonic acid, trifluoromethanesulfonic acid and the like).

More preferred examples of the acid include a case of using acetic acid, propionic acid, methanesulfonic acid, phosphoric acid and sulfuric acid either alone or in combination thereof, and among them, phosphoric acid or a combination use system of acetic acid and sulfuric acid is particularly preferred.

As preferred examples of the reaction medium (solvent), an organic acid and an inorganic acid are preferably used, and particularly, phosphoric acid, sulfuric acid, acetic acid, propionic acid and methanesulfonic acid are preferred, and among them, acetic acid and/or propionic acid are preferred.

As a preferred example of the nitrosonium ion source, it is stable to use nitrtosyl sulfuric acid in the aforementioned preferred reaction medium containing an acid, and further, the diazonium salt may be efficiently prepared.

The amount of the solvent used is preferably 0.5 times by mass to 50 times by mass, more preferably 1 time by mass to 20 times by mass, and particularly preferably 3 times by mass to 10 times by mass based on the amount of the diazo component of Formula (2).

In the present invention, the diazo component of Formula (2) may be in a state of being dispersed in a solvent, or in a state of a dissolved solution depending on the type of the diazo component.

The amount of the nitrosonium ion source used is preferably 0.95 equivalents to 5.0 equivalents, more preferably 1.00 equivalent to 3.00 equivalents, and particularly preferably 1.00 to 1.10 equivalents with respect to the diazo component.

The reaction temperature is preferably −15° C. to 30° C., more preferably −10° C. to 10° C., and still more preferably −5° C. to 5° C. At less than −10° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

The coupling reaction may be performed in an acidic reaction medium to a basic reaction medium, but is preferably performed in an acidic to neutral reaction medium for the azo pigment of the present invention, and the components may be efficiently derived into the azo pigment by suppressing the decomposition of the diazonium salt particularly when the coupling reaction is performed in an acidic reaction medium.

As a preferred example of the reaction medium (solvent), an organic acid, an inorganic acid and an organic solvent may be used, and an organic solvent is particularly preferred, and a solvent causing no liquid separation phenomenon during reaction and providing a uniform solution with the solvent is preferred. Examples thereof include an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the solvent may be a glycol-based solvent having two or more hydroxyl groups, or an alcohol-based solvent having 3 or less carbon atoms, and preferably an alcohol solvent (for example, methanol and ethylene glycol) having 2 or less carbon atoms, in a solvent molecule. Further, a mixed solvent of these solvents is also included in the organic solvent.

The amount of the solvent used is preferably 1 time by mass to 100 times by mass, more preferably 1 time by mass to 50 times by mass, and still more preferably 2 times by mass to 10 times by mass based on the amount of the coupling component represented by Formula (3).

In the present invention, the coupling component which forms Formula (1) may be in a state of being dispersed in a solvent, or in a state of a dissolved solution depending on the type of the coupling component.

For the amount of the coupling component used, the diazo component is preferably 0.95 equivalents to 5.0 equivalents, more preferably 1.00 equivalent to 3.00 equivalents, and particularly preferably 1.00 to 1.50 equivalents per the azo coupling moiety.

The reaction temperature is preferably −30° C. to 30° C., more preferably −15° C. to 10° C., and still more preferably −10° C. to 5° C. At less than −30° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

In the method of synthesizing an azo pigment according to the present invention, a product (crude azo pigment) obtained by these reactions may be treated by a typical post-treatment method of an organic synthesis reaction, and then used with or without purification.

That is, for example, a product isolated from the reaction system may be used without purification or by performing a purification operation such as recrystallization and salt formation either alone or in combination.

In addition, after the reaction is completed, the reaction solvent may or may not be removed by distillation, the reaction solution may or may not be neutralized by pouring the reaction solvent in water or ice, and the product isolated or extracted with an organic solvent/aqueous solution may be used without purification or after performing a purification operation such as recrystallization, crystallization and salt formation either alone or in combination.

The synthesizing method of an azo pigment composition according to the present invention will be described in more detail.

The method for preparing an azo pigment according to the present invention includes, in a coupling reaction between a diazonium compound, which is obtained by modifying the heterocyclic amine represented by Formula (2) into diazonium and the compound represented by Formula (3), dissolving the compound of Formula (3) in an organic solvent, and then performing the coupling reaction.

The reaction of modifying the heterocyclic amine represented by Formula (2) into diazonium may be performed, for example, by reacting the heterocyclic amine with a reagent such as sodium nitrite and nitrosylsulfuric acid in an acidic solvent such as sulfuric acid, phosphoric acid and acetic acid at a temperature of 15° C. or less for approximately 10 minutes to 6 hours. It is preferred that the coupling reaction is performed by reacting a diazonium salt obtained by the above-described method and the compound represented by Formula (3) at 40° C. or less, preferably 15° C. or less for approximately 10 minutes to 12 hours.

The tautomerism and/or crystalline polymorphism described above may be controlled by the preparation conditions during the coupling reaction. As the method of preparing the γ-type crystal, for example, it is preferred to use the method of the present invention including dissolving the compound represented by Formula (3) one time in an organic solvent, and then performing the coupling reaction. Examples of the organic solvent which may be used in this case include an alcohol solvent. As an example of the alcohol solvent, methanol, ethanol, isopropanol, ethylene glycol, diethylene glycol and the like are preferred, and among them, methanol is particularly preferred.

Another method for preparing an azo pigment includes, in a coupling reaction between a diazonium compound obtained by modifying the heterocyclic amine represented by Formula (2) into diazonium and the compound represented by Formula (3), performing the coupling reaction in the presence of a polar aprotic solvent.

The β-type crystal may be efficiently prepared even by the method of performing the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, a mixed solvent thereof and the like. When these solvents are used, the compound of Formula (3) may or may not be completely dissolved in the solvent.

By the aforementioned preparation method, the compound represented by Formula (1) is obtained as a crude azo pigment, and when the compound is used as the pigment of the present invention, a post-treatment is preferably performed. Examples of the method of this post-treatment include a process of controlling the pigment particle by a grinding treatment such as solvent salt milling, salt milling, dry milling, solvent milling and acid pasting, a solvent heating treatment, and the like, and a process of performing a surface treatment with a resin, a surfactant, a dispersing agent and the like.

It is preferred that the compound represented by Formula (1) according to the present invention is subjected to solvent heating treatment and/or solvent salt milling as the post-treatment.

The method and conditions of the solvent heating treatment and the solvent salt milling are the same as those described above.

[Preparation of δ-Type Crystal Form Azo Pigment]

Hereinafter, the preparation method of the present invention will be described in detail.

It is preferred that the method for preparing an azo pigment according to the present invention includes a process of obtaining a crude azo pigment and a process of transforming the crude azo pigment into a δ-type crystal form azo pigment by subjecting the crude azo pigment to solvent treatment.

It is preferred that the method for preparing a crude azo pigment includes (a) a process of mixing a diazotizing agent with a heterocyclic amine represented by Formula (2), and (b) a process of performing a reaction by mixing a reaction product obtained in process (a) with a compound represented by Formula (3), and obtaining a solution in which an azo compound produced by the reaction and represented by Formula (1) is dissolved at least in part, and it is more preferred that the method also includes (c) a process of crystallizing the pigment represented by Formula (1) by mixing the solution obtained in process (b) with a poor solvent for the azo compound represented by Formula (1).

In process (b), when the ratio at which the azo compound is dissolved is high, the yield becomes high, which is preferred.

Process (a) according to the present invention will be described in detail.

In process (a), a diazonium compound is derived by a reaction of a heterocyclic amine represented by Formula (2) with a diazotizing agent by mixing a diazotizing agent with a heterocyclic amine represented by Formula (2). It is preferred that this reaction is performed in a medium including an acid. In the present specification, a liquid including the diazonium compound is referred to as "diazonium compound liquid preparation". The method of mixing the heterocyclic amine represented by Formula (2) with the acid and the diazotizing agent is not particularly limited, but it is preferred that the diazotizing agent is added to a solution of the heterocyclic amine represented by Formula (2) and the acid. The diazotizing agent in process (a) is used to derive the heterocyclic amine represented by Formula (2) into the diazonium compound, and is not limited as long as the diazotizing agent has such an action. Representative examples of the diazotizing agent include nitrite esters (examples thereof include isopentyl nitrite), nitrite salts (examples thereof include sodium nitrite or potassium nitrite), isoamyl nitrite and nitrosylsulfuric acid, the diazotizing agent is more preferably sodium nitrite, potassium nitrite and nitrosylsulfuric acid, and among them, nitrosylsulfuric acid is particularly preferred from the viewpoint that the diazonium compound may be stably and efficiently prepared.

The acid used in process (a) means an acid which may even slightly dissolve the heterocyclic amine even though the acid does not completely dissolve the heterocyclic amine represented by Formula (2), and is preferably an acid which completely dissolves an amino compound. As the acid, an inorganic acid and an organic acid may be used, and examples of the inorganic acid include hydrochloric acid, phosphoric acid and sulfuric acid, and the inorganic acid is preferably phosphoric acid and sulfuric acid, and more preferably sulfuric acid. Examples of the organic acid include formic acid, acetic acid, propionic acid and methanesulfonic acid, and the organic acid is preferably acetic acid, propionic acid and methanesulfonic acid, and more preferably acetic acid and propionic acid. Furthermore, these acids may be used either alone or in a mixture thereof. Examples of a mixed acid include phosphoric acid/acetic acid, sulfuric acid/acetic acid, methanesulfonic acid/acetic acid and acetic acid/propionic acid, the mixed acid is preferably phosphoric acid/acetic acid, sulfuric acid/acetic acid, sulfuric acid/acetic acid/propionic acid and acetic acid/propionic acid, and among them, sulfuric acid/acetic acid and acetic acid/propionic acid are particularly preferred. The mass ratio of these mixed acids is preferably 1/(0.1 to 20), more preferably 1/(0.5 to 10), and still more preferably 1/(1 to 10).

In process (a), the amount of acid added to the heterocyclic amine represented by Formula (2) is, in terms of mass ratio, 1 time to 100 times, more preferably 2 times to 50 times, and still more preferably 3 times to 25 times. When the mass ratio is 1 time or more, stirrability is improved so that the diazonium compound may be derived more securely. On the other hand, when the mass ratio is 100 times or less, productivity is enhanced so that economic efficiency is improved.

Further, in process (a), the amount of the diazotizing agent added to the heterocyclic amine represented by Formula (2) is, in terms of molar ratio, 1.0 time to 20 times, more preferably 1.0 time to 10 times, and still more preferably 1.0 time to 5 times. When the amount of the diazotizing agent to the amino compound is, in terms of molar ratio, 1 time or more, the diazonium compound may be derived more securely, and when the amount is 20 times or less, it is possible to suppress the diazonium compound from being decomposed by a side reaction.

The mixing of the diazotizing agent with the heterocyclic amine represented by Formula (2) in process (a) is performed preferably at 50° C. or less, more preferably at 40° C. or less, and still more preferably at 30° C. or less. In the preparation of the diazo solution at 50° C. or more, there is a concern in that the diazotizing agent may be decomposed. A stirring time to derive the heterocyclic amine into the diazonium compound is preferably 0.3 to 10 hours, more preferably 0.5 to 5 hours, and still more preferably 1 to 3 hours. When the stirring time is 0.3 hour or more, it is easy to completely derive the heterocyclic amine into the diazonium compound, and when the stirring time is 10 hours or less, it is difficult for the decomposition of therdiazonium compound to occur. In addition, a typical stirrer is used in the mixing, and the stirrer is not particularly limited. The number of revolutions of the stirring may be different depending on the manufacturing facility in some cases, but is preferably 30 rpm to 300 rpm, more preferably 40 rpm to 200 rpm, and still more preferably 50 rpm to 200 rpm. When the stirring speed is 30 rpm or more in terms of the number of revolutions, the stirring efficiency of the diazonium compound liquid preparation is improved, and therefore, a desired reaction may proceed securely.

The solvent which may be mixed in process (a) is not particularly limited as long as the diazonium compound derived is not decomposed. Examples of the solvent which may be mixed include a hydrocarbon-based solvent such as hexane, benzene and toluene, an ether-based solvent such as diethyl ether and tetrahydrofuran, a ketone-based solvent such as acetone and methyl ethyl ketone, an amide-based solvent such as dimethylformamide, dimethylacetamide, pyrrolidone and N-methyl-2-pyrrolidone, and dimethylsulfoxide, sulfolane, acetonitrile and water.

A preferred pH of the diazonium compound liquid preparation in process (a) is preferably 7 or less, more preferably 5 or less, and still more preferably 3 or less. When the pH of the diazonium compound liquid preparation in process (a) is more than 7, there is a concern in that the diazonium compound derived may be decomposed.

Next, process (b) according to the present invention will be described in detail.

Process (b) is a process of mixing the reaction product obtained in process (a) with a compound represented by Formula (3) for a reaction to occur, and obtaining a solution in which an azo compound produced by the reaction and represented by Formula (1) is dissolved at least in part.

In the present specification, the solution in which the azo compound is dissolved at least in part is referred to as "an azo compound dissolved solution".

Examples of a method of preparing the azo compound dissolved solution include (I) a method of obtaining the azo compound dissolved solution including: performing a coupling reaction by mixing the reaction product obtained in process (a) with the compound represented by Formula (3), and as a result of the reaction, dissolving the precipitated azo pigment represented by Formula (1) in a solvent, and (II) a method of obtaining the azo compound dissolved solution including: performing the coupling reaction such that the compound obtained by the coupling reaction and represented by Formula (1) is dissolved at least in part in a reaction solution, and adopting the resulting reaction solution as the azo compound dissolved solution as it is, or a method of obtaining the azo compound dissolved solution including: further dissolving a (crystallized) azo pigment, which is obtained by applying the thus-obtained azo compound dissolved solution to process (c) to be described below in detail in a solvent.

In any of types (I) and (II), a method of mixing the diazonium compound liquid preparation obtained in process (a) with a compound represented by Formula (3) is not particularly limited, but it is preferred that the compound represented by Formula (3) is dissolved in a solvent and the resulting solution is added to the liquid preparation, and it is more preferred that a solution of the compound represented by Formula (3) is added to the diazonium compound liquid preparation obtained in process (a).

In addition, the amount of the diazonium compound in the diazonium compound liquid preparation obtained in process (a) to the compound represented by Formula (3) in process (b) is preferably 0.8 to 3 equivalents to the coupling position of the compound represented by Formula (3), more preferably 0.9 to 2 equivalents to the coupling position, and still more preferably 0.95 to 1.5 equivalents to the coupling position. When the amount is 0.8 equivalents or more, a coupling component having an unreacted coupling position may be suppressed from remaining, and when the amount is 3 equivalents or less, an unreacted diazonium compound may be suppressed from remaining, and therefore, the amount range is more economical.

Meanwhile, in type (II), since the azo compound represented by Formula (1) is dissolved at least in part in process (b), the coupling reaction proceeds more smoothly, thereby preparing a high-purity azo compound. The reason is assumed as follows. Since there are two coupling positions, for example, only one coupling position goes through a reaction intermediate which is reacted. When the reaction intermediate is precipitated into the reaction system, the reaction rate of the second coupling reaction is slowed down. Meanwhile, since the diazonium compound is unstable, there is a concern in that decomposition may occur when a long time elapses. Accordingly, it is important to allow the coupling reaction to proceed rapidly, and consequently, the type (II) preparation method, which does not produce a precipitate in process (b), is more suitable for preparing a high-purity pigment.

In process (b), the coupling component may be added without using a solvent, and may be mixed with a solvent and the resulting solution may be added, but it is preferred that the coupling component is added without using the solvent. In process (b), when a solvent is used in the coupling component, the solvent is not particularly limited, but is preferably a solvent which allows type (II) to be used, that is, a solvent by which it is possible to obtain a solution in which the azo compound produced after the reaction and represented by the general Formula (1) is dissolved at least in part.

In the case of type (I), that is, when the pigment is precipitated, as an example of the solvent, water, an organic acid, an inorganic acid and an organic solvent may be used, and an organic solvent is particularly preferred, and a solvent causing no liquid separation phenomenon during reaction and providing a uniform solution with the solvent is preferred. Examples thereof include water, acetic acid, an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the organic solvent may be a glycol-based solvent having two or more hydroxyl groups in the solvent molecule, an alcohol-based solvent having 3 or less carbon atoms, or a ketone-based solvent having a total carbon number of 5 or less, preferably an alcohol solvent having 2 or less atoms (for example, methanol and ethylene glycol) and a ketone-based solvent having a total carbon number of 4 or less (for example, acetone and methyl ethyl ketone). Furthermore, a mixed solvent of these solvents is also included in the organic solvent.

Further, in the case of type (II), that is, when a coupling reaction is performed such that the compound represented by Formula (1) is dissolved at least in part in the reaction solution, examples of the solvent include an alcohol-based solvent such as methanol, isopropanol and ethylene glycol, a ketone-based solvent such as acetone and methyl ethyl ketone, an organic acid solvent such as acetic acid, propionic acid and methanesulfonic acid, an inorganic acid solvent such as sulfuric acid, hydrochloric acid and phosphoric acid, an amide-based solvent such as dimethylformamide, dimethylacetamide, pyrrolidone and N-methyl-2-pyrrolidone, dimethylsulfoxide, sulfolane, and acetonitrile. Among them, a ketone-based solvent such as acetone and methyl ethyl ketone, an organic acid solvent such as acetic acid, propionic acid and methanesulfonic acid, and an inorganic acid solvent such as sulfuric acid, hydrochloric acid and phosphoric acid are preferred, an acidic solvent of organic acid or inorganic acid is more preferred, and acetic acid, methanesulfonic acid, phosphoric acid and sulfuric acid are most preferred. In addition, a mixed solvent of the aforementioned solvents is also suitable.

Particularly, in the case of type (II), in process (b), it is preferred that an acidic solution obtained by dissolving or suspending the coupling component in an acidic solvent is mixed with the reaction product obtained in process (a), or the coupling component is added to the reaction product obtained in process (a) without using a solvent. Particularly, it is preferred that the acidic solvent is a solvent including at least one of acetic acid and sulfuric acid.

In any of types (I) and (II), the preferred amount of the solvent added is, in terms of mass ratio, preferably 0.5 times to 200 times, more preferably 1 time to 100 times, and still more preferably 1 time to 50 times, based on the coupling component. As for the preferred amount of the solvent added based on the coupling component, when the mass ratio is less than 0.5 time, it is difficult to stir the coupling component and the solvent in a preparation machine and a desired reaction does not proceed. Furthermore, the case where the mass ratio is more than 200 times is not economical.

When the preparation method of the azo compound dissolved solution is type (1) or when the preparation method of the azo compound dissolved solution is type (II) and an azo pigment, which is obtained by applying the coupling reaction solution in which the compound represented by Formula (1) is dissolved at least in part to process (c), is further dissolved in the solvent to prepare an azo compound dissolved solution, the solvent for dissolving the obtained azo pigment is not particularly limited as long as the solvent may dissolve at least a part of the azo pigment, but examples thereof include the preferred examples of the solvent previously described in type (II).

As for the azo compound dissolved solution obtained in process (b), the ratio of the azo compound represented by Formula (1), which is dissolved in the azo compound dissolved solution to the total amount of the azo compound produced by process (b) (the sum of the azo compound represented by Formula (1), which is dissolved in the azo compound dissolved solution and the azo pigment represented by Formula (1), which is precipitated from the azo compound dissolved solution) is preferably 50% by mass or more, more preferably 75% by mass or more, still more preferably 90% by mass or more, and most preferably 100% by mass (a state where the azo compound produced in process (b) is completely dissolved in the reaction solution), and accordingly, the particle diameter of the pigment tends to be further reduced.

In process (b), the mixing of the diazonium compound liquid preparation of process (a) and the coupling component is preferably performed at a temperature of 50° C. or less, more preferably 30° C. or less, and still more preferably 25° C. or less. When the mixing temperature is 50° C. or more, there is a concern in that the diazonium compound derived in process (a) and the produced azo compound represented by Formula (1) are decomposed. Further, a typical stirrer is used in the mixing, and the stirrer is not particularly limited. The number of revolutions of the stirring may be different depending on the manufacturing facility in some cases, but is preferably 30 rpm to 300 rpm, more preferably 40 rpm to 200 rpm, and still more preferably 50 rpm to 200 rpm. When the stirring speed is less than 30 rpm in terms of the number of revolutions, the stirring efficiency of the mixed solution deteriorates, and therefore, a desired reaction may not proceed. The stirring time in process (b) is preferably 0.1 to 10 hours, more preferably 0.3 to 5 hours, and still more preferably 0.3 to 3 hours. When the stirring time is less than 0.1 hours, it is difficult for the pigment to be completely derived, and when the stirring time exceeds 10 hours, there is a concern in that the azo compound represented by Formula (1) may be decomposed.

Next, process (c) according to the present invention will be described in detail.

Process (c) is a process of crystallizing a pigment by mixing the azo compound dissolved solution obtained in process (b) with a poor solvent with the azo compound having low solubility therein. The method of mixing the azo compound dissolved solution obtained in process (b) with a poor solvent is not particularly limited, but it is preferred that the azo compound dissolved solution obtained in process (b) is added to a poor solvent and at this time, it is preferred that the poor solvent is in a state of being stirred.

The stirring speed is preferably 100 rpm to 10,000 rpm, more preferably 150 rpm to 8,000 rpm, and particularly preferably 200 rpm to 6,000 rpm. For the addition, a pump or the like may also be used. In this case, either in-liquid addition or out-of-liquid addition may be employed, but in-liquid addition is more preferred. Further, continuous supply into liquid through a supply pipe by using a pump is preferred.

The poor solvent is not particularly limited, but is preferably a poor solvent with the azo compound represented by Formula (1) having a solubility of 1 g/L or less therein, and more preferably a poor solvent with the azo compound represented by Formula (1) having a solubility of 0.1 g/L or less therein. This solubility may be a solubility when the azo compound is dissolved in the presence of an acid or an alkali. As for the compatibility or uniform mixing property between the azo compound dissolved solution obtained in process (b) and the poor solvent, the amount of the azo compound dissolved in a poor solvent is preferably 30% by weight or more, and more preferably 50% by weight or more based on the amount of the azo compound dissolved in a good solvent. In the present specification, the solubility indicates a solubility at 25° C.

Examples of the poor solvent include an aqueous solvent such as water, hydrochloric acid, ammonia water and an aqueous sodium hydroxide solution, an alcohol-based solvent such as methanol, ethanol, isopropyl alcohol and 1-methoxy-2-propanol, a ketone compound solvent such as acetone, methyl ethyl ketone, methyl isobutyl ketone and cyclohexanone, an ether-based solvent such as diethyl ether and tetrahydrofuran, a hydrocarbon-based solvent such as hexane, benzene and toluene, a nitrile-based solvent such as acetonitrile, a halogen-based solvent such as dichloromethane and trichloroethylene, and an ester-based solvent such as ethyl acetate, ethyl lactate and 2-(1-methoxy)propyl acetate, and the poor solvent is preferably an aqueous solvent such as water, hydrochloric acid, ammonia water and an aqueous sodium hydroxide solution, an alcohol-based solvent such as methanol, ethanol, isopropyl alcohol and 1-methoxy-2-propanol, and a ketone compound solvent such as acetone, methyl ethyl ketone, methyl isobutyl ketone and cyclohexanone, and more preferably an aqueous solvent such as water and ammonia water, and an alcohol solvent having 1 to 3 carbon atoms. In addition, a mixed solvent of the aforementioned solvents is also suitable. The poor solvent is most preferably one or more solvents selected from the group consisting of water and an alcohol having 1 to 3 carbon atoms.

In the aspect of the present invention, the azo compound dissolved solution obtained in process (b) is in a state where the azo compound is completely dissolved in a reaction solution, and it is preferred that water or an alcohol having 1 to 3 carbon atoms, preferably water, methanol or a mixed solvent thereof is mixed as a poor solvent with the azo compound dissolved solution. A finally desired δ-type crystal form azo pigment having a small particle diameter may be efficiently obtained by preparing a crude azo pigment by the aspect.

The mixing ratio between the azo compound dissolved solution obtained in the process (b) and the poor solvent is, in terms of volume ratio, preferably 1/50 to 2/3, more preferably 1/40 to 1/2, and particularly preferably 1/20 to 1/2. When the volume ratio is 2/3 or less, sufficient crystallization of a pigment occurs and the reaction yield is increased, and when the volume ratio is 1/50 or more, productivity is enhanced, which is economical.

The temperature at which the azo compound dissolved solution obtained in process (b) is mixed with the poor solvent is not particularly limited, but the mixing is preferably performed at −10° C. to 50° C., more preferably at −5° C. to 30° C., and most preferably at −5° C. to 15° C.

In the mixing of the azo compound dissolved solution obtained in process (b) with the poor solvent, the particle diameter of the organic nanoparticle produced by precipitation may be controlled by adjusting the Reynolds number. Here, the Reynolds number is a dimensionless number which indicates the flowing state of a fluid and is represented by the following equation.

$$Re = \rho UL/\mu \qquad \text{Equation (1)}$$

(In Equation (1), Re represents the Reynolds number, $\rho$ represents the density [$kg/m^3$] of the azo compound dissolved solution obtained in process (b), U represents the relative velocity [m/s] when the azo compound dissolved solution meets the poor solvent, L represents the equivalent diameter [m] of a flow channel or a supply inlet at a portion where the azo compound dissolved solution meets the poor solvent, and $\mu$ represents the viscosity coefficient [Pa·s] of the azo compound dissolved solution.)

The equivalent diameter L refers to the diameter of an equivalent circular tube when a circular tube which is equivalent to the opening diameter or flow channel of a pipe having an arbitrary cross-section shape is envisaged. The equivalent diameter L is represented by the following Equation (2), in which the cross-sectional area of the pipe is designated as A and the wetted perimeter length (circumference) of the pipe or the outer perimeter of the flow channel is designated as p.

$$L = 4A/p \qquad \text{Equation (2)}$$

The relative velocity U when the azo compound dissolved solution meets the poor solvent is defined as the relative velocity in a direction perpendicular to a surface of the portion where the two liquids meet each other. That is, for example, in the case of mixing by injecting the azo compound dissolved solution into the poor solvent which is stationary, the velocity of injecting from the supply inlet is identical to the relative velocity U. The value of the relative velocity U is not particularly limited, but for example, the value is preferably set to 0.5 m/s to 100 m/s, and more preferably to 1.0 m/s to 50 m/s.

The density $\rho$ of the azo compound dissolved solution is a value which is determined depending on the type of the selected material, but it is practical that p is, for example, 0.8 $kg/m^3$ to 2.0 $kg/m^3$. Furthermore, the viscosity coefficient $\mu$ of the azo compound dissolved solution is also a value which is determined depending on the material used, the environment temperature and the like, but for example, a value of 0.5 mPa·s to 100 mPa·s is preferred, and a value of 1.0 mPa·s to 50.0 mPa·s is more preferred.

A smaller value of the Reynolds number is likely to form a laminar flow, and a larger value is likely to form a turbulent flow. For example, the particle diameter of the pigment nanoparticles may be obtained while being controlled by adjusting the Reynolds number to 60 or more, and it is preferred to adjust the Reynolds number to 100 or more, and more preferably to 150 or more. The Reynolds number has no particular upper limit, but pigment particles having a desired average particle diameter may be obtained while being controlled by adjusting and controlling the Reynolds number, for example, in a range of 100,000 or less. In this case, within the aforementioned range, pigment particles having a smaller particle diameter may be obtained while being controlled usually by increasing the Reynolds number.

When the primary particles of the crude azo pigment particle obtained by the preparation method of the present invention are observed under a transmission microscope, the length in a long axis direction is preferably 1 nm to 1 μm, more preferably 5 nm to 3 μm, still more preferably 10 nm to 500 nm, and particularly preferably 10 nm to 300 nm.

Meanwhile, with respect to the particle diameter of the pigment particle, there is a method of digitizing the particle diameter by a measuring technique and expressing the particle diameter in terms of an average size of a group, examples of the size frequently used includes a mode diameter indicating the maximum value of distribution, a median diameter corresponding to the median value in the integral distribution curve, various average diameters (number average, length average, area average, mass average, volume average and the like), and the like, and in the present invention, unless otherwise indicated, the average particle diameter refers to a number average particle diameter.

Examples of the method of measuring the particle diameter of the pigment particle include a microscopic method, a mass method, a light scattering method, a light shielding method, an electric resistance method, an acoustic method, and a dynamic light scattering method, and a microscopic method and a dynamic light scattering method are particularly preferred. Examples of a microscope used in the microscopic method include a scanning electron microscope, a transmission electron microscope and the like. Examples of a particle measuring apparatus using a dynamic light scattering method include Nanotrac UPA-EX150 manufactured by Nikkiso Co., Ltd., Dynamic Light Scattering Photometer DLS-7000 Series manufactured by Otsuka Electronics Co., Ltd., and the like.

The aforementioned preferred average particle diameter of the pigment particle is achieved by appropriately adjusting (1) the temperature in process (c), (2) the solubility of the azo compound for the poor solvent, and (3) the stirring speed (or Reynolds number).

In preparing a liquid dispersion by precipitating crude azo pigment fine particles, at least any one of the azo compound dissolved solution and the poor solvent may contain a dispersing agent. In this case, it is preferred that the dispersing agent is contained into the azo compound dissolved solution. The dispersing agent has actions of (1) quickly being adsorbed to the surface of the precipitated pigment to form fine nanoparticles and (2) preventing these particles from aggregating again.

As the dispersing agent, for example, an anionic, cationic, amphoteric or nonionic, low molecular or polymer dispersing agent may be used.

As for the polymer dispersing agent, the mass average molecular weight thereof is preferably 1,000 to 500,000, more preferably 10,000 to 500,000, and particularly preferably 10,000 to 100,000.

Specific examples thereof include polyvinylpyrrolidone, polyvinyl alcohol, polyvinyl methyl ether, polyethylene glycol, polypropylene glycol, polyacrylamide, a vinyl alcohol-vinyl acetate copolymer, partially formalised polyvinyl alcohol, partially butyralized polyvinyl alcohol, a vinylpyrrolidone-vinyl acetate copolymer, a polyethylene oxide/propylene oxide block copolymer, polyacrylate, polyvinyl sulfate, poly(4-vinylpyridine) salt, polyamide, polyallylamine salt, condensed naphthalenesulfonate, a cellulose derivative, a starch derivative and the like. In addition, natural polymers such as alginate, gelatin, albumin, casein, gum arabic, gum traganth and lignin sulfonate may also be used. Among them, polyvinylpyrrolidone is preferred. These polymer compounds may be used either alone or in combination of two or more thereof, and may also be used by combining a low molecular dispersing agent. The dispersing agent used for dispersion of a pigment is described in detail in "Dispersion Stabilization of Pigment and Surface Treatment Technique Evaluation" (Japan Association for International Chemical Information, published on December 2001), pp. 29 to 46.

Examples of the anionic dispersing agent (anionic surfactant) include an N-acyl-N-alkyltaurine salt, a fatty acid salt, an alkylsulfonic ester salt, alkylbenzenesulfonate, alkylnaphthalenesulfonate, dialkylsulfosuccinate, an alkylphosphonic ester salt, a naphthalenesulfonic acid-formalin condensate, a polyoxyethylene alkylsulfonic ester salt and the like. Among them, an N-acyl-N-alkyltaurine salt is preferred. As the N-acyl-N-alkyltaurine salt, those described in Japanese Patent Application Laid-Open No. H3-273067 are preferred. These anionic dispersing agents may be used either alone or in combination of two or more kinds thereof.

Examples of the cationic dispersing agent (cationic surfactant) include a quaternary ammonium salt, alkoxylated polyamine, aliphatic amine polyglycol ether, aliphatic amine, diamine or polyamine derived from aliphatic amine and aliphatic alcohol, imidazoline derived from aliphatic acid, and salts of these cationic substances. These cationic dispersing agents may be used either alone or in combination of two or more kinds thereof.

The amphoteric dispersing agent is a dispersing agent having, in the molecule thereof, both an anionic group moiety that is contained in the molecule of the anionic dispersing agent, and a cationic group moiety that is contained in the molecule of the cationic dispersing agent.

Examples of the nonionic dispersing agent (nonionic surfactant) include polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and the like. Among them, polyoxyethylene alkylaryl ether is preferred. These nonionic dispersing agents may be used either alone or in combination of two or more kinds thereof.

The content of the dispersing agent is preferably in a range of 0.1 parts by mass to 1,000 parts by mass, more preferably in a range of 1 part by mass to 500 parts by mass, and still more preferably in a range of 5 parts by mass to 200 parts by mass, based on 100 parts by mass of the pigment. Furthermore, the dispersing agents may be used either alone or in combination of a plurality thereof.

(Solvent Heating Treatment)

The solvent heating treatment in the present invention specifically refers to heating and stirring an azo pigment represented by Formula (1) or a salt, hydrate or solvate thereof in a solvent.

A crystal transformation may be efficiently performed by the solvent heating treatment. For example, a δ-type crystal form azo pigment may be obtained by heating and stirring a solvate of an amorphous azo pigment.

In the present invention, it is preferred that the azo pigment represented by Formula (1) is transformed into a crystal form having characteristic X-ray diffraction peaks at Bragg angles ($2\theta \pm 0.2°$) of 4.8°, 7.2° and 9.7° in the CuKα characteristic X-ray diffraction.

The monodispersity is enhanced by transforming the azo pigment into the aforementioned δ-type crystal form azo pigment having characteristic X-ray diffraction peaks, that is, the particles may be dispersed into a target particle diameter in a short time.

The crystal form having characteristic X-ray diffraction peaks at Bragg angles ($2\theta \pm 0.2°$) of 4.8°, 7.2° and 9.7° in the CuKα characteristic X-ray diffraction is also more preferably a crystal form having characteristic X-ray diffraction peaks at 4.8°, 7.2°, 9.7°, 20.1° and 26.8°. Among them, a crystal form having characteristic X-ray diffraction peaks particularly at 4.8°, 7.2°, 9.5°, 9.7°, 10.7°, 17.4°, 19.0°, 20.1° and 26.8° is most preferred.

As a solvent which may be used in the crystal transformation of the present invention, a solvent with an azo pigment represented by Formula (1) having low solubility therein after the crystal transformation is preferred from the viewpoint of suppressing the crystal growth during the crystal transformation. Water, an organic acid, an inorganic acid and an organic solvent may be used, but water and the organic solvent are preferred. Examples of a more preferred solvent include water, methanol, ethanol, isopropanol, isobutanol, ethylene glycol, diethylene glycol, diethylene glycol diethyl ether, diethylene glycol monomethyl ether, dipropylene glycol, acetic acid, propionic acid, sulfuric acid or a mixed solvent thereof, and the solvent is more preferably ethylene glycol, water, acetic acid, sulfuric acid or a mixed solvent thereof, and most preferably ethylene glycol.

The amount of the solvent used in the solvent heating treatment is preferably 1 time to 100 times, more preferably 5 times to 50 times, and still more preferably 8 times to 30 times based on the amount of the azo pigment represented by Formula (1). When the amount is one time or more, stirrability may be secured, which is preferred. Further, when the amount is 100 times or less, productivity is enhanced and economic efficiency is enhanced, which is preferred.

The temperature of heating and stirring in the solvent heating treatment varies depending on the size of the primary particle diameter of a desired pigment, but is preferably 15° C. to 150° C., more preferably 20° C. to 120° C., and still more preferably 20° C. to 100° C. When the temperature is 15° C. or more, it does not take a long time for the crystal transformation to occur, which is efficient. On the other hand, when the temperature is 15° C. or less, a part of the azo pigment (1) may be suppressed from being decomposed, which is preferred.

The stirring time for crystal transformation is not particularly limited as long as the crystal transformation is occurring, but is preferably 5 minutes to 1,500 minutes, more preferably 10 minutes to 600 minutes, and still more preferably 30 minutes to 300 minutes. When the time is 5 minutes or more, a partially amorphous moiety may be suppressed from remaining, which is preferred. On the other hand, when the time is 1,500 minutes or less, the time is efficiency, which is preferred.

The azo pigment represented by Formula (1) may also be prepared by the following method. That is, the azo pigment represented by Formula (1) may be prepared by modifying a heterocyclic amine represented by the following Formula (2) into diazonium, and

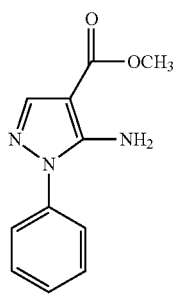

Formula (2)

subsequently, performing a coupling reaction with a compound represented by the following Formula (3).

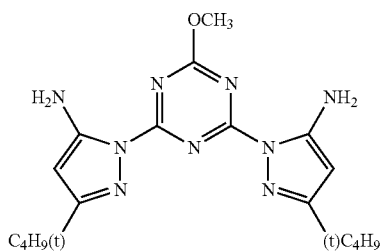

Formula (3)

The azo pigment of the present invention may be synthesized, for example, by performing an azo coupling reaction between a diazonium salt prepared by an already known method using the diazo component of Formula (2) and the coupling component of Formula (3).

The preparation and coupling reaction of the diazonium salt may be performed by a common method.

For the preparation of the diazonium salt of Formula (2), it is possible to apply, for example, a common method of adjusting a diazonium salt by using a nitrosonium ion source, for example, nitrous acid, nitrite or nitrosylsulfuric acid, in a reaction medium containing an acid (for example, hydrochloric acid, sulfuric acid, phosphoric acid, acetic acid, propionic acid, methanesulfonic acid, trifluoromethanesulfonic acid and the like).

More preferred examples of the acid include a case of using acetic acid, propionic acid, methanesulfonic acid, phosphoric acid and sulfuric acid either alone or in combination thereof, and among them, phosphoric acid or a combination use system of acetic acid and sulfuric acid is particularly preferred.

As preferred examples of the reaction medium (solvent), an organic acid and an inorganic acid are preferably used, and particularly, phosphoric acid, sulfuric acid, acetic acid, propionic acid and methanesulfonic acid are preferred, and among them, acetic acid and/or propionic acid are preferred.

As a preferred example of the nitrosonium ion source, it is stable to use nitrtosyl sulfuric acid in the aforementioned preferred reaction medium containing an acid, and further, the diazonium salt may be efficiently prepared.

The amount of the solvent used is preferably 0.5 times by mass to 50 times by mass, more preferably 1 time by mass to 20 times by mass, and particularly preferably 3 times by mass to 10 times by mass based on the amount of the diazo component of Formula (2).

In the present invention, the diazo component of Formula (2) may be in a state of being dispersed in a solvent, or in a state of a dissolved solution depending on the type of the diazo component.

The amount of the nitrosonium ion source used is preferably 0.95 equivalents to 5.0 equivalents, more preferably 1.00 equivalent to 3.00 equivalents, and particularly preferably 1.00 to 1.10 equivalents with respect to the diazo component.

The reaction temperature is preferably −15° C. to 30° C., more preferably −10° C. to 10° C., and still more preferably −5° C. to 5° C. At less than −15° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

The coupling reaction may be performed in an acidic reaction medium to a basic reaction medium, but is preferably performed in an acidic to neutral reaction medium for the azo pigment of the present invention, and the components may be efficiently derived into the azo pigment by suppressing the decomposition of the diazonium salt particularly when the coupling reaction is performed in an acidic reaction medium.

As a preferred example of the reaction medium (solvent), an organic acid, an inorganic acid and an organic solvent may be used, and an organic solvent is particularly preferred, and a solvent causing no liquid separation phenomenon during reaction and providing a uniform solution with the solvent is preferred. Examples thereof include an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the solvent may be a glycol-based solvent having two or more hydroxyl groups, or an alcohol-based solvent having 3 or less carbon atoms, and preferably an alcohol solvent (for example, methanol and ethylene glycol) having 2 or less carbon atoms, in a solvent molecule. In addition, a mixed solvent of these solvents is also included in the organic solvent.

The amount of the solvent used is preferably 1 time by mass to 100 times by mass, more preferably 1 time by mass to 50 times by mass, and still more preferably 2 times by mass to 10 times by mass based on the amount of the coupling component represented by Formula (3).

In the present invention, the coupling component which forms Formula (1) may be in a state of being dispersed in a solvent, or in a state of a dissolved solution depending on the type of the coupling component.

For the amount of the coupling component used, the diazo component is preferably 0.95 equivalents to 5.0 equivalents, more preferably 1.00 equivalent to 3.00 equivalents, and particularly preferably 1.00 to 1.50 equivalents per the azo coupling moiety.

The reaction temperature is preferably −30° C. to 30° C., more preferably −15° C. to 10° C., and still more preferably −10° C. to 5° C. At less than −30° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

In the method of synthesizing an azo pigment according to the present invention, a product (crude azo pigment) obtained by these reactions may be treated by a typical post-treatment method of an organic synthesis reaction, and then used with or without purification.

That is, for example, a product isolated from the reaction system may be used without purification or by performing a purification operation such as recrystallization and salt formation either alone or in combination.

In addition, after the reaction is completed, the reaction solvent may or may not be removed by distillation, the reaction solution may or may not be neutralized by pouring the reaction solvent in water or ice, and the product isolated or extracted with an organic solvent/aqueous solution may be used without purification or after performing a purification operation such as recrystallization, crystallization and salt formation either alone or in combination.

The synthesizing method of an azo pigment of the present invention will be described in more detail.

The method for preparing an azo pigment according to the present invention includes, in a coupling reaction between a diazonium compound, which is obtained by modifying the heterocyclic amine represented by Formula (2) into diazonium and the compound represented by Formula (3), dissolving the compound of Formula (3) in an organic solvent, and then performing the coupling reaction.

The reaction of modifying the heterocyclic amine represented by Formula (2) into diazonium may be performed, for example, by reacting the heterocyclic amine with a reagent such as sodium nitrite and nitrosylsulfuric acid in an acidic solvent such as sulfuric acid, phosphoric acid and acetic acid at a temperature of 15° C. or less for approximately 10 minutes to 6 hours. It is preferred that the coupling reaction is performed by reacting a diazonium salt obtained by the above-described method and the compound represented by Formula (3) at 40° C. or less, preferably 15° C. or less for approximately 10 minutes to 12 hours.

The tautomerism and/or crystalline polymorphism described above may be controlled by the preparation conditions during the coupling reaction. As the method of preparing the δ-type crystal which is a more preferred type, for example, it is preferred to use the method of the present invention including dissolving the compound represented by Formula (3) one time in an organic solvent, and then performing the coupling reaction. Examples of the organic solvent which may be used in this case include an alcohol solvent. As an example of the alcohol solvent, methanol, ethanol, isopropanol, ethylene glycol, diethylene glycol and the like are preferred, and among them, methanol is particularly preferred.

Another method for preparing an azo pigment according to the present invention includes a coupling reaction between a diazonium compound, which is obtained by modifying the heterocyclic amine represented by Formula (2) into diazonium and the compound represented by Formula (3), in which the coupling reaction is performed in the presence of a polar aprotic solvent.

The δ-type crystal may be efficiently prepared even by the method of performing the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, a mixed solvent thereof and the like. When these solvents are used, the compound of Formula (3) may or may not be completely dissolved in the solvent.

By the aforementioned preparation method, the compound represented by Formula (1) is obtained as a crude azo pigment, and when the compound is used as the pigment of the present invention, a post-treatment is preferably performed. Examples of the method of this post-treatment include a process of controlling the pigment particle by a grinding treatment such as solvent salt milling, salt milling, dry milling, solvent milling and acid pasting, a solvent heating treatment, and the like, and a process of performing a surface treatment with a resin, a surfactant, a dispersing agent and the like.

The preparation method of the present invention is a method for preparing an azo pigment or a tautomer thereof represented by Formula (1) and having characteristic X-ray diffraction peaks at Bragg angles (2θ±0.2°) of 4.8°, 7.2° and 9.7° in the CuKα characteristic X-ray diffraction, the method including heating and stirring the azo pigment represented by Formula (1) in an organic solvent at 60° C. or more (solvent heating treatment). Preferably, the preparation method of the present invention is a method for preparing an azo pigment or a tautomer thereof represented by Formula (1) and having characteristic X-ray diffraction peaks at Bragg angles (2θ±0.2°) of 4.8°, 7.2°, 9.7°, 20.1° and 26.8° in the CuKα characteristic X-ray diffraction, the method including heating and stirring the azo pigment represented by Formula (1) in an organic solvent at 60° C. or more (solvent heating treatment).

It is preferred that the compound represented by Formula (1) according to the present invention is subjected to solvent heating treatment and/or solvent salt milling as the post-treatment.

(Solvent Heating Treatment)

The solvent heating treatment in the present invention specifically refers to heating and stirring an amorphous azo pigment represented by Formula (1) or a salt, hydrate or solvate thereof in a solvent.

As a solvent used for the solvent heating treatment, a solvent with an azo pigment represented by Formula (1) having low solubility therein after the crystal transformation is preferred from the viewpoint of suppressing the crystal growth. Water, an organic acid, an inorganic acid and an organic solvent may be used, but water and the organic solvent are preferred. Examples of a more preferred solvent include water, an alcohol-based organic solvent such as methanol, ethanol, isopropanol and isobutanol, a glycol-based organic solvent such as ethylene glycol, diethylene glycol, diethylene glycol diethyl ether, diethylene glycol monomethyl ether and dipropylene glycol, acetic acid, propionic acid, butyl acetate or a mixture thereof, and the solvent is preferably ethylene glycol, isobutanol and butyl acetate, and most preferably ethylene glycol. An inorganic or organic acid or base may be further added to the solvent exemplified above.

The amount of the solvent used in the solvent heating treatment is preferably 1 time by amount to 1,000 times by amount, and more preferably 5 times by amount to 50 times by amount, based on the amount of the azo compound represented by Formula (1).

The temperature of heating and stirring in the solvent heating treatment varies depending on the size of the primary particle diameter of a desired pigment, but is preferably 40° C. to 150° C., more preferably 60° C. or more, and still more preferably 60° C. to 100° C. Furthermore, the treatment time is preferably 30 minutes to 24 hours.

(Solvent Salt Milling)

Examples of the solvent salt milling include a method including placing, into a kneading machine, a mixture including an azo pigment (hereinafter, an azo pigment before kneading and grinding refers to "a crude azo pigment" in some cases), an inorganic salt, and an organic solvent which does not dissolve it, and performing kneading and grinding therein. A water-soluble inorganic salt may be suitably used as the inorganic salt, and it is preferred that for example, an inorganic salt such as sodium chloride, potassium chloride, sodium sulfate and potassium sulfate is used. Furthermore, the particle diameter of the aqueous inorganic salt is not particularly limited, but the particle diameter of the aqueous inorganic salt is, in terms of a median diameter based on the volume, preferably 0.5 μm to 50 μm, more preferably 1 μm to 20 rpm, and still more preferably 1 μm to 10 μm from the viewpoint of controlling the particle diameter of the secondary aggregate of the azo pigment. The amount of the inorganic salt used is preferably 1 time by mass to 30 times by mass, and from the viewpoint of productivity, preferably 3 times by mass to 20 times by mass, and more preferably 5 times by mass to 15 times by mass based on the amount of the crude azo pigment. An aqueous organic solvent may be suitably used as the organic solvent, and since the solvent may easily evaporate due to an increase in temperature at the time of kneading, a solvent having a high boiling temperature is preferred from the viewpoint of safety. Examples of the organic solvent include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol monomethyl ether, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, or a mixture thereof. Further, as another aqueous organic solvent, a monohydric alcohol-based solvent such as propyl alcohol, 2-butyl alcohol and tert-butyl alcohol may also be suitably used. The amount of the aqueous organic solvent used is preferably 0.1 times by mass to 5 times by mass, and more preferably 2 times by mass to 3 times by mass based on the amount of the crude azo pigment. The kneading temperature is preferably 20° C. to 130° C. and particularly preferably 40° C. to 110° C. As the kneading machine, for example, a kneader, a mix Muller or the like may be used, and specifically, a batch-type kneading machine such as a kneader, a batch-type kneading machine such as a super mixer (manufactured by KAWATA MFG Co., Ltd.) or Trimix (manufactured by INOUE MFG., Inc.) and a continuous-type kneading machine such as a continuous-type uniaxial kneading machine KCK Mill (manufactured by ASADA IRON WORKS CO., LTD.) may be used.

As the continuous-type kneading machine, for example, a kneading machine having a stationary blade and a rotary blade which may allow the grinding portion thereof to impart three actions of compression • shearing • mixing (substitution), which are elements required for kneading and dispersion to the crude pigment is preferred. In addition, the ridge and ridge between the stationary blade and the rotary blade form a crevice (gap) and the shearing action occurs at the gap, and further, it is preferred that a material in a valley between the stationary blade and the rotary blade is subjected to cavity slice with each other.

The shape of the stationary blade and the rotary blade is not particularly limited, but it is preferred that each is selected from three types of chrysanthemum, fan and cotyloid. It is preferred that the stationary blade and the rotary blade are alternately overlapped at a multiple stage, and accordingly, cavities may be radially formed on both sides of each blade. Furthermore, it is preferred that the rotary blade and an intermediate screw are alternatingly inserted on the rotation axis and the stationary blade is fixed to a feed cylinder alternately with a shear chamber cylinder by tie rods, and accordingly, a kneaded product may be extruded by a combination of the stationary blade, the rotary blade and the screw.

Further, it is preferred that the continuous-type kneading machine has at least six temperature controlling units in an input unit, a grinding unit and an extrusion unit of a mixture. Accordingly, the temperature range in the grinding process of the crude azo pigment may be widely set.

The treatment temperature in the grinding process is not particularly limited, and may be, for example, 5° C. to 200° C., but is preferably 5° C. to 50° C., and more preferably 10° C. to 35° C. from the viewpoint of change in color and particle size distribution of azo pigment particles.

In addition, it is preferred that in the continuous-type kneading machine, the discharge amount may be changed by the ratio of mixing the crude azo pigment, the aqueous inorganic salt and the aqueous organic solvent, or the number of axis rotations. The ground particle diameter of the azo pigment may be easily controlled to a desired particle diameter by changing the discharge amount.

The method for preparing a ground azo pigment according to the present invention may include other processes if necessary, in addition to the grinding process. Examples of the other processes include a washing process of removing the aqueous inorganic salt and the aqueous organic solvent by inputting and stirring the mixture into water and the like after the grinding process, and then separating the ground azo pigment by filtration and the like, a drying process of drying the ground azo pigment obtained in the washing process, and the like.

In these washing and drying processes, a method usually used in a so-called solvent salt milling method may be applied even to the present invention without any particular limitation.

The particle diameter of the primary particles of the ground azo pigment in the present invention is preferably 80 nm or less, and more preferably 30 nm to 50 nm. Furthermore, the particle diameter of the secondary particles obtained from the aggregation of primary particles is preferably 120 nm or less, and more preferably 60 nm to 100 nm.

The particle diameters of the primary and secondary particles of the ground azo pigment are measured using a transmission electron microscope (TEM).

The present invention also relates to a method for preparing the azo pigment or the tautomer thereof represented by Formula (1), the method including: kneading the azo pigment or the tautomer thereof represented by Formula (1) with a mixture including an aqueous inorganic salt and an aqueous organic solvent, in which the azo pigment or the tautomer thereof has characteristic X-ray diffraction peaks at Bragg angles (2θ±0.2°) of 4.8°, 7.2° and 9.7° in the CuKα characteristic X-ray diffraction, and has a BET specific surface area by a nitrogen adsorption method of 50 m²/g or more.

As the aqueous inorganic salt and the aqueous organic solvent, those described above may be used, and preferred ranges are also the same. Similarly, in the kneading machine used in kneading, the kneading machine described above may be used.

From the viewpoint of further enhancing the tinctorial strength by making the dispersibility of the pigment further preferred, it is preferred that the azo pigment or the tautomer thereof included in the mixture and represented by Formula (1) has characteristic X-ray diffraction peaks at Bragg angles (2θ±0.2°) of 4.8°, 7.2° and 9.7° in the CuKα characteristic X-ray diffraction.

Furthermore, the present invention also relates to the azo pigment or the tautomer thereof prepared by the preparation method.

[Synthesis of ε-Type Crystal Form Azo Pigment]

Hereinafter, synthesis of the ε-type crystal form azo pigment represented by Formula (1) will be described in detail.

The ε-type crystal form azo pigment represented by Formula (1) (hereinafter, simply referred to as "azo pigment" or "pigment" in some cases) may be synthesized by the following preparation method.

It is preferred that the preparation method of the present invention includes a process of subjecting a diazonium salt derived from a heterocyclic amine represented by the following Formula (2) and a compound represented by the following Formula (3) to azo coupling reaction.

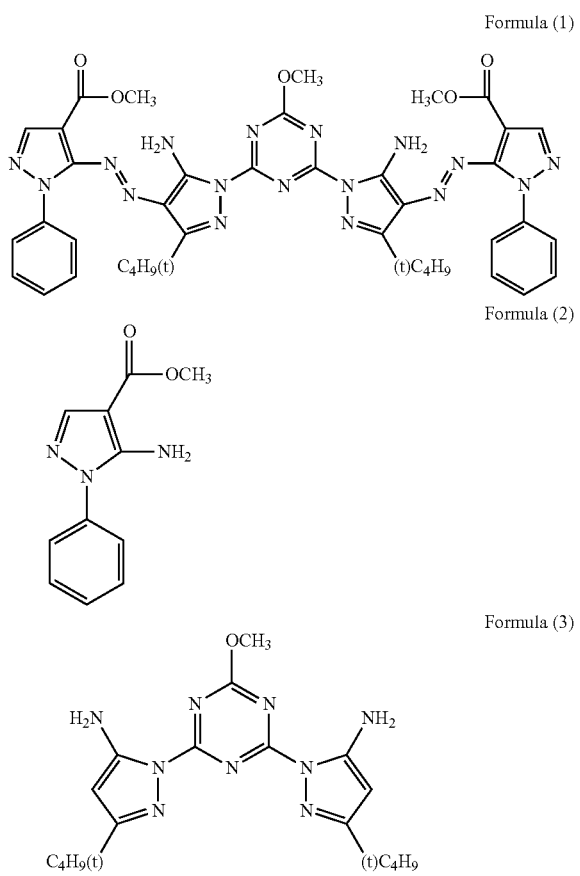

Hereinafter, the preparation method of the present invention will be described in detail.

It is preferred that the method for preparing an azo pigment according to the present invention includes a process of obtaining a crude azo pigment and a process of transforming the crude azo pigment into an η-type crystal form azo pigment by subjecting the crude azo pigment to solvent treatment.

It is preferred that the method for preparing a crude azo pigment includes (a) a process of mixing a diazotizing agent with a heterocyclic amine represented by Formula (2), and (b) a process of performing a reaction by mixing a reaction product obtained in process (a) with a compound represented by Formula (3), and obtaining a solution in which an azo compound produced by the reaction and represented by Formula (1) is dissolved at least in part, and it is more preferred that the method also includes (c) a process of crystallizing the pigment represented by Formula (1) by mixing the solution obtained in process (b) with a poor solvent for the azo compound represented by Formula (1).

In process (b), when the ratio at which the azo compound is dissolved is high, the yield becomes high, which is preferred.

Process (a) according to the present invention will be described in detail.

In process (a), a diazonium compound is derived by a reaction of a heterocyclic amine represented by Formula (2) with a diazotizing agent by mixing a diazotizing agent with a heterocyclic amine represented by Formula (2). It is preferred that this reaction is performed in a medium including an acid. In the present specification, a liquid including the diazonium compound is referred to as "diazonium compound liquid preparation". The method of mixing the heterocyclic amine represented by Formula (2) with the acid and the diazotizing agent is not particularly limited, but it is preferred that the diazotizing agent is added to a solution of the heterocyclic amine represented by Formula (2) and the acid. The diazotizing agent in process (a) is used to derive the heterocyclic amine represented by Formula (2) into the diazonium compound, and is not limited as long as the diazotizing agent has such an action. Representative examples of the diazotizing agent include nitrite esters (examples thereof include isopentyl nitrite), nitrite salts (examples thereof include sodium nitrite or potassium nitrite), isoamyl nitrite and nitrosylsulfuric acid, the diazotizing agent is more preferably sodium nitrite, potassium nitrite and nitrosylsulfuric acid, and among them, nitrosylsulfuric acid is particularly preferred from the viewpoint that the diazonium compound may be stably and efficiently prepared.

The acid used in process (a) means an acid which may even slightly dissolve the heterocyclic amine even though the acid does not completely dissolve the heterocyclic amine represented by Formula (2), and is preferably an acid which completely dissolves an amino compound. As the acid, an inorganic acid and an organic acid may be used, and examples of the inorganic acid include hydrochloric acid, phosphoric acid and sulfuric acid, and the inorganic acid is preferably phosphoric acid and sulfuric acid, and more preferably sulfuric acid. Examples of the organic acid include formic acid, acetic acid, propionic acid and methanesulfonic acid, and the organic acid is preferably acetic acid, propionic acid and methanesulfonic acid, and more preferably acetic acid and propionic acid. Further, these acids may be used either alone or in a mixture thereof. Examples of a mixed acid include phosphoric acid/acetic acid, sulfuric acid/acetic acid, methanesulfonic acid/acetic acid and acetic acid/propionic acid, the mixed acid is preferably phosphoric acid/acetic acid, sulfuric acid/acetic acid, sulfuric acid/acetic acid/propionic acid and acetic acid/propionic acid, and among them, sulfuric acid/acetic acid and acetic acid/propionic acid are particularly preferred. The mass ratio of these mixed acids is preferably 1/(0.1 to 20), more preferably 1/(0.5 to 10), and still more preferably 1/(1 to 10).

In process (a), the amount of acid added to the heterocyclic amine represented by Formula (2) is, in terms of mass ratio, 1 time to 100 times, more preferably 2 times to 50 times, and still more preferably 3 times to 25 times. When the mass ratio is 1 time or more, stirrability is improved so that the diazonium compound may be derived more securely. On the other hand, when the mass ratio is 100 times or less, productivity is enhanced so that economic efficiency is improved.

In addition, in process (a), the amount of the diazotizing agent added to the heterocyclic amine represented by Formula (2) is, in terms of molar ratio, 1.0 time to 20 times, more preferably 1.0 time to 10 times, and still more preferably 1.0 time to 5 times. When the amount of the diazotizing agent to the amino compound is, in terms of molar ratio, 1 time or more, the diazonium compound may be derived more securely, and when the amount is 20 times or less, it is possible to suppress the diazonium compound from being decomposed by a side reaction.

The mixing of the diazotizing agent with the heterocyclic amine represented by Formula (2) in process (a) is performed preferably at 50° C. or less, more preferably at 40° C. or less, and still more preferably at 30° C. or less. In the preparation of the diazo solution at a high temperature more than 50° C., there is a concern in that the diazotizing agent may be decomposed. A stirring time to derive the heterocyclic amine into the diazonium compound is preferably 0.3 to 10 hours, more preferably 0.5 to 5 hours, and still more preferably 1 to 3 hours. When the stirring time is 0.3 hour or more, it is easy to completely derive the heterocyclic amine into the diazonium compound, and when the stirring time is 10 hours or less, it is difficult for the decomposition of the diazonium compound to occur. Furthermore, a typical stirrer is used in the mixing, and the stirrer is not particularly limited. The number of revolutions of the stirring may be different depending on the manufacturing facility in some cases, but is preferably 30 rpm to 300 rpm, more preferably 40 rpm to 200 rpm, and still more preferably 50 rpm to 200 rpm. When the stirring speed is 30 rpm or more in terms of the number of revolutions, the stirring efficiency of the diazonium compound liquid preparation is improved, and therefore, a desired reaction may proceed securely.

The solvent which may be mixed in process (a) is not particularly limited as long as the diazonium compound derived is not decomposed. Examples of the solvent which may be mixed include a hydrocarbon-based solvent such as hexane, benzene and toluene, an ether-based solvent such as diethyl ether and tetrahydrofuran, a ketone-based solvent such as acetone and methyl ethyl ketone, an amide-based solvent such as dimethylformamide, dimethylacetamide, pyrrolidone and N-methyl-2-pyrrolidone, and dimethylsulfoxide, sulfolane, acetonitrile and water.

A preferred pH of the diazonium compound liquid preparation in process (a) is preferably 7 or less, more preferably 5 or less, and still more preferably 3 or less. When the pH of the diazonium compound liquid preparation in process (a) is more than 7, there is a concern in that the diazonium compound derived may be decomposed.

Next, process (b) according to the present invention will be described in detail.

Process (b) is a process of mixing the reaction product obtained in process (a) with a compound represented by Formula (3) for a reaction to occur, and obtaining a solution in which an azo compound produced by the reaction and represented by Formula (1) is dissolved at least in part.

In the present specification, the solution in which the azo compound is dissolved at least in part is referred to as "an azo compound dissolved solution".

Examples of a method of preparing the azo compound dissolved solution include (I) a method of obtaining the azo compound dissolved solution including: performing a coupling reaction by mixing the reaction product obtained in process (a) with the compound represented by Formula (3), and as a result of the reaction, dissolving the precipitated azo pigment represented by Formula (1) in a solvent, and (II) a method of obtaining the azo compound dissolved solution including: performing the coupling reaction such that the compound obtained by the coupling reaction and represented by Formula (1) is dissolved at least in part in a reaction solution, and adopting the resulting reaction solution as the azo compound dissolved solution as it is, or a method of obtaining the azo compound dissolved solution including: further dissolving a (crystallized) azo pigment, which is obtained by applying the thus-obtained azo compound dissolved solution to process (c) to be described below in detail in a solvent.

In any of types (I) and (II), a method of mixing the diazonium compound liquid preparation obtained in process (a) with a coupling component is not particularly limited, but it is preferred that the coupling component is partly or completely dissolved in a solvent and the resulting solution is added to the liquid preparation, or the coupling component is added as a solid to the liquid preparation without using the solvent, and it is more preferred that a solution of the coupling component is added to the diazonium compound liquid preparation obtained in process (a), or the coupling component is added as a solid to the diazonium compound liquid preparation obtained in process (a).

Further, the amount of the diazonium compound in the diazonium compound liquid preparation obtained in process (a) to the compound represented by Formula (3) in process (b) is preferably 0.8 to 3 equivalents to the coupling position of the compound represented by Formula (3), more preferably 0.9 to 2 equivalents to the coupling position, and still more preferably 0.95 to 1.5 equivalents to the coupling position. When the amount is 0.8 equivalents or more, a coupling component having an unreacted coupling position may be suppressed from remaining, and when the amount is 3 equivalents or less, an unreacted diazonium compound may be suppressed from remaining, and therefore, the amount range is more economical.

Meanwhile, in type (II), since the azo compound represented by Formula (1) is dissolved at least in part in process (b), the coupling reaction proceeds more smoothly, thereby preparing a high-purity azo compound. The reason is assumed as follows. Since there are two coupling positions, for example, only one coupling position goes through a reaction intermediate which is reacted. When the reaction intermediate is precipitated into the reaction system, the reaction rate of the second coupling reaction is slowed down. Meanwhile, since the diazonium compound is unstable, there is a concern in that decomposition may occur when a long time elapses. Accordingly, it is important to allow the coupling reaction to proceed rapidly, and consequently, the type (II) preparation method, which does not produce a precipitate in process (b), is more suitable for preparing a high-purity pigment.

In process (b), the coupling component may be added without using a solvent, but it is preferred that the coupling component is added while being mixed with the solvent. In process (b), when a solvent is used in the coupling component, the solvent is not particularly limited, but is preferably a solvent which allows type (II) to be used, that is, a solvent by which it is possible to obtain a solution in which the azo compound produced after the reaction and represented by the general Formula (1) is dissolved at least in part.

In the case of type (I), that is, when the pigment is precipitated, as an example of the solvent, water, an organic acid, an inorganic acid and an organic solvent may be used, and an organic solvent is particularly preferred, and a solvent causing no liquid separation phenomenon during reaction and providing a uniform solution with the solvent is preferred. Examples thereof include water, an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the organic solvent may be a glycol-based solvent having two or more hydroxyl groups in the solvent molecule, an alcohol-based solvent having 3 or less carbon atoms, or a ketone-based solvent having a total carbon number of 5 or less, preferably an alcohol solvent having 2 or less atoms (for example, methanol and ethylene glycol) and a ketone-based solvent having a total carbon number of 4 or less (for example, acetone and methyl ethyl ketone). In addition, a mixed solvent of these solvents is also included in the organic solvent.

Furthermore, in the case of type (II), that is, when a coupling reaction is performed such that the compound represented by Formula (1) is dissolved at least in part in the reaction solution, examples of the solvent include an alcohol-based solvent such as methanol, isopropanol and ethylene glycol, a ketone-based solvent such as acetone and methyl ethyl ketone, an organic acid solvent such as acetic acid, propionic acid and methanesulfonic acid, an inorganic acid solvent such as sulfuric acid, hydrochloric acid and phosphoric acid, an amide-based solvent such as dimethylformamide, dimethylacetamide, pyrrolidone and N-methyl-2-pyrrolidone, dimethylsulfoxide, sulfolane, and acetonitrile. Among them, a ketone-based solvent such as acetone and methyl ethyl ketone, an organic acid solvent such as acetic acid, propionic acid and methanesulfonic acid, and an inorganic acid solvent such as sulfuric acid, hydrochloric acid and phosphoric acid are preferred, an acidic solvent of organic acid or inorganic acid is more preferred, and acetic acid, methanesulfonic acid, phosphoric acid and sulfuric acid are most preferred. Further, a mixed solvent of the aforementioned solvents is also suitable.

Particularly, in the case of type (II), in process (b), it is preferred that an acidic solution obtained by dissolving or suspending the coupling component in an acidic solvent is mixed with the reaction product obtained in process (a), or the coupling component is added to the reaction product obtained in process (a) without using a solvent. Particularly, it is preferred that the acidic solvent is a solvent including at least one of acetic acid and sulfuric acid.

In any of types (I) and (II), the preferred amount of the solvent added is, in terms of mass ratio, preferably 0.5 to 200 times, more preferably 1 to 100 times, and still more preferably 1 to 50 times, based on the coupling component. As for the preferred amount of the solvent added based on the coupling component, when the mass ratio is less than 0.5 time, it is difficult to stir the coupling component and the solvent in a preparation machine and a desired reaction does not proceed. In addition, the case where the mass ratio is more than 200 times is not economical.

When the preparation method of the azo compound dissolved solution is type (I) or when the preparation method of the azo compound dissolved solution is type (II) and the case where an azo pigment, which is obtained by applying the coupling reaction solution in which the compound represented by Formula (1) is dissolved at least in part to process (c), is further dissolved in the solvent to prepare an azo compound dissolved solution, the solvent for dissolving the obtained azo pigment is not particularly limited as long as the solvent may dissolve at least a part of the azo pigment, but examples thereof include the preferred examples of the solvent previously described in type (II).

Whether any process of types (I) and (II) is employed, the azo compound dissolved solution finally obtained in process (b) is preferably an acidic solution, and particularly preferably a solution including at least one of acetic acid and sulfuric acid.

As for the azo compound dissolved solution obtained in process (b), the ratio of the azo compound represented by Formula (1) dissolved in the azo compound dissolved solution to the total amount of the azo compound produced by process (b) (the sum of the azo compound represented by Formula (1) dissolved in the azo compound dissolved solution and the azo pigment represented by Formula (1) precipitated from the azo compound dissolved solution) is preferably 50% by mass or more, more preferably 75% by mass or more, still more preferably 90% by mass or more, and most preferably 100% by mass (a state where the azo compound produced in process (b) is completely dissolved in the reaction solution), and accordingly, the particle diameter of the pigment tends to be further reduced. Furthermore, as the ratio at which the azo compound is dissolved is high, the yield becomes high, which is preferred.

In process (b), the mixing of the diazonium compound liquid preparation of process (a) and the coupling component is preferably performed at a temperature of 50° C. or less, more preferably 30° C. or less, and still more preferably 25° C. or less. When the mixing temperature is 50° C. or more, there is a concern in that the diazonium compound derived in process (a) and the produced azo compound represented by Formula (1) are decomposed. Further, a typical stirrer is used in the mixing, and the stirrer is not particularly limited. The number of revolutions of the stirring may be different depending on the manufacturing facility in some cases, but is preferably 30 rpm to 400 rpm, more preferably 40 rpm to 300 rpm, and still more preferably 50 rpm to 200 rpm. When the stirring speed is 30 rpm or less in terms of the number of revolutions, the stirring efficiency of the mixed solution deteriorates, and therefore, a desired reaction may not proceed. The stirring time in process (b) is preferably 0.1 to 10 hours, more preferably 0.3 to 5 hours, and still more preferably 0.3 to 3 hours. When the stirring time is less than 0.1 hours, it is difficult for the pigment to be completely derived, and when the stirring time is more than 10 hours, there is a concern in that the azo compound represented by Formula (1) may be decomposed.

Next, process (c) according to the present invention will be described in detail.

Process (c) is a process of crystallizing a pigment by mixing the azo compound dissolved solution obtained in process (b) with a poor solvent with the azo compound having low solubility therein. The method of mixing the azo compound dissolved solution obtained in process (b) with a poor solvent is not particularly limited, but it is preferred that the azo compound dissolved solution obtained in process (b) is added to a poor solvent and at this time, it is preferred that the poor solvent is in a state of being stirred.

The stirring speed is preferably 100 rpm to 10,000 rpm, more preferably 150 rpm to 8,000 rpm, and particularly preferably 200 rpm to 6,000 rpm. For the addition, a pump or the like may also be used. In this case, either in-liquid addition or out-of-liquid addition may be employed, but in-liquid addition is more preferred. In addition, continuous supply into liquid through a supply pipe by using a pump is preferred.

The poor solvent is not particularly limited, but is preferably a poor solvent with the azo compound represented by Formula (1) having a solubility of 1 g/L or less therein, and more preferably a poor solvent with the azo compound represented by Formula (1) having a solubility of 0.1 g/L or less therein. This solubility may be a solubility when the azo compound is dissolved in the presence of an acid or an alkali. As for the compatibility or uniform mixing property between the azo compound dissolved solution obtained in process (b) and the poor solvent, the amount of the azo compound dissolved in a poor solvent is preferably 30% by mass or more, and more preferably 50% by mass or more based on the amount of the azo compound dissolved in a good solvent. In the present specification, the solubility indicates a solubility at 25° C.

Examples of the poor solvent include an aqueous solvent such as water, hydrochloric acid, ammonia water and an aqueous sodium hydroxide solution, an alcohol-based solvent such as methanol, ethanol, isopropyl alcohol and 1-methoxy-2-propanol, a glycol-based solvent such as ethylene glycol and diethylene glycol, a ketone compound solvent such as acetone, methyl ethyl ketone, methyl isobutyl ketone and cyclohexanone, an ether-based solvent such as diethyl ether and tetrahydrofuran, a hydrocarbon-based solvent such as hexane, benzene and toluene, a nitrile-based solvent such as acetonitrile, a halogen-based solvent such as dichloromethane and trichloroethylene, and an ester-based solvent such as ethyl acetate, ethyl lactate and 2-(1-methoxy)propyl acetate, and the poor solvent is preferably an aqueous solvent such as water, hydrochloric acid, ammonia water and an aqueous sodium hydroxide solution, an alcohol-based solvent such as methanol, ethanol, isopropyl alcohol and 1-methoxy-2-propanol, a glycol-based solvent such as ethylene glycol and diethylene glycol, and a ketone compound solvent such as acetone, methyl ethyl ketone, methyl isobutyl ketone and cyclohexanone, and more preferably an aqueous solvent such as water and ammonia water, an alcohol solvent having 1 to 3 carbon atoms, and a glycol-based solvent having 1 to 6 carbon atoms. Furthermore, a mixed solvent of the aforementioned solvents is also suitable. The poor solvent is most preferably one or more solvents selected from the group consisting of water, alcohol having 1 to 3 carbon atoms and glycol having 1 to 6 carbon atoms.

The mixing ratio between the azo compound dissolved solution obtained in the process (b) and the poor solvent is, in terms of volume ratio, preferably 1/50 to 2/3, more preferably 1/40 to 1/2, and particularly preferably 1/20 to 1/2. When the volume ratio is 2/3 or less, sufficient crystallization of a pigment occurs and the reaction yield is increased, and when the volume ratio is 1/50 or more, productivity is enhanced, which is economical.

The temperature at which the azo compound dissolved solution obtained in process (b) is mixed with the poor solvent is not particularly limited, but the mixing is preferably performed at −10° C. to 50° C., more preferably at −5° C. to 30° C., and most preferably at −5° C. to 25° C.

In the mixing of the azo compound dissolved solution obtained in process (b) with the poor solvent, the particle diameter of the organic nanoparticle produced by precipitation may be controlled by adjusting the Reynolds number. Here, the Reynolds number is a dimensionless number which indicates the flowing state of a fluid and is represented by the following equation.

$$Re = \rho UL/\mu \qquad \text{Equation (1)}$$

(In Equation (1), Re represents the Reynolds number, $\rho$ represents the density [kg/m$^3$] of the azo compound dissolved solution obtained in process (b), U represents the relative velocity [m/s] when the azo compound dissolved solution meets the poor solvent, L represents the equivalent diameter [m] of a flow channel or a supply inlet at a portion where the azo compound dissolved solution meets the poor solvent, and $\mu$ represents the viscosity coefficient [Pa·s] of the azo compound dissolved solution.)

The equivalent diameter L refers to the diameter of an equivalent circular tube when a circular tube which is equivalent to the opening diameter or flow channel of a pipe having an arbitrary cross-section shape is envisaged. The equivalent diameter L is represented by the following Equation (2), in which the cross-sectional area of the pipe is designated as A and the wetted perimeter length (circumference) of the pipe or the outer perimeter of the flow channel is designated as p.

$$L = 4A/p \qquad \text{Equation (2)}$$

The relative velocity U when the azo compound dissolved solution meets the poor solvent is defined as the relative velocity in a direction perpendicular to a surface of the portion where the two liquids meet each other. That is, for example, in the case of mixing by injecting the azo compound dissolved solution into the poor solvent which is stationary, the velocity of injecting from the supply inlet is identical to the relative velocity U. The value of the relative velocity U is not particularly limited, but for example, the value is preferably set to 0.5 m/s to 100 m/s, and more preferably to 1.0 m/s to 50 m/s.

The density $\rho$ of the azo compound dissolved solution is a value which is determined depending on the type of the selected material, but it is practical that p is, for example, 0.8 kg/m$^3$ to 2.0 kg/m$^3$. Further, the viscosity coefficient $\mu$ of the azo compound dissolved solution is also a value which is determined depending on the material used, the environment temperature and the like, but for example, a value of 0.5 mPa·s to 100 mPa·s is preferred, and a value of 1.0 mPa·s to 50.0 mPa·s is more preferred.

A smaller value of the Reynolds number is likely to form a laminar flow, and a larger value is likely to form a turbulent flow. For example, the particle diameter of the pigment nanoparticles may be obtained while being controlled by adjusting the Reynolds number to 60 or more, and it is preferred to adjust the Reynolds number to 100 or more, and more preferably to 150 or more. The Reynolds number has no particular upper limit, but pigment particles having a desired average particle diameter may be obtained while being controlled by adjusting and controlling the Reynolds number, for example, in a range of 100,000 or less. In this case, within the aforementioned range, pigment particles having a smaller particle diameter may be obtained while being controlled usually by increasing the Reynolds number.

When the primary particles of the crude azo pigment particle obtained by the preparation method of the present invention are observed under a transmission microscope, the length in a long axis direction is preferably 1 nm to 10 μm, more preferably 5 nm to 5 μm, still more preferably 10 nm to 2 μm, and particularly preferably 10 nm to 1 μm.

Meanwhile, with respect to the particle diameter of the pigment particle, there is a method of digitizing the particle diameter by a measuring technique and expressing the particle diameter in terms of an average size of a group, examples of the size frequently used includes a mode diameter indicating the maximum value of distribution, a median diameter corresponding to the median value in the integral distribution curve, various average diameters (number average, length average, area average, mass average, volume average and the like), and the like, and in the present invention, unless otherwise indicated, the average particle diameter refers to a number average particle diameter.

Examples of the method of measuring the particle diameter of the pigment particle include a microscopic method, a mass method, a light scattering method, a light shielding method, an electric resistance method, an acoustic method, and a dynamic light scattering method, and a microscopic method and a dynamic light scattering method are particularly preferred. Examples of a microscope used in the microscopic method include a scanning electron microscope, a transmission electron microscope and the like. Examples of a particle measuring apparatus using a dynamic light scattering method include Nanotrac UPA-EX150 manufactured by Nikkiso Co., Ltd., Dynamic Light Scattering Photometer DLS-7000 Series manufactured by Otsuka Electronics Co., Ltd., and the like.

The aforementioned preferred average particle diameter of the pigment particle is achieved by appropriately adjusting (1) the temperature in process (c), (2) the solubility of the azo compound for the poor solvent, and (3) the stirring speed (or Reynolds number).

In preparing a liquid dispersion by precipitating crude azo pigment fine particles, at least any one of the azo compound dissolved solution and the poor solvent may contain a dispersing agent. In this case, it is preferred that the dispersing agent is contained into the azo compound dissolved solution. The dispersing agent has actions of (1) quickly being adsorbed to the surface of the precipitated pigment to form fine nanoparticles and (2) preventing these particles from aggregating again.

As the dispersing agent, for example, an anionic, cationic, amphoteric or nonionic, low molecular or polymer dispersing agent may be used.

As for the polymer dispersing agent, the mass average molecular weight thereof is preferably 1,000 to 500,000, more preferably 10,000 to 500,000, and particularly preferably 10,000 to 100,000.

Specific examples thereof include polyvinylpyrrolidone, polyvinyl alcohol, polyvinyl methyl ether, polyethylene glycol, polypropylene glycol, polyacrylamide, a vinyl alcohol-vinyl acetate copolymer, partially formalised polyvinyl alcohol, partially butyralized polyvinyl alcohol, a vinylpyrrolidone-vinyl acetate copolymer, a polyethylene oxide/propylene oxide block copolymer, polyacrylate, polyvinyl sulfate, poly(4-vinylpyridine) salt, polyamide, polyallylamine salt, condensed naphthalenesulfonate, a cellulose derivative, a starch derivative and the like. In addition, natural polymers such as alginate, gelatin, albumin, casein, gum arabic, gum traganth and lignin sulfonate may also be used. Among them, polyvinylpyrrolidone is preferred. These polymer compounds may be used either alone or in combination of two or more thereof, and may also be used by combining a low molecular dispersing agent. The dispersing agent used for dispersion of a pigment is described in detail in "Dispersion Stabilization of Pigment and Surface Treatment Technique Evaluation" (Japan Association for International Chemical Information, published on December 2001), pp. 29 to 46.

Examples of the anionic dispersing agent (anionic surfactant) include an N-acyl-N-alkyltaurine salt, a fatty acid salt, an alkylsulfonic ester salt, alkylbenzenesulfonate, alkylnaphthalenesulfonate, dialkylsulfosuccinate, an alkylphosphonic ester salt, a naphthalenesulfonic acid-formalin condensate, a polyoxyethylene alkylsulfonic ester salt and the like. Among them, an N-acyl-N-alkyltaurine salt is preferred. As the N-acyl-N-alkyltaurine salt, those described in Japanese Patent Application Laid-Open No. H3-273067 are preferred. These anionic dispersing agents may be used either alone or in combination of two or more kinds thereof.

Examples of the cationic dispersing agent (cationic surfactant) include a quaternary ammonium salt, alkoxylated polyamine, aliphatic amine polyglycol ether, aliphatic amine, diamine or polyamine derived from aliphatic amine and aliphatic alcohol, imidazoline derived from aliphatic acid, and salts of these cationic substances. These cationic dispersing agents may be used either alone or in combination of two or more kinds thereof.

The amphoteric dispersing agent is a dispersing agent having, in the molecule thereof, both an anionic group moiety that is contained in the molecule of the anionic dispersing agent, and a cationic group moiety that is contained in the molecule of the cationic dispersing agent.

Examples of the nonionic dispersing agent (nonionic surfactant) include polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and the like: Among them, polyoxyethylene alkylaryl ether is preferred. These nonionic dispersing agents may be used either alone or in combination of two or more kinds thereof.

The content of the dispersing agent is preferably 0.1 parts by mass to 1,000 parts by mass, more preferably 1 part by mass to 500 parts by mass, and still more preferably 5 parts by mass to 200 parts by mass, based on 100 parts by mass of the pigment. Further, the dispersing agents may be used either alone or in combination of a plurality thereof.

By the aforementioned preparation method, the compound represented by Formula (1) is obtained as a crude azo pigment. As a method of obtaining an azo pigment in the form of crystal, a post-treatment is preferably performed. Examples of the method of this post-treatment include a process of controlling the pigment particle by a grinding treatment such as solvent salt milling, salt milling, dry milling, solvent milling and acid pasting, a solvent heating treatment, desolvation and the like.

For example, a ζ-type crystal form azo pigment is precipitated by mixing the azo compound dissolved solution obtained in process (b) with methanol as a poor solvent, and an η-type crystal form azo pigment may be obtained by subjecting the ζ-type crystal form azo pigment to crystal transformation.

Hereinafter, crystal transformation will be described.

The crystal transformation in the present invention indicates transforming the crystal form, and before transformation, even an amorphous form may have a crystal form different from the crystal form after transformation. Examples of the method of crystal transformation include the aforementioned post-treatment, a grinding treatment such as solvent salt milling, salt milling, dry milling, solvent milling and acid pasting, a solvent heating treatment and desolvation are preferred, salt milling, solvent milling, a solvent heating treatment and desolvation are more preferred, and a solvent heating treatment and desolvation are particularly preferred.

According to the crystal transformation, a compound may be transformed from an amorphous state to a crystal form, and may also be transformed from one crystal form to another crystal form.

For example, a γ-type crystal form azo pigment may be precipitated by adding the azo compound dissolved solution obtained in process (b) to methanol containing 30% of water. An η-type crystal form azo pigment may be obtained by subjecting the γ-type crystal form azo pigment to crystal transformation.

In addition, a ζ-type crystal form azo pigment is precipitated by adding the azo compound dissolved solution obtained in process (b) to methanol, and an η-type crystal form azo pigment may be obtained by subjecting the ζ-type crystal form azo pigment to crystal transformation.

An ε-type crystal form azo pigment may be obtained, for example, by desolvating a solvate (preferably, acetone solvate) of the η-type crystal form azo pigment.

A method for preparing an azo pigment or a tautomer thereof represented by the following Formula (1), and having characteristic X-ray diffraction peaks at Bragg angles (2θ±0.2°) of 4.9°, 8.8° and 13.1° in the CuKα characteristic X-ray diffraction according to the present invention is characterized by desolvating a solvate of an azo pigment or a tautomer thereof represented by the following Formula (1), and having characteristic X-ray diffraction peaks at Bragg angles (2θ±0.2°) of 4.8°, 9.2°, 13.0° and 24.4° in the CuKα characteristic X-ray diffraction.

Formula (1)

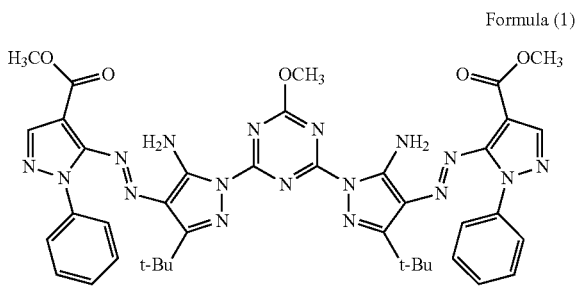 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

(Solvent Heating Treatment)

The solvent heating treatment in the present invention specifically refers to heating and stirring an amorphous azo compound or a crystalline azo pigment represented by Formula (1) or a salt, hydrate or solvate thereof in a solvent.

The present invention also relates to a solvate of an azo compound or a tautomer thereof represented by the following Formula (1), and having characteristic X-ray diffraction peaks at Bragg angles (2θ±0.2°) of 4.8°, 9.2°, 13.0° and 24.4° in the CuKα characteristic X-ray diffraction.

Formula (1)

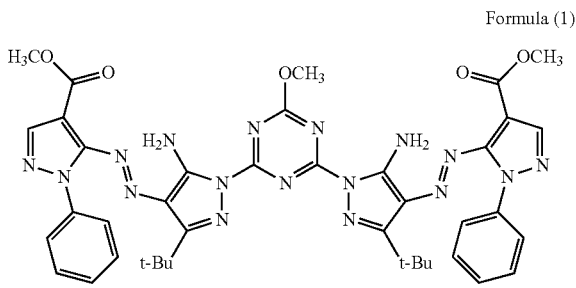 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

A crystal transformation may be efficiently performed by the solvent heating treatment.

The γ-type and ζ-type crystal form azo pigments may be obtained by the above-described preparation method.

As a solvent used for the solvent heating treatment, a solvent with an azo pigment represented by Formula (1) having low solubility therein after the crystal transformation is preferred from the viewpoint of suppressing the crystal growth.

As the solvent used when the γ-type and ζ-type crystal form azo pigments are subjected to crystal transformation into an η-type crystal form azo pigment, for example, a ketone-based compound, an aromatic-based compound and acetonitrile are preferred, and among them, examples thereof include a polar aprotic organic solvent such as acetone, methyl ethyl ketone, toluene, acetonitrile, N,N-dimethylformamide, N,N-dimethylacetamide and N-methyl-2-pyrrolidone, or a mixture thereof, and among them, acetone, methyl ethyl ketone, toluene, acetonitrile and N-methyl-2-pyrrolidone are preferred, N-methyl-2-pyrrolidone or acetone is more preferred, and acetone is still more preferred. An inorganic or organic acid or base may be further added to the solvent exemplified above.

The amount of the solvent used in the solvent heating treatment is preferably 1 time to 100 times, more preferably 5 times to 50 times, and still more preferably 8 times to 30 times based on the amount of the amorphous azo compound represented by Formula (1). When the amount is less than 1 time, stirrability may not be secured, which is not preferred. Further, when the amount is more than 100 times, productivity deteriorates, and economic efficiency deteriorates, which is not preferred.

Temperature of heating and stirring in the solvent heating treatment varies depending on the size of the primary particle diameter of a desired pigment, but is preferably 15° C. to 150° C., more preferably 20° C. to 120° C., and still more preferably 20° C. to 100° C. At a low temperature less than 15° C., it takes a long time for a crystal transformation to occur, which is not efficient. On the other hand, at a high temperature more than 150° C., a part of an azo pigment (1) is decomposed, which is not preferred. It is preferred that the solvent heating treatment is performed under reflux.

The stirring time for crystal transformation is not particularly limited as long as the crystal transformation is occurring, but is preferably 5 minutes to 1,500 minutes, more preferably 10 minutes to 600 minutes, and still more preferably 30 minutes to 300 minutes. When the stirring time is shorter than 5 minutes, partially amorphous moieties are likely to remain, which is not preferred. On the other hand, when the stirring time is longer than 1,500 minutes, the time is inefficient, which is not preferred.

(Desolvation)

An ε-type crystal form azo pigment may be obtained by desolvating an η-type crystal form azo pigment.

Examples of a desolvation method include treatment with a solvent which is not solvated with the ε-type crystal form azo pigment represented by Formula (1), and drying, the method is preferably drying, and drying under heat and/or reduced pressure is most preferred. In the case of drying by adding heat, the temperature is not particularly limited as long as a solvent is removed at the temperature, and is preferably 40° C. or more, more preferably 60° C. or more, and still more preferably 60° C. to 100° C.

(Solvent Salt Milling)

Examples of the solvent salt milling include a method including placing, into a kneading machine, a crude azo pigment, an inorganic salt, and an organic solvent which does not dissolve it, and performing kneading and grinding therein. A water-soluble inorganic salt may be suitably used as the inorganic salt, and it is preferred that for example, an inorganic salt such as sodium chloride, potassium chloride and sodium sulfate is used. In addition, it is more preferred that an inorganic salt having an average particle diameter of 0.5 μm to 50 μm is used. The amount of the inorganic salt used is preferably 3 times by mass to 20 times by mass, and more preferably 5 times by mass to 15 times by mass based on the amount of the crude azo pigment. An aqueous organic solvent may be suitably used as the organic solvent, and since the solvent may easily evaporate due to an increase in temperature at the time of kneading, a solvent having a high boiling temperature is preferred from the viewpoint of safety. Examples of the organic solvent include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, or a mixture thereof. The amount of the aqueous organic solvent used is preferably 0.1 times by mass to 5 times by mass based on the amount of the crude azo pigment. The kneading temperature is preferably 20° C. to 130° C. and particularly preferably 40° C. to 110° C. As the kneading machine, for example, a kneader, a mix Muller or the like may be used.

The ε-type crystal form azo pigment represented by Formula (1) according to the present invention may be further subjected to post-treatment, and may be subjected to surface treatment with, for example, a resin, a surfactant, a dispersing agent and the like.

The azo pigment represented by Formula (1) may also be prepared by the following method. That is, the azo pigment represented by Formula (1) may be prepared by modifying a heterocyclic amine represented by the following Formula (2) into diazonium, and subsequently performing a coupling reaction with a compound represented by the following Formula (3).

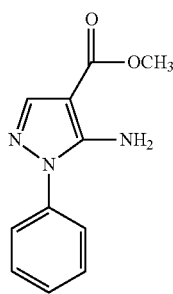

Formula (2)

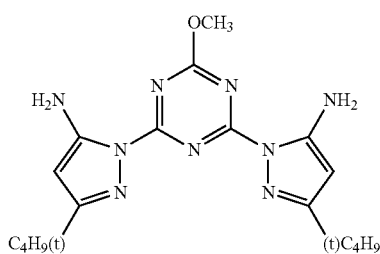

Formula (3)

The azo pigment of the present invention may be synthesized, for example, by performing an azo coupling reaction between a diazonium salt prepared by an already known method using the diazo component of Formula (2) and the coupling component of Formula (3).

The preparation and coupling reaction of the diazonium salt may be performed by a common method.

For the preparation of the diazonium salt of Formula (2), it is possible to apply, for example, a common method of adjusting a diazonium salt by using a nitrosonium ion source, for example, nitrous acid, nitrite or nitrosylsulfuric acid, in a reaction medium containing an acid (for example, hydrochloric acid, sulfuric acid, phosphoric acid, acetic acid, propionic acid, methanesulfonic acid, trifluoromethanesulfonic acid and the like).

More preferred examples of the acid include a case of using acetic acid, propionic acid, methanesulfonic acid, phosphoric acid and sulfuric acid either alone or in combination thereof, and among them, phosphoric acid or a combination use system of acetic acid and sulfuric acid is particularly preferred.

As preferred examples of the reaction medium (solvent), an organic acid and an inorganic acid are preferably used, and particularly, phosphoric acid, sulfuric acid, acetic acid, propionic acid and methanesulfonic acid are preferred, and among them, acetic acid and/or propionic acid are preferred.

As a preferred example of the nitrosonium ion source, it is stable to use nitrtosyl sulfuric acid in the aforementioned preferred reaction medium containing an acid, and further, the diazonium salt may be efficiently prepared.

The amount of the solvent used is preferably 0.5 times by mass to 50 times by mass, more preferably 1 time by mass to 20 times by mass, and particularly preferably 3 times by mass to 10 times by mass based on the amount of the diazo component of Formula (2).

In the present invention, the diazo component of Formula (2) may be in a state of being dispersed in a solvent, or in a state of a dissolved solution depending on the type of the diazo component.

The amount of the nitrosonium ion source used is preferably 0.95 equivalents to 5.0 equivalents, more preferably 1.00 equivalent to 3.00 equivalents, and particularly preferably 1.00 to 1.10 equivalents with respect to the diazo component.

The reaction temperature is preferably −15° C. to 30° C., more preferably −10° C. to 10° C., and still more preferably −5° C. to 5° C. At less than −10° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

The coupling reaction may be performed in an acidic reaction medium to a basic reaction medium, but is preferably performed in an acidic to neutral reaction medium for the azo pigment of the present invention, and the components may be efficiently derived into the azo pigment by suppressing the decomposition of the diazonium salt particularly when the coupling reaction is performed in an acidic reaction medium.

As a preferred example of the reaction medium (solvent), an organic acid, an inorganic acid and an organic solvent may be used, and an organic solvent is particularly preferred, and a solvent causing no liquid separation phenomenon during reaction and providing a uniform solution with the solvent is preferred. Examples thereof include an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the solvent may be a glycol-based solvent having two or more hydroxyl groups, or an alcohol-based solvent having 3 or less carbon atoms, and preferably an alcohol solvent (for example, methanol and ethylene glycol) having 2 or less carbon atoms, in a solvent molecule. In addition, a mixed solvent of these solvents is also included in the organic solvent.

The amount of the solvent used is preferably 1 time by mass to 100 times by mass, more preferably 1 time by mass to 50 times by mass, and still more preferably 2 times by mass to 10 times by mass based on the amount of the coupling component represented by Formula (3).

In the present invention, the coupling component which forms Formula (1) may be in a state of being dispersed in a solvent, or in a state of a dissolved solution depending on the type of the coupling component.

For the amount of the coupling component used, the diazo component is preferably 0.95 equivalents to 5.0 equivalents, more preferably 1.00 equivalent to 3.00 equivalents, and particularly preferably 1.00 to 1.50 equivalents per the azo coupling moiety.

The reaction temperature is preferably $-30°$ C. to $30°$ C., more preferably $-15°$ C. to $10°$ C., and still more preferably $-10°$ C. to $5°$ C. At less than $-30°$ C., the reaction rate is significantly slowed down, and a time for synthesis is significantly increased, which is not economical, and when the synthesis is performed at a high temperature more than $30°$ C., the amount of a side product produced is increased, which is not preferred.

The reaction time is preferably 30 minutes to 300 minutes, more preferably 30 minutes to 200 minutes, and still more preferably 30 minutes to 150 minutes.

In the method of synthesizing an azo pigment according to the present invention, a product (crude azo pigment) obtained by these reactions may be treated by a typical post-treatment method of an organic synthesis reaction, and then used with or without purification.

That is, for example, a product isolated from the reaction system may be used without purification or by performing a purification operation such as recrystallization and salt formation either alone or in combination.

In addition, after the reaction is completed, the reaction solvent may or may not be removed by distillation, the reaction solution may or may not be neutralized by pouring the reaction solvent in water or ice, and the product isolated or extracted with an organic solvent/aqueous solution may be used without purification or after performing a purification operation such as recrystallization, crystallization and salt formation either alone or in combination.

The synthesizing method of an azo pigment composition according to the present invention will be described in more detail.

It is preferred that the method for preparing an azo pigment according to the present invention includes, in a coupling reaction between a diazonium compound, which is obtained by modifying the heterocyclic amine represented by Formula (2) into diazonium and the compound represented by Formula (3), dissolving the compound of Formula (3) in an organic solvent, and then performing the coupling reaction.

The reaction of modifying the heterocyclic amine represented by Formula (2) into diazonium may be performed, for example, by reacting the heterocyclic amine with a reagent such as sodium nitrite and nitrosylsulfuric acid in an acidic solvent such as sulfuric acid, phosphoric acid and acetic acid at a temperature of $15°$ C. or less for approximately 10 minutes to 6 hours. It is preferred that the coupling reaction is performed by reacting a diazonium salt obtained by the above-described method and the compound represented by Formula (3) at $40°$ C. or less, preferably $15°$ C. or less for approximately 10 minutes to 12 hours.

The tautomerism and/or crystalline polymorphism described above may be controlled by the preparation conditions during the coupling reaction. As the method of preparing the $\epsilon$-type crystal, for example, it is preferred to use the method of the present invention including dissolving the compound represented by Formula (3) one time in an organic solvent, and then performing the coupling reaction. Examples of the organic solvent which may be used in this case include an alcohol solvent. As an example of the alcohol solvent, methanol, ethanol, isopropanol, ethylene glycol, diethylene glycol and the like are preferred, and among them, methanol is particularly preferred.

Another method for preparing an azo pigment includes, in a coupling reaction between a diazonium compound obtained by modifying the heterocyclic amine represented by Formula (2) into diazonium and the compound represented by Formula (3), performing the coupling reaction in the presence of a polar aprotic solvent.

The $\epsilon$-type crystal may be efficiently prepared even by the method of performing the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, a mixed solvent thereof and the like. When these solvents are used, the compound of Formula (3) may or may not be completely dissolved in the solvent.

By the aforementioned preparation method, the compound represented by Formula (1) is obtained as a $\zeta$-type crystal form azo pigment. As a method of obtaining a $\epsilon$-type crystal form azo pigment, the above-described post-treatment is preferably performed. Examples thereof include a method of obtaining a $\gamma$-type crystal form azo pigment by subjecting the $\zeta$-type crystal form azo pigment or the $\eta$-type crystal form azo pigment to solvent heating treatment, and desolvating the $\eta$-type crystal form azo pigment. The solvent heating treatment and desolvation may be performed by the above-described method.

[Synthesis of $\zeta$-Type Crystal Form Azo Pigment]

Hereinafter, synthesis of the $\zeta$-type crystal form azo pigment represented by Formula (1) will be described in detail.

The $\zeta$-type crystal form azo pigment represented by Formula (1) (hereinafter, simply referred to as "azo pigment" or "pigment" in some cases) may be synthesized by the preparation method of the present invention.

The preparation method of the present invention includes a process of subjecting a diazonium salt derived from a heterocyclic amine represented by the following Formula (2) and a compound represented by the following Formula (3) to azo coupling reaction.

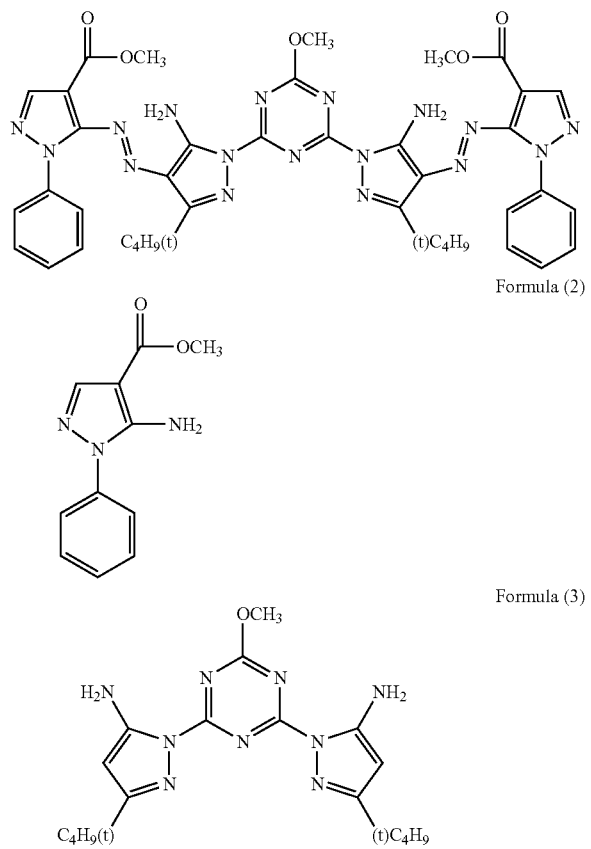

Formula (1)

Formula (2)

Formula (3)

The method for preparing an azo pigment according to the present invention includes (a) a process of mixing a diazotizing agent with a heterocyclic amine represented by Formula (2), and (b) a process of performing a reaction by mixing a reaction product obtained in process (a) with a compound represented by Formula (3), and obtaining a solution in which an azo compound produced by the reaction and represented by Formula (1) is dissolved at least in part, and (c) a process of crystallizing the pigment represented by Formula (1) by mixing the solution obtained in process (b) with a poor solvent for the azo compound represented by Formula (1).

Process (a) according to the present invention will be described in detail.

In process (a), a diazonium compound is derived by a reaction of a heterocyclic amine represented by Formula (2) with a diazotizing agent by mixing a diazotizing agent with a heterocyclic amine represented by Formula (2). It is preferred that this reaction is performed in a medium including an acid. In the present specification, a liquid including the diazonium compound is referred to as "diazonium compound liquid preparation". The method of mixing the heterocyclic amine represented by Formula (2) with the acid and the diazotizing agent is not particularly limited, but it is preferred that the diazotizing agent is added to a solution of the heterocyclic amine represented by Formula (2) and the acid. The diazotizing agent in process (a) is used to derive the heterocyclic amine represented by Formula (2) into the diazonium compound, and is not limited as long as the diazotizing agent has such an action. Representative examples of the diazotizing agent include nitrite esters (examples thereof include isopentyl nitrite), nitrite salts (examples thereof include sodium nitrite or potassium nitrite), isoamyl nitrite and nitrosylsulfuric acid, the diazotizing agent is more preferably sodium nitrite, potassium nitrite and nitrosylsulfuric acid, and among them, nitrosylsulfuric acid is particularly preferred from the viewpoint that the diazonium compound may be stably and efficiently prepared.

The acid used in process (a) means an acid which may even slightly dissolve the heterocyclic amine even though the acid does not completely dissolve the heterocyclic amine represented by Formula (2), and is preferably an acid which completely dissolves an amino compound. As the acid, an inorganic acid and an organic acid may be used, and examples of the inorganic acid include hydrochloric acid, phosphoric acid and sulfuric acid, and the inorganic acid is preferably phosphoric acid and sulfuric acid, and more preferably sulfuric acid. Examples of the organic acid include formic acid, acetic acid, propionic acid and methanesulfonic acid, and the organic acid is preferably acetic acid, propionic acid and methanesulfonic acid, and more preferably acetic acid and propionic acid. Further, these acids may be used either alone or in a mixture thereof. Examples of a mixed acid include phosphoric acid/acetic acid, sulfuric acid/acetic acid, methanesulfonic acid/acetic acid and acetic acid/propionic acid, the mixed acid is preferably phosphoric acid/acetic acid, sulfuric acid/acetic acid, sulfuric acid/acetic acid/propionic acid and acetic acid/propionic acid, and among them, sulfuric acid/acetic acid and acetic acid/propionic acid are particularly preferred. The mass ratio of these mixed acids is preferably 1/(0.1 to 20), more preferably 1/(0.5 to 10), and still more preferably 1/(1 to 10).

In process (a), the amount of acid added to the heterocyclic amine represented by Formula (2) is, in terms of mass ratio, 1 time to 100 times, more preferably 2 times to 50 times, and still more preferably 3 times to 25 times. When the mass ratio is 1 time or more, stirrability is improved so that the diazonium compound may be derived more securely. On the other hand, when the mass ratio is 100 times or less, productivity is enhanced so that economic efficiency is improved.

In addition, in process (a), the amount of the diazotizing agent added to the heterocyclic amine represented by Formula (2) is, in terms of molar ratio, 1.0 to 20 times, more preferably 1.0 to 10 times, and still more preferably 1.0 to 5 times. When the amount of the diazotizing agent to the amino compound is, in terms of molar ratio, 1 time or more, the diazonium compound may be derived more securely, and when the amount is 20 times or less, it is possible to suppress the diazonium compound from being decomposed by a side reaction.

The mixing of the diazotizing agent with the heterocyclic amine represented by Formula (2) in process (a) is performed preferably at 50° C. or less, more preferably at 40° C. or less, and still more preferably at 30° C. or less. In the preparation of the diazo solution at 50° C. or more, there is a concern in that the diazotizing agent may be decomposed. A stirring time to derive the heterocyclic amine into the diazonium compound is preferably 0.3 to 10 hours, more preferably 0.5 to 5 hours, and still more preferably 1 to 3 hours. When the stirring time is 0.3 hour or more, it is easy to completely derive the heterocyclic amine into the diazonium compound, and when the stirring time is 10 hours or less, it is difficult for the decomposition of the diazonium compound to occur. Furthermore, a typical stirrer is used in the mixing, and the stirrer is not particularly limited. The number of revolutions of the stirring may be different depending on the manufacturing facility in some cases, but is preferably 30 rpm to 300 rpm, more preferably 40 rpm to 200 rpm, and still more preferably 50 rpm to 200 rpm. When the stirring speed is 30 rpm or more in terms of the number of revolutions, the stirring efficiency of the diazonium compound liquid preparation is improved, and therefore, a desired reaction may proceed securely.

The solvent which may be mixed in process (a) is not particularly limited as long as the diazonium compound derived is not decomposed. Examples of the solvent which may be mixed include a hydrocarbon-based solvent such as hexane, benzene and toluene, an ether-based solvent such as diethyl ether and tetrahydrofuran, a ketone-based solvent such as acetone and methyl ethyl ketone, an amide-based solvent such as dimethylformamide, dimethylacetamide, pyrrolidone and N-methyl-2-pyrrolidone, and dimethylsulfoxide, sulfolane, acetonitrile and water.

A preferred pH of the diazonium compound liquid preparation in process (a) is preferably 7 or less, more preferably 5 or less, and still more preferably 3 or less. When the pH of the diazonium compound liquid preparation in process (a) is 7 or more, there is a concern in that the diazonium compound derived may be decomposed.

Next, process (b) according to the present invention will be described in detail.

Process (b) is a process of mixing the reaction product obtained in process (a) with a compound represented by Formula (3) for a reaction to occur, and obtaining a solution in which an azo compound produced by the reaction and represented by Formula (1) is dissolved at least in part.

In the present specification, the solution in which the azo compound is dissolved at least in part is referred to as "an azo compound dissolved solution".

Examples of a method of preparing the azo compound dissolved solution include (I) a method of obtaining the azo compound dissolved solution including: performing a coupling reaction by mixing the reaction product obtained in process (a) with the compound represented by Formula (3), and as a result of the reaction, dissolving the precipitated azo pigment represented by Formula (1) in a solvent, and (II) a method of obtaining the azo compound dissolved solution including: performing the coupling reaction such that the compound obtained by the coupling reaction and represented by Formula (1) is dissolved at least in part in a reaction solution, and adopting the resulting reaction solution as the azo compound dissolved solution as it is, or a method of obtaining the azo compound dissolved solution including: further dissolving a (crystallized) azo pigment, which is obtained by applying the thus-obtained azo compound dissolved solution to process (c) to be described below in detail in a solvent.

In any of types (I) and (II), a method of mixing the diazonium compound liquid preparation obtained in process (a) with a compound represented by Formula (3) is not particularly limited, but it is preferred that the compound represented by Formula (3) is dissolved in a solvent and the resulting solution is added to the liquid preparation, and it is more preferred that a solution of the compound represented by Formula (3) is added to the diazonium compound liquid preparation obtained in process (a).

Further, the amount of the diazonium compound in the diazonium compound liquid preparation obtained in process (a) to the compound represented by Formula (3) in process (b) is preferably 0.8 to 3 equivalents to the coupling position of the compound represented by Formula (3), more preferably 0.9 to 2 equivalents to the coupling position, and still more preferably 0.95 to 1.5 equivalents to the coupling position. When the amount is 0.8 equivalents or more, a coupling component having an unreacted coupling position may be suppressed from remaining, and when the amount is 3 equivalents or less, an unreacted diazonium compound may be suppressed from remaining, and therefore, the amount range is more economical.

Meanwhile, in type (II), since the azo compound represented by Formula (1) is dissolved at least in part in process (b), the coupling reaction proceeds more smoothly, thereby preparing a high-purity azo compound. The reason is assumed as follows. Since there are two coupling positions, for example, only one coupling position goes through a reaction intermediate which is reacted. When the reaction intermediate is precipitated into the reaction system, the reaction rate of the second coupling reaction is slowed down. Meanwhile, since the diazonium compound is unstable, there is a concern in that decomposition may occur when a long time elapses. Accordingly, it is important to allow the coupling reaction to proceed rapidly, and consequently, the type (II) preparation method, which does not produce a precipitate in process (b), is more suitable for preparing a high-purity pigment.

In process (b), the coupling component may be added without using a solvent, but it is preferred that the coupling component is added while being mixed with the solvent. In process (b), when a solvent is used in the coupling component, the solvent is not particularly limited, but is preferably a solvent which allows type (II) to be used, that is, a solvent by which it is possible to obtain a solution in which the azo compound produced after the reaction and represented by the general Formula (1) is dissolved at least in part.

In the case of type (I), that is, when the pigment is precipitated, as an example of the solvent, water, an organic acid, an inorganic acid and an organic solvent may be used, and an organic solvent is particularly preferred, and a solvent causing no liquid separation phenomenon during reaction and providing a uniform solution with the solvent is preferred. Examples thereof include water, an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the organic solvent may be a glycol-based solvent having two or more hydroxyl groups in the solvent molecule, an alcohol-based solvent having 3 or less carbon atoms, or a ketone-based solvent having a total carbon number of 5 or less, preferably an alcohol solvent having 2 or less atoms (for example, methanol and ethylene glycol) and a ketone-based solvent having a total carbon number of 4 or less (for example, acetone and methyl ethyl ketone). In addition, a mixed solvent of these solvents is also included in the organic solvent.

Furthermore, in the case of type (II), that is, when a coupling reaction is performed such that the compound represented by Formula (1) is dissolved at least in part in the reaction solution, examples of the solvent include an alcohol-based solvent such as methanol, isopropanol and ethylene glycol, a ketone-based solvent such as acetone and methyl ethyl ketone, an organic acid solvent such as acetic acid, propionic acid and methanesulfonic acid, an inorganic acid solvent such as sulfuric acid, hydrochloric acid and phosphoric acid, an amide-based solvent such as dimethylformamide, dimethylacetamide, pyrrolidone and N-methyl-2-pyrrolidone, dimethylsulfoxide, sulfolane, and acetonitrile. Among them, a ketone-based solvent such as acetone and methyl ethyl ketone, an organic acid solvent such as acetic acid, propionic acid and methanesulfonic acid, and an inorganic acid solvent such as sulfuric acid, hydrochloric acid and phosphoric acid are preferred, an acidic solvent of organic acid or inorganic acid is more preferred, and acetic acid, methanesulfonic acid, phosphoric acid and sulfuric acid are most preferred. Further, a mixed solvent of the aforementioned solvents is also suitable.

Particularly, in the case of type (II), in process (b), it is preferred that an acidic solution obtained by dissolving or suspending the coupling component in an acidic solvent and the reaction product obtained in process (a) are mixed. Particularly, it is preferred that the acidic solvent is a solvent including at least one of acetic acid and sulfuric acid.

In any of types (I) and (II), the preferred amount of the solvent added is, in terms of mass ratio, preferably 0.5 times to 200 times, more preferably 1 time to 100 times, and still more preferably 1 time to 50 times, based on the coupling component. As for the preferred amount of the solvent added based on the coupling component, when the mass ratio is 0.5 times or less, it is difficult to stir the coupling component and the solvent in a preparation machine and a desired reaction does not proceed. In addition, the case where the mass ratio is 200 times or more is not economical.

When the preparation method of the azo compound dissolved solution is type (I) or when the preparation method of the azo compound dissolved solution is type (II) and an azo pigment, which is obtained by applying the coupling reaction solution in which the compound represented by Formula (1) is dissolved at least in part to process (c), is further dissolved in the solvent to prepare an azo compound dissolved solution, the solvent for dissolving the obtained azo pigment is not particularly limited as long as the solvent may dissolve at least a part of the azo pigment, but examples thereof include the preferred examples of the solvent previously described in type (II).

As for the azo compound dissolved solution obtained in process (b), the ratio of the azo compound represented by Formula (1), which is dissolved in the azo compound dissolved solution to the total amount of the azo compound produced by process (b) (the sum of the azo compound represented by Formula (1), which is dissolved in the azo compound dissolved solution and the azo pigment represented by Formula (1), which is precipitated from the azo compound dissolved solution) is preferably 50% by mass or more, more preferably 75% by mass or more, still more preferably 90% by mass or more, and most preferably 100% by mass (a state where the azo compound produced in process (b) is completely dissolved in the reaction solution), and accordingly, the particle diameter of the pigment tends to be further reduced.

In process (b), the mixing of the diazonium compound liquid preparation of process (a) and the coupling component is preferably performed at a temperature of 50° C. or less, more preferably 30° C. or less, and still more preferably 25° C. or less. When the mixing temperature is 50° C. or more, there is a concern in that the diazonium compound derived in process (a) and the produced azo compound represented by formula (1) are decomposed. Furthermore, a typical stirrer is used in the mixing, and the stirrer is not particularly limited. The number of revolutions of the stirring may be different depending on the manufacturing facility in some cases, but is preferably 30 rpm to 300 rpm, more preferably 40 rpm to 200 rpm, and still more preferably 50 rpm to 200 rpm. When the stirring speed is 30 rpm or less in terms of the number of revolutions, the stirring efficiency of the mixed solution deteriorates, and therefore, a desired reaction may not proceed. The stirring time in process (b) is preferably 0.1 to 10 hours, more preferably 0.3 to 5 hours, and still more preferably 0.3 to 3 hours. When the stirring time is 0.1 hours or less, it is difficult for the pigment to be completely derived, and when the stirring time is 10 hours or more, there is a concern in that the azo compound represented by Formula (1) may be decomposed.

Next, process (c) according to the present invention will be described in detail.

Process (c) is a process of crystallizing a pigment by mixing the azo compound dissolved solution obtained in process (b) with a poor solvent with the azo compound having low solubility therein. The method of mixing the azo compound dissolved solution obtained in process (b) with a poor solvent is not particularly limited, but it is preferred that the azo compound dissolved solution obtained in process (b) is added to a poor solvent and at this time, it is preferred that the poor solvent is in a state of being stirred.

The stirring speed is preferably 100 rpm to 10,000 rpm, more preferably 150 rpm to 8,000 rpm, and particularly preferably 200 rpm to 6,000 rpm. For the addition, a pump or the like may also be used. In this case, either in-liquid addition or out-of-liquid addition may be employed, but in-liquid addition is more preferred. In addition, continuous supply into liquid through a supply pipe by using a pump is preferred.

The poor solvent is not particularly limited, but is preferably a poor solvent with the azo compound represented by Formula (1) having a solubility of 1 g/L or less therein, and more preferably a poor solvent with the azo compound represented by Formula (1) having a solubility of 0.1 g/L or less therein. This solubility may be a solubility when the azo compound is dissolved in the presence of an acid or an alkali. As for the compatibility or uniform mixing property between the azo compound dissolved solution obtained in process (b) and the poor solvent, the amount of the azo compound dissolved in a poor solvent is preferably 30% by weight or more, and more preferably 50% by weight or more based on the amount of the azo compound dissolved in a good solvent. In the present specification, the solubility indicates a solubility at 25° C.

Examples of the poor solvent include an aqueous solvent such as water, hydrochloric acid, ammonia water and an aqueous sodium hydroxide solution, an alcohol-based solvent such as methanol, ethanol, isopropyl alcohol and 1-methoxy-2-propanol, a glycol-based solvent such as ethylene glycol and diethylene glycol, a ketone compound solvent such as acetone, methyl ethyl ketone, methyl isobutyl ketone and cyclohexanone, an ether-based solvent such as diethyl ether and tetrahydrofuran, a hydrocarbon-based solvent such as hexane, benzene and toluene, a nitrile-based solvent such as acetonitrile, a halogen-based solvent such as dichloromethane and trichloroethylene, and an ester-based solvent such as ethyl acetate, ethyl lactate and 2-(1-methoxy)propyl acetate, and the poor solvent is preferably an aqueous solvent such as water, hydrochloric acid, ammonia water and an aqueous sodium hydroxide solution, an alcohol-based solvent such as methanol, ethanol, isopropyl alcohol and 1-methoxy-2-propanol, a glycol-based solvent such as ethylene glycol and diethylene glycol, and a ketone compound solvent such as acetone, methyl ethyl ketone, methyl isobutyl ketone and cyclohexanone, and more preferably an aqueous solvent such as water and ammonia water, an alcohol solvent having 1 to 3 carbon atoms, and a glycol-based solvent having 1 to 6 carbon atoms. Furthermore, a mixed solvent of the aforementioned solvents is also suitable. The poor solvent is most preferably one or more solvents selected from the group consisting of water, alcohol having 1 to 3 carbon atoms and glycol having 1 to 6 carbon atoms.

In the aspect of the present invention, the azo compound dissolved solution obtained in process (b) is in a state where the azo compound is completely dissolved in a reaction solution, and it is preferred that an alcohol having 1 to 3 carbon atoms, preferably methanol is mixed as a poor solvent with the azo compound dissolved solution. A finally desired ζ-type crystal form azo pigment having a small particle diameter may be efficiently obtained by preparing a crude azo pigment by the aspect.

The mixing ratio between the azo compound dissolved solution obtained in the process (b) and the poor solvent is, in terms of volume ratio, preferably 1/50 to 2/3, more preferably 1/40 to 1/2, and particularly preferably 1/20 to 1/2. When the volume ratio is 2/3 or less, sufficient crystallization of a pigment occurs and the reaction yield is increased, and when the volume ratio is 1/50 or more, productivity is enhanced, which is economical.

The temperature at which the azo compound dissolved solution obtained in process (b) is mixed with the poor solvent is not particularly limited, but the mixing is preferably performed at −10° C. to 50° C., more preferably at −5° C. to 30° C., and most preferably at −5° C. to 15° C.

In the mixing of the azo compound dissolved solution obtained in process (b) with the poor solvent, the particle diameter of the organic nanoparticle produced by precipitation may be controlled by adjusting the Reynolds number. Here, the Reynolds number is a dimensionless number which indicates the flowing state of a fluid and is represented by the following equation.

$$Re = \rho UL/\mu \qquad \text{Equation (1)}$$

(In Equation (1), Re represents the Reynolds number, $\rho$ represents the density [kg/m$^3$] of the azo compound dissolved solution obtained in process (b), U represents the relative velocity [m/s] when the azo compound dissolved solution meets the poor solvent, L represents the equivalent diameter [m] of a flow channel or a supply inlet at a portion where the azo compound dissolved solution meets the poor solvent, and $\mu$ represents the viscosity coefficient [Pa·s] of the azo compound dissolved solution.)

The equivalent diameter L refers to the diameter of an equivalent circular tube when a circular tube which is equivalent to the opening diameter or flow channel of a pipe having an arbitrary cross-section shape is envisaged. The equivalent diameter L is represented by the following Equation (2), in which the cross-sectional area of the pipe is designated as A and the wetted perimeter length (circumference) of the pipe or the outer perimeter of the flow channel is designated as p.

$$L = 4A/p \qquad \text{Equation (2)}$$

The relative velocity U when the azo compound dissolved solution meets the poor solvent is defined as the relative velocity in a direction perpendicular to a surface of the portion where the two liquids meet each other. That is, for example, in the case of mixing by injecting the azo compound dissolved solution into the poor solvent which is stationary, the velocity of injecting from the supply inlet is identical to the relative velocity U. The value of the relative velocity U is not particularly limited, but for example, the value is preferably set to 0.5 m/s to 100 m/s, and more preferably to 1.0 m/s to 50 m/s.

The density $\rho$ of the azo compound dissolved solution is a value which is determined depending on the type of the selected material, but it is practical that p is, for example, 0.8 kg/m$^3$ to 2.0 kg/m$^3$. Further, the viscosity coefficient $\mu$ of the azo compound dissolved solution is also a value which is determined depending on the material used, the environment temperature and the like, but for example, a value of 0.5 mPa·s to 100 mPa·s is preferred, and a value of 1.0 mPa·s to 50.0 mPa·s is more preferred.

A smaller value of the Reynolds number is likely to form a laminar flow, and a larger value is likely to form a turbulent flow. For example, the particle diameter of the pigment nanoparticles may be obtained while being controlled by adjusting the Reynolds number to 60 or more, and it is preferred to adjust the Reynolds number to 100 or more, and more preferably to 150 or more. The Reynolds number has no particular upper limit, but pigment particles having a desired average particle diameter may be obtained while being controlled by adjusting and controlling the Reynolds number, for example, in a range of 100,000 or less. In this case, within the aforementioned range, pigment particles having a smaller particle diameter may be obtained while being controlled usually by increasing the Reynolds number.

When the primary particles of the crude azo pigment particle obtained by the preparation method of the present invention are observed under a transmission microscope, the length in a long axis direction is preferably 1 nm to 1 μm, more preferably 5 nm to 700 nm, still more preferably 10 nm to 500 nm, and particularly preferably 10 nm to 300 nm.

Meanwhile, with respect to the particle diameter of the pigment particle, there is a method of digitizing the particle diameter by a measuring technique and expressing the particle diameter in terms of an average size of a group, examples of the size frequently used includes a mode diameter indicating the maximum value of distribution, a median diameter corresponding to the median value in the integral distribution curve, various average diameters (number average, length average, area average, mass average, volume average and the like), and the like, and in the present invention, unless otherwise indicated, the average particle diameter refers to a number average particle diameter.

Examples of the method of measuring the particle diameter of the pigment particle include a microscopic method, a mass method, a light scattering method, a light shielding method, an electric resistance method, an acoustic method, and a dynamic light scattering method, and a microscopic method and a dynamic light scattering method are particularly preferred. Examples of a microscope used in the microscopic method include a scanning electron microscope, a transmission electron microscope and the like. Examples of a particle measuring apparatus using a dynamic light scattering method include Nanotrac UPA-EX150 manufactured by Nikkiso Co., Ltd., Dynamic Light Scattering Photometer DLS-7000 Series manufactured by Otsuka Electronics Co., Ltd., and the like.

The aforementioned preferred average particle diameter of the pigment particle is achieved by appropriately adjusting (1) the temperature in process (c), (2) the solubility of the azo compound for the poor solvent, and (3) the stirring speed (or Reynolds number).

In preparing a liquid dispersion by precipitating crude azo pigment fine particles, at least any one of the azo compound dissolved solution and the poor solvent may contain a dispersing agent. In this case, it is preferred that the dispersing agent is contained into the azo compound dissolved solution. The dispersing agent has actions of (1) quickly being adsorbed to the surface of the precipitated pigment to form fine nanoparticles and (2) preventing these particles from aggregating again.

As the dispersing agent, for example, an anionic, cationic, amphoteric or nonionic, low molecular or polymer dispersing agent may be used.

As for the polymer dispersing agent, the mass average molecular weight thereof is preferably 1,000 to 500,000, more preferably 10,000 to 500,000, and particularly preferably 10,000 to 100,000.

Specific examples thereof include polyvinylpyrrolidone, polyvinyl alcohol, polyvinyl methyl ether, polyethylene glycol, polypropylene glycol, polyacrylamide, a vinyl alcohol-vinyl acetate copolymer, partially formalised polyvinyl alcohol, partially butyralized polyvinyl alcohol, a vinylpyrrolidone-vinyl acetate copolymer, a polyethylene oxide/propylene oxide block copolymer, polyacrylate, polyvinyl sulfate, poly(4-vinylpyridine) salt, polyamide, polyallylamine salt, condensed naphthalenesulfonate, a cellulose derivative, a starch derivative and the like. In addition, natural polymers such as alginate, gelatin, albumin, casein, gum arabic, gum traganth and lignin sulfonate may also be used. Among them, polyvinylpyrrolidone is preferred. These polymer compounds may be used either alone or in combination of two or more thereof, and may also be used by combining a low molecular dispersing agent. The dispersing agent used for dispersion of a pigment is described in detail in "Dispersion Stabilization of Pigment and Surface Treatment Technique Evaluation" (Japan Association for International Chemical Information, published on December 2001), pp. 29 to 46.

Examples of the anionic dispersing agent (anionic surfactant) include an N-acyl-N-alkyltaurine salt, a fatty acid salt, an alkylsulfonic ester salt, alkylbenzenesulfonate, alkylnaphthalenesulfonate, dialkylsulfosuccinate, an alkylphosphonic ester salt, a naphthalenesulfonic acid-formalin condensate, a polyoxyethylene alkylsulfonic ester salt and the like. Among them, an N-acyl-N-alkyltaurine salt is preferred. As the N-acyl-N-alkyltaurine salt, those described in Japanese Patent Application Laid-Open No. H3-273067 are preferred. These anionic dispersing agents may be used either alone or in combination of two or more kinds thereof.

Examples of the cationic dispersing agent (cationic surfactant) include a quaternary ammonium salt, alkoxylated polyamine, aliphatic amine polyglycol ether, aliphatic amine, diamine or polyamine derived from aliphatic amine and aliphatic alcohol, imidazoline derived from aliphatic acid, and salts of these cationic substances. These cationic dispersing agents may be used either alone or in combination of two or more kinds thereof.

The amphoteric dispersing agent is a dispersing agent having, in the molecule thereof, both an anionic group moiety that is contained in the molecule of the anionic dispersing agent, and a cationic group moiety that is contained in the molecule of the cationic dispersing agent.

Examples of the nonionic dispersing agent (nonionic surfactant) include polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and the like. Among them, polyoxyethylene alkylaryl ether is preferred. These nonionic dispersing agents may be used either alone or in combination of two or more kinds thereof.

The content of the dispersing agent is preferably in a range of 0.1 parts by mass to 1,000 parts by mass, more preferably in a range of 1 part by mass to 500 parts by mass, and still more preferably in a range of 5 parts by mass to 200 parts by mass, based on 100 parts by mass of the pigment. Further, the dispersing agents may be used either alone or in combination of a plurality thereof.

The azo pigment represented by Formula (1) may also be prepared by the following method. That is, the azo pigment represented by Formula (1) may be prepared by modifying a heterocyclic amine represented by the following Formula (2) into diazonium, and Formula (2):

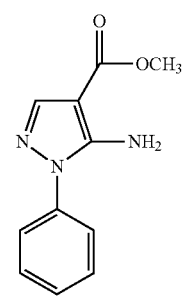

Formula (2)

subsequently, performing a coupling reaction with a compound represented by the following Formula (3).

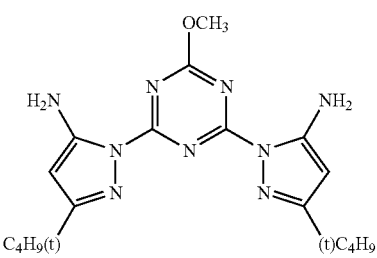

Formula (3)

The azo pigment of the present invention may be synthesized, for example, by performing an azo coupling reaction between a diazonium salt prepared by an already known method using the diazo component of Formula (2) and the coupling component of Formula (3).

The preparation and coupling reaction of the diazonium salt may be performed by a common method.

For the preparation of the diazonium salt of Formula (2), it is possible to apply, for example, a common method of adjusting a diazonium salt by using a nitrosonium ion source, for example, nitrous acid, nitrite or nitrosylsulfuric acid, in a reaction medium containing an acid (for example, hydrochloric acid, sulfuric acid, phosphoric acid, acetic acid, propionic acid, methanesulfonic acid, trifluoromethanesulfonic acid and the like).

More preferred examples of the acid include a case of using acetic acid, propionic acid, methanesulfonic acid, phosphoric acid and sulfuric acid either alone or in combination thereof, and among them, phosphoric acid or a combination use system of acetic acid and sulfuric acid is particularly preferred.

As preferred examples of the reaction medium (solvent), an organic acid and an inorganic acid are preferably used, and particularly, phosphoric acid, sulfuric acid, acetic acid, propionic acid and methanesulfonic acid are preferred, and among them, acetic acid and/or propionic acid are preferred.

As a preferred example of the nitrosonium ion source, it is stable to use nitrtosylsulfuric acid in the aforementioned preferred reaction medium containing an acid, and further, the diazonium salt may be efficiently prepared.

The amount of the solvent used is preferably 0.5 times by mass to 50 times by mass, more preferably 1 time by mass to 20 times by mass, and particularly preferably 3 times by mass to 10 times by mass based on the amount of the diazo component of Formula (2).

In the present invention, the diazo component of Formula (2) may be in a state of being dispersed in a solvent, or in a state of a dissolved solution depending on the type of the diazo component.

The amount of the nitrosonium ion source used is preferably 0.95 equivalents to 5.0 equivalents, more preferably 1.00 equivalent to 3.00 equivalents, and particularly preferably 1.00 to 1.10 equivalents with respect to the diazo component.

The reaction temperature is preferably −15° C. to 30° C., more preferably −10° C. to 10° C., and still more preferably −5° C. to 5° C. At less than −10° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

The coupling reaction may be performed in an acidic reaction medium to a basic reaction medium, but is preferably performed in an acidic to neutral reaction medium for the azo pigment of the present invention, and the components may be efficiently derived into the azo pigment by suppressing the decomposition of the diazonium salt particularly when the coupling reaction is performed in an acidic reaction medium.

As a preferred example of the reaction medium (solvent), an organic acid, an inorganic acid and an organic solvent may be used, and an organic solvent is particularly preferred, and a solvent causing no liquid separation phenomenon during reaction and providing a uniform solution with the solvent is preferred. Examples thereof include an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the solvent may be a glycol-based solvent having two or more hydroxyl groups, or an alcohol-based solvent having 3 or less carbon atoms, and preferably an alcohol solvent (for example, methanol and ethylene glycol) having 2 or less carbon atoms, in a solvent molecule. In addition, a mixed solvent of these solvents is also included in the organic solvent.

The amount of the solvent used is preferably 1 time by mass to 100 times by mass, more preferably 1 time by mass to 50 times by mass, and still more preferably 2 times by mass to 10 times by mass based on the amount of the coupling component represented by Formula (3).

In the present invention, the coupling component which forms Formula (1) may be in a state of being dispersed in a solvent, or in a state of a dissolved solution depending on the type of the coupling component.

For the amount of the coupling component used, the diazo component is preferably 0.95 equivalents to 5.0 equivalents, more preferably 1.00 equivalent to 3.00 equivalents, and particularly preferably 1.00 to 1.50 equivalents per the azo coupling moiety.

The reaction temperature is preferably −30° C. to 30° C., more preferably −15° C. to 10° C., and still more preferably −10° C. to 5° C. At less than −30° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

In the method of synthesizing an azo pigment according to the present invention, a product (crude azo pigment) obtained by these reactions may be treated by a typical post-treatment method of an organic synthesis reaction, and then used with or without purification.

That is, for example, a product isolated from the reaction system may be used without purification or by performing a purification operation such as recrystallization and salt formation either alone or in combination.

In addition, after the reaction is completed, the reaction solvent may or may not be removed by distillation, the reaction solution may or may not be neutralized by pouring the reaction solvent in water or ice, and the product isolated or extracted with an organic solvent/aqueous solution may be used without purification or after performing a purification operation such as recrystallization, crystallization and salt formation either alone or in combination.

The synthesizing method of an azo pigment composition according to the present invention will be described in more detail.

The method for preparing an azo pigment according to the present invention includes, in a coupling reaction between a diazonium compound, which is obtained by modifying the heterocyclic amine represented by Formula (2) into diazonium and the compound represented by Formula (3), dissolving the compound of Formula (3) in an organic solvent, and then performing the coupling reaction.

The reaction of modifying the heterocyclic amine represented by Formula (2) into diazonium may be performed, for example, by reacting the heterocyclic amine with a reagent such as sodium nitrite and nitrosylsulfuric acid in an acidic solvent such as sulfuric acid, phosphoric acid and acetic acid at a temperature of 15° C. or less for approximately 10 minutes to 6 hours. It is preferred that the coupling reaction is performed by reacting a diazonium salt obtained by the above-described method and the compound represented by Formula (3) at 40° C. or less, preferably 15° C. or less for approximately 10 minutes to 12 hours.

The tautomerism and/or crystalline polymorphism described above may be controlled by the preparation conditions during the coupling reaction. As the method of preparing the ζ-type crystal which is a more preferred type, for example, it is preferred to use the method of the present invention including dissolving the compound represented by Formula (3) one time in an organic solvent, and then performing the coupling reaction. Examples of the organic solvent which may be used in this case include an alcohol solvent. As an example of the alcohol solvent, methanol, ethanol, isopropanol, ethylene glycol, diethylene glycol and the like are preferred, and among them, methanol is particularly preferred.

Another method for preparing an azo pigment according to the present invention includes, in a coupling reaction between a diazonium compound, which is obtained by modifying the heterocyclic amine represented by Formula (2) into diazonium and the compound represented by Formula (3), performing the coupling reaction in the presence of a polar aprotic solvent.

The ζ-type crystal may be efficiently prepared even by the method of performing the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, a mixed solvent thereof and the like. When these solvents are used, the compound of Formula (3) may or may not be completely dissolved in the solvent.

By the aforementioned preparation method, the compound represented by Formula (1) is obtained as a crude azo pigment, and when the compound is used as the pigment of the present invention, a post-treatment is preferably performed. Examples of the method of this post-treatment include a process of controlling the pigment particle by a grinding treatment such as solvent salt milling, salt milling, dry milling, solvent milling and acid pasting, by a solvent heating treatment, and the like, and a process of performing a surface treatment with a resin, a surfactant, a dispersing agent and the like.

(Solvent Salt Milling)

It is preferred that the compound represented by Formula (1) according to the present invention is subjected to solvent salt milling.

Examples of the solvent salt milling include a method including placing, into a kneading machine, a crude azo pigment, an inorganic salt, and an organic solvent which does not dissolve it, and performing kneading and grinding therein. A water-soluble inorganic salt may be suitably used as the inorganic salt, and it is preferred that for example, an inorganic salt such as sodium chloride, potassium chloride and sodium sulfate is used. Furthermore, it is more preferred that an inorganic salt having an average particle diameter of 0.5 μm to 50 μm is used. The amount of the inorganic salt used is preferably 3 times by mass to 20 times by mass, and more preferably 5 times by mass to 15 times by mass based on the amount of the crude azo pigment. An aqueous organic solvent may be suitably used as the organic solvent, and since the solvent may easily evaporate due to an increase in temperature at the time of kneading, a solvent having a high boiling temperature is preferred from the viewpoint of safety. Examples of the organic solvent include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, or a mixture thereof. The amount of the aqueous organic solvent used is preferably 0.1 times by mass to 5 times by mass based on the amount of the crude azo pigment. The kneading temperature is preferably 20° C. to 130° C. and particularly preferably 40° C. to 110° C. As the kneading machine, for example, a kneader, a mix Muller and the like may be used.

[Synthesis of η-Type Crystal Form Azo Pigment]

Hereinafter, synthesis of the η-type crystal form azo pigment represented by Formula (1) will be described in detail.

The η-type crystal form azo pigment represented by Formula (1) (hereinafter, simply referred to as "azo pigment" or "pigment" in some cases) may be synthesized by the following preparation method.

It is preferred that the preparation method of the present invention includes a process of subjecting a diazonium salt derived from a heterocyclic amine represented by the following Formula (2) and a compound represented by the following Formula (3) to azo coupling reaction.

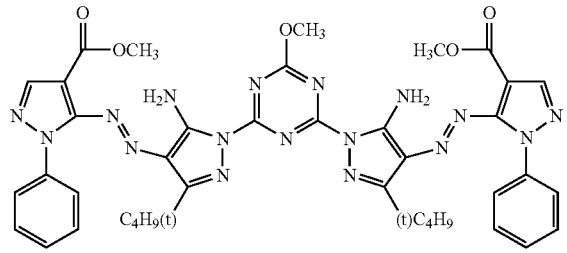

Formula (1)

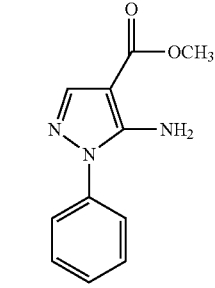

Formula (2)

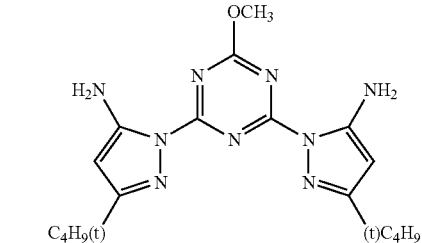

Formula (3)

Hereinafter, the preparation method of the present invention will be described in detail.

It is preferred that the method for preparing an azo pigment according to the present invention includes a process of obtaining a crude azo pigment and a process of transforming the crude azo pigment into an η-type crystal form azo pigment by subjecting the crude azo pigment to solvent treatment.

It is preferred that the method for preparing a crude azo pigment includes (a) a process of mixing a diazotizing agent with a heterocyclic amine represented by Formula (2), and (b) a process of performing a reaction by mixing a reaction product obtained in process (a) with a compound represented by Formula (3), and obtaining a solution in which an azo compound produced by the reaction and represented by Formula (1) is dissolved at least in part, and it is more preferred that the method also includes (c) a process of crystallizing the pigment represented by Formula (1) by mixing the solution obtained in process (b) with a poor solvent for the azo compound represented by Formula (1).

In process (b), when the ratio at which the azo compound is dissolved is high, the yield becomes high, which is preferred.

Process (a) according to the present invention will be described in detail.

In process (a), a diazonium compound is derived by a reaction of a heterocyclic amine represented by Formula (2)

with a diazotizing agent by mixing a diazotizing agent with a heterocyclic amine represented by Formula (2). It is preferred that this reaction is performed in a medium including an acid. In the present specification, a liquid including the diazonium compound is referred to as "diazonium compound liquid preparation". The method of mixing the heterocyclic amine represented by Formula (2) with the acid and the diazotizing agent is not particularly limited, but it is preferred that the diazotizing agent is added to a solution of the heterocyclic amine represented by Formula (2) and the acid. The diazotizing agent in process (a) is used to derive the heterocyclic amine represented by Formula (2) into the diazonium compound, and is not limited as long as the diazotizing agent has such an action. Representative examples of the diazotizing agent include nitrite esters (examples thereof include isopentyl nitrite), nitrite salts (examples thereof include sodium nitrite or potassium nitrite), isoamyl nitrite and nitrosylsulfuric acid, the diazotizing agent is more preferably sodium nitrite, potassium nitrite and nitrosylsulfuric acid, and among them, nitrosylsulfuric acid is particularly preferred from the viewpoint that the diazonium compound may be stably and efficiently prepared.

The acid used in process (a) means an acid which may even slightly dissolve the heterocyclic amine even though the acid does not completely dissolve the heterocyclic amine represented by Formula (2), and is preferably an acid which completely dissolves an amino compound. As the acid, an inorganic acid and an organic acid may be used, and examples of the inorganic acid include hydrochloric acid, phosphoric acid and sulfuric acid, and the inorganic acid is preferably phosphoric acid and sulfuric acid, and more preferably sulfuric acid. Examples of the organic acid include formic acid, acetic acid, propionic acid and methanesulfonic acid, and the organic acid is preferably acetic acid, propionic acid and methanesulfonic acid, and more preferably acetic acid and propionic acid. Further, these acids may be used either alone or in a mixture thereof. Examples of a mixed acid include phosphoric acid/acetic acid, sulfuric acid/acetic acid, methanesulfonic acid/acetic acid and acetic acid/propionic acid, the mixed acid is preferably phosphoric acid/acetic acid, sulfuric acid/acetic acid, sulfuric acid/acetic acid/propionic acid and acetic acid/propionic acid, and among them, sulfuric acid/acetic acid and acetic acid/propionic acid are particularly preferred. The mass ratio of these mixed acids is preferably 1/(0.1 to 20), more preferably 1/(0.5 to 10), and still more preferably 1/(1 to 10).

In process (a), the amount of acid added to the heterocyclic amine represented by Formula (2) is, in terms of mass ratio, 1 to 100 times, more preferably 2 to 50 times, and still more preferably 3 to 25 times. When the mass ratio is 1 time or more, stirrability is improved so that the diazonium compound may be derived more securely. On the other hand, when the mass ratio is 100 times or less, productivity is enhanced so that economic efficiency is improved.

In addition, in process (a), the amount of the diazotizing agent added to the heterocyclic amine represented by Formula (2) is, in terms of molar ratio, 1.0 time to 20 times, more preferably 1.0 time to 10 times, and still more preferably 1.0 time to 5 times. When the amount of the diazotizing agent to the amino compound is, in terms of molar ratio, 1 time or more, the diazonium compound may be derived more securely, and when the amount is 20 times or less, it is possible to suppress the diazonium compound from being decomposed by a side reaction.

The mixing of the diazotizing agent with the heterocyclic amine represented by Formula (2) in process (a) is performed preferably at 50° C. or less, more preferably at 40° C. or less, and still more preferably at 30° C. or less. In the preparation of the diazo solution at a high temperature more than 50° C., there is a concern in that the diazotizing agent may be decomposed. A stirring time to derive the heterocyclic amine into the diazonium compound is preferably 0.3 to 10 hours, more preferably 0.5 to 5 hours, and still more preferably 1 to 3 hours. When the stirring time is 0.3 hour or more, it is easy to completely derive the heterocyclic amine into the diazonium compound, and when the stirring time is 10 hours or less, it is difficult for the decomposition of the diazonium compound to occur. Furthermore, a typical stirrer is used in the mixing, and the stirrer is not particularly limited. The number of revolutions of the stirring may be different depending on the manufacturing facility in some cases, but is preferably 30 rpm to 300 rpm, more preferably 40 rpm to 200 rpm, and still more preferably 50 rpm to 200 rpm. When the stirring speed is 30 rpm or more in terms of the number of revolutions, the stirring efficiency of the diazonium compound liquid preparation is improved, and therefore, a desired reaction may proceed securely.

The solvent which may be mixed in process (a) is not particularly limited as long as the diazonium compound derived is not decomposed. Examples of the solvent which may be mixed include a hydrocarbon-based solvent such as hexane, benzene and toluene, an ether-based solvent such as diethyl ether and tetrahydrofuran, a ketone-based solvent such as acetone and methyl ethyl ketone, an amide-based solvent such as dimethylformamide, dimethylacetamide, pyrrolidone and N-methyl-2-pyrrolidone, and dimethylsulfoxide, sulfolane, acetonitrile and water.

A preferred pH of the diazonium compound liquid preparation in process (a) is preferably 7 or less, more preferably 5 or less, and still more preferably 3 or less. When the pH of the diazonium compound liquid preparation in process (a) is more than 7, there is a concern in that the diazonium compound derived may be decomposed.

Next, process (b) according to the present invention will be described in detail.

Process (b) is a process of mixing the reaction product obtained in process (a) with a compound represented by Formula (3) for a reaction to occur, and obtaining a solution in which an azo compound produced by the reaction and represented by Formula (1) is dissolved at least in part.

In the present specification, the solution in which the azo compound is dissolved at least in part is referred to as "an azo compound dissolved solution".

Examples of a method of preparing the azo compound dissolved solution include (1) a method of obtaining the azo compound dissolved solution including: performing a coupling reaction by mixing the reaction product obtained in process (a) with the compound represented by Formula (3), and as a result of the reaction, dissolving the precipitated azo pigment represented by Formula (1) in a solvent, and (II) a method of obtaining the azo compound dissolved solution including: performing the coupling reaction such that the compound obtained by the coupling reaction and represented by Formula (1) is dissolved at least in part in a reaction solution, and adopting the resulting reaction solution as the azo compound dissolved solution as it is, or a method of obtaining the azo compound dissolved solution including: further dissolving a (crystallized) azo pigment, which is obtained by applying the thus-obtained azo compound dissolved solution to process (c) to be described below in detail in a solvent.

In any of types (I) and (II), a method of mixing the diazonium compound liquid preparation obtained in process (a) with the coupling component is not particularly limited, but it is more preferred that the coupling component is partly or completely dissolved in a solvent and the resulting solution is added to the liquid preparation, or the coupling component is added as a solid to the diazonium compound liquid preparation obtained in process (a).

Further, the amount of the diazonium compound in the diazonium compound liquid preparation obtained in process (a) to the compound represented by Formula (3) in process (b) is preferably 0.8 to 3 equivalents to the coupling position of the compound represented by Formula (3), more preferably 0.9 to 2 equivalents to the coupling position, and still more preferably 0.95 to 1.5 equivalents to the coupling position. When the amount is 0.8 equivalents or more, a coupling component having an unreacted coupling position may be suppressed from remaining, and when the amount is 3 equivalents or less, an unreacted diazonium compound may be suppressed from remaining, and therefore, the amount range is more economical.

Meanwhile, in type (II), since the azo compound represented by Formula (1) is dissolved at least in part in process (b), the coupling reaction proceeds more smoothly, thereby preparing a high-purity azo compound. The reason is assumed as follows. Since there are two coupling positions, for example, only one coupling position goes through a reaction intermediate which is reacted. When the reaction intermediate is precipitated into the reaction system, the reaction rate of the second coupling reaction is slowed down. Meanwhile, since the diazonium compound is unstable, there is a concern in that decomposition may occur when a long time elapses. Accordingly, it is important to allow the coupling reaction to proceed rapidly, and consequently, the type (II) preparation method, which does not produce a precipitate in process (b), is more suitable for preparing a high-purity pigment.

In process (b), the coupling component may be added without using a solvent, but it is preferred that the coupling component is added while being mixed with the solvent. In process (b), when a solvent is used in the coupling component, the solvent is not particularly limited, but is preferably a solvent which allows type (II) to be used, that is, a solvent by which it is possible to obtain a solution in which the azo compound produced after the reaction and represented by the general Formula (1) is dissolved at least in part.

In the case of type (1), that is, when the pigment is precipitated, as an example of the solvent, water, an organic acid, an inorganic acid and an organic solvent may be used, and an organic solvent is particularly preferred, and a solvent causing no liquid separation phenomenon during reaction and providing a uniform solution with the solvent is preferred. Examples thereof include water, an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the organic solvent may be a glycol-based solvent having two or more hydroxyl groups in the solvent molecule, an alcohol-based solvent having 3 or less carbon atoms, or a ketone-based solvent having a total carbon number of 5 or less, preferably an alcohol solvent having 2 or less atoms (for example, methanol and ethylene glycol) and a ketone-based solvent having a total carbon number of 4 or less (for example, acetone and methyl ethyl ketone). In addition, a mixed solvent of these solvents is also included in the organic solvent.

Furthermore, in the case of type (II), that is, when a coupling reaction is performed such that the compound represented by Formula (1) is dissolved at least in part in the reaction solution, examples of the solvent include an alcohol-based solvent such as methanol, isopropanol and ethylene glycol, a ketone-based solvent such as acetone and methyl ethyl ketone, an organic acid solvent such as acetic acid, propionic acid and methanesulfonic acid, an inorganic acid solvent such as sulfuric acid, hydrochloric acid and phosphoric acid, an amide-based solvent such as dimethylformamide, dimethylacetamide, pyrrolidone and N-methyl-2-pyrrolidone, dimethylsulfoxide, sulfolane, and acetonitrile. Among them, a ketone-based solvent such as acetone and methyl ethyl ketone, an organic acid solvent such as acetic acid, propionic acid and methanesulfonic acid, and an inorganic acid solvent such as sulfuric acid, hydrochloric acid and phosphoric acid are preferred, an acidic solvent of organic acid or inorganic acid is more preferred, and acetic acid, methanesulfonic acid, phosphoric acid and sulfuric acid are most preferred. Furthermore, a mixed solvent of the aforementioned solvents is also suitable.

Particularly, in the case of type (II), in process (b), it is preferred that an acidic solution obtained by dissolving or suspending the coupling component in an acidic solvent is mixed with the reaction product obtained in process (a), or the coupling component is added to the reaction product obtained in process (a) without using a solvent. Particularly, it is preferred that the acidic solvent is a solvent including at least one of acetic acid and sulfuric acid.

In any of types (I) and (II), the preferred amount of the solvent added is, in terms of mass ratio, preferably 0.5 times to 200 times, more preferably 1 time to 100 times, and still more preferably 1 time to 50 times, based on the coupling component. As for the preferred amount of the solvent added based on the coupling component, when the mass ratio is less than 0.5 time, it is difficult to stir the coupling component and the solvent in a preparation machine and a desired reaction does not proceed. Further, the case where the mass ratio is more than 200 times is not economical.

When the preparation method of the azo compound dissolved solution is type (I) or when the preparation method of the azo compound dissolved solution is type (II) and an azo pigment, which is obtained by applying the coupling reaction solution in which the compound represented by Formula (1) is dissolved at least in part to process (c), is further dissolved in the solvent to prepare an azo compound dissolved solution, the solvent for dissolving the obtained azo pigment is not particularly limited as long as the solvent may dissolve at least a part of the azo pigment, but examples thereof include the preferred examples of the solvent previously described in type (II).

Even though any process of types (I) and (II) is employed, the azo compound dissolved solution finally obtained in process (b) is preferably an acidic solution, and particularly preferably a solution including at least one of acetic acid and sulfuric acid.

As for the azo compound dissolved solution obtained in process (b), the ratio of the azo compound represented by Formula (1), which is dissolved in the azo compound dissolved solution to the total amount of the azo compound produced by process (b) (the sum of the azo compound represented by Formula (1), which is dissolved in the azo compound dissolved solution and the azo pigment represented by Formula (1), which is precipitated from the azo compound dissolved solution) is preferably 50% by mass or more, more preferably 75% by mass or more, still more preferably 90% by mass or more, and most preferably 100% by mass (a state where the azo compound produced in process (b) is completely dissolved in the reaction solution), and accordingly, the particle diameter of the pigment tends to be further reduced. Furthermore, as the ratio at which the azo compound is dissolved is high, the yield becomes high, which is preferred.

In process (b), the mixing of the diazonium compound liquid preparation of process (a) and the coupling component is preferably performed at a temperature of 50° C. or less, more preferably 30° C. or less, and still more preferably 25° C. or less. When the mixing temperature is 50° C. or more, there is a concern in that the diazonium compound derived in process (a) and the produced azo compound represented by formula (1) are decomposed. Further, a typical stirrer is used in the mixing, and the stirrer is not particularly limited. The number of revolutions of the stirring may be different depending on the manufacturing facility in some cases, but is preferably 30 rpm to 400 rpm, more preferably 40 rpm to 300 rpm, and still more preferably 50 rpm to 200 rpm. When the stirring speed is 30 rpm or less in terms of the number of revolutions, the stirring efficiency of the mixed solution deteriorates, and therefore, a desired reaction may not proceed. The stirring time in process (b) is preferably 0.1 to 10 hours, more preferably 0.3 to 5 hours, and still more preferably 0.3 to 3 hours. When the stirring time is less than 0.1 hours, it is difficult for the pigment to be completely derived, and when the stirring time is more than 10 hours, there is a concern in that the azo compound represented by Formula (1) may be decomposed.

Next, process (c) according to the present invention will be described in detail.

Process (c) is a process of crystallizing a pigment by mixing the azo compound dissolved solution obtained in process (b) with a poor solvent with the azo compound having low solubility therein. The method of mixing the azo compound dissolved solution obtained in process (b) with a poor solvent is not particularly limited, but it is preferred that the azo compound dissolved solution obtained in process (b) is added to a poor solvent and at this time, it is preferred that the poor solvent is in a state of being stirred.

The stirring speed is preferably 100 rpm to 10,000 rpm, more preferably 150 rpm to 8,000 rpm, and particularly preferably 200 rpm to 6,000 rpm. For the addition, a pump or the like may also be used. In this case, either in-liquid addition or out-of-liquid addition may be employed, but in-liquid addition is more preferred. In addition, continuous supply into liquid through a supply pipe by using a pump is preferred.

The poor solvent is not particularly limited, but is preferably a poor solvent with the azo compound represented by Formula (1) having a solubility of 1 g/L or less therein, and more preferably a poor solvent with the azo compound represented by Formula (1) having a solubility of 0.1 g/L or less therein. This solubility may be a solubility when the azo compound is dissolved in the presence of an acid or an alkali. As for the compatibility or uniform mixing property between the azo compound dissolved solution obtained in process (b) and the poor solvent, the amount of the azo compound dissolved in a poor solvent is preferably 30% by mass or more, and more preferably 50% by mass or more based on the amount of the azo compound dissolved in a good solvent. In the present specification, the solubility indicates a solubility at 25° C.

Examples of the poor solvent include an aqueous solvent such as water, hydrochloric acid, ammonia water and an aqueous sodium hydroxide solution, an alcohol-based solvent such as methanol, ethanol, isopropyl alcohol and 1-methoxy-2-propanol, a glycol-based solvent such as ethylene glycol and diethylene glycol, a ketone compound solvent such as acetone, methyl ethyl ketone, methyl isobutyl ketone and cyclohexanone, an ether-based solvent such as diethyl ether and tetrahydrofuran, a hydrocarbon-based solvent such as hexane, benzene and toluene, a nitrile-based solvent such as acetonitrile, a halogen-based solvent such as dichloromethane and trichloroethylene, and an ester-based solvent such as ethyl acetate, ethyl lactate and 2-(1-methoxy)propyl acetate, and the poor solvent is preferably an aqueous solvent such as water, hydrochloric acid, ammonia water and an aqueous sodium hydroxide solution, an alcohol-based solvent such as methanol, ethanol, isopropyl alcohol and 1-methoxy-2-propanol, a glycol-based solvent such as ethylene glycol and diethylene glycol, and a ketone compound solvent such as acetone, methyl ethyl ketone, methyl isobutyl ketone and cyclohexanone, and more preferably an aqueous solvent such as water and ammonia water, an alcohol solvent having 1 to 3 carbon atoms, and a glycol-based solvent having 1 to 6 carbon atoms. Furthermore, a mixed solvent of the aforementioned solvents is also suitable. The poor solvent is most preferably one or more solvents selected from the group consisting of water, alcohol having 1 to 3 carbon atoms and glycol having 1 to 6 carbon atoms.

The mixing ratio between the azo compound dissolved solution obtained in the process (b) and the poor solvent is, in terms of volume ratio, preferably 1/50 to 2/3, more preferably 1/40 to 1/2, and particularly preferably 1/20 to 1/2. When the volume ratio is 2/3 or less, sufficient crystallization of a pigment occurs and the reaction yield is increased, and when the volume ratio is 1/50 or more, productivity is enhanced, which is economical.

The temperature at which the azo compound dissolved solution obtained in process (b) is mixed with the poor solvent is not particularly limited, but the mixing is preferably performed at −10° C. to 50° C., more preferably at −5° C. to 30° C., and most preferably at −5° C. to 25° C.

In the mixing of the azo compound dissolved solution obtained in process (b) with the poor solvent, the particle diameter of the organic nanoparticle produced by precipitation may be controlled by adjusting the Reynolds number. Here, the Reynolds number is a dimensionless number which indicates the flowing state of a fluid and is represented by the following equation.

$$Re = \rho UL/\mu \qquad \text{Equation (1)}$$

(In Equation (1), Re represents the Reynolds number, $\rho$ represents the density [kg/m$^3$] of the azo compound dissolved solution obtained in process (b), U represents the relative velocity [m/s] when the azo compound dissolved solution meets the poor solvent, L represents the equivalent diameter [m] of a flow channel or a supply inlet at a portion where the azo compound dissolved solution meets the poor solvent, and $\mu$ represents the viscosity coefficient [Pa·s] of the azo compound dissolved solution.)

The equivalent diameter L refers to the diameter of an equivalent circular tube when a circular tube which is equivalent to the opening diameter or flow channel of a pipe having an arbitrary cross-section shape is envisaged. The equivalent diameter L is represented by the following Equation (2), in which the cross-sectional area of the pipe is designated as A and the wetted perimeter length (circumference) of the pipe or the outer perimeter of the flow channel is designated as p.

$$L = 4A/p \qquad \text{Equation (2)}$$

The relative velocity U when the azo compound dissolved solution meets the poor solvent is defined as the relative velocity in a direction perpendicular to a surface of the portion where the two liquids meet each other. That is, for example, in the case of mixing by injecting the azo compound dissolved solution into the poor solvent which is stationary, the velocity of injecting from the supply inlet is identical to the relative velocity U. The value of the relative velocity U is not particularly limited, but for example, the value is preferably set to 0.5 m/s to 100 m/s, and more preferably to 1.0 m/s to 50 m/s.

The density ρ of the azo compound dissolved solution is a value which is determined depending on the type of the selected material, but it is practical that p is, for example, 0.8 kg/m$^3$ to 2.0 kg/m$^3$. Further, the viscosity coefficient μ of the azo compound dissolved solution is also a value which is determined depending on the material used, the environment temperature and the like, but for example, a value of 0.5 mPa·s to 100 mPa·s is preferred, and a value of 1.0 mPa·s to 50.0 mPa·s is more preferred.

A smaller value of the Reynolds number is likely to form a laminar flow, and a larger value is likely to form a turbulent flow. For example, the particle diameter of the pigment nanoparticles may be obtained while being controlled by adjusting the Reynolds number to 60 or more, and it is preferred to adjust the Reynolds number to 100 or more, and more preferably to 150 or more. The Reynolds number has no particular upper limit, but pigment particles having a desired average particle diameter may be obtained while being controlled by adjusting and controlling the Reynolds number, for example, in a range of 100,000 or less. In this case, within the aforementioned range, pigment particles having a smaller particle diameter may be obtained while being controlled usually by increasing the Reynolds number.

When the primary particles of the crude azo pigment particle obtained by the preparation method of the present invention are observed under a transmission microscope, the length in a long axis direction is preferably 1 nm to 10 μm, more preferably 5 nm to 5 μm, still more preferably 10 nm to 2 μm, and particularly preferably 10 nm to 1 μm.

Meanwhile, with respect to the particle diameter of the pigment particle, there is a method of digitizing the particle diameter by a measuring technique and expressing the particle diameter in terms of an average size of a group, examples of the size frequently used includes a mode diameter indicating the maximum value of distribution, a median diameter corresponding to the median value in the integral distribution curve, various average diameters (number average, length average, area average, mass average, volume average and the like), and the like, and in the present invention, unless otherwise indicated, the average particle diameter refers to a number average particle diameter.

Examples of the method of measuring the particle diameter of the pigment particle include a microscopic method, a mass method, a light scattering method, a light shielding method, an electric resistance method, an acoustic method, and a dynamic light scattering method, and a microscopic method and a dynamic light scattering method are particularly preferred. Examples of a microscope used in the microscopic method include a scanning electron microscope, a transmission electron microscope and the like. Examples of a particle measuring apparatus using a dynamic light scattering method include Nanotrac UPA-EX150 manufactured by Nikkiso Co., Ltd., Dynamic Light Scattering Photometer DLS-7000 Series manufactured by Otsuka Electronics Co., Ltd., and the like.

The aforementioned preferred average particle diameter of the pigment particle is achieved by appropriately adjusting (1) the temperature in process (c), (2) the solubility of the azo compound for the poor solvent, and (3) the stirring speed (or Reynolds number).

In preparing a liquid dispersion by precipitating crude azo pigment fine particles, at least any one of the azo compound dissolved solution and the poor solvent may contain a dispersing agent. In this case, it is preferred that the dispersing agent is contained into the azo compound dissolved solution. The dispersing agent has actions of (1) quickly being adsorbed to the surface of the precipitated pigment to form fine nanoparticles and (2) preventing these particles from aggregating again.

As the dispersing agent, for example, an anionic, cationic, amphoteric or nonionic, low molecular or polymer dispersing agent may be used.

As for the polymer dispersing agent, the mass average molecular weight thereof is preferably 1,000 to 500,000, more preferably 10,000 to 500,000, and particularly preferably 10,000 to 100,000.

Specific examples thereof include polyvinylpyrrolidone, polyvinyl alcohol, polyvinyl methyl ether, polyethylene glycol, polypropylene glycol, polyacrylamide, a vinyl alcohol-vinyl acetate copolymer, partially formalised polyvinyl alcohol, partially butyralized polyvinyl alcohol, a vinylpyrrolidone-vinyl acetate copolymer, a polyethylene oxide/propylene oxide block copolymer, polyacrylate, polyvinyl sulfate, poly(4-vinylpyridine) salt, polyamide, polyallylamine salt, condensed naphthalenesulfonate, a cellulose derivative, a starch derivative and the like. In addition, natural polymers such as alginate, gelatin, albumin, casein, gum arabic, gum and lignin sulfonate may also be used. Among them, polyvinylpyrrolidone is preferred. These polymer compounds may be used either alone or in combination of two or more thereof, and may also be used by combining a low molecular dispersing agent. The dispersing agent used for dispersion of a pigment is described in detail in "Dispersion Stabilization of Pigment and Surface Treatment Technique Evaluation" (Japan Association for International Chemical Information, published on December 2001), pp. 29 to 46.

Examples of the anionic dispersing agent (anionic surfactant) include an N-acyl-N-alkyltaurine salt, a fatty acid salt, an alkylsulfonic ester salt, alkylbenzenesulfonate, alkylnaphthalenesulfonate, dialkylsulfosuccinate, an alkylphosphonic ester salt, a naphthalenesulfonic acid-formalin condensate, a polyoxyethylene alkylsulfonic ester salt and the like. Among them, an N-acyl-N-alkyltaurine salt is preferred. As the N-acyl-N-alkyltaurine salt, those described in Japanese Patent Application Laid-Open No. H3-273067 are preferred. These anionic dispersing agents may be used either alone or in combination of two or more kinds thereof.

Examples of the cationic dispersing agent (cationic surfactant) include a quaternary ammonium salt, alkoxylated polyamine, aliphatic amine polyglycol ether, aliphatic amine, diamine or polyamine derived from aliphatic amine and aliphatic alcohol, imidazoline derived from aliphatic acid, and salts of these cationic substances. These cationic dispersing agents may be used either alone or in combination of two or more kinds thereof.

The amphoteric dispersing agent is a dispersing agent having, in the molecule thereof, both an anionic group moiety that is contained in the molecule of the anionic dispersing agent, and a cationic group moiety that is contained in the molecule of the cationic dispersing agent.

Examples of the nonionic dispersing agent (nonionic surfactant) include polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and the like. Among them, polyoxyethylene alkylaryl ether is preferred. These nonionic dispersing agents may be used either alone or in combination of two or more kinds thereof.

The content of the dispersing agent is preferably 0.1 parts by mass to 1,000 parts by mass, more preferably 1 part by mass to 500 parts by mass, and still more preferably 5 parts by mass to 200 parts by mass, based on 100 parts by mass of the pigment. Further, the dispersing agents may be used either alone or in combination of a plurality thereof.

In the aspect of the present invention, the azo compound dissolved solution obtained in process (b) is in a state where the azo compound is completely dissolved in a reaction solution, and it is preferred that an alcohol having 1 to 3 carbon atoms, preferably methanol is mixed as a poor solvent with the azo compound dissolved solution. A finally desired η-type crystal form azo pigment having a small particle diameter may be efficiently obtained by preparing a crude azo pigment by the aspect.

By the aforementioned preparation method, the compound represented by Formula (1) is obtained as a crude azo pigment. As a method of obtaining an azo pigment in the form of crystal, a post-treatment is preferably performed. Examples of the method of this post-treatment include a process of controlling the pigment particle by a grinding treatment such as solvent salt milling, salt milling, dry milling, solvent milling and acid pasting, a solvent heating treatment and the like.

For example, an amorphous azo pigment is precipitated by mixing the azo compound dissolved solution obtained in process (b) with methanol as a poor solvent, and an η-type crystal form azo pigment may be obtained by subjecting the amorphous azo pigment to crystal transformation.

A ζ-type crystal form azo pigment is precipitated by mixing the azo compound dissolved solution obtained in process (b) with methanol as a poor solvent, and a crystal form azo pigment may also be obtained by subjecting the ζ-type crystal form azo pigment to crystal transformation.

Hereinafter, crystal transformation will be described.

The crystal transformation in the present invention indicates transforming the crystal form, and before transformation, even an amorphous form may have a crystal form different from the crystal form after transformation. Examples of the method of crystal transformation include the aforementioned post-treatment, a grinding treatment such as solvent salt milling, salt milling, dry milling, solvent milling and acid pasting and a solvent heating treatment are preferred, salt milling, solvent milling and a solvent heating treatment are more preferred, and a solvent heating treatment is particularly preferred.

According to the crystal transformation, a compound may be transformed from an amorphous state to a crystal form, and may also be transformed from one crystal form to another crystal form.

The method for preparing an azo pigment or a tautomer thereof represented by the following Formula (1), and having characteristic X-ray diffraction peaks at Bragg angles (2θ±0.2°) of 4.8°, 9.2° and 13.0° in the CuKα characteristic X-ray diffraction according to the present invention includes subjecting an azo compound or a tautomer thereof, which is represented by the following Formula (1), and has a characteristic X-ray diffraction peak at Bragg angles (2θ±0.2°) of any one of (i) 6.6°, 9.2° and 21.5° (ζ-type crystal form azo pigment)
(ii) 4.8°, 7.2° and 9.7° (δ-type crystal form azo pigment), and
(iii) 5.9°, 7.0° and 8.9° (γ-type crystal form azo pigment) in the CuKα characteristic X-ray diffraction, to solvent heating treatment, and then solvating the azo compound or the tautomer represented by heating.

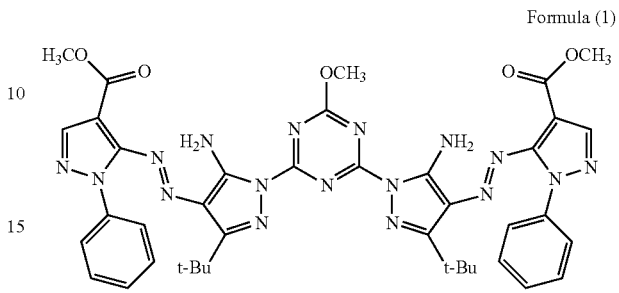

Formula (1)

(Solvent Heating Treatment)

The solvent heating treatment in the present invention specifically refers to heating and stirring an amorphous azo compound or a crystalline azo pigment represented by Formula (1) or a salt, hydrate or solvate thereof in a solvent.

A crystal transformation may be efficiently performed by the solvent heating treatment. For example, a δ-type crystal form azo pigment may be obtained by heating and stirring a solvate of an amorphous azo pigment.

An η-type crystal form azo pigment may be obtained by subjecting any one of a ζ-type crystal form azo pigment, a δ-type crystal form azo pigment and a γ-type crystal form azo pigment to solvent heating treatment.

Further, the ζ-type crystal form azo pigment may be obtained by the above-described preparation method. In addition, the γ-type crystal form azo pigment may be obtained by a preparation method to be described below.

As a solvent used for the solvent heating treatment, a solvent with an azo pigment represented by Formula (1) having low solubility therein after the crystal transformation is preferred from the viewpoint of suppressing the crystal growth.

As the solvent used when the ζ-type crystal form azo pigment and the γ-type crystal form azo pigment are subjected to crystal transformation into an η-type crystal form azo pigment, for example, a ketone-based compound, an aromatic-based compound and acetonitrile are preferred, and among them, examples thereof include a polar aprotic organic solvent such as acetone, methyl ethyl ketone, toluene, acetonitrile, N,N-dimethylformamide, N,N-dimethylacetamide and N-methyl-2-pyrrolidone, or a mixture thereof, and among them, acetone, methyl ethyl ketone, toluene, acetonitrile and N-methyl-2-pyrrolidone are preferred, N-methyl-2-pyrrolidone or acetone is more preferred, and acetone is still more preferred. An inorganic or organic acid or base may be further added to the solvent exemplified above, and the solvent may be a mixed solvent with another solvent (for example, an alcohol-based organic solvent such as methanol, ethanol, 2-propanol and t-butyl alcohol).

The amount of the solvent used in the solvent heating treatment is preferably 1 time to 100 times, more preferably 5 times to 50 times, and still more preferably 8 times to 30 times based on the amount of the amorphous azo compound represented by Formula (1). When the amount is less than 1 time, stirrability may not be secured, which is not preferred. In addition, when the amount is more than 100 times, productivity deteriorates, and economic efficiency deteriorates, which is not preferred.

The temperature of heating and stirring in the solvent heating treatment varies depending on the size of the primary particle diameter of a desired pigment, but is preferably 15° C. to 150° C., more preferably 20° C. to 120° C., and still more preferably 20° C. to 100° C. At a low temperature less than 15° C., it takes a long time for a crystal transformation to occur, which is not efficient. On the other hand, at a high temperature more than 150° C., a part of an azo pigment (1) is decomposed, which is not preferred. It is preferred that the solvent heating treatment is performed under reflux.

The stirring time for crystal transformation is not particularly limited as long as the crystal transformation is occurring, but is preferably 5 minutes to 1,500 minutes, more preferably 10 minutes to 600 minutes, and still more preferably 30 minutes to 300 minutes. When the stirring time is shorter than 5 minutes, partially amorphous moieties are likely to remain, which is not preferred. On the other hand, when the stirring time is longer than 1,500 minutes, the time is inefficient, which is not preferred.

(Solvent Salt Milling)

Examples of the solvent salt milling include a method including placing, into a kneading machine, a crude azo pigment, an inorganic salt, and an organic solvent which does not dissolve it, and performing kneading and grinding therein. A water-soluble inorganic salt may be suitably used as the inorganic salt, and it is preferred that for example, an inorganic salt such as sodium chloride, potassium chloride and sodium sulfate is used. Furthermore, it is more preferred that an inorganic salt having an average particle diameter of 0.5 μm to 50 μm is used. The amount of the inorganic salt used is preferably 3 times by mass to 20 times by mass, and more preferably 5 times by mass to 15 times by mass based on the amount of the crude azo pigment. An aqueous organic solvent may be suitably used as the organic solvent, and since the solvent may easily evaporate due to an increase in temperature at the time of kneading, a solvent having a high boiling temperature is preferred from the viewpoint of safety. Examples of the organic solvent include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, or a mixture thereof. The amount of the aqueous organic solvent used is preferably 0.1 times by mass to 5 times by mass based on the amount of the crude azo pigment. The kneading temperature is preferably 20° C. to 130° C. and particularly preferably 40° C. to 110° C. As the kneading machine, for example, a kneader, a mix Muller and the like may be used.

The η-type crystal form azo pigment represented by Formula (1) according to the present invention may be further subjected to post-treatment, and may be subjected to surface treatment with, for example, a resin, a surfactant, a dispersing agent and the like.

The azo pigment represented by Formula (1) may also be prepared by the following method. That is, the azo pigment represented by Formula (1) may be prepared by modifying a heterocyclic amine represented by the following Formula (2) into diazonium, and subsequently performing a coupling reaction with a compound represented by the following Formula (3).

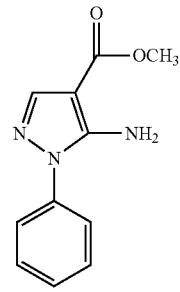

Formula (2)

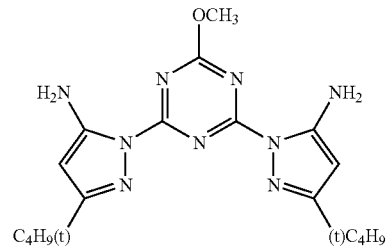

Formula (3)

The azo pigment of the present invention may be synthesized, for example, by performing an azo coupling reaction between a diazonium salt prepared by an already known method using the diazo component of Formula (2) and the coupling component of Formula (3).

The preparation and coupling reaction of the diazonium salt may be performed by a common method.

For the preparation of the diazonium salt of Formula (2), it is possible to apply, for example, a common method of adjusting a diazonium salt by using a nitrosonium ion source, for example, nitrous acid, nitrite of nitrosylsulfuric acid, in a reaction medium containing an acid (for example, hydrochloric acid, sulfuric acid, phosphoric acid, acetic acid, propionic acid, methanesulfonic acid, trifluoromethanesulfonic acid and the like).

More preferred examples of the acid include a case of using acetic acid, propionic acid, methanesulfonic acid, phosphoric acid and sulfuric acid either alone or in combination thereof, and among them, phosphoric acid or a combination use system of acetic acid and sulfuric acid is particularly preferred.

As preferred examples of the reaction medium (solvent), an organic acid and an inorganic acid are preferably used, and in particular, phosphoric acid, sulfuric acid, acetic acid, propionic acid and methanesulfonic acid are preferred, and among them, acetic acid and/or propionic acid are preferred.

As a preferred example of the nitrosonium ion source, it is stable to use nitrtosyl sulfuric acid in the aforementioned preferred reaction medium containing an acid, and further, the diazonium salt may be efficiently prepared.

The amount of the solvent used is preferably 0.5 times by mass to 50 times by mass, more preferably 1 time by mass to 20 times by mass, and particularly preferably 3 times by mass to 10 times by mass based on the amount of the diazo component of Formula (2).

In the present invention, the diazo component of Formula (2) may be in a state of being dispersed in a solvent, or in a state of a dissolved solution depending on the type of the diazo component.

The amount of the nitrosonium ion source used is preferably 0.95 equivalents to 5.0 equivalents, more preferably 1.00 equivalent to 3.00 equivalents, and particularly preferably 1.00 to 1.10 equivalents with respect to the diazo component.

The reaction temperature is preferably −15° C. to 30° C., more preferably −10° C. to 10° C., and still more preferably −5° C. to 5° C. At less than −10° C., the reaction rate is significantly slowed down, and a time for synthesis is significantly increased, which is not economical, and when the synthesis is performed at a high temperature more than 30° C., the amount of a side product produced is increased which is not preferred.

The reaction time is preferably 30 minutes to 300 minutes, more preferably 30 minutes to 200 minutes, and still more preferably 30 minutes to 150 minutes.

The coupling reaction may be performed in an acidic reaction medium to a basic reaction medium, but is preferably performed in an acidic to neutral reaction medium for the azo pigment of the present invention, and the components may be efficiently derived into the azo pigment by suppressing the decomposition of the diazonium salt particularly when the coupling reaction is performed in an acidic reaction medium.

As a preferred example of the reaction medium (solvent), an organic acid, an inorganic acid and an organic solvent may be used, and an organic solvent is particularly preferred, and a solvent causing no liquid separation phenomenon during reaction and providing a uniform solution with the solvent is preferred. Examples thereof include an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the solvent may be a glycol-based solvent having two or more hydroxyl groups, or an alcohol-based solvent having 3 or less carbon atoms, and preferably an alcohol solvent (for example, methanol and ethylene glycol) having 2 or less carbon atoms, in a solvent molecule. Furthermore, a mixed solvent of these solvents is also included in the organic solvent.

The amount of the solvent used is preferably 1 time by mass to 100 times by mass, more preferably 1 time by mass to 50 times by mass, and still more preferably 2 times by mass to 10 times by mass based on the amount of the coupling component represented by Formula (3).

In the present invention, the coupling component which forms Formula (1) may be in a state of being dispersed in a solvent, or in a state of a dissolved solution depending on the type of the coupling component.

For the amount of the coupling component used, the diazo component is preferably 0.95 equivalents to 5.0 equivalents, more preferably 1.00 equivalent to 3.00 equivalents, and particularly preferably 1.00 to 1.50 equivalents per the azo coupling moiety.

The reaction temperature is preferably −30° C. to 30° C., more preferably −15° C. to 10° C., and still more preferably −10° C. to 5° C. At less than −30° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

In the method of synthesizing an azo pigment according to the present invention, a product (crude azo pigment) obtained by these reactions may be treated by a typical post-treatment method of an organic synthesis reaction, and then used with or without purification.

That is, for example, a product isolated from the reaction system may be used without purification or by performing a purification operation such as recrystallization and salt formation either alone or in combination.

Further, after the reaction is completed, the reaction solvent may or may not be removed by distillation, the reaction solution may or may not be neutralized by pouring the reaction solvent in water or ice, and the product isolated or extracted with an organic solvent/aqueous solution may be used without purification or after performing a purification operation such as recrystallization, crystallization and salt formation either alone or in combination.

The synthesizing method of an azo pigment of the present invention will be described in more detail.

As the method for preparing an azo pigment according to the present invention, in a coupling reaction between a diazonium compound obtained by modifying the heterocyclic amine represented by Formula (2) into diazonium and the compound represented by Formula (3), it is preferred that the compound of Formula (3) is dissolved in an organic solvent, and then subjected to coupling reaction.

The reaction of modifying the heterocyclic amine represented by Formula (2) into diazonium may be performed, for example, by reacting the heterocyclic amine with a reagent such as sodium nitrite and nitrosylsulfuric acid in an acidic solvent such as sulfuric acid, phosphoric acid and acetic acid at a temperature of 15° C. or less for approximately 10 minutes to 6 hours. It is preferred that the coupling reaction is performed by reacting a diazonium salt obtained by the above-described method and the compound represented by Formula (3) at 40° C. or less, preferably 15° C. or less for approximately 10 minutes to 12 hours.

The tautomerism and/or crystalline polymorphism described above may be controlled by the preparation conditions during the coupling reaction. As the method of preparing the η-type crystal, for example, it is preferred to use the method of the present invention including dissolving the compound represented by Formula (3) one time in an organic solvent, and then performing the coupling reaction. Examples of the organic solvent which may be used in this case include an alcohol solvent. As an example of the alcohol solvent, methanol, ethanol, isopropanol, ethylene glycol, diethylene glycol and the like are preferred, and among them, methanol is particularly preferred.

Another method for preparing an azo pigment includes, in a coupling reaction between a diazonium compound obtained by modifying the heterocyclic amine represented by Formula (2) into diazonium and the compound represented by Formula (3), performing the coupling reaction in the presence of a polar aprotic solvent.

The η-type crystal may be efficiently prepared even by the method of performing the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, a mixed solvent thereof and the like. When these solvents are used, the compound of Formula (3) may or may not be completely dissolved in the solvent.

By the aforementioned preparation method, the compound represented by Formula (1) is obtained as a crude azo pigment, and when the compound is used as the pigment of the present invention, a post-treatment is preferably performed.

Examples of the method of this post-treatment include a process of controlling the pigment particle by a grinding treatment such as solvent salt milling, salt milling, dry milling, solvent milling and acid pasting, by a solvent heating treatment, and the like, and a process of performing a surface treatment with a resin, a surfactant, a dispersing agent and the like.

It is preferred that the compound represented by Formula (1) of the present invention is subjected to solvent heating treatment and/or solvent salt milling as the post-treatment.

The method and conditions of the solvent heating treatment and the solvent salt milling are the same as those described above.

[Pigment Dispersion]

A pigment dispersion of the present invention includes at least one of the azo pigment and the tautomer thereof of the present invention. Accordingly, a pigment dispersion having excellent color characteristics, durability and dispersion stability may be prepared.

The pigment dispersion of the present invention may be aqueous or non-aqueous, but is preferably an aqueous pigment dispersion. As an aqueous liquid for dispersing the pigment in the aqueous pigment dispersion of the present invention, it is possible to use a mixture including water as a major component and, as desired, a hydrophilic organic solvent added. Examples of the hydrophilic organic solvent include alcohols such as methanol, ethanol, propanol, isopropanol, butanol, isobutanol, sec-butanol, t-butanol, pentanol, hexanol, cyclohexanol and benzylalcohol, polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol, a glycol derivative such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, and ethylene glycol monophenyl ether, amine such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone and the like.

In addition, the aqueous pigment dispersion of the present invention may include an aqueous resin. Examples of the aqueous resin include a water-soluble resin which is dissolved in water, a water-dispersible resin which is dispersed in water, a colloidal dispersion resin or a mixture thereof. Specific examples of the aqueous resin include acryl-based resins, styrene-acryl-based resins, polyester-based resins, polyamide-based resins, polyurethane-based resins, fluorine-based resins and the like.

The dispersing agent in the present invention may be arbitrarily selected among low molecular and polymer, and water-soluble and water-insoluble dispersing agents, and a polymer dispersing agent is preferred from the viewpoint of image quality of a printed matter. Furthermore, since dispersion is performed with an aqueous dispersing agent, water-soluble dispersing agent is preferred from the viewpoint of dispersibility and dispersion stability. The dispersing agent in the present invention is particularly preferably a water-soluble polymer.

Further, the "dispersing agent" in the present invention also means a dispersing agent in a state of being cross-linked by a crosslinking agent. In the pigment dispersion of the present invention, it is preferred that the dispersing agent is adsorbed to a pigment.

Since the dispersing agent has an effect due to electric charge repulsion in the molecule thereof, it is preferred that the dispersing agent has one or more, preferably ten or more carboxyl groups from the viewpoint of storage stability of dispersions. When the crosslinking agent has two epoxy groups, the number of carboxyl groups is decreased because an expoxy group is cross-linked with a carboxyl group by a crosslinking reaction, and therefore, it is preferred that polymer has ten or more carboxyl groups.

The carboxyl group in the polymer may be either an acid (—COOH) form or a salt form. Examples of the salt include a metal ion, ammonium, substituted ammonium, quaternary ammonium, a pyridinium salt or the like. The salt is preferably a metal ion and ammonium, and more preferably a potassium ion and a sodium ion.

The polymer dispersing agent of the present invention includes polyurethane, polyester and polyvinyl, and polyurethane, polyester and polyvinyl are more preferred, and polyvinyl (vinyl polymer) is most preferred. In the present invention, two or more polymers may be combined.

The introduction of a carboxyl group into the polymer is obtained by copolymerization of monomers including at least one carboxyl group. In a preferred polyvinyl, itaconic acid, maleic acid, fumaric acid, crotonic acid, methacrylic acid, acrylic acid and η-carboxyethyl acrylate are used as a monomer, and methacrylic acid, acrylic acid and β-carboxyethyl acrylate are preferably used.

A carboxyl group in the polymer has an action of crosslinking with a crosslinkable group in a crosslinking agent in the first place. Examples of the crosslinkable group include acid anhydride and an epoxy group, and an epoxy group is particularly preferred. The reason is that due to high reactivity, an epoxy group may crosslink with the crosslinkable group under mild conditions. In addition, an unreacted carboxyl group is effective in stability to sedimentation and aggregation of a final fine particle dispersion. A carboxyl group is effective as a stable group in a polar solvent, particularly a water solvent. When a carboxyl group is the only group which contributes to stability in a pigment dispersion, stability of the dispersion significantly deteriorates when all the carboxyl groups are cross-linked with the crosslinking agent. For that reason, it is preferred that a molar excess of a carboxyl group is maintained with respect to an epoxy group such that an unreacted carboxyl group is to remain after the crosslinking reaction is completed, and the carboxyl group with respect to the epoxy group is preferably 30:1 to 1:1, more preferably 25:1 to 1.1:1, and particularly preferably 20:1 to 2:1 by molar ratio.

The polymer may have another stable group. The selection and amount of the stable group depends greatly on the nature of the solvent. The stable group actually depends on whether the solvent is hydrophilic (for example, a polar solvent) or hydrophobic (for example, a non-polar solvent).

A preferred polymer dispersing agent is obtained from both a hydrophilic monomer and a hydrophobic monomer.

The hydrophilic monomer is a monomer including hydrophilicity, which is an ionic group or a non-ionic group. The ionic group may be a cation, but is preferably an anion. Both a cationic group and an anionic group impart amphoteric stabilisation to the dispersing agent. A preferred anionic group is a group (may be a salt) of phenoxy, sulfonic acid, sulfuric acid, phosphonic acid, polyphosphoric acid and phosphoric acid. A preferred cationic group is quaternary ammonium, benzalkonium, guanidine, biguanidine and pyridinium. These cationic groups may be in the form of a salt such as hydroxide, sulfate, nitrate, chloride, bromide, iodide and fluoride. A preferred non-ionic group is glucoside, sugars, pyrrolidone, acrylamide and particularly a hydroxyl group and a poly(alkyleneoxide) group, more preferably a poly(ethyleneoxide) group or poly(propyleneoxide) group, and particularly —$(CH_2CH_2O)_n$H or —$(CH_2CH_2O)_n C_{1-4}$-alkyl. Here, n indicates 3 to 200 (preferably 4 to 20). Hereinafter, for example, the expression of $C_{1-4}$-indicates "1 to 4 carbon atoms". The polymer may include only a non-ionic group, a plurality of non-ionic groups throughout the polymer, and one or more polymer chains including a non-ionic group. A hydroxyl group is incorporated using polyvinyl alcohol, polyhydroxy-functional acrylic resin and cellulose. An ethyleneoxy group is incorporated using a polymer chain such as polyethylene oxide.

A hydrophobic monomer is a monomer including a hydrophobic group. Representative monomers having a hydrophobic group are hydrocarbons, fluorocarbons, poly $C_{3-4}$ alkyleneoxy and alkyl siloxanes, which have three or less hydrophilic groups, preferably no hydrophilic group. The hydrophobic group is preferably a $C_{3-50}$ chain, and may have propyleneoxide at the side chain or the straight chain in the hydrophobic monomer.

The polymer may be a homopolymer, but is preferably a copolymer. The polymer includes a random polymer (statistically short blocks or segments), but preferably includes a graft polymer (long blocks or segments). Furthermore, the polymer may be an alternating polymer. The polymer may be branched, but is preferably a straight chain. The polymer may have two or more segments (for example, block and graft, copolymers), but may preferably have a random segments.

In an aspect in which the polymer has two or more segments, it is preferred that at least one segment is hydrophobic and at least one segment is hydrophilic relative to each other. A preferred method for making hydrophilic and hydrophobic segments is by the copolymerization of hydrophilic and hydrophobic monomers, respectively. In the case where the polymer has at least one hydrophilic segment and at least one hydrophobic segment, the carboxyl group may be situated in the hydrophobic segment, in the hydrophilic segment, or in both segments.

A vinyl polymer (polyvinyl) may be prepared by an appropriate means. A preferred method for preparing a vinyl polymer is particularly a free radical polymerization using a vinyl polymer such as (meth)acrylate and vinyl naphthalene (particularly, a styrene monomer). An appropriate free radical polymerization is not limited to a suspension polymerization, a solution polymerization, a dispersion polymerization and an emulsion polymerization, but is preferably a solution polymerization.

For the vinyl polymer, a case of using a (meth)acrylate monomer is preferred.

The vinyl polymer is preferably a copolymer.

A copolyvinyl dispersing agent derived from a hydrophobic monomer and a hydrophilic monomer preferably has substantially no segment. For example, the copolyvinyl polymer is prepared by a free radical polymerization in which the segment has a very short length or is not present. In this case, the free radical polymerization is frequently referred to as a "random" polymerization. The copolyvinyl polymer having a segment is prepared by a polymerization method such as a living polymerization, particularly, an atomic group transfer polymerization, an atom transfer polymerization, a macromonomer polymerization, a graft polymerization and an anionic or cationic polymerization. A suitable hydrophilic vinyl monomer is a non-ionic monomer and an ionic monomer. A preferred non-ionic monomer is sugars, glucose, amide and pyrrolidone, particularly a non-ionic monomer having a hydroxyl group and an ethoxy group. Examples of the preferred non-ionic monomer include hydroxyethyl acrylate, hydroxyethyl methacrylate, vinyl pyrrolidone, ethoxylated (meth)acrylate and (meth)acrylamide. A suitable ionic vinyl monomer may be cationic, but is preferably anionic.

A preferred anionic vinyl monomer is an anionic vinyl monomer including a carboxyl group and/or a phosphoric acid group and/or a sulfonic acid group (these acids may be free or salts). Preferred examples thereof include (meth)acrylic acid, styrenesulfonic acid, vinylbenzylsulfonic acid, vinylsulfonic acid, (meth)acryloyloxyalkylsulfonic acid (for example, acryloyloxymethylsulfonic acid, acryloyloxyethylsulfonic acid, acryloyloxypropylsulfonic acid, acryloyloxybutylsulfonic acid, methacryloyloxymethylsulfonic acid, methacryloyloxyethylsulfonic acid, methacryloyloxypropylsulfonic acid and methacryloyloxybutylsulfonic acid), 2-acrylamido-2-alkyl alkane sulfonic acid (for example, 2-acrylamido-2-methyl ethane sulfonic acid, 2-acrylamido-2-methylpropanesulfonic acid, 2-acrylamido-2-methylbutanesulfonic acid), 2-methacrylamido-2-alkyl alkane sulfonic acid (for, example, 2-methacrylamido-2-methyl ethane sulfonic acid, 2-methacrylamido-2-methyl propane sulfonic acid and 2-methacrylamido-2-methyl butane sulfonic acid), mono-(acryloyloxyalkyl)phosphate (for example, mono-(acryloyloxyethyl)phosphate and mono-(3-acryloyloxypropyl)phosphate), mono-(methacryloyloxy alkyl)phosphate (for example, mono-(methacryloyloxy ethyl)phosphate and mono-(3-methacryloyloxy propyl)phosphate).

A preferred cationic vinyl momer is a cationic vinyl monomer including a quaternary amine group, a pyridine group, a guanidine group and a biguanidine group.

A preferred hydrophobic vinyl monomer has no hydrophilic group. Examples of the preferred hydrophobic vinyl monomer include $C_{1-20}$-hydrocarbyl (meth)acrylates, butadiene, styrene and vinyl naphthalene, $C_{1-20}$-hydrocarbyl (meth)acrylates (for example, methyl(meth)acrylate, butyl(meth)acrylate, octyl(meth)acrylate, 2-ethyl hexyl(meth)acrylate, isobornyl acrylate, lauryl acrylate, stearyl acrylate, benzyl (meth)acrylate and phenoxy ethyl(meth)acrylate) are preferred, and methyl methacrylate, benzyl methacrylate, 2-ethyl hexyl methacrylate, phenoxy ethyl methacrylate are particularly preferred. These hydrocarbyl groups may be branched, but are preferably straight chains.

Polyester having at least one carboxyl group is also produced by reaction of a diol monomer and an excessive amount of a dicarboxylic acid monomer. A carboxyl group may also be introduced by copolymerization of a diol having a carboxyl group and a dicarboxylic acid monomer.

Polyester is typically prepared by esterification of a dicarboxylic acid and a diol.

Polyester having a carboxyl group may be prepared by performing a dehydration condensation reaction of a carboxyl group-containing compound with a hydroxyl group-containing compound by a publicly known method such as a melting method and a solvent method such that the carboxyl group remains.

Examples of the polyester include polyester obtained by appropriately selecting a compound having a carboxyl group, such as monobasic acid and polybasic acid and a compound having a hydroxyl group, such as diol and polyol and dehydration condensation of the compounds, and polyester obtained by using oils and fats or fatty acids will be an alkyd resin.

The carboxyl group, which the polyester used in the present invention has, is an unreacted carboxyl group usually derived from polybasic acid of dibasic or more acid which constitutes polyester.

Examples of the polybasic acid include adipic acid, (anhydrous) succinic acid, sebacic acid, dimmer acid, (anhydrous) maleic acid, (anhydrous) phthalic acid, isophthalic acid, terephthalic acid, tetrahydro (anhydrous) phthalic acid, hexahydro (anhydrous) phthalic acid, hexahydroterephalic acid, 2,6-naphthalenedicarboxylic acid, (anhydrous) trimellitic acid, (anhydrous) pyromellitic acid and the like.

Examples of a compound having a carboxyl group which may be used other than the polybasic acid include: lower alkyl etsers of acids such as dimethyl terephthalate; monobasic acids such as benzoic acid, p-tertiary butylbenzoic acid, rosin and hydrogenated rosin; fatty acids and oils and fats; macromonomers having one or two carboxyl groups at a molecular end; 5-sodium sulfoisophthalic acid and dimethyl esters thereof; and the like.

Examples of a compound having a hydroxyl group include: diols such as ethylene glycol, neopentyl glycol, propylene glycol, diethylene glycol, dipropylene glycol, 2-methyl-1,3-propanediol, 2,2-diethyl-1,3-propanediol, 1,4-butanediol, 1,3-propanediol, 1,6-hexanediol, 1,4-cyclohexanedimethanol, 1,5-pentanediol, an alkylene oxide adduct of bisphenol A, hydrogenated bisphenol A, an alkylene oxide adduct of hydrogenated bisphenol A, polyethylene glycol, polypropylene glycol and polytetramethylene glycol; polyols such as glycerin, trimethylol propane, trimethylol ethane, diglycerin, pentaerythritol and trishydroxyethylisocyanurate; monoglycidyl compounds such as "Cardura E-10" (glycidyl ester of a synthetic fatty acid manufactured by Shell Chemicals Co., Ltd.); macromonomers having two hydroxyl groups at one molecular end, and the like.

Further, when polyester is synthesized, it is also possible to use fatty acids or oils and fats containing a hydroxyl group, such as castor oil and 12-hydroxystearic acid; a compound having a carboxyl group such as dimethylolpropionic acid, p-hydroxybenzoic acid and ε-caprolactone, and a hydroxyl group, and the like.

In addition, a part of the dibasic acid may also be replaced with a diisocyante compound.

Furthermore, the polyester having a carboxyl group may also be prepared by a method of addition-reacting a hydrous acid such as anhydrous maleic acid, anhydrous phthalic acid, tetrahydro anhydrous phthalic acid, hexahydro anhydrous phthalic acid and anhydrous trimellitic acid with polyester having a hydroxyl group.

The polyester having a hydroxyl group and a carboxyl group may be easily prepared by, for example, reacting the compounds according to a publicly known method in a dehydration condensation reaction of the polyester resin such that the hydroxyl group and the carboxyl group remain.

Polyester having a tertiary amino group and a carboxyl group may be easily prepared by, for example, using a tertiary amino group such as triethanolamine, N-methyldiethanolamine and N,N-dimethyletanolamine and a compound having a hydroxyl group as alcohol components when the polyester resin is prepared.

Polyester having a radical polymerizable unsaturated group and a carboxyl group may be easily prepared by, for example, [1] a method of addition-reacting an anhydrous acid having radical polymerizable unsaturated group-containing monomers having an isocyanate group such as 2-methacryloyloxyethyl isocyanate, or an hydrous acid having a radical polymerizable unsaturated group, such as anhydrous maleic acid with polyester having a hydroxyl group and a carboxyl group, [2] a method of addition-reacting polymerizable monomers having an epoxy group with a polyester resin having a carboxyl group, [3] a method of synthesizing a polyester resin using a radical polymerizable unsaturated group-containing monomer such as anhydrous maleic acid as an acid component, or the like.

Polyurethane is preferably prepared by a condensation reaction of a polyol component (for example, di-isocyanate) with a polyol component (for example, diol).

Polyurethane having a carboxyl group may be easily prepared by, for example, reacting a polyol component containing a compound having a carboxyl group and a hydroxyl group, such as dimethylol propionic acid as a component of introducing a carboxyl group with a polyisocyanate component.

As the polyol component, a trifunctional or more polyol compound may also be used if necessary, in addition to a diol component exemplified in the method of preparing polyester.

As the polyisocyanate component, for example, a polyisocyanate compound such as polymethylene polyphenyl isocyanate may also be used in addition to a diisocyante compound such as 2,4-tolylenediisocyanate, 2,6-tolylenediisocyanate, 4,4'-diphenylmethanediisocyanate, hexamethylenediisocyanate, phenylene diisocyanate, 1,5-naphthalene diisocyante, methaxylene diisocyanate, isophorone diisocyanate, hydrogenated tolylene diisocyante, hydrogenated 4,4'-diphenylmethnae diisocyanate, hydrogenated methaxylene diisocyanate and crude 4,4'-diphenylmethane diisocyanate.

Polyurethane is prepared according to a typical method. For example, it is preferred that an addition reaction is performed in an inert organic solvent solution which is not reacted with an isocyanate group at room temperature or a temperature approximately from 40° C. to 100° C. At that time, a publicly known catalyst such as dibutyltin dilaurate may be used.

In a reaction system when polyurethane is prepared, it is also possible to use a publicly known chain extender such as N-alkyl dialkanolamine such as diamine, polyamine and N-methyldiethanolamine; a dihydrazide compound; and the like.

Polyurethane having a hydroxyl group and a carboxyl group may be easily prepared by, for example, performing a reaction at a ratio which increases the number of hydroxyl groups more than that of isocyanate groups when the polyurethane is prepared. Alternatively, the polyurethane having a hydroxyl group and a carboxyl group may also be easily prepared by addition-reacting a compound having two or more hydroxyl groups in a molecule thereof with a polyisocyanate having a carboxyl group and a terminal isocyanate group.

Polyurethane having a tertiary amino group and a carboxyl group may be easily prepared by, for example, using N-alkyl dialkanolamine such as N-methyl diethanolamine as a part of the polyol component.

Polyurethane having a blocked isocyanate group and a carboxyl group may be easily prepared by, for example, addition-reacting a publicly known blocking agent with a polyisocyanate having a carboxyl group and a terminal isocyanate group.

Polyurethane having an epoxy group and a carboxyl group may be easily prepared by, for example, addition-reacting a compound having a hydroxyl group and an epoxy group with a polyisocyanate having a carboxyl group and a terminal isocyanate group.

Examples of the compound having a hydroxyl group and an epoxy group include glycidol, glycerin diglycidyl ether, trimethylolpropane diglycidyl ether, diglycidyl ether of bisphenol A and the like.

Polyurethane having a radical polymerizable unsaturated group and a carboxyl group as an acidic group may be easily prepared by, for example, a method of addition-reacting polymerizable monomers having a hydroxyl group as described above and a compound having a hydroxyl group such as glycerol mono(meth)acrylate, trimethylolpropanedi(meth)acrylate and pentaerythritol triacrylate and a radical polymerizable unsaturated group with a polyisocyanate having a terminal isocyanate group.

Polyurethane having a hydrolyzable alkoxysilane group and a carboxyl group as an acidic group may be easily prepared by, for example, a method of addition-reacting a silane coupling agent having an active hydrogen, which may be reacted with an isocyanate group such as γ-mercaptopropyl trimethoxysilane, γ-mercaptopropyl methyldimethoxysilane, γ-aminopropyl trimethoxysilane and γ-aminopropyl triethoxysilane with a polyisocyanate having a terminal isocyanate group.

Polymer is selected so as to be suitable for a liquid medium used while a fine particle dispersion is prepared, and to be suitable for a liquid vehicle in a final composition (for example, an ink) used in the fine particle dispersion. For example, when the fine particle dispersion is used in an aqueous inkjet recording ink, the polymer is preferably hydrophilic.

[Molecular Weight]

The weight average molecular weight of the dispersing agent is preferably 10,000 to 200,000, more preferably 15,000 to 150,000, and among them, still more preferably 20,000 to 100,000. When the weight average molecular weight thereof is 10,000 or more, the image quality of a printed matter is excellent, which is preferred, but on the other hand, when the weight average molecular weight thereof is 200,000 or less, it is possible to suppress the viscosity from increasing, thereby further preventing a deterioration in storage stability, which is preferred.

[D/P Value]

The content of the dispersing agent is preferably 20 parts by mass to 100 parts by mass, more preferably 25 part by mass to 90 parts by mass, and still more preferably 30 parts by mass to 70 parts by mass, based on 100 parts by mass of the pigment. Further, the dispersing agents may be used either alone or in combination of a plurality thereof.

When the content of the dispersing agent is less than 20 parts by mass, the amount of the dispersing agent is insufficient with respect to the pigment, and thus storage stability becomes insufficient. On the other hand, when the content exceeds 100 parts by mass, the viscosity is increased, and thus the storage stability further deteriorates, which is not suitable.

When the ratio of the content D and the content P is defined as a D/P value in which the content of the coloring agent and the content of the dispersing agent in the pigment dispersion are designated as P and D, respectively, the D/P value is preferably 0.15 to 1.0, more preferably 0.16 to 0.8, and still more preferably 0.17 to 0.7.

[Acid Value]

The dispersing agent needs to have a sufficient acid value in order to be cross-linked with a crosslinking agent, and preferably has an acid value of at least 50 mgKOH/g.

In the all aspects, the aforementioned acid value is preferably 70 mgKOH/g to 200 mgKOH/g, and more preferably 70 mgKOH/g to 160 mgKOH/g. A dispersing agent having the acid value imparts an improved storage stability.

In addition, when the acid value is less than 50 mgKOH/g, the acid value is not suitable due to low solubility in an aqueous solvent.

[Solubility]

The dispersing agent may be water-insoluble or water-soluble, but the solubility in water is preferably 1 g/100 mL or more, more preferably 3 g/100 mL or more, and particularly preferably 5 g/100 mL or more.

When the solubility in water is less than 1 g/(100 μm)L, it is difficult for the dispersing agent to be adsorbed to pigment particles due to low solubility in water, and dispersibility may deteriorate in some cases.

[Crosslinkage]

It is preferred that the aqueous dispersion is cross-linked by a crosslinking agent.

In a more preferred embodiment of the present invention, the dispersion agent is adsorbed to the surface of the pigment before being cross-linked and a relatively stable dispersion is formed, and after the dispersion process, it is possible to obtain a dispersion having a higher level of storage stability and excellent image quality of a printed matter by performing a process of obtaining crosslinking by using a crosslinking agent.

When a dispersing agent having an acid value of at least 50 mg/KOH is used, the crosslinking agent may or may not have an oligomer dispersion group. The term "oligomer" is used to mean that there is no upper limit on the molecular weight, and also, there is no upper limit on the repeating unit. A crosslinking agent having one or more oligomer dispersion groups increases storage stability of a fine particle dispersion produced. The increased stability is particularly useful in a liquid vehicle used in the inkjet recording. The reason is that it is difficult to achieve dispersion in a dispersion having an acid value of 50 mg/KOH or less.

The oligomer dispersion group is preferably polyalkylene oxide, more preferably poly $C_{2-4}$-alkylene oxide, and particularly preferably polyethylene oxide. The polyalkylene oxide improves stability of the fine particle dispersion produced. The polyalkylene oxide has preferably an alkylene oxide repeating units of 3 to 200, more preferably 5 to 50, and particularly preferably 5 to 20.

It is preferred that the crosslinking agent has two or more epoxy groups. A preferred crosslinking agent having at least two epoxy groups is an epichlorohydrin derivative. Examples of a crosslinking agent having two or more epoxy groups and no oligomer dispersion group include ethylene glycol diglycidyl ether, resorcinol diglycidyl ether, neopentyl glycol diglycidyl ether, 1,6-hexanediol diglycidyl ether, hydrogenated bisphenol A diglycidyl ether, trimethylolpropane polyglycidyl ether, polyglycerol polyglycidyl ether, glycerol polyglycidyl ether, pentaerythritol polyglycidyl ether, diglycerol polyglycidyl ether, sorbitol polyglycidyl ether and polybutadiene diglycidyl ether. A preferred crosslinking agent having two epoxy groups and one or more oligomer dispersion groups is diethylene glycol diglycidyl ether, polyethylene glycol diglycidyl ether or dipropylene glycol diglycidyl ether.

Furthermore, an acid anhydride such as phthalic anhydride and succinic anhydride may also be used as a crosslinking agent.

[Temperature, pH]

The crosslinking reaction in the present invention is performed preferably at 100° C. or less and a pH of 6 or more. A more preferred crosslinking reaction is performed at 30° C. to 90° C., and an still more preferred crosslinking reaction is performed at 40° C. to 85° C. A preferred pH of the crosslinking reaction is 7 to 10, and a more preferred pH of the crosslinking reaction is 8 to 9.5.

It is preferred that the crosslinking agent also includes a carboxyl group, and a crosslinking reaction between a carboxyl group and an epoxy group is performed at 100° C. or less and a pH of 6 or more.

Since the crosslinking reaction is performed in an aqueous system, the temperature is preferably 100° C. or less. On the contrary, a low temperature slows down the progress of the crosslinking reaction, and thus is not preferred, and the temperature is preferably 30° C. or more, and more preferably 40° C. or more.

When the pH is 10 or more, the polymer is likely to be hydrolyzed when heat is added to the crosslinking reaction. On the other hand, when the pH is 6 or less, the pigment dispersion is likely to cause aggregation and the reaction becomes unstable, which is not preferred.

[Membrane Purification]

A reverse osmosis membrane (NF membrane) and an ultrafiltration membrane (UF membrane) may be used in the membrane purification, and pressure may or may not be applied, but when pressure is applied, a time for purification is reduced, which is efficient. In the UF membrane, the cutoff molecular weight is preferably 10,000 to 150,000, and more preferably 20,000 to 100,000. When the cutoff molecular weight is less than 10,000, a time for purification is increased, which is inefficient. On the other hand, when the cutoff molecular weight exceeds 150,000, the dispersing agent is likely to flow out, which is not preferred.

Further, in order to enhance the dispersion of the pigment and the quality of the image, a surfactant and a dispersing agent may be used. Examples of the surfactant include anionic, non-ionic, cationic and amphoteric surfactants, and any surfactant may be used, but it is preferred that an anionic or non-ionic surfactant is used. Examples of the anionic surfactant include a fatty acid salt, an alkylsulfuric ester salt, alkylbenzenesulfonate, alkylnaphthalenesulfonate, dialkylsulfosuccinate, alkyldiaryl ether disulfonate, alkyl phosphate, polyoxyethylene alkyl ether sulfate, polyoxyethylene alkylaryl ether sulfate, a naphthalenesulfonic acid formalin condensate, a polyoxyethylene alkylphosphoric ester salt, glycerol borate fatty acid ester, polyoxyethylene glycerol fatty acid ester and the like.

Examples of the non-ionic surfactant include polyoxyethylene alkyl ether, polyoxyethylene alkylaryl ether, a polyoxyethylene oxypropylene block copolymer, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene alkylamine, fluorine-based and silicone-based surfactants, and the like.

A non-aqueous pigment dispersion is obtained by dispersing the pigment represented by Formula (1) in a non-aqueous vehicle. Examples of a resin used for the non-aqueous vehicle include a petroleum resin, casein, shellac, a rosin-modified maleic acid resin, a rosin-modified phenol resin, nitrocellulose, cellulose acetate butyrate, cyclized rubber, chlorinated rubber, oxidized rubber, hydrochlorinated rubber, a phenol resin, an alkyd resin, a polyester resin, an unsaturated polyester resin, an amino resin, an epoxy resin, a vinyl resin, vinyl chloride, a vinyl chloride-vinyl acetate copolymer, an acrylic resin, a methacrylic resin, a polyurethane resin, a silicone resin, a fluorine resin, a drying oil, a synthesized drying oil, a styrene/maleic acid resin, a styrene/acrylic resin, a polyamide resin, a polyimide resin, a benzoguanamine resin, a melamine resin, urea resin chlorinated polypropylene, a butyral resin, a vinylidene chloride resin and the like. A photocurable resin may be used as a non-aqueous vehicle.

In addition, examples of a solvent used in the non-aqueous vehicle include an aromatic solvent such as toluene, xylene and methoxybenzene, an acetic acid ester-based solvent such as ethyl acetate or butyl acetate, propylene glycol monomethyl ether acetate and propylene glycol monoethyl ether acetate, a propionate-based solvent such as ethoxyethyl propionate, an alcohol-based solvent such as methanol and ethanol, an ether-based solvent such as butyl cellosolve, propylene glycol monomethyl ether, diethylene glycol ethyl ether and diethylene glycol dimethyl ether, a ketone-based solvent such as methyl ethyl ketone, methyl isobutyl ketone and cyclohexanone, an aliphatic hydrocarbon-based solvent such as hexane, a nitrogen compound-based solvent such as N,N-dimethylformamide, γ-butyrolactam, N-methyl-2-pyrrolidone, aniline and pyridine, a lactone-based solvent such as γ-butyrolactone, a carbamic acid ester such as a 48:52 mixture of methyl carbamate and ethyl carbamate, and the like.

The pigment dispersion of the present invention is obtained by dispersing the aforementioned azo pigment and an aqueous or non-aqueous medium by means of a dispersing device. As the dispersing device, it is possible to use a simple stirrer, an impeller stirring system, an in-line stirring system, a mill system (for example, colloid mill, ball mill, sand mill, bead mill, attritor, roll mill, jet mill, paint shaker, agitator mill and the like), an ultrasonic system, and a high-pressure emulsion dispersion system (high-pressure homogenizer; specifically, as a commercially available device, Gaulin homogenizer, Microfluidizer, DeBEE 2000 and the like).

In the present invention, the volume average particle diameter of the pigment particles in the pigment dispersion is preferably 0.01 μm to 0.2 μm.

When the volume average particle diameter of the pigment particles in the pigment dispersion is 0.01 μm or more, stability of dispersions over time is enhanced, and it is difficult for the dispersion to be aggregated, which is preferred. Furthermore, when the volume average particle diameter of the particles is 0.2 μm or less, the optical concentration is increased, the concentration of a printed matter is increased, the color reproducibility of a mixed color portion such as red or green is enhanced, and the transparency is increased, and thus it is difficult for clogging at a nozzle to occur during printing in an inkjet and the like, which is preferred.

Meanwhile, the volume average particle diameter of the pigment particles indicates the particle diameter of the pigment itself, or when an additive such as a dispersing agent is attached to a color material, the particle diameter of the particle to which the additive is attached. In the present invention, a Nanotrac UPA particle size distribution analyzer (UPA-EX150, manufactured by Nikkiso Co., Ltd.) may be used in a device for measuring the volume average particle diameter of the pigment particles. The measurement may be performed according to a predetermined measurement method after placing 3 ml of a pigment dispersion in a measurement cell. Meanwhile, as for the parameter input during the measurement, the ink viscosity is used for the viscosity, and the density of the pigment is used for the density of dispersed particles.

[Volume Average Particle Diameter of α-Type Crystal Form Azo Pigment]

A more preferred volume average particle diameter is 20 nm to 250 nm, more preferably 30 nm to 200 nm, and among them, particularly most preferably 50 nm to 150 nm.

[Volume Average Particle Diameter of β-Type Crystal Form Azo Pigment]

A more preferred volume average particle diameter is 20 nm to 250 nm, more preferably 30 nm to 200 nm, and among them, particularly most preferably 50 nm to 150 nm.

[Volume Average Particle Diameter of γ-Type Crystal Form Azo Pigment]

A more preferred volume average particle diameter is 20 nm to 150 nm, more preferably 30 nm to 130 nm, and among them, particularly most preferably 50 nm to 100 nm.

[Volume Average Particle Diameter of δ-Type Crystal Form Azo Pigment]

A more preferred volume average particle diameter is 20 nm to 150 nm, more preferably 30 nm to 130 nm, and among them, particularly most preferably 50 nm to 100 nm.

In order to set the volume average particle diameter of the δ-type crystal form azo pigment particles to the aforementioned range, for example, the following method may be used. It is possible to prepare the δ-type crystal form azo pigment having a volume average particle diameter in a range of 0.06 μm to 0.10 μm (60 nm to 100 nm) by mixing 0.25 part of the azo pigment, 0.05 part of sodium oleate, 0.5 parts of glycerin and 4.2 parts of water, and dispersing the mixture together with 10 parts of a zirconia bead having a diameter of 0.1 mm by means of a planetary ball mill at 300 revolutions per minute for 1 hour and 30 minutes. Furthermore, it is possible to prepare the δ-type crystal form azo pigment having a volume average particle diameter in a range of 0.04 μm to 0.07 μm (40 nm to 70 nm) by performing dispersion for 3 hours. Further, it is possible to prepare the δ-type crystal form azo pigment having a volume average particle diameter in a range of 0.03 μm to 0.06 μm (30 nm to 60 nm) by performing dispersion for 4 hours.

[Volume Average Particle Diameter of ε-Type Crystal Form Azo Pigment]

A more preferred volume average particle diameter is 20 nm to 150 nm, more preferably 30 nm to 130 nm, and among them, particularly most preferably 50 nm to 100 nm.

In order to set the volume average particle diameter of the ε-type crystal form azo pigment particles to the aforementioned range, for example, the following method may be used. It is possible to prepare the ε-type crystal form azo pigment having a volume average particle diameter in a range of 0.06 μm to 0.10 μm (60 nm to 100 nm) by mixing 0.25 part of the azo pigment, 0.05 part of sodium oleate, 0.5 parts of glycerin and 4.2 parts of water, and dispersing the mixture together with 10 parts of a zirconia bead having a diameter of 0.1 mm by means of a planetary ball mill at 300 revolutions per minute for 1 hour and 30 minutes. In addition, it is possible to prepare the ε-type crystal form azo pigment having a volume average particle diameter in a range of 0.04 μm to 0.07 μm (40 nm to 70 nm) by performing dispersion for 3 hours. Furthermore, it is possible to prepare the ε-type crystal form azo pigment having a volume average particle diameter in a range of 0.03 μm to 0.06 μm (30 nm to 60 nm) by performing dispersion for 4 hours.

[Volume Average Particle Diameter of ζ-Type Crystal Form Azo Pigment]

A more preferred volume average particle diameter is 20 nm to 150 nm, more preferably 30 nm to 130 nm, and among them, particularly most preferably 50 nm to 100 nm.

[Volume Average Particle Diameter of η-Type Crystal Form Azo Pigment]

A more preferred volume average particle diameter is 20 nm to 250 nm, more preferably 30 nm to 200 nm, and among them, particularly most preferably 50 nm to 150 nm.

In order to set the volume average particle diameter of the η-type crystal form azo pigment particles to the aforementioned range, for example, the following method may be used. It is possible to prepare the η-type crystal form azo pigment having a volume average particle diameter in a range of 0.06 μm to 0.10 μm (60 nm to 100 nm) by mixing 0.25 part of the azo pigment, 0.05 part of sodium oleate, 0.5 parts of glycerin and 4.2 parts of water, and dispersing the mixture together with 10 parts of a zirconia bead having a diameter of 0.1 mm by means of a planetary ball mill at 300 revolutions per minute for 1 hour and 30 minutes. Further, it is possible to prepare the η-type crystal form azo pigment having a volume average particle diameter in a range of 0.04 μm to 0.07 μm (40 nm to 70 nm) by performing dispersion for 3 hours. In addition, it is possible to prepare the η-type crystal form azo pigment having a volume average particle diameter in a range of 0.03 μm to 0.06 μm (30 nm to 60 nm) by performing dispersion for 4 hours.

The concentration of the pigment included in the pigment dispersion of the present invention is preferably in a range of 1% by mass to 35% by mass, and more preferably in a range of 2% by mass to 25% by mass. When the concentration does not reach 1% by mass, a sufficient image concentration may not be obtained in some cases when a pigment dispersion is used alone as an ink. When the concentration exceeds 35% by mass, dispersion stability deteriorates in some cases.

Examples of the use of the azo pigment of the present invention include particularly an image recording material for forming a color image, specific examples thereof include a heat-sensitive recording material, a pressure-sensitive recording material, a recording material using an electrophotographic system, a silver halide photosensitive material of transfer system, a printing ink, a recording pen and the like, in addition to a recording material of inkjet system to be described below in detail, a recording material of inkjet system, a heat-sensitive recording material and a recording material using an electrophotographic system are preferred, and a recording material of inkjet system are more preferred.

Furthermore, the azo pigment of the present invention may also be applied to a color filter for recording and reproducing a color image, which is used in a solid image device such as CCD, or a display such as LCD and PDP, and a stain solution for staining various types of fiber.

The azo pigment of the present invention may be used in an emulsion-dispersed state, or furthermore even in a solid dispersion state according to the system in which the azo pigment of the present invention is used.

<Coloring Composition>

A coloring composition of the present invention means a coloring composition containing at least one of the azo pigments of the present invention, or a coloring composition containing the pigment dispersion of the present invention. The coloring composition of the present invention may contain a medium, and the case of using a solvent as the medium is particularly suitable as an inkjet recording ink. The coloring composition of the present invention may be manufactured by using a lipophilic medium or an aqueous medium as a medium, and dispersing the azo pigment of the present invention in the medium. The coloring composition of the present invention is preferably manufactured by using an aqueous medium. An ink composition except for the medium is also included in the coloring composition of the present invention. The coloring composition of the present invention may contain other additives if necessary, within a range not impairing the effect of the present invention. Examples of the other additives include publicly known additives (described in Japanese Patent Application Laid-Open No. 2003-306623), such as a drying inhibitor (wetting agent), a discoloration inhibitor, an emulsification stabilizer, a permeation accelerator, an ultraviolet absorbent, an antiseptic, a fungicide, a pH adjusting agent, a surface tension adjusting agent, a defoaming agent, a viscosity adjusting agent, a dispersing agent, a dispersion stabilizer, a rust inhibitor and a chelating agent. These various additives are directly added to the ink solution in the case of an aqueous ink. In the case of an oil-soluble ink, the additives are generally added to the dispersion after the preparation of an azo pigment dispersion, but may be added as the oil or aqueous phase during the preparation.

[Ink]

Next, an ink will be described.

The ink in the present invention may use the azo pigment or azo dispersion or coloring composition of the present invention as described above. Preferably, the ink in the present invention is prepared by mixing an aqueous solvent, water and the like. However, when there is no particular problem, the pigment dispersion of the present invention may be used as it is.

The inkjet recording ink in the present invention includes the azo pigment or pigment dispersion or coloring composition of the present invention, and the ink in the present invention may also be used as an inkjet recording ink.

Further, the coloring composition containing the pigment of the present invention may be preferably used as an inkjet recording ink.

[Inkjet Recording Ink]

Next, an inkjet recording ink will be described.

The inkjet recording ink (hereinafter, referred to as an "ink" in some cases) uses the azo pigment or pigment dispersion or coloring composition of the present invention as described above. Preferably, the inkjet recording ink is prepared by mixing an aqueous solvent, water and the like. However, when there is no particular problem, the pigment dispersion of the present invention may be used as it is.

The content ratio of the α, β, γ, δ, ε, ζ or η-type crystal form azo pigment dispersion in the ink is preferably in a range of 1% by mass to 100% by mass, more preferably in a range of 3% by mass to 20% by mass, and among them, still more preferably in a range of 3% by mass to 15% by mass, in consideration of the color, color concentration, chroma, transparency and the like of an image formed on each of the recording media.

The pigment of the present invention is contained in an amount of preferably 0.1 parts by mass to 20 parts by mass, more preferably 0.2 parts by mass to 10 parts by mass, and still more preferably 1 part by mass to 10 parts by mass, based on 100 parts by mass of the ink. In addition, the pigment of the present invention may be used in combination with another pigment in the ink of the present invention. When two or more pigments are used in combination, it is preferred that the sum of the contents of the pigments is in the aforementioned range.

The ink may be used not only in forming a monochromatic image, but also in forming a full-color image. In order to form a full-color image, a magenta tone ink, a cyan tone ink and a yellow tone ink may be used, and also in order to adjust the tone, a black tone ink may be further used.

In addition, in the ink in the present invention, another pigment may be simultaneously used in addition to the azo pigment in the present invention. Examples of the yellow pigment which may be applied include C.I.P.Y.-74, C.I.P.Y.-128, C.I.P.Y.-155 and C.I.P.Y.-213, examples of the magenta pigment which may be applied include C.I.P.V.-19 and C.I.P.R.-122, examples of the cyan pigment which may be applied include C.I.P.B.-15:3 and C.I.P.B.-15:4, and any pigment may be arbitrarily used apart from these pigments. Examples of a black material which may be applied include a dispersion of carbon black in addition to disazo, trisazo and tetraazo pigments.

As an aqueous solvent used in the ink, polyhydric alcohols, a polyhydric alcohol derivative, a nitrogen-containing solvent, alcohols, a sulfur-containing solvent and the like are used.

Specific examples of the polyhydric alcohols include ethylene glycol, diethylene glycol, propylene glycol, butylene glycol, triethylene glycol, 1,5-pentanediol, 1,2,6-hexanetriol, glycerin and the like.

Examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, an ethylene oxide adduct of diglycerin and the like.

Furthermore, examples of the nitrogen-containing solvent include pyrrolidone, N-methyl-2-pyrrolidone, cyclohexylpyrrolidone, and triethanolamine, examples of the alcohols include alcohols such as ethanol, isopropyl alcohol, butyl alcohol, and benzyl alcohol, and examples of the sulfur-containing solvent include thiodiethanol, thiodiglycerol, sulfolane, dimethylsulfoxide and the like. Besides, propylene carbonate, ethylene carbonate and the like may also be used.

The aqueous solvents used in the present invention may be used either alone or in mixture of two or more kinds thereof. The content of the aqueous solvent is used in an amount from 1% by mass to 60% by mass, and preferably 5% by mass to 40% by mass based on the total amount of the ink. When the amount of the aqueous solvent in the ink is less than 1% by mass, a sufficient optical concentration may not be obtained in some cases, and on the other hand, when the amount is more than 60% by mass, the viscosity of the liquid is increased and the spray characteristics of the ink liquid may be destabilized in some cases.

Preferred properties of the ink in the present invention are as follows. The surface tension of the ink is preferably 20 mN/m to 60 mN/m. The surface tension of the ink is more preferably 20 mN/m to 45 mN/m, and still more preferably 25 mN/m to 35 mN/m. When the surface tension is less than 20 mN/m, since the liquid overflows to the nozzle surface of the recording head, printing may not be normally carried out in some cases. On the other hand, when the surface tension is more than 60 mN/m, penetrability into recording media after printing is delayed, and the drying time may be prolonged in some cases. Meanwhile, the surface tension was measured under an environment of 23° C. and 55% RH by using a Wilhelmy type surface tensiometer as described above.

The viscosity of the ink is preferably 1.2 mPa·s or more and 8.0 mPa·s or less, more preferably 1.5 mPa·s or more and less than 6.0 mPa·s, and still more preferably 1.8 mPa·s or more and less than 4.5 mPa·s. When the viscosity is more than 8.0 mPa·s, discharge properties may deteriorate in some cases. On the other hand, when the viscosity is less than 1.2 mPa·s, long-term spray properties may deteriorate in some cases.

Meanwhile, the viscosity (including the viscosity to be described below) is measured by using a rotary viscometer RHEOMAT 115 (manufactured by Contraves Co.) at 23° C. and a shear rate of 1400 $s^{-1}$.

In addition to the various components described above, water is added to the ink in a range that the aforementioned preferred surface tension and viscosity are obtained. The amount of water added is not particularly limited, but is preferably 10% by mass to 99% by mass, and more preferably 30% by mass to 80% by mass, based on the total amount of the ink.

Furthermore, if necessary, for the purpose of controlling characteristics such as an improvement in discharge properties, it is possible to use polyethyleneimine, polyamines, polyvinylpyrrolidone, polyethylene glycol, cellulose derivatives such as ethyl cellulose and carboxymethyl cellulose, polysaccharides and derivatives thereof, other water-soluble polymers, polymer emulsions such as acrylic polymer emulsions, polyurethane-based emulsions and hydrophilic latex, hydrophilic polymer gels, cyclodextrin, macrocyclic amines, dendrimers, crown ethers, urea and derivatives thereof, acetamide, silicone-based surfactants, fluorine-based surfactants, and the like.

Further, in order to adjust electrical conductivity and pH, it is possible to use alkali metal compounds such as potassium hydroxide, sodium hydroxide and lithium hydroxide, nitrogen-containing compounds such as ammonium hydroxide, triethanolamine, diethanolamine, ethanolamine and 2-amino-2-methyl-1-propanol, alkaline earth metal compounds such as calcium hydroxide, acids such as sulfuric acid, hydrochloric acid and nitric acid, salts of a strong acid and a weak alkali, such as ammonium sulfate, and the like.

In addition, a pH buffer, an antioxidant, an antifungal agent, a viscosity adjusting agent, a conductive agent, an ultraviolet absorbent, and the like may also be added if necessary.

[Inkjet Recording Method, Inkjet Recording Apparatus and Ink Tank for Inkjet Recording]

An inkjet recording method is a method of forming an image on the surface of a recording medium by discharging the ink onto the surface of the recording medium from a recording head according to record signals, by using an inkjet recording ink.

Furthermore, an inkjet recording apparatus is an apparatus which forms an image by using an inkjet recording ink and including a recording head capable of discharging an ink (if necessary, a processing solution) onto the surface of a recording medium to discharge the ink onto the surface of the recording medium from the recording head. Meanwhile, the inkjet recording apparatus may feed the ink to the recording head, and may be equipped with an ink tank for inkjet recording (hereinafter also referred to as an "ink tank" in some cases) which is detachable from a main body of the inkjet recording apparatus. In this case, the ink is stored in the ink tank for inkjet recording.

As the inkjet recording apparatus, a typical inkjet recording apparatus, which is equipped with a printing system capable of using an ink for inkjet recording may be used, and in addition, may be an inkjet recording apparatus mounting a heater or the like for controlling drying of the ink thereon if necessary, or an inkjet recording apparatus equipped with a mechanism which mounts an intermediate body transfer mechanism thereon, discharges (prints) an ink and a processing solution onto an intermediate body, and then transfers the image on the intermediate body onto a recording medium such as paper.

Further, as the ink tank for inkjet recording, any publicly known ink tank in the related art may be utilized as long as the tank is detachable from the inkjet recording apparatus equipped with a recording head and has a configuration in which the tank may feed, in a state of being mounted on the inkjet recording apparatus, an ink to the recording head.

From the viewpoint of the effect of reducing bleeding and inter-color bleeding, it is preferred that the inkjet recording method (apparatus) adopts a thermal inkjet recording system or a piezo inkjet recording system. In the case of the thermal inkjet recording system, an ink is heated during discharge to have a low viscosity, and the temperature of the ink decreases on a recording medium, thereby leading to a sharp increase in viscosity. For this reason, there is an effect of reducing bleeding and inter-color bleeding. On the other hand, in the case of the piezo inkjet recording system, a liquid with high viscosity may be discharged, and since the liquid with high viscosity may suppress the spread thereof in a direction of paper surface on a recording medium, there is an effect of reducing bleeding and inter-color bleeding.

In the inkjet recording method (apparatus), replenishment (feeding) of the ink to the recording head is preferably performed from an ink tank filled with an ink liquid (including a processing solution tank if necessary). This ink tank is preferably a cartridge system tank which is detachable from the main body of the apparatus, and replenishment of the ink is performed with ease by exchanging the cartridge system ink tank.

[Color Toner]

The content of the azo pigment in 100 parts by mass of a color toner is not particularly limited, but is preferably 0.1 part by mass or more, more preferably 1 part by mass to 20 parts by mass, and most preferably 2 parts by mass to 10 parts by mass. As a binder resin for a color toner into which the azo pigment is to be introduced, all binders which are generally used may be used. Examples thereof include styrene-based resins, acrylic resins, styrene/acrylic resins, polyester resins and the like.

For the purpose of improving flowability, controlling electrostatic charge and the like with respect to a toner, inorganic fine powders or organic fine particles may be externally added to the toner. Silica fine particles and titania fine particles surface-treated with a coupling agent containing an alkyl group are preferably used. Meanwhile, these particles have a number-average primary particle size of preferably 10 nm to 500 nm, and are added to the toner in an amount of preferably 0.1% by mass to 20% by mass.

As a release agent, all release agents used in the related art may be used. Specific examples thereof include olefins such as low molecular polypropylene, and low molecular polyethylene and ethylene-propylene copolymer, microcrystalline wax, carnauba wax, sazol wax, paraffin wax and the like. The addition amount thereof is preferably 1% by mass to 5% by mass in the toner.

The charge controlling agent may be added if necessary, but from the viewpoint of chromogenic properties, colorless agents are preferred. Examples thereof include those of a quaternary ammonium salt structure, those of a calixarene structure and the like.

As a carrier, it is possible to use any of non-coated carriers constituted by particles of a magnetic material such as iron or ferrite alone, and resin-coated carriers including magnetic material particles whose surface is coated with a resin. The average particle diameter of the carrier is preferably 30 µm to 150 µm in terms of volume average particle diameter.

The image-forming method to which the toner is applied is not particularly limited, but examples thereof include a method of forming an image by repeatedly forming a color image on a photoreceptor, and then transferring the color image thereon, a method of forming a color image by successively transferring an image formed on a photoreceptor onto an intermediate transfer body and the like to form a color image on the intermediate transfer body and the like, and then transferring the color image onto an image-forming member such as paper, and the like.

[Heat-Sensitive Recording (Transferring) Material]

The heat-sensitive recording material is configured of an ink sheet formed by applying the azo pigment of the present invention together with a binder on a support, and an image-receiving sheet for immobilizing the pigment traveled to correspond to a heat energy applied from a thermal head according to image-recording signals. The ink sheet may be formed by dispersing the azo pigment of the present invention together with a binder as fine particles in a solvent to prepare an ink liquid, coating the ink on a support, and appropriately drying the coated ink. The amount of the ink coated on the support is not particularly limited, but is preferably 30 mg/m$^2$ to 1,000 mg/m$^2$. As preferred binder resin, ink solvent, support and, further, an image-receiving sheet, those which are described in Japanese Patent Application Laid-Open No. H7-137466 may preferably be used.

In order to apply the heat-sensitive recording material to a heat-sensitive recording material capable of recording a full color image, it is preferred to form the full color image by successively coating on a support a cyan ink sheet containing a thermally diffusible cyan colorant which may form a cyan image, a magenta ink sheet containing a thermally diffusible magenta colorant which may form a magenta image, and a yellow ink sheet containing a thermally diffusible yellow colorant which may form a yellow image. In addition, an ink sheet including another black image-forming substance may be further formed if necessary.

[Color Filter]

As a method for forming a color filter, there is a method of first forming a pattern by a photoresist and then performing dyeing, or a method of forming a pattern by a photoresist added with a colorant as described in Japanese Patent Application Laid-Open Nos. H4-163552, H4-128703, and H4-175753. As a method to be used in the case of introducing the colorant of the present invention into a color filter, any of these methods may be used, but Examples of a preferred method include a method of forming a color filter which includes applying a positive-type resist composition containing a thermosetting resin, a quinonediazide compound, a crosslinking agent, a colorant, and a solvent on a substrate, exposing the applied composition through a mask, developing the exposed portion to form a positive-type resist pattern, entirely exposing the positive-type resist pattern, and then curing the positive-type resist pattern after the exposure, as described in Japanese Patent Application Laid-Open No. H4-175753 or Japanese Patent Application Laid-Open No. 116-35182. Further, an RGB primary color-based color filter or a YMC complementary color-based color filter may be obtained by forming a black matrix according to a typical method. Even in the case of the color filter, the amount of the azo pigment of the present invention to be used is not limited, but is preferably 0.1% by mass to 50% by mass.

As the thermosetting resin, the quinonediazide compound, the crosslinking agent, and the solvent to be used at this time, and the amounts thereof to be used, those which are described in the aforementioned patent documents may be preferably used.

Hereinafter, the present invention will be described in more detail with reference to Examples, but the present invention is not limited thereto. Meanwhile, the "part" in Examples indicates part by mass.

EXAMPLE

The X-ray diffractions of the α-type crystal form azo pigment, the β-type crystal form azo pigment, the γ-type crystal form azo pigment, the δ-type crystal form azo pigment, the ε-type crystal form azo pigment, the ζ-type crystal form azo pigment and the η-type crystal form azo pigment were measured in accordance with the Japanese Industrial Standards JISK0131 (General Rule of X-ray diffractometry) under the following conditions using a powder X-ray diffractometer RINT 2500 (manufactured by Rigaku Corporation) and a Cu Kα line.

Measuring apparatus used: automatic X-ray diffractometer RINT 2500 manufactured by Rigaku Corporation
X-ray tube: Cu tube
Voltage: 55 KV
Tube current: 280 mA
Scanning method: 2θ/θ scan
Scanning speed: 6 deg./min
Sampling interval: 0.100 deg.
Starting angle (2θ): 5 deg.
Stopping angle (2θ): 55 deg.
Divergence slit: 2 deg.
Scattering slit: 2 deg.
Receiving slit: 0.6 mm
A vertical-type goniometer was used Example of First Aspect Synthesis Example α-1

Synthesis of α-Type Crystal Form Azo Pigment
α-(1)-1

16.2 g of a 43% nitrosylsulfuric acid solution was added to a mixed solvent composed of 50 g of acetic acid and 8 g of sulfuric acid over 20 minutes. The solution was cooled down to 3° C., and a diazotization reaction was performed by adding 11.55 g of a compound represented by the following Formula (2) as a powder thereto. After the mixture was stirred at the same temperature for 1 hour, a diazonium compound liquid preparation was obtained by deactivating the excess nitrosylsulfuric acid with 0.094 g of urea.

10 g of a compound represented by the following Formula (3) was dividedly added as a powder to the above-described diazonium compound liquid preparation at 5° C. or less. After the addition was completed, an azo compound dissolved solution was obtained by increasing the temperature to 20° C. and reacting the mixture for 2 hours. Meanwhile, the precipitation of the pigment was not observed during the coupling reaction, and the azo compound dissolved solution was in a state of completely dissolving the azo compound obtained.

A poor solvent composed of 150 mL of methanol was prepared and stirred at 5° C. and 200 rpm. The above-described azo compound dissolved solution was added dropwise to the poor solvent.

After the mixture was stirred as it was for 15 minutes, a ζ-type crystal form azo pigment ζ-(1)-101 was obtained by filtering off the crystal produced.

A solution with a pH of 6.0 was prepared by suspending the crystal obtained in 200 mL of water and adding a 28% ammonia water thereto. The crystal was filtered off and washed sufficiently with water. After the crystal was dried at 80° C. for 24 hours, the crystal obtained was suspended in 200 mL of acetone, and the resulting suspension was stirred under reflux for 2 hours by increasing the temperature. The solution was cooled down to room temperature, and 19.88 g (yield 91.0%) of an α-type crystal form azo pigment α-(1)-1 was obtained by filtering off the crystal, washing the crystal sufficiently with acetone, and drying the crystal at 80° C. for 24 hours.

The ζ-type crystal form azo pigment ζ-(1)-101 obtained was observed by visual inspection using a transmission microscope (manufactured by JEOL Ltd.: JEM-1010 electron microscope), and as a result, the length of primary particles in a long axis direction was about 15 μm.

The X-ray diffraction of the ζ-type crystal form azo pigment ζ-(1)-101 was measured by the aforementioned conditions, and as a result, characteristic X-ray diffraction peaks were shown at Bragg angles (2θ±0.2°) of 6.6°, 9.2°, 10.3°, 21.5° and 25.6°.

A CuKα characteristic X-ray diffraction diagram is illustrated in FIG. 1-1.

The α-type crystal form azo pigment α-(1)-1 obtained was observed by visual inspection using a transmission microscope (manufactured by JEOL Ltd.: JEM-1010 electron microscope), and as a result, the length of primary particles in a long axis direction was about 15 μm.

The X-ray diffraction of the α-type crystal form azo pigment α-(1)-1 was measured by the aforementioned conditions, and as a result, characteristic X-ray diffraction peaks were shown at Bragg angles (2θ±0.2°) of 6.5°, 7.1°, 14.4°, 21.8° and 23.6°.

Figure 2:
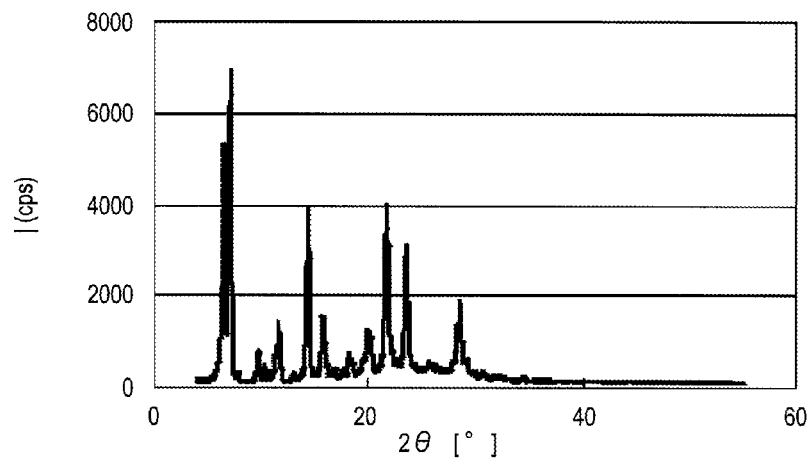
FIG. 2 is a graph of an X-ray diffraction of an α-type crystal form azo pigment α-(1)-1, which is synthesized in Synthesis Example α-1.

A CuKα characteristic X-ray diffraction diagram is illustrated in FIG. 1-2.

Synthesis Example α-2

Synthesis of α-Type Crystal Form Azo Pigment α-(1)-2

67.5 g of a compound represented by the following Formula (2) was dissolved in 530 mL of phosphoric acid, and the internal temperature was cooled down to 3° C. by ice-cooling the solution. 26.9 g of sodium nitrite was dividedly added to the solution over 15 minutes such that the internal temperature was 4° C. or less. After the addition was completed, a diazonium salt solution was obtained by stirring the solution at the same temperature for 50 minutes, and dividedly adding 18.6 g of urea thereto. Apart from the aforementioned preparation, 47.9 g of a compound represented by the following Formula (3) was added to 1,680 mL of methanol, and was completely dissolved under reflux. The internal temperature was cooled down to 0° C. by ice-cooling the solution, and the above-described diazonium salt solution was added thereto over 30 minutes such that the internal temperature was 10° C. or less. After stirring was performed at an internal temperature of 5° C. for 1 hour and 30 minutes, 1.6 L of water was added thereto, and stirring was performed for 30 minutes. The crystal precipitated was filtered off, and then washed with 1 L of water. A solution with a pH of 6.1 was prepared by suspending the crystal obtained in 2.5 L of water and adding a 28% ammonia water thereto. A γ-type crystal form azo pigment was obtained by filtering off the crystal and washing the crystal sufficiently with water. The crystal obtained was suspended in 1.5 L of acetone, and the resulting suspension was stirred under reflux for 2 hours by increasing the temperature. 103.5 g of a β-type crystal form azo pigment β-(1)-2 was obtained by filtering off the crystal at a thermal time, and washing the crystal sufficiently with acetone.

92.8 g (yield 88.8%) of an α-type crystal form azo pigment α-(1)-2 was obtained by drying the β-type crystal form azo pigment β-(1)-2 obtained at 60° C. for 24 hours.

The β-type crystal form azo pigment β-(1)-2 obtained was observed by visual inspection using a transmission microscope (manufactured by JEOL Ltd.: JEM-1010 electron microscope), and as a result, the length of primary particles in a long axis direction was about 10 μm.

The X-ray diffraction of the β-type crystal form azo pigment β-(1)-2 was measured by the aforementioned conditions, and as a result, characteristic X-ray diffraction peaks were shown at Bragg angles (2θ±0.2°) of 6.3°, 6.4° and 22.3°.

Figure 3:
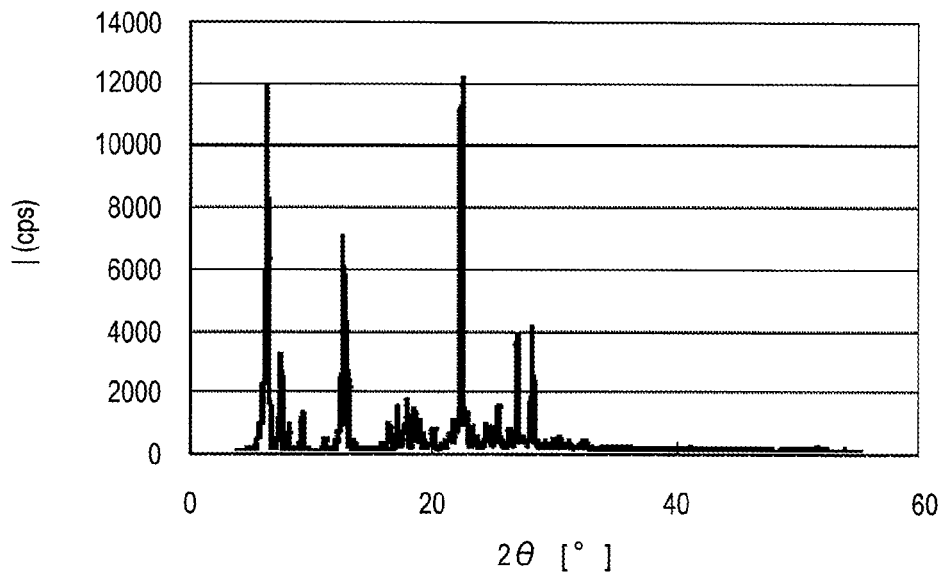
FIG. 3 is a graph of an X-ray diffraction of a β-type crystal form azo pigment β-(1)-2, which is synthesized in Synthesis Example α-2.

A CuKα characteristic X-ray diffraction diagram is illustrated in FIG. 1-3.

The α-type crystal form azo pigment α-(1)-2 obtained was observed by visual inspection using a transmission microscope (manufactured by JEOL Ltd.: JEM-1010 electron microscope), and as a result, the length of primary particles in a long axis direction was about 10 μm.

The X-ray diffraction of the α-type crystal form azo pigment α-(1)-2 was measured by the aforementioned conditions, and as a result, characteristic X-ray diffraction peaks were shown at Bragg angles (2θ±0.2°) of 6.5°, 7.1°, 14.4°, 21.8° and 23.6°.

A CuKα characteristic X-ray diffraction diagram is illustrated in FIG. 1-4.

Synthesis Example α-3

5.8 g of a compound represented by the following Formula (2) was dissolved in 50 mL of a 12 N hydrochloric acid, and the internal temperature was cooled down to −5° C. by ice-cooling the solution. 30 mL of water in which 2.21 g of sodium nitrite was dissolved was added dropwise thereto such that the temperature was 0° C. or less. A diazonium salt solution was obtained by stirring the resulting solution at an internal temperature of 0° C. for 1 hour, and dividedly adding 0.5 g of urea thereto. Apart from the aforementioned preparation, 5 g of a compound represented by the following Formula (3) was added to 40 mL of acetic acid, and was completely dissolved at an internal temperature of 50° C., the internal temperature was cooled down to 20° C., and the resulting solution was added dropwise to the above-described diazonium salt solution such that the internal temperature was 5° C. or less. After the dropwise addition was completed, the solution was heated to an internal temperature of 10° C., and was stirred at the same temperature for 3 hours. The crystal precipitated was filtered off, and then washed with 500 mL of water. A solution with a pH of 6.2 was prepared by suspending the crystal obtained in 200 mL of water and adding a 28% ammonia water thereto. The crystal was filtered off and washed sufficiently with water, and then was suspended in 100 mL of acetone, and the suspension was stirred for 24 hours. 8.9 g of a β-type crystal form azo pigment β-(1)-103 was obtained by filtering off the crystal, and washing the crystal sufficiently with acetone.

8.2 g (yield 75.1%) of an α-type crystal form azo pigment α-(1)-3 was obtained by drying the β-type crystal form azo pigment β-(1)-103 obtained at 60° C. for 24 hours.

The β-type crystal form azo pigment β-(1)-103 obtained was observed by visual inspection using a transmission microscope (manufactured by JEOL Ltd.: JEM-1010 electron microscope), and as a result, the length of primary particles in a long axis direction was about 10 μm.

The X-ray diffraction of the β-type crystal form azo pigment β-(1)-103 was measured by the aforementioned conditions, and as a result, characteristic X-ray diffraction peaks were shown at Bragg angles (2θ±0.2°) of 6.3°, 6.4° and 22.3°.

A CuKα characteristic X-ray diffraction diagram is illustrated in FIG. 1-5.

The α-type crystal form azo pigment α-(1)-3 obtained was observed by visual inspection using a transmission microscope (manufactured by JEOL Ltd.: JEM-1010 electron microscope), and as a result, the length of primary particles in a long axis direction was about 10 μm.

The X-ray diffraction of the α-type crystal form azo pigment α-(1)-3 was measured by the aforementioned conditions, and as a result, characteristic X-ray diffraction peaks were shown at Bragg angles (2θ±0.2°) of 6.5°, 7.1°, 14.4°, 21.8° and 23.6°.

A CuKα characteristic X-ray diffraction diagram is illustrated in FIG. 1-6.

Comparative Synthesis Example α-1

Synthesis of Amorphous Azo Compound 1-(1)-4

16.2 g of a 43% nitrosylsulfuric acid solution was added to a mixed solvent composed of 50 g of acetic acid and 8 g of sulfuric acid over 20 minutes. The solution was cooled down to 3° C., and a diazotization reaction was performed by adding 11.55 g of a compound represented by the following Formula (2) as a powder thereto. After the mixture was stirred at the same temperature for 1 hour, a diazonium compound liquid preparation was obtained by deactivating the excess nitrosylsulfuric acid with 0.094 g of urea.

10 g of a compound represented by the following Formula (3) was dividedly added as a powder to the above-described diazonium compound liquid preparation at 5° C. or less. After the addition was completed, an azo compound dissolved solution was obtained by increasing the temperature to 20° C. and reacting the mixture for 2 hours. Meanwhile, the precipitation of the pigment was not observed during the coupling reaction, and the azo compound dissolved solution was in a state of completely dissolving the azo compound obtained.

A poor solvent composed of 150 mL of water was prepared and stirred at 5° C. and 200 rpm. The above-described azo compound dissolved solution was added dropwise to the poor solvent.

The resulting solution was stirred as it was for 15 minutes, and then a solid precipitated was filtered off.

A solution with a pH of 6.0 was prepared by suspending the solid obtained in 200 mL of water and adding a 28% ammonia water thereto. 23.8 g (yield 94.3%) of an amorphous azo compound 1-(1)-4 was obtained by filtering off the crystal and washing the crystal sufficiently with water. The amorphous azo compound 1-(1)-4 obtained was observed by visual inspection using a transmission microscope (manufactured by JEOL Ltd.: JEM-1010 electron microscope), and as a result, the length of primary particles in a long axis direction was about 500 nm.

The X-ray diffraction of the amorphous azo compound 1-(1)-4 was measured by the aforementioned conditions, and as a result, no characteristic X-ray diffraction peak may be confirmed.

A CuKα characteristic X-ray diffraction diagram is illustrated in FIG. 1-7.

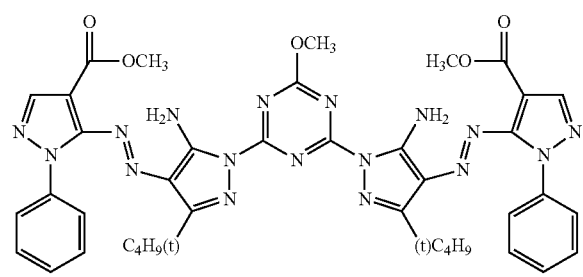

Formula (1)

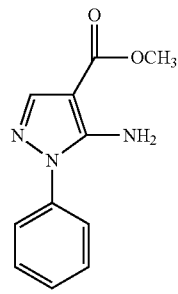

Formula (2)

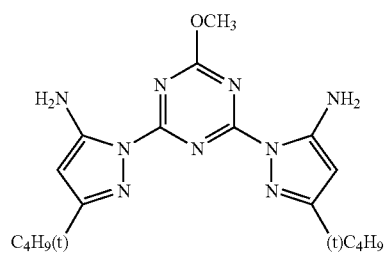

Formula (3)

Example α-1

Manufacture of Pigment Dispersion α-1

2.5 parts by mass of the α-type crystal form azo pigment α-(1)-1 synthesized in Synthesis Example α-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 10 hours. After the dispersion was completed, a yellow pigment dispersion α-1 (volume average particle diameter; Mv≈97.3 nm: measured using Nanotrac 150 (UPA-EX150) manufactured by Nikkiso Co., Ltd.) was obtained by separating the zirconia bead.

Example α-2

Manufacture of Pigment Dispersion α-2

2.5 parts by mass of the α-type crystal form azo pigment α-(1)-2 synthesized in Synthesis Example α-2 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 7 hours. After the dispersion was completed, a yellow pigment dispersion α-2 (volume average particle diameter; Mv □ 82.7 nm: measured using Nanotrac 150 (UPA-EX150) manufactured by Nikkiso Co., Ltd.) was obtained by separating the zirconia bead.

Example α-3

Manufacture of Pigment Dispersion α-3

2.5 parts by mass of the α-type crystal form azo pigment α-(1)-3 synthesized in Synthesis Example α-3 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 5 hours. After the dispersion was completed, a yellow pigment dispersion α-3 (volume average particle diameter; Mv≈87.2 nm: measured using Nanotrac 150 (UPA-EX150) manufactured by Nikkiso Co., Ltd.) was obtained by separating the zirconia bead.

Comparative Example α-1

Manufacture of Comparative Pigment Dispersion α-1

2.5 parts by mass of the amorphous azo compound α-(1)-4 synthesized in Comparative Synthesis Example α-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 8 hours. After the dispersion was completed, a yellow comparative pigment dispersion α-1 (volume average particle diameter; Mv □ 207.5 nm: measured using Nanotrac 150 (UPA-EX150) manufactured by Nikkiso Co., Ltd.) was obtained by separating the zirconia bead.

Comparative Example α-2

Manufacture of Comparative Pigment Dispersion α-2

2.5 parts by mass of the C.I. Pigment Yellow 155 (INKJET YELLOW 4G VP2532 manufactured by Clariant Corporation) was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 3 hours. After the dispersion was completed, a yellow comparative pigment dispersion α-2 (volume average particle diameter; Mv≈83.3 nm: measured using Nanotrac 150 (UPA-EX150) manufactured by Nikkiso Co., Ltd.) was obtained by separating the zirconia bead.

[Evaluation of Performance of Pigment Dispersion]
<Evaluation of Tinctorial Strength>
Each of the pigment dispersions obtained in the Examples and Comparative Examples was applied on Photo Matte Paper manufactured by EPSON Inc., using a No. 3 bar coater. An image concentration of each of the applied products obtained was measured using a reflection densitometer (X-Rite 938 manufactured by X-Rite Co.), and the "tinctorial strength (OD: Optical Density)" was evaluated in accordance with the following criteria. Samples showing an OD of 1.4 or more were ranked A, samples showing an OD of 1.2 or more and less than 1.4 were ranked B, and samples showing an OD less than 1.2 were ranked C. The results were shown in Table α-1.

<Evaluation of Hue>
Hue was evaluated by confirming the chromaticity of the applied product obtained above with the eyes and ranking the chromaticity as A which has slight reddishness and clear vividness and C (defective) in which any one of the reddishness and vividness was not suitable. The results were shown in Table α-1.

<Evaluation of Light Fastness>
The applied products having an image concentration of 1.0 used in the evaluation of hue were prepared and irradiated for 28 days with a xenon light (99,000 lux; in the presence of a TAC filter) using a fadeometer, the image concentration thereof was measured before and after irradiation with the xenon light using a reflection densitometer, and evaluation was performed by ranking samples with a colorant residual ratio [(concentration after irradiation/concentration before irradiation)×100%] of 95% or more as A, samples with a colorant residual ratio of 80% or more and less than 95% as B, and samples with a colorant residual ratio less than 80% as C. The results were shown in Table α-1.

<Evaluation of Water Resistance>
0.1 g of each of the α-type crystal form azo pigments α-(1)-1 to α-(1)-3 obtained in Synthesis Examples α-1 to α-3, the amorphous azo compound 1-(1)-4 obtained in the Comparative Synthesis Example and the C.I. Pigment Yellow 155 (INKJET YELLOW 4G VP2532 manufactured by Clariant Corporation) was suspended in 1 L of water and heated to an internal temperature of 70° C., and the crystal was filtered off at a thermal time. Evaluation was performed by ranking samples in which coloration of the filtrate may be confirmed as C and samples in which coloration of the filtrate may not be confirmed as A. The results were shown in Table α-1.

TABLE α-1

| | Color Material | Tinctorial strengh | Hue | Light resistance | Water resistance |
|---|---|---|---|---|---|
| Example α-1 | α-type crystal form azo pigment α-(1)-1 | A | A | A | A |
| Example α-2 | α-type crystal form azo pigment α-(1)-2 | A | A | A | A |
| Example α-3 | α-type crystal form azo pigment α-(1)-3 | A | A | A | A |
| Comp. Example α-1 | Amorphous azo compound 1-(1)-4 | A | A | A | C |
| Comp. Example α-2 | C.I. Pigment Yellow-155 | B | C | C | A |

Example of Second Aspect

Synthesis Example β-1

Synthesis of β-Type Crystal Form Azo Pigment β-(1)-1

16.2 g of a 43% nitrosylsulfuric acid solution was added to a mixed solvent composed of 50 g of acetic acid and 8 g of sulfuric acid over 20 minutes. The solution was cooled down to 3° C., and a diazotization reaction was performed by adding 11.55 g of a compound represented by the following Formula (2) as a powder thereto. After the mixture was stirred at the same temperature for 1 hour, a diazonium compound liquid preparation was obtained by deactivating the excess nitrosylsulfuric acid with 0.094 g of urea.

10 g of a compound represented by the following Formula (3) was dividedly added as a powder to the above-described diazonium compound liquid preparation at 5° C. or less. After the addition was completed, an azo compound dissolved solution was obtained by increasing the temperature to 20° C. and reacting the mixture for 2 hours. Meanwhile, the precipitation of the pigment was not observed during the coupling reaction, and the azo compound dissolved solution was in a state of completely dissolving the azo compound obtained.

A poor solvent composed of 150 mL of methanol was prepared and stirred at 5° C. and 200 rpm. The above-described azo compound dissolved solution was added dropwise to the poor solvent.

After the mixture was stirred as it was for 15 minutes, a ζ-type crystal form azo pigment ζ-(1)-101 was obtained by filtering off the crystal produced.

A solution with a pH of 6.0 was prepared by suspending the crystal obtained in 200 mL of water and adding a 28% ammonia water thereto. The crystal was filtered off and washed sufficiently with water. The crystal obtained was suspended in 200 mL of acetone, and the resulting suspension was stirred under reflux for 2 hours by increasing the temperature. 20.5 g of a β-type crystal form azo pigment β-(1)-1 represented by the following Formula (1) was obtained by cooling down the suspension to room temperature, and filtering off the crystal and washing the crystal sufficiently with acetone.

The ζ-type crystal form azo pigment ζ-(1)-101 obtained was observed by visual inspection using a transmission microscope (manufactured by JEOL Ltd.: JEM-1010 electron microscope), and as a result, the length of primary particles in a long axis direction was about 15 μm.

The X-ray diffraction of the ζ-type crystal form azo pigment ζ-(1)-101 was measured by the aforementioned conditions, and as a result, characteristic X-ray diffraction peaks were shown at Bragg angles (2θ±0.2°) of 6.6°, 9.2°, 10.3°, 21.5° and 25.6°.

A CuKα characteristic X-ray diffraction diagram is illustrated in FIG. 1-1.

The β-type crystal form azo pigment β-(1)-1 obtained was observed by visual inspection using a transmission microscope (manufactured by JEOL Ltd.: JEM-1010 electron microscope), and as a result, the length of primary particles in a long axis direction was about 15 μm.

The X-ray diffraction of the β-type crystal form azo pigment β-(1)-1 was measured by the aforementioned conditions, and as a result, characteristic X-ray diffraction peaks were shown at Bragg angles (2θ±0.2°) of 6.3°, 6.4°, 12.9° and 22.3°.

A CuKα characteristic X-ray diffraction diagram is illustrated in FIG. 2-2.

Synthesis Example β-2

Synthesis of β-Type Crystal Form Azo Pigment β-(1)-2

67.5 g of a compound represented by the following Formula (2) was dissolved in 530 mL of phosphoric acid, and the internal temperature was cooled down to 3° C. by ice-cooling the solution. 26.9 g of sodium nitrite was dividedly added to the solution over 15 minutes such that the internal temperature was 4° C. or less. After the addition was completed, a diazonium salt solution was obtained by stirring the solution at the same temperature for 50 minutes, and dividedly adding 18.6 g of urea thereto. Apart from the aforementioned preparation, 47.9 g of a compound represented by the following Formula (3) was added to 1,680 mL of methanol, and was completely dissolved under reflux. The internal temperature was cooled down to 0° C. by ice-cooling the solution, and the above-described diazonium salt solution was added thereto over 30 minutes such that the internal temperature was 10° C. or less. After stirring was performed at an internal temperature of 5° C. for 1 hour and 30 minutes, 1.6 L of water was added thereto, and stirring was performed for 30 minutes. The crystal precipitated was filtered off, and then washed with 1 L of water. A solution with a pH of 6.1 was prepared by suspending the crystal obtained in 2.5 L of water and adding a 28% ammonia water thereto. A γ-type crystal form azo pigment γ-(1)-102 was obtained by filtering off the crystal and washing the crystal sufficiently with water. The γ-type crystal form azo pigment γ-(1)-102 obtained was suspended in 1.5 L of acetone, and the suspension was stirred under reflux for 2 hours by increasing the temperature. 103.5 g of a β-type crystal form azo pigment β-(1)-2 represented by the following Formula (1) was obtained by filtering off the crystal at a thermal time and washing the crystal sufficiently with acetone.

The γ-type crystal form azo pigment γ-(1)-102 obtained was observed by visual inspection using a transmission microscope (manufactured by JEOL Ltd.: JEM-1010 electron microscope), and as a result, the length of primary particles in a long axis direction was about 2 μm.

The X-ray diffraction of the γ-type crystal form azo pigment γ-(1)-102 was measured by the aforementioned conditions, and as a result, characteristic X-ray diffraction peaks were shown at Bragg angles (2θ±0.2°) of 5.9°, 7.0° and 8.9°.

A CuKα characteristic X-ray diffraction diagram is illustrated in FIG. 2-3.

The β-type crystal form azo pigment β-(1)-2 obtained was observed by visual inspection using a transmission microscope (manufactured by JEOL Ltd.: JEM-1010 electron microscope), and as a result, the length of primary particles in a long axis direction was about 10 μm.

The X-ray diffraction of the β-type crystal form azo pigment β-(1)-2 was measured by the aforementioned conditions, and as a result, characteristic X-ray diffraction peaks were shown at Bragg angles (2θ±0.2°) of 6.3°, 6.4°, 12.9° and 22.3°.

A CuKα characteristic X-ray diffraction diagram is illustrated in FIG. 1-3.

Synthesis Example β-3

5.8 g of a compound represented by the following Formula (2) was dissolved in 50 mL of a 12 N hydrochloric acid, and the internal temperature was cooled down to −5° C. by ice-cooling the solution. 30 mL of water in which 2.21 g of sodium nitrite was dissolved was added dropwise thereto such that the temperature was 0° C. or less. A diazonium salt solution was obtained by stirring the resulting solution at an internal temperature of 0° C. for 1 hour, and dividedly adding 0.5 g of urea thereto. Apart from the aforementioned preparation, 5 g of compound (3) was added to 40 mL of acetic acid, and was completely dissolved at an internal temperature of 50° C., the internal temperature was cooled down to 20° C., and the resulting solution was added dropwise to the above-described diazonium salt solution such that the internal temperature was 5° C. or less. After the dropwise addition was completed, the solution was heated to an internal temperature of 10° C., and was stirred at the same temperature for 3 hours. The crystal precipitated was filtered off, and then washed with 500 mL of water. A solution with a pH of 6.2 was prepared by suspending the crystal obtained in 200 mL of water and adding a 28% ammonia water thereto. The crystal was filtered off and washed sufficiently with water, and then was suspended in 100 mL of acetone, and the suspension was stirred under reflux for 2 hours by increasing the temperature. 8.9 g of a η-type crystal form azo pigment β-(1)-3 represented by the following Formula (1) was obtained by cooling down the suspension to room temperature, and filtering off the crystal and washing the crystal sufficiently with acetone.

The β-type crystal form azo pigment β-(1)-3 obtained was observed by visual inspection using a transmission microscope (manufactured by JEOL Ltd.: JEM-1010 electron microscope), and as a result, the length of primary particles in a long axis direction was about 10 μm.

The X-ray diffraction of the β-type crystal form azo pigment β-(1)-3 was measured by the aforementioned conditions, and as a result, characteristic X-ray diffraction peaks were shown at Bragg angles (2θ±0.2°) of 6.3°, 6.4°, 12.9° and 22.3°.

A CuKα characteristic X-ray diffraction diagram is illustrated in FIG. 2-5.

Comparative Synthesis Example β-1

Synthesis of Amorphous Azo Compound 1-(1)-4

16.2 g of a 43% nitrosylsulfuric acid solution was added to a mixed solvent composed of 50 g of acetic acid and 8 g of sulfuric acid over 20 minutes. The solution was cooled down to 3° C., and a diazotization reaction was performed by adding 11.55 g of a compound represented by the following Formula (2) as a powder thereto. After the mixture was stirred at the same temperature for 1 hour, a diazonium compound liquid preparation was obtained by deactivating the excess nitrosylsulfuric acid with 0.094 g of urea.

10 g of a compound represented by the following Formula (3) was dividedly added as a powder to the above-described diazonium compound liquid preparation at 5° C. or less. After the addition was completed, an azo compound dissolved solution was obtained by increasing the temperature to 20° C. and reacting the mixture for 2 hours. Meanwhile, the precipitation of the pigment was not observed during the coupling reaction, and the azo compound dissolved solution was in a state of completely dissolving the azo compound obtained.

A poor solvent composed of 150 mL of water was prepared and stirred at 5° C. and 200 rpm. The above-described azo compound dissolved solution was added dropwise to the poor solvent.

The resulting solution was stirred as it was for 15 minutes, and then a solid precipitated was filtered off.

A solution with a pH of 6.0 was prepared by suspending the solid obtained in 200 mL of water and adding a 28% ammonia water thereto. 23.8 g (yield 94.3%) of an amorphous azo compound 1-(1)-4 represented by the following Formula (1) was obtained by filtering off the crystal and washing the crystal sufficiently with water.

The amorphous azo compound 1-(1)-4 obtained was observed by visual inspection using a transmission microscope (manufactured by JEOL Ltd.: JEM-1010 electron microscope), and as a result, the length of primary particles in a long axis direction was about 500 nm.

The X-ray diffraction of the amorphous azo compound 1-(1)-4 was measured by the aforementioned conditions, and as a result, no characteristic X-ray diffraction peak may be confirmed.

A CuKα characteristic X-ray diffraction diagram is illustrated in FIG. 1-7.

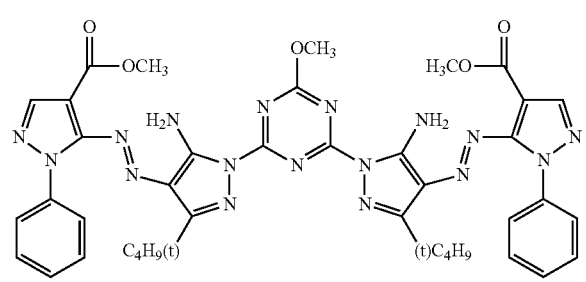

Formula (1)

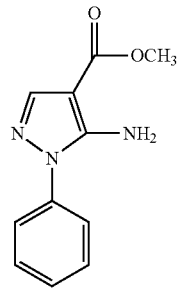

Formula (2)

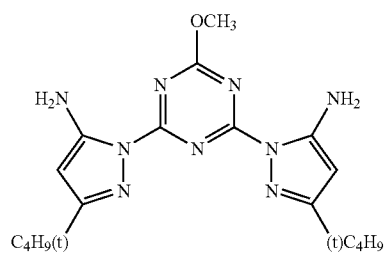

Formula (3)

Example β-1

Manufacture of Pigment Dispersion 3-1

2.5 parts by mass of the β-type crystal form, azo pigment β-(1)-1 synthesized in Synthesis Example β-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 10 hours. After the dispersion was completed, a yellow pigment dispersion 0-1 (volume average particle diameter; Mv≈97.3 nm: measured using Nanotrac 150 (UPA-EX150) manufactured by Nikkiso Co., Ltd.) was obtained by separating the zirconia bead.

Example β-2

Manufacture of Pigment Dispersion β-2

2.5 parts by mass of the β-type crystal form azo pigment β-(1)-2 synthesized in Synthesis Example β-2 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 7 hours. After the dispersion was completed, a yellow pigment dispersion β-2 (volume average particle diameter; Mv≈82.7 nm: measured using Nanotrac 150 (UPA-EX150) manufactured by Nikkiso Co., Ltd.) was obtained by separating the zirconia bead.

Example β-3

Manufacture of Pigment Dispersion β-3

2.5 parts by mass of the β-type crystal form azo pigment β-(1)-3 synthesized in Synthesis Example β-3 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 5 hours. After the dispersion was completed, a yellow pigment dispersion 0-3 (volume average particle diameter; Mv≈87.2 nm: measured using Nanotrac 150 (UPA-EX150) manufactured by Nikkiso Co., Ltd.) was obtained by separating the zirconia bead.

Comparative Example β-1

Manufacture of Comparative Pigment Dispersion β-1

2.5 parts by mass of the amorphous azo compound 1-(1)-4 synthesized in Comparative Synthesis Example β-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 8 hours. After the dispersion was completed, a yellow comparative pigment dispersion β-1 (volume average particle diameter; Mv = 207.5 nm: measured using Nanotrac 150 (UPA-EX150) manufactured by Nikkiso Co., Ltd.) was obtained by separating the zirconia bead.

Comparative Example β-2

Manufacture of Comparative Pigment Dispersion β-2

2.5 parts by mass of the C.I. Pigment Yellow 155 (INKJET YELLOW 4G VP2532 manufactured by Clariant Corporation) was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 3 hours. After the dispersion was completed, a yellow comparative pigment dispersion 2 (volume average particle diameter; Mv=83.3 nm: measured using Nanotrac 150 (UPA-EX150) manufactured by Nikkiso Co., Ltd.) was obtained by separating the zirconia bead.

[Evaluation of Performance of Pigment Dispersion]
<Evaluation of Tinctorial Strength>

Each of the pigment dispersions obtained in the Examples and Comparative Examples was applied on Photo Matte Paper manufactured by EPSON Inc., using a No. 3 bar coater. An image concentration of each of the applied products obtained was measured using a reflection densitometer (X-Rite 938 manufactured by X-Rite Co.), and the "tinctorial strength (OD: Optical Density)" was evaluated in accordance with the following criteria. Samples showing an OD of 1.4 or more were ranked A, samples showing an OD of 1.2 or more and less than 1.4 were ranked B, and samples showing an OD less than 1.2 were ranked C. The results were shown in Table β-1.

<Evaluation of Hue>

Hue was evaluated by confirming the chromaticity of the applied product obtained above with the eyes and ranking the chromaticity as A which has slight reddishness and clear vividness and C (defective) in which any one of the reddishness and vividness was not suitable. The results were shown in Table β-1.

<Evaluation of Light Fastness>

The applied products having an image concentration of 1.0 used in the evaluation of hue were prepared and irradiated for 28 days with a xenon light (99,000 lux; in the presence of a TAC filter) using a fadeometer, the image concentration thereof was measured before and after irradiation with the xenon light using a reflection densitometer, and evaluation was performed by ranking samples with a colorant residual ratio [(concentration after irradiation/concentration before irradiation)×100%] of 95% or more as A, samples with a colorant residual ratio of 80% or more and less than 95% as B, and samples with a colorant residual ratio less than 80% as C. The results were shown in Table β-1.

<Evaluation of Wettability>

2.5 parts by mass of the pigment, 0.5 parts by mass of sodium oleate, 5 parts by mass of glycerin and 42 parts by mass of water were mixed, the mixture was dispersed together with 100 parts by mass of a zirconia bead having a diameter of 0.1 mm by means of a planetary ball mill at 300 revolutions per minute for 8 hours, and then evaluation was performed by ranking samples in which no residue was confirmed as A, samples in which a residue was slightly confirmed as B, and samples in which a residue was significantly confirmed as C, when the zirconia bead was separated. The results were shown in Table β-1.

TABLE β-1

| | Color Material | Tinctorial strengh | Hue | Light resistance | Wettability |
|---|---|---|---|---|---|
| Example β-1 | β-type crystal form azo pigment β-(1)-1 | A | A | A | A |
| Example β-2 | β-type crystal form azo pigment β-(1)-2 | A | A | A | A |
| Example β-3 | β-type crystal form azo pigment β-(1)-3 | A | A | A | A |
| Comp. Example β-1 | Amorphous azo compound 2-(1)-4 | A | A | A | C |
| Comp. Example β-2 | C.I. Pigment Yellow-155 | B | C | C | A |

From the results in Table 3-1, it can be seen that an azo pigment having the β-type crystal form represented by Formula (1) has excellent tinctorial strength, hue and light resistance. Furthermore, it can be seen that the β-type crystal form azo pigment represented by Formula (1) according to the present invention has excellent wettability.

Example of Third Aspect

Synthesis Example γ-1

Synthesis of γ-Type Crystal Form Azo Pigment γ-(1)-1

The internal temperature was set to −3° C. by dissolving 67.3 g of the compound of Formula (2) in 530 mL of an 85% aqueous solution of phosphoric acid, and ice-cooling the resulting solution. 21.4 g of sodium nitrite was slowly added thereto such that the temperature was 3° C. or less. After the addition was completed, the resulting solution was stirred at an internal temperature of 0° C. for 40 minutes, and then 18 g of urea was added thereto over 15 minutes. After the addition was completed, a diazonium salt solution was obtained by stirring the resulting solution at the same temperature for 5 minutes. Apart from the aforementioned preparation, 1,670 mL of methanol was heated, and the compound of Formula (3) was slowly added thereto at an internal temperature of 60° C., and then was completely dissolved by stirring the mixture under reflux for 30 minutes by increasing the temperature. After the internal temperature was cooled down to −3° C., the above-described diazonium salt solution was added thereto at an internal temperature of 10° C. or less over 30 minutes. After the addition was completed, the resulting solution was stirred at an internal temperature of 5° C. for 2 hours, and the crystal precipitated was filtered off and washed with 1 L of methanol. The crystal was suspended in 1.2 L of water, and the pH was adjusted to 6.1 with a 28% ammonia water. 102.2 g of an azo pigment γ-(1)-1 having a γ-type crystal form was obtained by filtering off the crystal and washing the crystal sufficiently with water.

The γ-type crystal form azo pigment obtained was measured by Nanotrac 150 (UPA-EX150) manufactured by Nikkiso Co., Ltd., and as a result, the average volume particle diameter and D95 were 457 nm and 892 nm, respectively.

The X-ray diffraction of the γ-type crystal form azo pigment was measured by the aforementioned conditions, and as a result, characteristic X-ray diffraction peaks were shown at Bragg angles (2θ±0.2°) of 5.9°, 7.0°, 10.4° and 23.5°.

A CuKα characteristic X-ray diffraction diagram is illustrated in FIG. 3-1.

Synthesis Example γ-2

Synthesis of γ-Type Crystal Form Azo Pigment
γ-(1)-2

The internal temperature was set to −3° C. by dissolving 6.7 g of the compound of Formula (2) in 53 mL of an 85% aqueous solution of phosphoric acid, and ice-cooling the resulting solution. 2.1 g of sodium nitrite was slowly added thereto such that the temperature was 3° C. or less. After the addition was completed, the resulting solution was stirred at an internal temperature of 0° C. for 40 minutes, and then 1.8 g of urea was added thereto over 15 minutes. After the addition was completed, a diazonium salt solution was obtained by stirring the resulting solution at the same temperature for 5 minutes. Apart from the aforementioned preparation, 1,670 mL of methanol was heated, the compound of Formula (3) was slowly added thereto at an internal temperature of 60° C., and then was completely dissolved by stirring the mixture under reflux for 30 minutes by increasing the temperature. After the internal temperature was cooled down to −3° C., the above-described diazonium salt solution was added thereto at an internal temperature of 10° C. or less over 5 minutes. After the addition was completed, the resulting solution was stirred at an internal temperature of 5° C. for 2 hours, and the crystal precipitated was filtered off and washed with 200 mL of methanol. The crystal was suspended in 120 mL of water, and the pH was adjusted to 6.1 with a 28% ammonia water. 10.0 g of an azo pigment γ-(1)-2 having a γ-type crystal form was obtained by filtering off the crystal and washing the crystal sufficiently with water.

The γ-type crystal form azo pigment obtained was measured by Nanotrac 150 (UPA-EX150) manufactured by Nikkiso Co., Ltd., and as a result, the average volume particle diameter and D95 were 434 nm and 826 nm, respectively.

The X-ray diffraction of the γ-type crystal form azo pigment was measured by the aforementioned conditions, and as a result, characteristic X-ray diffraction peaks were shown at Bragg angles (2θ±0.2°) of 5.9°, 7.0°, 10.4° and 23.5°.

A CuKα characteristic X-ray diffraction diagram is illustrated in FIG. 3-2.

Synthesis Example γ-3

Synthesis of γ-Type Crystal Form Azo Pigment
γ-(1)-3

3.0 mL of sulfuric acid was added to 13.4 mL of acetic acid, and the internal temperature was cooled down to 5° C. by ice-cooling the solution. A 43% sulfuric acid solution of nitrosylsulfuric acid was added dropwise thereto such that the internal temperature was 8° C. or less. 1.2 g of the compound of Formula (2) was slowly added thereto while the internal temperature was maintained at 10° C. or less, the resulting solution was stirred at 5° C. for 1 hour, and then 0.5 g of urea was added thereto. After the addition was completed, a diazonium salt solution was obtained by stirring the resulting solution at the same temperature for 15 minutes. Apart from the aforementioned preparation, 50 mL of methanol was heated, and the compound of Formula (3) was slowly added thereto at an internal temperature of 60° C., and then was completely dissolved by stirring the mixture under reflux for 30 minutes by increasing the temperature. After the internal temperature was cooled down to −3° C. by adding 5 mL of the resulting solution thereto, the above-described diazonium salt solution was added thereto over 5 minutes while the internal temperature was maintained at 5° C. or less. After the addition was completed, the resulting solution was stirred at an internal temperature of 5° C. for 2 hours, and the crystal precipitated was filtered off and washed with 50 mL of methanol. The crystal was suspended in 50 mL of water, and the pH was adjusted to 6.1 with a 28% ammonia water. 1.8 g of an azo pigment γ-(1)-3 having a γ-type crystal form was obtained by filtering off the crystal and washing the crystal sufficiently with water.

The γ-type crystal form azo pigment obtained was measured by Nanotrac 150 (UPA-EX150) manufactured by Nikkiso Co., Ltd., and as a result, the average volume particle diameter and D95 were 478 nm and 912 nm, respectively.

The X-ray diffraction of the γ-type crystal form azo pigment was measured by the aforementioned conditions, and as a result, characteristic X-ray diffraction peaks were shown at Bragg angles (2θ±0.2°) of 5.9°, 7.0°, 10.4° and 23.5°.

A CuKα characteristic X-ray diffraction diagram is illustrated in FIG. 3-3.

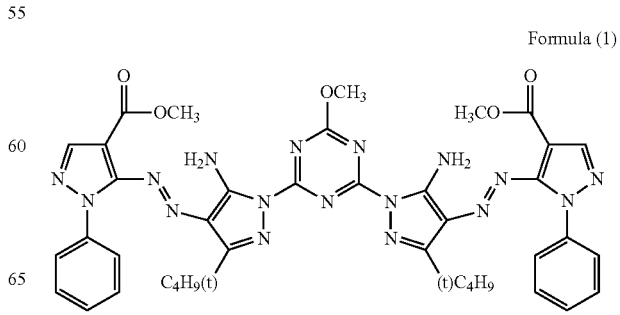

Formula (1)

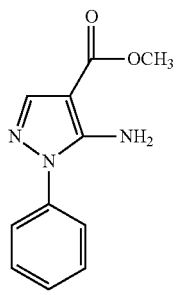

Formula (2)

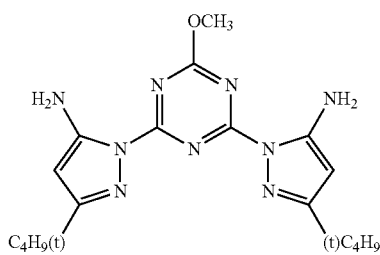

Formula (3)

Comparative Synthesis Example γ-1

Synthesis of Amorphous Azo Compound 3-(1)-4

11.5 g of the compound of Formula (2) was dissolved by adding 4.5 g of sulfuric acid to 50 g of acetic acid. The internal temperature was cooled down to 5° C. by ice-cooling the solution, and a 43% sulfuric acid solution of nitrosylsulfuric acid was added thereto such that the internal temperature was 8° C. or less. After the resulting solution was stirred at an internal temperature of 5° C. for 1 hour, 0.2 g of urea was added thereto, and the resulting solution was stirred at the same temperature for 15 minutes. 10 g of the compound of Formula (3) was added as a powder thereto such that the internal temperature was 10° C. or less, and a solution of the azo compound of Formula (1) was obtained by stirring the resulting solution at an internal temperature of 10° C. for 2 hours. Apart from the aforementioned preparation, 120 mL of water was prepared, and the above-described solution was added thereto at an internal temperature of 25° C. while being stirred. After the resulting solution was stirred at the same temperature for 20 minutes, the solid precipitated was filtered off and washed with 100 mL of water. The solid was suspended in 200 mL of water, and the pH was adjusted to 6.0 with a 28% ammonia water. 20.3 g of the amorphous azo compound 3-(1)-4 was obtained by filtering off the solid precipitated.

The amorphous azo compound obtained was measured by Nanotrac 150 (UPA-EX150) manufactured by Nikkiso Co., Ltd., and as a result, the average volume particle diameter and D95 were 375 nm and 1.4 μm, respectively.

The X-ray diffraction of the compound obtained was measured by the aforementioned conditions, and as a result, no characteristic X-ray diffraction peak may be confirmed.

Example γ-1

Manufacture of Pigment Dispersion γ-1

2.5 parts by mass of the γ-type crystal form azo pigment γ-(1)-1 synthesized in Synthesis Example γ-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of =a planetary ball mill at 300 revolutions per minute for 4 hours. After the dispersion was completed, a yellow pigment dispersion γ-1 (volume average particle diameter; Mv≈92.5 nm: measured using Nanotrac 150 (UPA-EX150) manufactured by Nikkiso Co., Ltd.) was obtained by separating the zirconia bead.

Example γ-2

Manufacture of Pigment Dispersion γ-2

2.5 parts by mass of the γ-type crystal form azo pigment γ-(1)-2 synthesized in Synthesis Example γ-2 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 4 hours. After the dispersion was completed, a yellow pigment dispersion γ-2 (volume average particle diameter; Mv≈90.8 nm: measured using Nanotrac 150 (UPA-EX150) manufactured by Nikkiso Co., Ltd.) was obtained by separating the zirconia bead.

Example γ-3

Manufacture of Pigment Dispersion γ-3

2.5 parts by mass of the γ-type crystal form azo pigment γ-(1)-3 synthesized in Synthesis Example γ-3 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 4 hours. After the dispersion was completed, a yellow pigment dispersion 7-3 (volume average particle diameter; Mv≈97.2 nm: measured using Nanotrac 150 (UPA-EX150) manufactured by Nikkiso Co., Ltd.) was obtained by separating the zirconia bead.

Comparative Example γ-1

Manufacture of Comparative Pigment Dispersion γ-1

2.5 parts by mass of the amorphous azo compound 3-(1)-4 synthesized in Comparative Synthesis Example was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 8 hours. After the dispersion was completed, a yellow comparative pigment dispersion γ-1 (volume average particle diameter; Mv □ 207.5 nm: measured using Nanotrac 150 (UPA-EX150) manufactured by Nikkiso Co., Ltd.) was obtained by separating the zirconia bead.

Comparative Example γ-2

Manufacture of Comparative Pigment Dispersion γ-2

2.5 parts by mass of the C.I. Pigment Yellow 155 (INKJET YELLOW 4G VP2532 manufactured by Clariant Corporation) was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 3 hours. After the dispersion was completed, a yellow comparative pigment dispersion γ-2 (volume average particle diameter; Mv≈83.3 nm: measured using Nanotrac 150 (UPA-EX150) manufactured by Nikkiso Co., Ltd.) was obtained by separating the zirconia bead.

[Evaluation of Performance of Pigment Dispersion]

<Evaluation of Tinctorial Strength>

Each of the pigment dispersions obtained in the Examples and Comparative Examples was applied on Photo Matte Paper manufactured by EPSON Inc., using a No. 3 bar coater. An image concentration of each of the applied products obtained was measured using a reflection densitometer (X-Rite 938 manufactured by X-Rite Co.), and the "tinctorial strength (OD: Optical Density)" was evaluated in accordance with the following criteria. Samples showing an OD of 1.4 or more were ranked A, samples showing an OD of 1.2 or more and less than 1.4 were ranked B, and samples showing an OD less than 1.2 were ranked C. The results were shown in Table γ-1.

<Evaluation of Hue>

Hue was evaluated by confirming the chromaticity of the applied product obtained above with the eyes and ranking the chromaticity as A which has slight reddishness and clear vividness and C (defective) in which any one of the reddishness and vividness was not suitable. The results were shown in Table γ-1.

<Evaluation of Light Fastness>

The applied products having an image concentration of 1.0 used in the evaluation of hue were prepared and irradiated for 28 days with a xenon light (99,000 lux; in the presence of a TAC filter) using a fadeometer, the image concentration thereof was measured before and after irradiation with the xenon light using a reflection densitometer, and evaluation was performed by ranking samples with a colorant residual ratio [(concentration after irradiation/concentration before irradiation)×100%] of 95% or more as A, samples with a colorant residual ratio of 80% or more and less than 95% as B, and samples with a colorant residual ratio less than 80% as C. The results were shown in Table γ-1.

<Evaluation of Quality Stability>

Evaluation was performed by ranking samples with [D95]÷[average volume particle diameter] of the particle obtained in the Synthesis Example being less than 2 as A, samples with the value being 2 or more and less than 3 as B, and samples with the value being 3 or more as C. The results were shown in Table γ-1.

TABLE γ-1

| Color Material | | Tinctorial strengh | Hue | Light fastness | Quality stability |
|---|---|---|---|---|---|
| Example γ-1 | γ-type crystal form azo pigment γ-(1)-1 | A | A | A | A |
| Example γ-2 | γ-type crystal form azo pigment γ-(1)-2 | A | A | A | A |
| Example γ-3 | γ-type crystal form azo pigment γ-(1)-3 | A | A | A | A |
| Comp. Example γ-1 | Amorphous azo compound 3-(1)-4 | A | A | A | C |
| Comp. Example γ-2 | C.I. Pigment Yellow-155 | B | C | C | B |

From the aforementioned results, it can be seen that the azo pigments γ-(1)-1 to γ-(1)-3 having a γ-type crystal form have a narrow particle size distribution, and the particle diameters thereof were not significantly changed depending on the scale. From the fact, it can be said that the azo pigments γ-(1)-1 to γ-(1)-3 having a γ-type crystal form have excellent quality stability, and therefore, fluctuation caused by the scale-up was small.

Example of Fourth Aspect

Synthesis Example δ-1

Synthesis of δ-Type Crystal Form Azo Pigment δ-(1)-1

11.5 g of the compound of Formula (2) was suspended in 50 g of acetic acid, and 16.2 g of a 43% sulfuric acid solution of nitrosylsulfuric acid was added dropwise thereto such that the internal temperature was 20° C. to 30° C. A diazonium salt solution was obtained by stirring the resulting solution at an internal temperature of 20° C. for 1 hour, and then adding 0.1 g of urea thereto. Apart from the aforementioned preparation, 10 g of the compound of Formula (3) was dissolved in 100 mL of acetic acid, and the resulting solution was added dropwise to the above-described diazonium salt solution such that the internal temperature was 20° C. to 25° C. A uniform reaction solution of the azo compound (1) was obtained by stirring the resulting solution at an internal temperature of 20° C. for 1 hour. Apart from the aforementioned preparation, 150 g of water was prepared, and the above-described uniform reaction solution of the azo compound (1) was added dropwise thereto at an internal temperature from 20° C. to 25° C. The solid precipitated was filtered off, washed sufficiently with water, and suspended in 200 mL of water, and the pH was adjusted to 6.2 by adding a 28% ammonia aqueous solution thereto. An amorphous azo compound 4-(1)-1 was obtained by filtering off the solid precipitated and washing the solid sufficiently with water.

The length of primary particles of the azo compound 4-(1)-1 obtained in a long axis direction was about 0.2 μm.

Moisture was measured, and as a result, the content of water was 68%.

The X-ray diffraction of the azo compound 4-(1)-1 was measured by the aforementioned conditions, and as a result, no characteristic X-ray diffraction peak was observed.

10 g of the amorphous azo compound 4-(1)-1 containing water obtained was suspended in 30 mL of ethylene glycol. The suspension was heated to an internal temperature of 95° C., and then was stirred at the same temperature for 2 hours. After the internal temperature was cooled down to 30° C., 2.9 g of a δ-type crystal form azo pigment δ-(1)-1 was obtained by filtering off the solid precipitated.

The length of primary particles of the azo pigment δ-(1)-1 obtained in a long axis direction was about 0.15 μm.

The X-ray diffraction of the azo pigment δ-(1)-1 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 4:
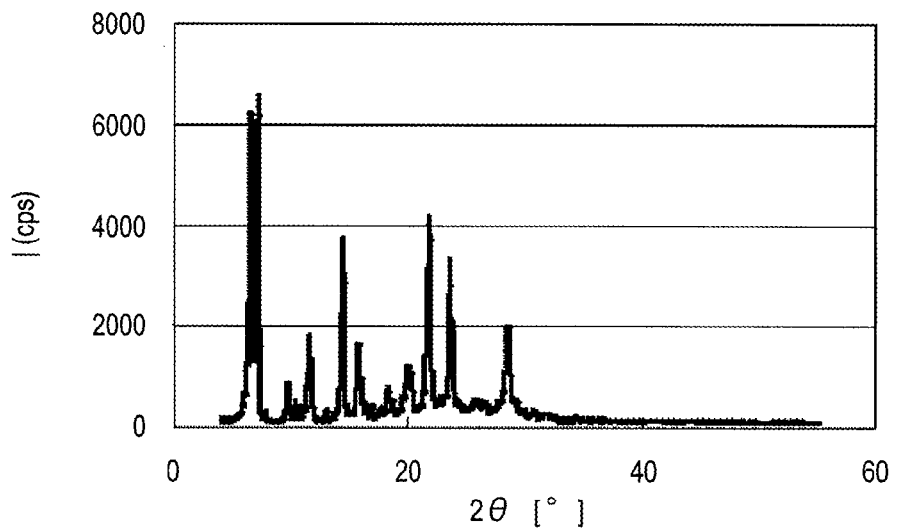
FIG. 4 is a graph of an X-ray diffraction of an α-type crystal form azo pigment α-(1)-2, which is synthesized in Synthesis Example α-2.

A CuKα characteristic X-ray diffraction diagram is illustrated in FIG. 4-1.

Synthesis Example δ-2

Synthesis of δ-Type Crystal Form Azo Pigment δ-(1)-2

67.5 g of the compound (2) was dissolved in 530 mL of phosphoric acid, and the internal temperature was cooled down to 3° C. by ice-cooling the solution. 26.9 g of sodium nitrite was dividedly added to the solution over 15 minutes such that the internal temperature was 4° C. or less. After the addition was completed, a diazonium salt solution was obtained by stirring the solution at the same temperature for 50 minutes, and dividedly adding 18.6 g of urea thereto. Apart from the aforementioned preparation, 47.9 g of the compound (3) was added to 1,680 mL of methanol, and was completely dissolved under reflux. The internal temperature was cooled down to 0° C. by ice-cooling the solution, and the above-described diazonium salt solution was added thereto over 30 minutes such that the internal temperature was 10° C. or less. After stirring was performed at an internal temperature of 5° C. for 1 hour and 30 minutes, 1.6 L of water was added thereto, and stirring was performed for 30 minutes. The crystal precipitated was filtered off, and then washed with 1 L of water. A solution with a pH of 6.1 was prepared by suspending the crystal obtained in 2.5 L of water and adding a 28% ammonia water thereto. An azo pigment γ-(1)-102 having a γ-type crystal form was obtained by filtering off the crystal and washing the crystal sufficiently with water. The crystal obtained was suspended in 1.5 L of isopropyl alcohol, and the resulting solution was stirred under reflux for 2 hours by increasing the temperature. The solution was cooled down to room temperature, and 98.1 g of an azo pigment δ-(1)-2 having a δ-type crystal form was obtained by filtering off the crystal, washing the crystal sufficiently with isopropyl alcohol, and drying the crystal at 60° C. for 12 hours.

The X-ray diffraction of the azo pigment δ-(1)-2 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

A CuKα characteristic X-ray diffraction diagram is illustrated in FIG. 4-2.

Synthesis Example δ-3

Synthesis of δ-Type Crystal Form Azo Pigment δ-(1)-3

2.2 g of sodium nitrite was dissolved in 50 mL of water. Apart from the aforementioned preparation, 5.8 g of the amino compound represented by Formula (2) was dissolved in 50 mL of a concentrated hydrochloric acid, and then the internal temperature was cooled down to −10° C. The above-described sodium nitrite aqueous solution was added dropwise thereto such that the internal temperature was 0° C. or less. After the resulting solution was stirred at an internal temperature from −10° C. to 0° C. for 1 hour, 1.8 g of urea was added thereto at an internal temperature of 0° C. or less. After the addition was completed, a diazonium salt solution was obtained by stirring the resulting solution at the same temperature for 15 minutes. Apart from the aforementioned preparation, 5 g of the compound of Formula (3) was added to 175 mL of methanol, and then was dissolved under reflux by increasing the temperature. The solution was cooled down to an internal temperature of 0° C., and the above-described diazonium salt solution was added thereto such that the internal temperature was 10° C. or less. After stirring at an internal temperature of 10° C. for 1 hour, the solid precipitated was filtered off. The solid was washed sufficiently with methanol and water and suspended in 300 mL of water, and the pH was adjusted to 6.0 by adding a 28% ammonia aqueous solution thereto. 9.8 g of an amorphous azo compound 4-(1)-3 was obtained by filtering the solid precipitated, washing the solid sufficiently with water, and drying the solid at 60° C.

The length of primary particles of the amorphous azo compound 4-(1)-3 obtained in a long axis direction was about 0.5 μm.

The X-ray diffraction of the amorphous azo compound 4-(1)-3 was measured by the aforementioned conditions, and as a result, no characteristic X-ray diffraction peak was observed.

5 g of the amorphous azo compound 4-(1)-3 obtained was suspended in 50 mL of ethylene glycol. The suspension was heated to an internal temperature of 100° C., and then was stirred at the same temperature for 2 hours. After the internal temperature was cooled down to 30° C., 4.5 g of a δ-type crystal form azo pigment δ-(1)-3 was obtained by filtering off the solid precipitated.

The length of primary particles of the δ-type crystal form azo pigment δ-(1)-3 obtained in a long axis direction was about 0.6 μm.

The X-ray diffraction of the δ-type crystal form azo pigment δ-(1)-3 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

A CuKα characteristic X-ray diffraction diagram is illustrated in FIG. 4-3.

Synthesis Example δ-4

Synthesis of δ-Type Crystal Form Azo Pigment δ-(1)-4

34.6 g of the compound of Formula (2) was suspended in 150 g of acetic acid, and 24 g of sulfuric acid was added dropwise thereto such that the internal temperature was 20° C. to 30° C. Further, 48.6 g of a 43% sulfuric acid solution of nitrosylsulfuric acid was added dropwise thereto such that the internal temperature was 20° C. to 30° C., the mixture was stirred at an internal temperature of 20° C. for 1 hour, and then a diazonium salt solution was obtained by adding 0.28 g of urea thereto. 30 g of the compound of Formula (3) was dividedly added to the diazonium salt solution such that the internal temperature was 20° C. to 30° C., and a uniform reaction solution of an azo compound was obtained by stirring the mixture at an internal temperature of 25° C. for 1 hour. Apart from the aforementioned preparation, 360 g of methanol was prepared at an internal temperature of 25° C., the above-described uniform reaction solution of an azo compound was added thereto such that the internal temperature was 30° C. or less, the mixture was stirred for 10 minutes, and then the solid precipitated was filtered off. The solid was washed with 300 mL of methanol, and then suspended in 900 mL of water, and the pH was adjusted to 6.0 by adding a 28% ammonium aqueous solution thereto. An azo pigment was obtained by filtering off the solid precipitated.

The length of primary particles of the azo pigment obtained in a long axis direction was about 2 μm.

The X-ray diffraction of the azo pigment obtained was measured by the aforementioned conditions, and as a result, it was determined that the azo pigment has ζ-type crystal form by showing characteristic X-ray diffraction peaks at Bragg angles (2θ±0.2°) of 6.5°, 6.7°, 9.1° and 21.3°.

5 g of the ζ-type crystal form azo pigment obtained was dissolved in 50 mL of sulfuric acid, and the resulting solution was added to 300 mL of water such that the internal temperature was 15° C. or less. The solid precipitated was filtered off, washed sufficiently with water, and then suspended in 300 mL of water, and the pH was adjusted to 6.1 by adding a 28% ammonia aqueous solution thereto. The solid precipitated was filtered off, washed sufficiently with water, and dried at 60° C., and then 3.9 g of an amorphous azo compound 4-(1)-4 was obtained.

The length of primary particles of the amorphous azo compound 4-(1)-4 obtained in a long axis direction was about 0.2 μm.

The X-ray diffraction of the amorphous azo compound 4-(1)-4 was measured by the aforementioned conditions, and as a result, no characteristic X-ray diffraction peak was observed.

3 g of the amorphous azo compound 4-(1)-4 obtained was suspended in 30 mL of ethylene glycol. The suspension was heated to an internal temperature of 120° C., and then was stirred at the same temperature for 2 hours. After the internal temperature was cooled down to 30° C., 2.4 g of a δ-type crystal form azo pigment β-(1)-4 was obtained by filtering off the solid precipitated.

The length of primary particles of the azo pigment δ-(1)-4 obtained in a long axis direction was about 0.3 μm.

The X-ray diffraction of the azo pigment δ-(1)-4 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

A CuKα characteristic X-ray diffraction diagram is illustrated in FIG. 4-4.

Synthesis Example δ-5

Synthesis of δ-Type Crystal Form Azo Pigment δ-(1)-5

34.6 g of the compound of Formula (2) was suspended in 150 g of acetic acid, and 24 g of sulfuric acid was added dropwise thereto such that the internal temperature was 20° C. to 30° C. In addition, 48.6 g of a 43% sulfuric acid solution of nitrosylsulfuric acid was added dropwise thereto such that the internal temperature was 20° C. to 30° C., the mixture was stirred at an internal temperature of 20° C. for 1 hour, and then a diazonium salt solution was obtained by adding 0.28 g of urea thereto. 30 g of the compound of Formula (3) was dividedly added to the diazonium salt solution such that the internal temperature was 20° C. to 30° C., and a uniform reaction solution of an azo compound was obtained by stirring the mixture at an internal temperature of 25° C. for 1 hour. Apart from the aforementioned preparation, 360 g of methanol was prepared at an internal temperature of 25° C., the above-described uniform reaction solution of an azo compound was added thereto such that the internal temperature was 30° C. or less, the mixture was stirred for 10 minutes, and then the solid precipitated was filtered off. The solid was washed with 300 mL of methanol, and then suspended in 900 mL of water, and the pH was adjusted to 6.0 by adding a 28% ammonium aqueous solution thereto. An azo pigment was obtained by filtering off the solid precipitated.

The length of primary particles of the azo pigment obtained in a long axis direction was about 2 μm.

The X-ray diffraction of the azo pigment obtained was measured by the aforementioned conditions, and as a result, it was determined that the azo pigment has ζ-type crystal form by showing characteristic X-ray diffraction peaks at Bragg angles (2θ±0.2°) of 6.5°, 6.7°, 9.1° and 21.3°.

5 g of the ζ-type crystal form azo pigment obtained above was suspended in 50 mL of ethylene glycol, the suspension was heated to an internal temperature of 120° C., and then was stirred at the same temperature for 2 hours. After the internal temperature was cooled down to 30° C., 3.9 g of a δ-type crystal form azo pigment δ-(1)-5 was obtained by filtering off the solid precipitated.

The δ-type crystal form azo pigment δ-(1)-5 obtained was observed by visual inspection using an optical microscope (manufactured by Nikon Corporation: ECLIPSE LV150), and as a result, the length of primary particles thereof in a long axis direction was about 80 μm.

The X-ray diffraction of the δ-type crystal form azo pigment δ-(1)-5 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 5:
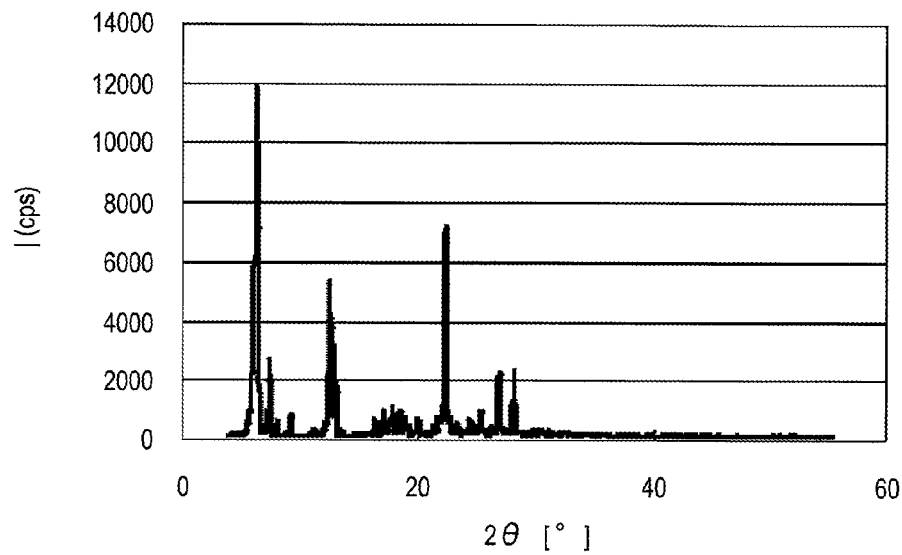
FIG. 5 is a graph of an X-ray diffraction of a β-type crystal form azo pigment β-(1)-103, which is synthesized in Synthesis Example α-3.

A CuKα characteristic X-ray diffraction diagram is illustrated in FIG. 4-5.

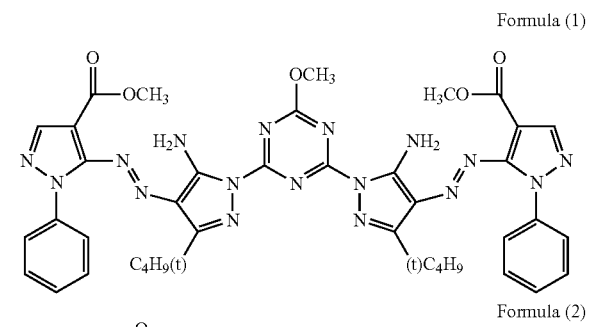

Formula (1)

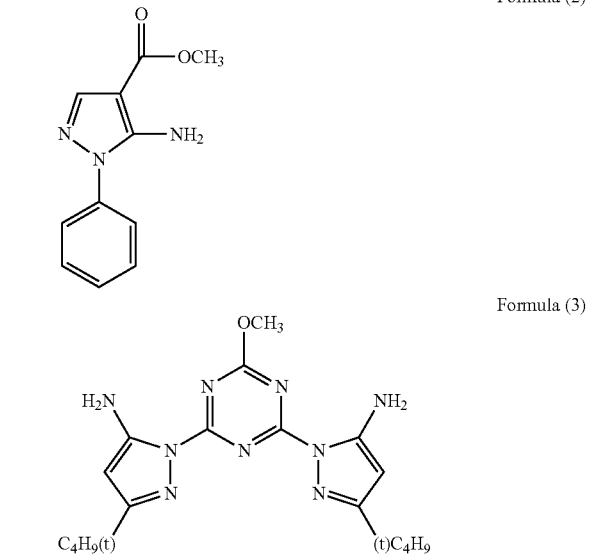

Formula (2)

Formula (3)

Example δ-1

2.5 parts by mass of the δ-type crystal form azo pigment δ-(1)-1 synthesized in Synthesis Example δ-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 3 hours. After the dispersion was completed, a pigment dispersion δ-1 was obtained by separating the zirconia bead. Mv≈89.2 nm, Mn=49.6 nm and Mv/Mn=1.80 (measured using Nanotrac 150 (UPA-EX150) manufactured by Nikkiso Co., Ltd.).

Meanwhile, Mv indicates a volume average particle diameter, and Mn indicates a number average particle diameter.

Example δ-2

2.5 parts by mass of the δ-type crystal form azo pigment δ-(1)-2 synthesized in Synthesis Example δ-2 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 3 hours. After the dispersion was completed, a pigment dispersion δ-2 was obtained by separating the zirconia bead. Mv≈78.6 nm, Mn=51.0 nm and Mv/Mn=1.75 (measured using Nanotrac 150 (UPA-EX150) manufactured by Nikkiso Co., Ltd.).

Example δ-3

2.5 parts by mass of the δ-type crystal form azo pigment δ-(1)-3 synthesized in Synthesis Example δ-3 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 3 hours. After the dispersion was completed, a pigment dispersion δ-3 was obtained by separating the zirconia bead. Mv≈98.3 nm, Mn=53.7 nm and Mv/Mn=1.83 (measured using Nanotrac 150 (UPA-EX150) manufactured by Nikkiso Co., Ltd.).

Example δ-4

2.5 parts by mass of the δ-type crystal form azo pigment δ-(1)-4 synthesized in Synthesis Example δ-4 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 3 hours. After the dispersion was completed, a pigment dispersion δ-4 was obtained by separating the zirconia bead. Mv≈95.3 nm, Mn=56.4 nm and My/Mn=1.69 (measured using Nanotrac 150 (UPA-EX150) manufactured by Nikkiso Co., Ltd.).

Example δ-5

2.5 parts by mass of the δ-type crystal form azo pigment δ-(1)-5 synthesized in Synthesis Example δ-5 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 12 hours. After the dispersion was completed, a pigment dispersion δ-5 was obtained by separating the zirconia bead. Mv≈98.5 nm, Mn=50.5 nm and Mv/Mn=1.95 (measured using Nanotrac 150 (UPA-EX150) manufactured by Nikkiso Co., Ltd.).

Comparative Example δ-1

2.5 parts by mass of the amorphous azo compound 4-(1)-1 synthesized in Synthesis Example δ-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 13 hours. After the dispersion was completed, a comparative pigment dispersion 8-1 was obtained by separating the zirconia bead. Mv≈95.3 nm, Mn=43.3 nm and Mv/Mn=2.18 (measured using Nanotrac 150 (UPA-EX150) manufactured by Nikkiso Co., Ltd.).

Comparative Example δ-2

2.5 parts by mass of the C.I. Pigment Yellow 155 (INKJET YELLOW 4G VP2532 manufactured by Clariant Corporation) was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 3 hours. After the dispersion was completed, a comparative pigment dispersion δ-2 was obtained by separating the zirconia bead. Mv≈83.3 nm, Mn=39.1 nm and Mv/Mn=2.13 (measured using Nanotrac 150 (UPA-EX150) manufactured by Nikkiso Co., Ltd.).

Comparative Example δ-101

2.5 parts by mass of the C.I. Pigment Yellow 128 (Cromophthal Yellow 8 GN manufactured by CIBA Inc.) was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 6 hours. After the dispersion was completed, a comparative pigment dispersion δ-101 was obtained by separating the zirconia bead. Mv≈79.5 nm, Mn=36.0 nm and Mv/Mn=2.21 (measured using Nanotrac 150 (UPA-EX150) manufactured by Nikkiso Co., Ltd.).

[Evaluation of Performance of Pigment Dispersion]

<Evaluation of Tinctorial Strength>

Each of the pigment dispersions obtained in the Examples and Comparative Examples was applied on Photo Matte Paper manufactured by EPSON Inc., using a No. 3 bar coater. An image concentration of each of the applied products obtained was measured using a reflection densitometer (X-Rite 938 manufactured by X-Rite Co.), and the "tinctorial strength (OD: Optical Density)" was evaluated in accordance with the following criteria. Samples showing an OD of 1.4 or more were ranked A, samples showing an OD of 1.2 or more and less than 1.4 were ranked B, and samples showing an OD less than 1.2 were ranked C. The results were shown in Table δ-1.

<Evaluation of Hue>

Hue was evaluated by confirming the chromaticity of the applied product obtained above with the eyes and ranking the chromaticity as A which has slight reddishness and clear vividness and C (defective) in which any one of the reddishness and vividness was not suitable. The results were shown in Table δ-1.

<Evaluation of Light Fastness>

The applied products having an image concentration of 1.0 used in the evaluation of hue were prepared and irradiated for 28 days with a xenon light (99,000 lux; in the presence of a TAC filter) using a fadeometer, the image concentration thereof was measured before and after irradiation with the xenon light using a reflection densitometer, and evaluation was performed by ranking samples with a colorant residual ratio [(concentration after irradiation/concentration before irradiation)×100%] of 95% or more as A, samples with a colorant residual ratio of 80% or more and less than 95% as B, and samples with a colorant residual ratio less than 80% as C. The results were shown in Table δ-1.

<Evaluation of Monodispersibility>

2.5 parts by mass of the δ-type crystal form azo pigment δ-(1)-1 was mixed with 0.5 parts by mass of sodium oleate, 5 parts by mass of glycerin and 42 parts by mass of water, the mixture was dispersed together with 100 parts by mass of a zirconia bead having a diameter of 0.1 mm by means of a planetary ball mill at 300 revolutions per minute, and the monodispersibility was evaluated as the value of Mv/Mn when My was 100 nm or less. Evaluation was performed by ranking samples with an Mv/Mn of 1.9 or less as A, samples with an Mv/Mn of 1.9 or more and less than 2.2 as B, and samples with an Mv/Mn of 2.2 or more as C.

The results of dispersion and evaluation for the δ-type crystal form azo pigments δ-(1)-2 to δ-(1)-5, the amorphous azo compound 4-(1)-1 and the C.I. Pigment Yellow 155 were shown in Table δ-1.

TABLE δ-1

| | Color Material | Tinctorial strengh | Hue | Light fastness | Mono-disperibility |
|---|---|---|---|---|---|
| Example δ-1 | δ-type crystal form azo pigment δ-(1)-1 | A | A | A | A |
| Example δ-2 | δ-type crystal form azo pigment δ-(1)-2 | A | A | A | A |
| Example δ-3 | δ-type crystal form azo pigment δ-(1)-3 | A | A | A | A |
| Example δ-4 | δ-type crystal form azo pigment δ-(1)-4 | A | A | A | A |
| Example δ-5 | δ-type crystal form azo pigment δ-(1)-5 | A | A | A | B |
| Comp. Example δ-1 | Amorphous azo compound 4-(1)-1 | A | A | A | C |
| Comp. Example δ-2 | C.I. Pigment Yellow-155 | B | C | C | B |
| Comp. Example δ-101 | C.I. Pigment Yellow-128 | C | C | C | C |

Preparation Method and Evaluation of Performance of Pigment Dispersion Containing Pigment Having BET Specific Surface Area of 50 m²/g or More by Nitrogent Adsorption Method Preparation of Azo Pigment (1) Having No δ-Type Crystal Form Synthesis Example δ-6

Preparation of α-Type Crystal Form Azo Pigment α-(1)-2

67.5 g of the compound represented by Formula (2) was dissolved in 530 mL of phosphoric acid, and the internal temperature was cooled down to 3° C. by ice-cooling the solution. 26.9 g of sodium nitrite was dividedly added to the solution over 15 minutes such that the internal temperature was 4° C. or less. After the addition was completed, a diazonium salt solution was obtained by stirring the solution at the same temperature for 50 minutes, and dividedly adding 18.6 g of urea thereto. Apart from the aforementioned preparation, 47.9 g of the compound represented by Formula (3) was added to 1,680 mL of methanol, and was completely dissolved under reflux. The internal temperature was cooled down to 0° C. by ice-cooling the solution, and the above-described diazonium salt solution was added thereto over 30 minutes such that the internal temperature was 10° C. or less. After stirring was performed at an internal temperature of 5° C. for 1 hour and 30 minutes, 1.6 L of water was added thereto, and stirring was performed for 30 minutes. The crystal precipitated was filtered off, and then washed with 1 L of water. A solution with a pH of 6.1 was prepared by suspending the crystal obtained in 2.5 L of water and adding a 28% ammonia water thereto. A γ-type crystal form azo pigment was obtained by filtering off the crystal and washing the crystal sufficiently with water. The crystal obtained was suspended in 1.5 L of acetone, and the resulting suspension was stirred under reflux for 2 hours by increasing the temperature. 103.5 g of a β-type crystal form azo pigment β-(1)-2 was obtained by filtering off the crystal at a thermal time, and washing the crystal sufficiently with acetone.

92.8 g (yield 88.8%) of an α-type crystal form azo pigment α-(1)-2 was obtained by drying the β-type crystal form azo pigment β-(1)-2 obtained at 60° C. for 24 hours.

Synthesis Example δ-7

Preparation of ε-Type Crystal Form Azo Pigment ε-(1)-1

16.2 g of a 43% sulfuric acid solution of nitrosylsulfuric acid was added to a mixed solvent composed of 50 g of acetic acid and 8 g of sulfuric acid over 20 minutes. The solution was cooled down to 3° C., and a diazotization reaction was performed by adding 11.55 g of the compound represented by Formula (2) as a powder thereto. After the mixture was stirred at the same temperature for 1 hour, a diazonium compound liquid preparation was obtained by deactivating the excess nitrosylsulfuric acid with 0.094 g of urea.

10 g of the compound represented by Formula (3) was dividedly added as a powder to the above-described diazonium compound liquid preparation at 5° C. or less. After the addition was completed, an azo compound dissolved solution was obtained by increasing the temperature to 20° C. and reacting the mixture for 2 hours. Meanwhile, the precipitation of the pigment was not observed during the coupling reaction, and the azo compound dissolved solution was in a state of completely dissolving the azo compound obtained.

A poor solvent composed of 150 mL of methanol was prepared and stirred at 5° C. and 200 rpm. The above-described azo compound dissolved solution was added dropwise to the poor solvent.

After the mixture was stirred as it was for 15 minutes, the ζ-type crystal form azo pigment ζ-(1)-101 represented by Formula (1) was obtained by filtering off the crystal produced.

A solution with a pH of 6.0 was prepared by suspending the crystal of the ζ-type crystal form azo pigment ζ-(1)-101 obtained in 200 mL of water, and adding a 28% ammonia water thereto. The crystal (ζ-type) precipitated was filtered off, washed sufficiently with water, and dried at 60° C. for 24 hours. The crystal (ζ-type) obtained was suspended in 200 mL of acetone, and the resulting suspension was stirred under reflux for 2 hours by increasing the temperature. The temperature was cooled down to room temperature, and the η-type crystal form azo pigment represented by Formula (1) was obtained by filtering off the crystal. 18.9 g of the ε-type crystal form azo pigment ε-(1)-1 represented by Formula (1) was obtained by washing the crystal obtained sufficiently with acetone and drying the crystal at 60° C. for 24 hours.
<Milling>

Example δ-6

Mixing was performed by inputting a crude azo pigment and table salt into a super mixer such that the following composition was obtained. A mixture (hereinafter, referred to as a "pre-mixture" in some cases) was prepared by gradually adding diethylene glycol to a super mixer while rotating the super mixer.

| | |
|---|---|
| Azo pigment δ-(1)-3 obtained in Synthesis Example δ-3 | 150 g |
| Table salt (Nakuru UM-05 manufactured by Naikai Salt Industries Co., Ltd.) | 1500 g |
| Diethylene glycol | 300 g |

Next, a knead product was obtained by setting the temperature at 5 points of a grinding unit and an extrusion unit of a continuous-type uniaxial kneading machine (manufactured by ASADA IRON WORKS Co., Ltd., MIRACLE KCK-L) and the number of axis rotations to 15° C. to 20° C. and 50 rpm, respectively, and inputting the pre-mixture obtained above. In this case, the current value (load) was about 4 A, the charge amount was 50 g/min, and the temperature of the discharge product was 16° C.

The thus-obtained kneaded product was inputted into 5,000 g of 1% diluted hydrochloric acid and subjected to stirring treatment, and then filtered and washed sufficiently with water to remove table salt and diethylene glycol, and dried. The X-ray diffraction of the δ-type crystal form azo pigment δ-(1)-3-A obtained was measured by the aforementioned conditions, and as a result, characteristic X-ray diffraction peaks were shown at Bragg angles (2θ±0.2°) of 4.8°, 7.2°, 9.6°, 9.7°, 10.7°, 17.3°, 18.9°, 20.0° and 26.7°.

Figure 6:
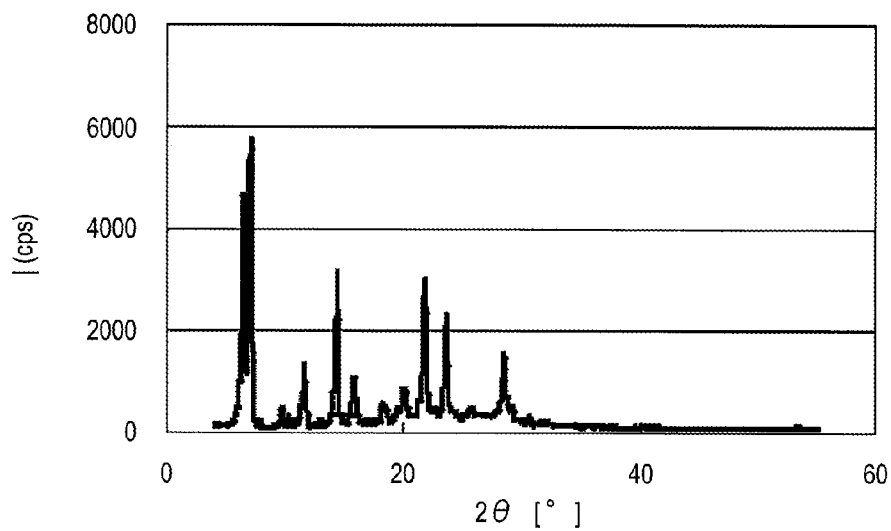
FIG. 6 is a graph of an X-ray diffraction of an α-type crystal form azo pigment α-(1)-3, which is synthesized in Synthesis Example α-3.

A CuKα characteristic X-ray diffraction diagram is illustrated in FIG. 4-6.

Examples δ-7 to δ-9 and Comparative Example δ-3

An azo pigment showing the following X-ray diffraction peaks shown below was prepared in the same manner as in Example δ-6, except that the azo pigment δ-(1)-3 of Synthesis Example δ-3, which was added to the pre-mixture in Example δ-6, was replaced with each of the following azo pigments.

Example δ-7

Azo Pigment α-(1)-2 of Synthesis Example δ-6

A δ-type azo pigment δ-(1)-7-A showing characteristic X-ray diffraction peaks at Bragg angles (2θ±0.2°) of 4.8; 7.2°, 9.7°, 10.7°, 17.4°, 19.0°, 20.1° and 26.8° was obtained.

A CuKα characteristic X-ray diffraction diagram is illustrated in FIG. 4-7.

Example δ-8

Azo Pigment ε-(1)-1 of Synthesis Example δ-7

A δ-type azo pigment δ-(1)-1-A showing characteristic X-ray diffraction peaks at Bragg angles (2θ±0.2°) of 4.8°, 7.2°, 9.5°, 10.7°, 17.4°, 19.0°, 20.1° and 26.8° was obtained.

A CuKα characteristic X-ray diffraction diagram is illustrated in FIG. 4-8.

Example δ-9

Azo Pigment δ-(1)-5 of Synthesis Example δ-5

A δ-type azo pigment δ-(1)-5-A showing characteristic X-ray diffraction peaks at Bragg angles (2θ±0.2°) of 4.8°, 7.1°, 9.6°, 10.7°, 17.3°, 18.9°, 20.0° and 26.7° was obtained.

A CuKα characteristic X-ray diffraction diagram is illustrated in FIG. 4-9.

Comparative Example δ-3

Azo Pigment δ-(1)-101 produced during Synthesis Example δ-7

A ζ-type azo pigment ζ-(1)-101-A showing characteristic X-ray diffraction peaks at Bragg angles (2θ±0.2°) of 6.6°, 9.2°, 10.3° and 21.5° was obtained.

A CuKα characteristic X-ray diffraction diagram is illustrated in FIG. 4-10.

Example δ-10

The azo pigment δ-(1)-3 of Synthesis Example δ-3 used in Example δ-6 was used as it was in the following evaluations without being milled.

Example δ-11

A δ-type crystal azo pigment δ-(1)-3-B was obtained in the same manner as in Example δ-6, except that the amount of the table salt used in Example δ-6 was changed to 750 g. The X-ray diffraction of the δ-type crystal form azo pigment δ-(1)-3-B was measured by the aforementioned conditions, and as a result, characteristic X-ray diffraction peaks were shown at Bragg angles (2θ±0.2°) of 4.8°, 7.1°, 9.5°, 10.7°, 17.3°, 18.9°, 20.0° and 26.7°.

Example δ-12

A δ-type crystal azo pigment δ-(1)-3-C was obtained in the same manner as in Example δ-6, except that the amount of the diethylene glycol used in Example δ-6 was changed to 400 g. The X-ray diffraction of the δ-type crystal form azo pigment δ-(1)-3-C was measured by the aforementioned conditions, and as a result, characteristic X-ray diffraction peaks were shown at Bragg angles (2θ±0.2°) of 4.8°, 7.1°, 9.5°, 10.7°, 17.3°, 18.9°, 20.0° and 26.7°.

<Measurement of BET Specific Surface Area>

0.1 g of a pigment previously vacuum dried at 80° C. was added to a sample cell, and the BET specific surface area was measured using a specific surface area measuring apparatus "MONOSORB MS-17" (manufactured by Yuasa Ionics Co., Ltd.). Meanwhile, a mixed gas with He:$N_2$=7:3 was used for the measurement.

<Preparation of Pigment Dispersion>

10 g of the δ-type crystal form azo pigment δ-(1)-3-A synthesized in Example δ-6 was mixed with 5 g of sodium oleate, 10 g of glycerin and 75 g of water, and the mixture was dispersed together with 375 g of a zirconia bead having a diameter of 0.1 mm by means of a sand grinder mill TSG1 (manufactured by AIMEX Co., Ltd.) at 1,500 revolutions per minute and 45° C. The mixture was dispersed until the volume average particle diameter (Mv) was 100 nm or less, and then a pigment dispersion was obtained by separating the zirconia bead.

A pigment dispersion was obtained by subjecting each of the azo pigments synthesized in Examples δ-7 to δ-10 and Comparative Example δ-3 to the same method.

The following evaluations for the pigment dispersions in Examples δ-6 to δ-9 and Comparative Example δ-3 were performed by an evaluation relative to the pigment dispersion in Example δ-10.

<Evaluation of Dispersibility>

Dispersibility was evaluated as time taken until the volume average particle diameter (Mv) in the preparation of the pigment dispersion becomes 100 nm or less (measured using Nanotrac 150 (UPA-EX150) manufactured by Nikkiso Co., Ltd.). Samples with dispersibility much better than that of the δ-type crystal-based azo pigment before milling, samples with dispersibility approximately identical to that of the δ-type crystal-based azo pigment before milling, and samples with dispersibility less than that of δ-type crystal-based azo pigment before milling were ranked A, B and C, respectively. The results were shown in Table δ-2.

<Evaluation of Tinctorial Strength>

Each of the pigment dispersions obtained in the Examples and Comparative Examples was diluted with water in terms of 10 times by mass, and then was applied on Photo Matte Paper manufactured by EPSON Inc., using a No. 3 bar coater. An image concentration of each of the applied products obtained was measured using a reflection densitometer (X-Rite 938 manufactured by X-Rite Co.), and the "tinctorial strength (OD: Optical Density)" was evaluated in accordance with the following criteria. Samples with dispersibility much better than that of the δ-type crystal-based azo pigment before milling, samples with dispersibility approximately identical to that of the δ-type crystal-based azo pigment before milling, and samples with dispersibility less than that of δ-type crystal-based azo pigment before milling were ranked A, B and C, respectively. The results were shown in Table δ-2.

TABLE δ-2

| | Crystal form before milling | Crystal form after milling | Specific surface area (m²/g) | Dispersibility | Tinctorial strength |
|---|---|---|---|---|---|
| Example δ-6 | δ-type | δ-type | 71 | A | A |
| Example δ-7 | α-type | δ-type | 58 | B | A |
| Example δ-8 | ε-type | δ-type | 64 | B | A |
| Example δ-9 | δ-type (via ζ-type) | δ-type | 52 | A | B |
| Example δ-10 | δ-type | No milling | 35 | B | B |
| Comp. Example δ-3 | ζ-type | ζ-type | 65 | C | C |

Synthesis Example δ-8

58.7 g of dipropylene glycol was heated to an internal temperature of 70° C. under nitrogen atmosphere, and a solution obtained by mixing 10.8 g of methacrylic acid, 39.4 g of benzyl methacrylate, 1.2 g of V-601 and 58.7 g of dipropylene glycol was added dropwise thereto over 3 hours. After the resulting mixture was further stirred at the same temperature for 1 hour, 0.6 g of V-601 (polymerization initiator: manufactured by Wako Pure Chemical Industries, Ltd.) was added thereto, and the resulting mixture was further stirred at the same temperature for 2 hours. 11.3 g of a 50% potassium hydroxide aqueous solution was added dropwise thereto at the same temperature, and then the resulting mixture was stirred at the same temperature for 1 hour. A dipropylene glycol solution of a copolymer (Mw=83,000, acid value 140 mgKOH) of benzyl methacrylate (66.7% by mol) and methacrylic acid (33.3% by mol) was obtained by cooling down the temperature to room temperature.

Synthesis Example δ-9

A dipropylene glycol solution of a copolymer (Mw=25,000, acid value 128 mgKOH) of benzyl methacrylate (66.7% by mol) and methacrylic acid (33.3% by mol) was obtained by increasing the amount of the V-601 in Synthesis Example δ-8 from 1.2 g to 2.5 g, setting the temperature to 86° C., and performing the same operation as described above.

Synthesis Example δ-10

41.1 g of dipropylene glycol was heated to an internal temperature of 70° C. under nitrogen atmosphere, and a solution obtained by mixing 9.6 g of methacrylic acid, 16.8 g of methyl methacrylate, 8.9 g of 2-ethylhexyl methacrylate, 2.5 g of V-601 and 41.1 g of dipropylene glycol was added dropwise thereto over 3 hours. A dipropylene glycol solution of a copolymer (Mw=83,000, acid value 154 mgKOH) of methyl methacrylate (47.8% by mol), methacrylic acid (31.8% by mol) and 2-ethylhexyl methacrylate (20.4% by mol) was obtained by performing the other operations in the same manner as in Synthesis Example δ-8.

Example δ-13

32.2 g (solid content ratio 30.8%, sold content 9.9 g) of the dispersing agent (a dipropylene glycol solution of a copolymer of benzyl methacrylate (66.7% by mol) and methacrylic acid (33.3% by mol), Mw=83,000 and acid value 140 mgKOH) obtained in Synthesis Example δ-8 and 58 g of water were mixed with 20 g of the δ-type crystal form azo pigment δ-(1)-3-A synthesized in Example δ-6, and then 1.14 g of a liquid dispersion (1) of a crude pigment at a pigment concentration of 14.1% by weight (average volume particle diameter Mv≈93.2 nm) was obtained by dispersing the mixture together with 375 g of a zirconia bead having a diameter of 0.1 mmϕ by means of a sand grinder mill TSG1 (manufactured by AIMEX Co., Ltd.) at 1,500 revolutions per minute and 45° C. for 3 hours, separating the zirconia bead, and performing washing with water.

0.45 g of DENACOL EX-321 (manufactured by Nagase ChemteX Corporation), 3.18 g of a 6.18% boric acid aqueous solution and 40 g of water were added to 114 g of the liquid dispersion (1) of a crude pigment obtained, and the resulting mixture was stirred at 70° C. for 5 hours. After the reaction was completed, the temperature was cooled down to room temperature, coarse particles were removed through a filter having a pore diameter of 1.0 μm, and then coarse particles were further precipitated by a centrifuge (7,000 rpm, for 10 minutes). After the precipitated solid was removed, 138 g of a liquid dispersion (1) of a pigment at a pigment concentration of 10.1% was obtained by using a filter having a cutoff molecular weight of 50,000 and performing washing sufficiently with water.

Example δ-14

28.6 g (solid content ratio 35%, sold content 10.0 g) of the dispersing agent (a dipropylene glycol solution of a copolymer of benzyl methacrylate (66.7% by mol) and methacrylic acid (33.3% by mol), Mw=25,000 and acid value 128 mgKOH) obtained in Synthesis Example δ-9 and 58 g of water were mixed with 20 g of the δ-type crystal form azo pigment δ-(1)-3-A synthesized in Example δ-6, and then 142 g of a liquid dispersion (2) of a crude pigment at a pigment concentration of 12.6% by weight (average volume particle diameter Mv≈91.9 nm) was obtained by dispersing the mixture together with 375 g of a zirconia bead having a diameter of 0.1 mmφ by means of a sand grinder mill TSG1 (manufactured by AIMEX Co., Ltd.) at 1,500 revolutions per minute and 45° C. for 2 hours, separating the zirconia bead, and performing washing with water.

0.19 g of DENACOL EX-321 (manufactured by Nagase ChemteX Corporation), 1.34 g of a 6.18% boric acid aqueous solution and 40 g of water were added to 142 g of the liquid dispersion (2) of a crude pigment obtained, and the resulting mixture was stirred at 70° C. for 5 hours. After the reaction was completed, the temperature was cooled down to room temperature, coarse particles were removed through a filter having a pore diameter of 1.0 μm, and then coarse particles were further precipitated by a centrifuge (7,000 rpm, for 10 minutes). After the precipitated solid was removed, 168 g of a liquid dispersion (2) of a pigment at a pigment concentration of 9.8% was obtained by using a filter having a cutoff molecular weight of 50,000 and performing washing sufficiently with water.

Example δ-15

28.4 g (solid content ratio 35.2%, sold content 10.0 g) of the dispersing agent (a dipropylene glycol solution of a copolymer of methyl methacrylate (47.8% by mol), methacrylic acid (31.8% by mol) and 2-ethylhexyl methacrylate (20.4% by mol), Mw=83,000 and acid value 154 mgKOH) obtained in Synthesis Example δ-10 and 62 g of water were mixed with 20 g of the δ-type crystal form azo pigment δ-(1)-3-A synthesized in Example δ-6, and then 99 g of a liquid dispersion (3) of a crude pigment at a pigment concentration of 15.4% by weight (average volume particle diameter Mv≈94.1 nm) was obtained by dispersing the mixture together with 375 g of a zirconia bead having a diameter of 0.1 mmφ by means of a sand grinder mill TSG1 (manufactured by AIMEX Co., Ltd.) at 1,500 revolutions per minute and 45° C. for 3 hours, separating the zirconia bead, and performing washing with water.

0.75 g of DENACOL EX-321 (manufactured by Nagase ChemteX Corporation), 5.3 g of a 6.18% boric acid aqueous solution and 40 g of water were added to 99 g of the liquid dispersion (3) of a crude pigment obtained, and the resulting mixture was stirred at 70° C. for 5 hours. After the reaction was completed, the temperature was cooled down to room temperature, coarse particles were removed through a filter having a pore diameter of 1.0 μm, and then coarse particles were further precipitated by a centrifuge (7,000 rpm, for 10 minutes). After the precipitated solid was removed, 111 g of a liquid dispersion (3) of a pigment at a pigment concentration of 10.8% was obtained by using a filter having a cutoff molecular weight of 50,000 and performing washing sufficiently with water.

Example δ-16

32.4 g (solid content ratio 30.8%, sold content 10.0 g) of the dispersing agent (a dipropylene glycol solution of a copolymer of benzyl methacrylate (66.7% by mol) and methacrylic acid (33.3% by mol), Mw=83,000 and acid value 140 mgKOH) obtained in Synthesis Example δ-8 and 46 g of water were mixed with 20 g of the δ-type crystal form azo pigment δ-(1)-2 synthesized in Example δ-2, and then 111 g of a liquid dispersion (4) of a crude pigment at a pigment concentration of 14.1% by weight (average volume particle diameter Mv≈97.4 nm) was obtained by dispersing the mixture together with 375 g of a zirconia bead having a diameter of 0.1 mmφ by means of a sand grinder mill TSG1 (manufactured by AIMEX Co., Ltd.) at 1,500 revolutions per minute and 45° C. for 9 hours, separating the zirconia bead, and performing washing with water.

0.78 g of DENACOL EX-321 (manufactured by Nagase ChemteX Corporation), 5.5 g of a 6.18% boric acid aqueous solution and 50 g of water were added to 111 g of the liquid dispersion (4) of a crude pigment obtained, and the resulting mixture was stirred at 70° C. for 5 hours. After the reaction was completed, the temperature was cooled down to room temperature, coarse particles were removed through a filter having a pore diameter of 1.0 μm, and then coarse particles were further precipitated by a centrifuge (7,000 rpm, for 10 minutes). After the precipitated solid was removed, 140 g of a liquid dispersion (4) of a pigment at a pigment concentration of 9.6% was obtained by using a filter having a cutoff molecular weight of 50,000 and performing washing sufficiently with water.

Comparative Example δ-4

32.4 g (solid content ratio 30.8%, sold content 10.0 g) of the dispersing agent (a dipropylene glycol solution of a copolymer of benzyl methacrylate (66.7% by mol) and methacrylic acid (33.3% by mol), Mw=83,000 and acid value 140 mgKOH) obtained in Synthesis Example δ-9 and 46 g of water were mixed with 20 g of the P.Y. 128 (Cromophtal Yellow 8 GN, manufactured by Ciba Inc.) and then 81 g of a comparative liquid dispersion (1) of a crude pigment at a pigment concentration of 16.3% by weight (average volume particle diameter Mv≈93.4 nm) was obtained by dispersing the mixture together with 375 g of a zirconia bead having a diameter of 0.1 mmφ by means of a sand grinder mill TSG1 (manufactured by AIMEX Co., Ltd.) at 1,500 revolutions per minute and 45° C. for 6 hours, separating the zirconia bead, and performing washing with water.

0.66 g of DENACOL EX-321 (manufactured by Nagase ChemteX Corporation), 4.7 g of a 6.18% boric acid aqueous solution and 45 g of water were added to 81 g of the comparative liquid dispersion (1) of a crude pigment obtained, and the resulting mixture was stirred at 70° C. for 5 hours. After the reaction was completed, the temperature was cooled down to room temperature, coarse particles were removed through a filter having a pore diameter of 1.0 μm, and then coarse particles were further precipitated by a centrifuge (7,000 rpm, for 10 minutes). After the precipitated solid was removed, 115 g of a comparative liquid dispersion (4) of a pigment at a pigment concentration of 10.2% was obtained by using a filter having a cutoff molecular weight of 50,000 and performing washing sufficiently with water.

<Evaluation of Tinctorial Strength>

Each of the pigment dispersions obtained in the Examples δ-13 to δ-16 was diluted with water in terms of 10 times by mass, and then was applied on Photo Matte Paper manufactured by EPSON Inc., using a No. 3 bar coater. An image concentration of each of the applied products obtained was measured using a reflection densitometer (X-Rite 938 manufactured by X-Rite Co.), and the "tinctorial strength (OD: Optical Density)" was evaluated in accordance with the following criteria. Samples with OD much better than that of Example δ-6, samples with OD approximately identical to that of Example δ-6, and samples with OD less than that of Example δ-6 but better than that of Example δ-10, with OD approximately identical to that of Example δ-10, and samples with OD less than that of Example δ-10 were ranked A, B, C, D and E, respectively. The results were shown in Table δ-3.

TABLE δ-3

|  | Tinctorial Strength |
|---|---|
| Example δ-6 | B |
| Example δ-10 | D |
| Example δ-13 | A |
| Example δ-14 | A |
| Example δ-15 | A |
| Example δ-16 | C |
| Comp. Example δ-4 | E |

Example δ-17

Each component was added to the liquid dispersion (1) of a pigment obtained in Example δ-13 so as to have 5% by mass of a solid content, 10% by mass of glycerin, 5% by mass of 2-pyrrolidone, 2% by mass of 1,2-hexanediol, 2% by mass of triethylene glycol monobutyl ether, 0.5% by mass of propylene glycol, 1% by mass of Surfynol 465 and 74% by mass of ion exchanged water, and then a pigment ink δ-(1) was obtained by filtering the liquid mixture obtained with a syringe having a capacity of 20 mL, to which a 1.2 μm filter (acetyl cellulose membrane and outer diameter: 25 mm, manufactured by Fujifilm Corporation) was attached, to remove coarse particles.

Examples δ-18 and δ-19

A pigment ink δ-(2) and a pigment ink δ-(3) were obtained by changing the liquid dispersion (1) of a pigment in Example δ-17 to a liquid dispersion (2) of a pigment obtained in Example δ-14 and a liquid dispersion (3) of a pigment obtained in Example δ-15.

Comparative Example δ-5

The following evaluation was performed using ICY-42 manufactured by Seiko Epson Corporation.
<Evaluation>
An ink solution was charged into a cartridge for a yellow ink solution of an inkjet printer PX-V630 manufactured by Seiko Epson Corporation, and image-receiving sheets were manufactured as a sheet printed and a sheet subjected to solid printing so as to have color setting: no color correction and printing quality: photo, and an OD of 1.0 in yellow in a photo paper Crispia <High Gloss> manufactured by Seiko Epson Corporation, and light resistance and concentration were evaluated.
<Evaluation of Tinctorial Strength>
An image concentration of each of the sheets subjected to solid printing was measured using a reflection densitometer (X-Rite 938 manufactured by X-Rite Co.), and the "tinctorial strength (OD: Optical Density)" was evaluated in accordance with the following criteria. Samples with OD better than that of Comparative Example δ-5, samples with OD approximately identical to that of Comparative Example δ-5 and samples with OD less than that of Comparative Example δ-5 were ranked A, B and C, respectively. The results were shown in Table δ-4.

<Evaluation of Light Resistance>
The products printed so as to have an OD of 1.0 were irradiated for 28 days with a xenon light (99,000 lux; in the presence of a TAC filter) using a fadeometer, the image concentration thereof was measured before and after irradiation with the xenon light using a reflection densitometer, and evaluation was performed by ranking samples with a colorant residual ratio [(concentration after irradiation/concentration before irradiation)×100%] of 90% or more as A and samples with a colorant residual ratio less than 90% as B. The results were shown in Table δ-4.

TABLE δ-4

|  | Ink solution | Tinctorial strength | Light resistance |
|---|---|---|---|
| Example δ-17 | Pigment ink δ-(1) | A | A |
| Example δ-18 | Pigment ink δ-(2) | A | A |
| Example δ-19 | Pigment ink δ-(3) | A | A |
| Comp. Example δ-5 | ICY-42 manufactured by Seiko Epson Corp | B | B |

Example of Fifth Aspect

Synthesis Example ε-1

Synthesis of ε-Type Crystal Form Azo Pigment ε-(1)-1

16.2 g of a 43% nitrosylsulfuric acid solution was added to a mixed solvent composed of 50 g of acetic acid and 8 g of sulfuric acid over 20 minutes. The solution was cooled down to 3° C., and a diazotization reaction was performed by adding 11.55 g of a compound represented by the following Formula (2) as a powder thereto. After the mixture was stirred at the same temperature for 1 hour, a diazonium compound liquid preparation was obtained by deactivating the excess nitrosylsulfuric acid with 0.094 g of urea.

10 g of a compound represented by the following Formula (3) was dividedly added as a powder to the above-described diazonium compound liquid preparation at 5° C. or less. After the addition was completed, an azo compound dissolved solution was obtained by increasing the temperature to 20° C. and reacting the mixture for 2 hours. Meanwhile, the precipitation of the pigment was not observed during the coupling reaction, and the azo compound dissolved solution was in a state of completely dissolving the azo compound obtained.

A poor solvent composed of 150 mL of methanol was prepared and stirred at 5° C. and 200 rpm. The above-described azo compound dissolved solution was added dropwise to the poor solvent.

After the mixture was stirred as it was for 15 minutes, a ζ-type crystal form azo pigment ζ-(1)-101 represented by the following Formula (1) was obtained by filtering off the crystal produced.

A solution with a pH of 6.0 was prepared by suspending the ζ-type crystal obtained in 200 mL of water and adding a 28% ammonia water thereto. The crystal (ζ-type) precipitated was filtered off, washed sufficiently with water, and dried at 60° C. for 24 hours. The crystal (ζ-type) obtained was suspended in 200 mL of acetone, and the resulting suspension was stirred under reflux for 2 hours by increasing the temperature. The temperature was cooled down to room temperature, and an η-type crystal form azo pigment η-(1)-1 represented by the following Formula (1) was obtained by filtering off the crystal. 18.9 g of the ε-type crystal form azo pigment ε-(1)-1 was obtained by washing the crystal obtained sufficiently with acetone and drying the crystal at 60° C. for 24 hours.

The ζ-type crystal form azo pigment ζ-(1)-101 obtained was observed by visual inspection using a transmission microscope (manufactured by JEOL Ltd.: JEM-1010 electron microscope), and as a result, the length of primary particles in a long axis direction was about 15 μm.

The X-ray diffraction of the ζ-type crystal form azo pigment ζ-(1)-101 was measured by the aforementioned conditions, and as a result, characteristic X-ray diffraction peaks were shown at Bragg angles (2θ±0.2°) of 6.6°, 9.2°, 10.3°, 21.5° and 25.6°.

A CuKα characteristic X-ray diffraction diagram is illustrated in FIG. 1-1.

The ε-type crystal form azo pigment ε-(1)-1 obtained was observed by visual inspection using a transmission microscope (manufactured by JEOL Ltd.: JEM-1010 electron microscope), and as a result, the length of primary particles in a long axis direction was about 25 μm.

The X-ray diffraction of the ε-type crystal form azo pigment ε-(1)-1 was measured by the aforementioned conditions, and as a result, characteristic X-ray diffraction peaks were shown at Bragg angles (2θ±0.2°) of 4.9°, 6.5°, 8.8°, 9.7° and 13.1°.

A CuKα characteristic X-ray diffraction diagram is illustrated in FIG. 5-2.

Synthesis Example ε-2

Synthesis of β-Type Crystal Form Azo Pigment ε-(1)-2

67.5 g of a compound represented by the following (2) was dissolved in 530 mL of phosphoric acid, and the internal temperature was cooled down to 3° C. by ice-cooling the solution. 26.9 g of sodium nitrite was dividedly added to the solution over 15 minutes such that the internal temperature was 4° C. or less. After the addition was completed, a diazonium salt solution was obtained by stirring the solution at the same temperature for 50 minutes, and dividedly adding 18.6 g of urea thereto. Apart from the aforementioned preparation, 47.9 g of a compound represented by the following (3) was added to 1,680 mL of methanol, and was completely dissolved under reflux. The internal temperature was cooled down to 0° C. by ice-cooling the solution, and the above-described diazonium salt solution was added thereto over 30 minutes such that the internal temperature was 10° C. or less. After stirring was performed at an internal temperature of 5° C. for 1 hour and 30 minutes, 1.6 L of water was added thereto, and stirring was performed for 30 minutes. The crystal precipitated was filtered off, and then washed with 1 L of water. A solution with a pH of 6.1 was prepared by suspending the crystal obtained in 2.5 L of water and adding a 28% ammonia water thereto. A γ-type crystal form azo pigment γ-(1)-102 represented by the following Formula (1) was obtained by filtering off the crystal, washing the crystal sufficiently with water and drying the crystal at 60° C. for 24 hours. The γ-type crystal form azo pigment γ-(1)-102 obtained was suspended in 1.5 L of acetone, and =the suspension was stirred under reflux for 2 hours by increasing the temperature. An η-type crystal form azo pigment η-(1)-2 was obtained by filtering off the crystal at a thermal time, and washing the crystal sufficiently with acetone. 98.5 g of an ε-type crystal form azo pigment ε-(1)-2 represented by the following Formula (1) was obtained by drying the η-type crystal form azo pigment η-(1)-2 obtained at 80° C. for 15 hours.

The γ-type crystal form azo pigment γ-(1)-102 obtained was observed by visual inspection using a transmission microscope (manufactured by JEOL Ltd.: JEM-1010 electron microscope), and as a result, the length of primary particles in a long axis direction was about 2 μm.

The X-ray diffraction of the γ-type crystal form azo pigment γ-(1)-102 was measured by the aforementioned conditions, and as a result, characteristic X-ray diffraction peaks were shown at Bragg angles (2θ±0.2°) of 5.9°, 7.0° and 8.9°.

A CuKα characteristic X-ray diffraction diagram is illustrated in FIG. 2-3.

The η-type crystal form azo pigment η-(1)-2 obtained was observed by visual inspection using a transmission microscope (manufactured by JEOL Ltd.: JEM-1010 electron microscope), and as a result, the length of primary particles in a long axis direction was about 15 μm.

The X-ray diffraction of the η-type crystal form azo pigment η-(1)-2 was measured by the aforementioned conditions, and as a result, characteristic X-ray diffraction peaks were shown at Bragg angles (2θ±0.2°) of 4.8°, 6.5°, 9.2°, 9.7°, 13.0° and 24.4°.

A CuKα characteristic X-ray diffraction diagram is illustrated in FIG. 5-4.

The ε-type crystal form azo pigment ε-(1)-2 obtained was observed by visual inspection using a transmission microscope (manufactured by JEOL Ltd.: JEM-1010 electron microscope), and as a result, the length of primary particles in a long axis direction was about 15 μm.

The X-ray diffraction of the ε-type crystal form azo pigment ε-(1)-2 was measured by the aforementioned conditions, and as a result, characteristic X-ray diffraction peaks were shown at Bragg angles (2θ±0.2°) of 4.9°, 6.5°, 8.8°, 9.7°, 13.1°, 19.7° and 25.2°.

A CuKα characteristic X-ray diffraction diagram is illustrated in FIG. 5-5.

Synthesis Example ε-3

5.8 g of a compound represented by the following (2) was dissolved in 50 mL of a 12 N hydrochloric acid, and the internal temperature was cooled down to −5° C. by ice-cooling the solution. 30 mL of water in which 2.21 g of sodium nitrite was dissolved was added dropwise thereto such that the temperature was 0° C. or less. A diazonium salt solution was obtained by stirring the resulting solution at an internal temperature of 0° C. for 1 hour, and dividedly adding 0.5 g of urea thereto. Apart from the aforementioned preparation, 5 g of a compound represented by the following (3) was added to 40 mL of acetic acid, and was completely dissolved at an internal temperature of 50° C., the internal temperature was cooled down to 20° C., and the resulting solution was added dropwise to the above-described diazonium salt solution such that the internal temperature was 5° C. or less. After the dropwise addition was completed, the solution was heated to an internal temperature of 10° C., and was stirred at the same temperature for 3 hours. The crystal precipitated was filtered off, and then washed with 500 mL of water. A solution with a pH of 6.2 was prepared by suspending the crystal obtained in 200 mL of water and adding a 28% ammonia water thereto. The crystal was filtered off, washed sufficiently with water, and then dried at 80° C. for 12 hours. The crystal obtained was suspended in 100 mL of acetone, and the resulting suspension was stirred under reflux for 2 hours by increasing the temperature. After the temperature was cooled down to room temperature, 8.5 g of the ε-type crystal form azo pigment ε-(1)-3 was obtained by filtering off the crystal, washing the crystal sufficiently with acetone and drying the crystal at 60° C. for 24 hours.

The ε-type crystal form azo pigment ε-(1)-3 obtained was observed by visual inspection using a transmission microscope (manufactured by JEOL Ltd.: JEM-1010 electron microscope), and as a result, the length of primary particles in a long axis direction was about 20 μm.

The X-ray diffraction of the ε-type crystal form azo pigment ε-(1)-3 was measured by the aforementioned conditions, and as a result, characteristic X-ray diffraction peaks were shown at Bragg angles (2θ±0.2°) of 4.9°, 6.5°, 8.8°, 9.7°, 13.1°, 19.7° and 25.2°.

A CuKα characteristic X-ray diffraction diagram is illustrated in FIG. 5-6.

Comparative Synthesis Example ε-1

Synthesis of Amorphous Azo Compound 5-(1)-4

16.2 g of a 43% nitrosylsulfuric acid solution was added to a mixed solvent composed of 50 g of acetic acid and 8 g of sulfuric acid over 20 minutes. The solution was cooled down to 3° C., and a diazotization reaction was performed by adding 11.55 g of a compound represented by the following Formula (2) as a powder thereto. After the mixture was stirred at the same temperature for 1 hour, a diazonium compound liquid preparation was obtained by deactivating the excess nitrosylsulfuric acid with 0.094 g of urea.

10 g of a compound represented by the following Formula (3) was dividedly added as a powder to the above-described diazonium compound liquid preparation at 5° C. or less. After the addition was completed, an azo compound dissolved solution was obtained by increasing the temperature to 20° C. and reacting the mixture for 3 hours. Meanwhile, the precipitation of the pigment was not observed during the coupling reaction, and the azo compound dissolved solution was in a state of completely dissolving the azo compound obtained.

A poor solvent composed of 150 mL of water was prepared and stirred at 5° C. and 200 rpm. The above-described azo compound dissolved solution was added dropwise to the poor solvent.

The resulting solution was stirred as it was for 15 minutes, and then a solid precipitated was filtered off.

A solution with a pH of 6.0 was prepared by suspending the solid obtained in 200 mL of water and adding a 28% ammonia water thereto. 23.0 g (yield 92.8%) of an amorphous azo compound 5-(1)-4 was obtained by filtering off the crystal and washing the crystal sufficiently with water.

The amorphous azo compound 5-(1)-4 obtained was observed by visual inspection using a transmission microscope (manufactured by JEOL Ltd.: JEM-1010 electron microscope), and as a result, the length of primary particles in a long axis direction was about 500 nm.

The X-ray diffraction of the amorphous azo compound 5-(1)-4 was measured by the aforementioned conditions, and as a result, no characteristic X-ray diffraction peak may be confirmed.

Figure 7:
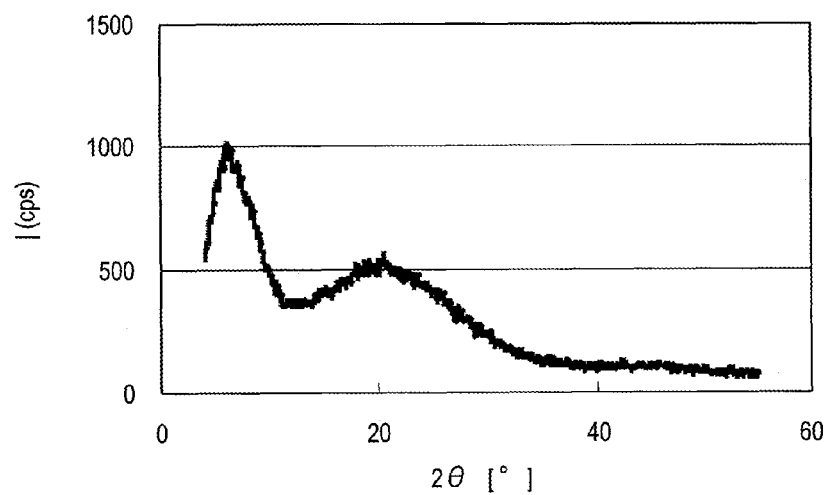
FIG. 7 is a graph of an X-ray diffraction of an amorphous azo compound 1-(1)-4, which is synthesized in Comparative Synthesis Example α-1.
Figure 8:
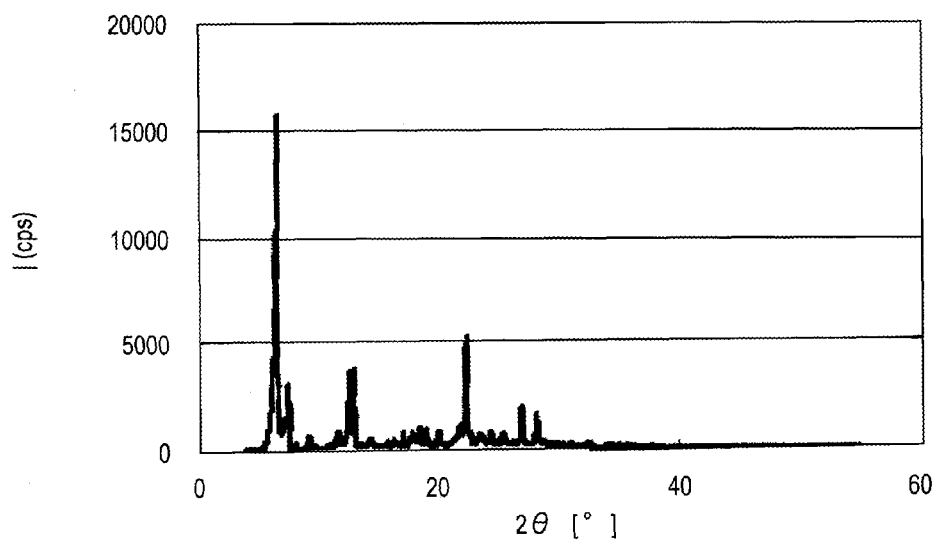
FIG. 8 is a graph of an X-ray diffraction of a β-type crystal form azo pigment β-(1)-1, which is synthesized in Synthesis Example β-1.
Figure 9:
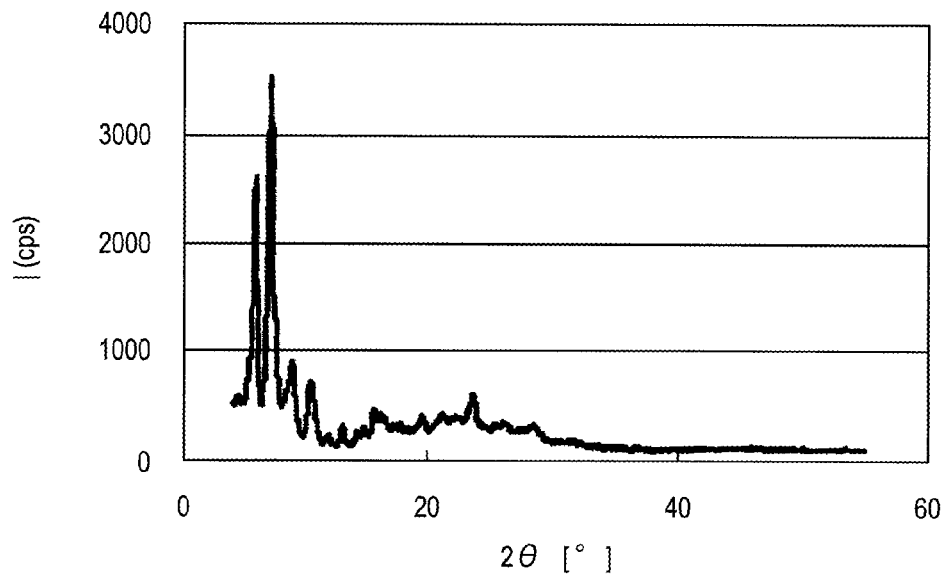
FIG. 9 is a graph of an X-ray diffraction of a γ-type crystal form azo pigment γ-(1)-102, which is synthesized in Synthesis Example β-2.
Figure 10:
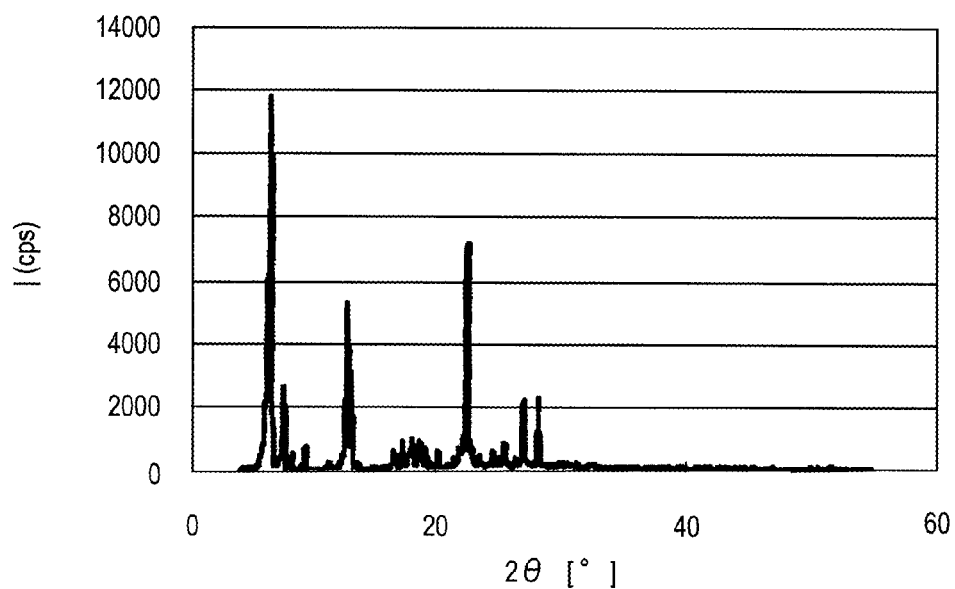
FIG. 10 is a graph of an X-ray diffraction of a β-type crystal form azo pigment β-(1)-3, which is synthesized in Synthesis Example β-3.
Figure 11:
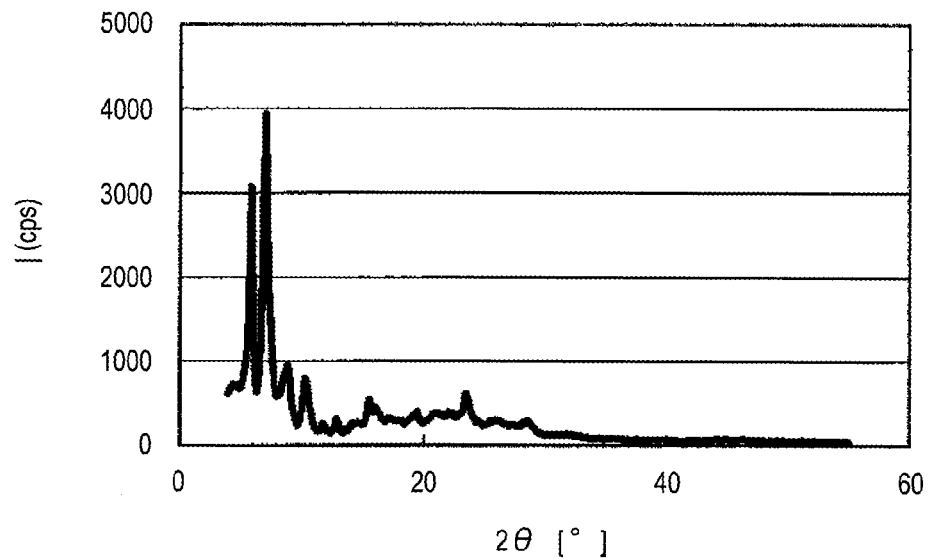
FIG. 11 is a graph of an X-ray diffraction of a γ-type crystal form azo pigment γ-(1)-1, which is synthesized according to Synthesis Example γ-1.
Figure 12:
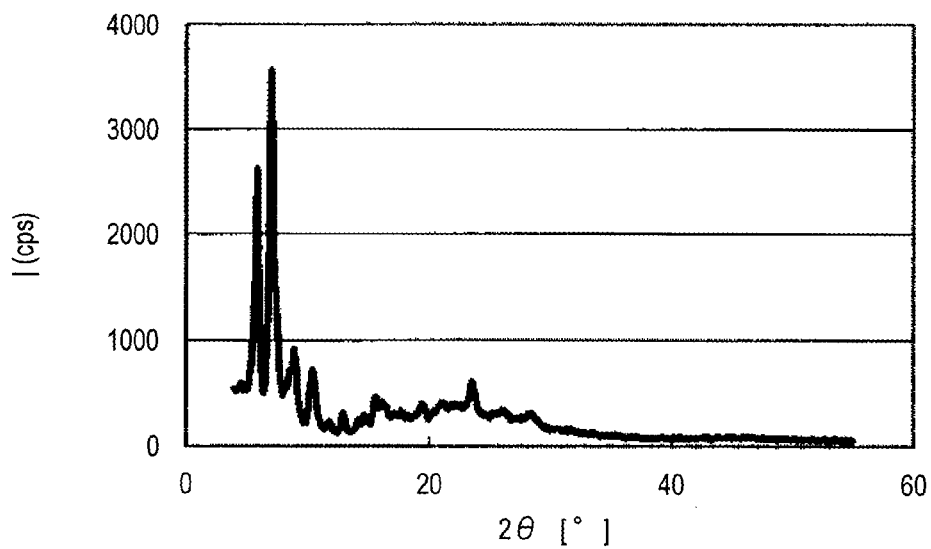
FIG. 12 is a graph of an X-ray diffraction of a γ-type crystal form azo pigment γ-(1)-2, which is synthesized according to Synthesis Example γ-2.
Figure 13:
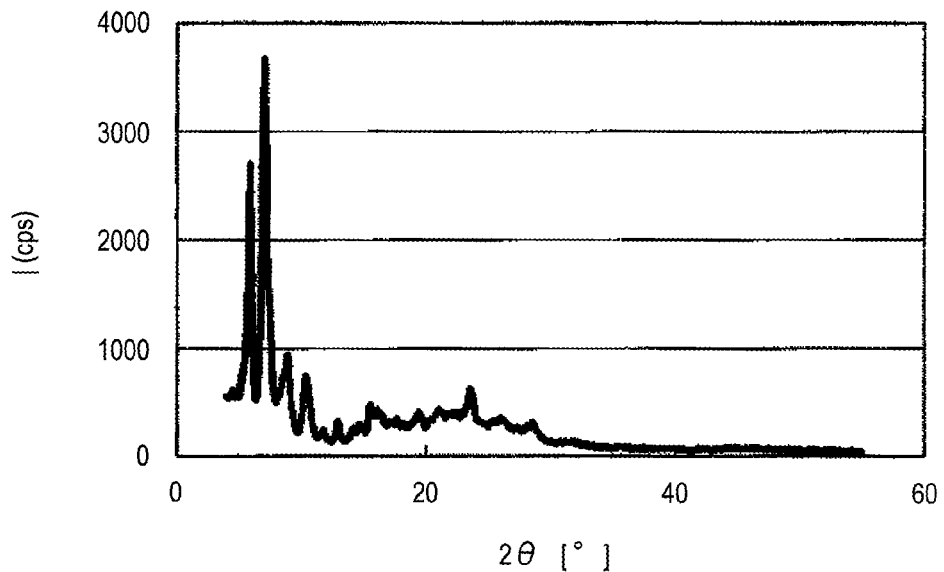
FIG. 13 is a graph of an X-ray diffraction of a γ-type crystal form azo pigment γ-(1)-3, which is synthesized according to Synthesis Example γ-3.
Figure 14:
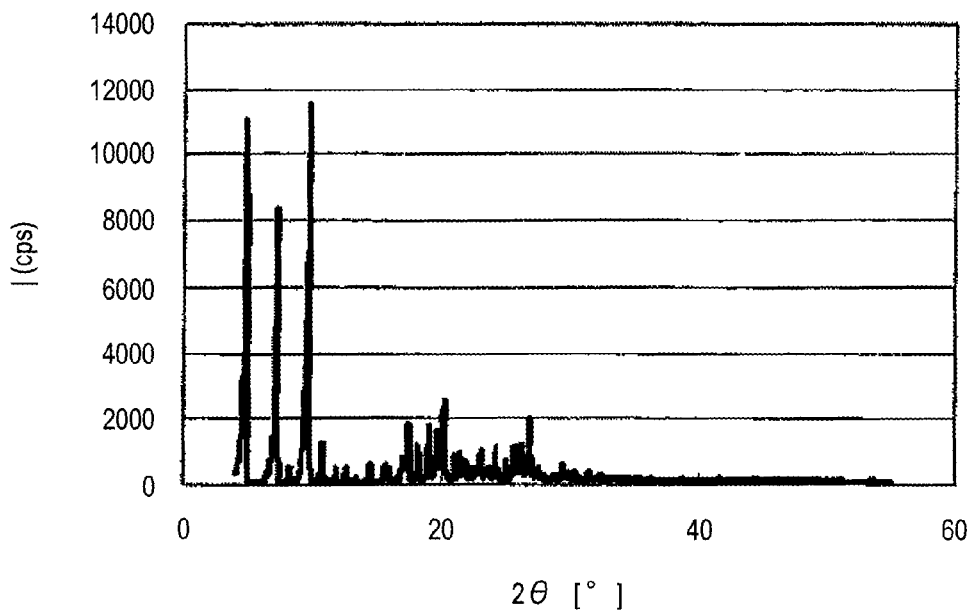
FIG. 14 is a graph of an X-ray diffraction of a δ-type crystal form azo pigment δ-(1)-1, which is synthesized in Synthesis Example δ-1.
Figure 15:
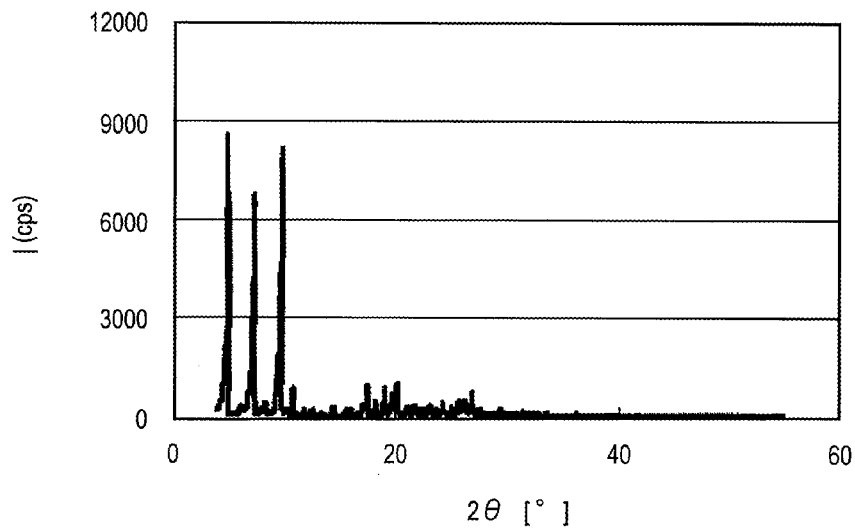
FIG. 15 is a graph of an X-ray diffraction of a δ-type crystal form azo pigment δ-(1)-2, which is synthesized in Synthesis Example δ-2.
Figure 16:
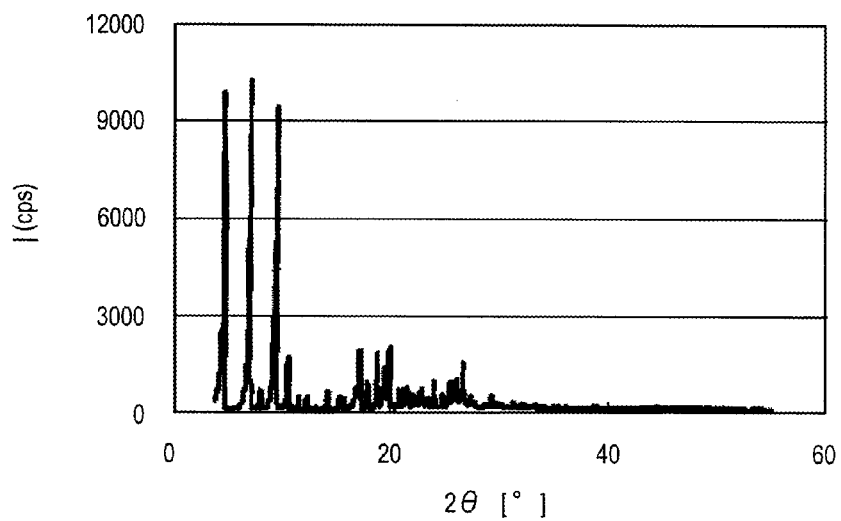
FIG. 16 is a graph of an X-ray diffraction of a δ-type crystal form azo pigment δ-(1)-3, which is synthesized in Synthesis Example δ-3.
Figure 17:
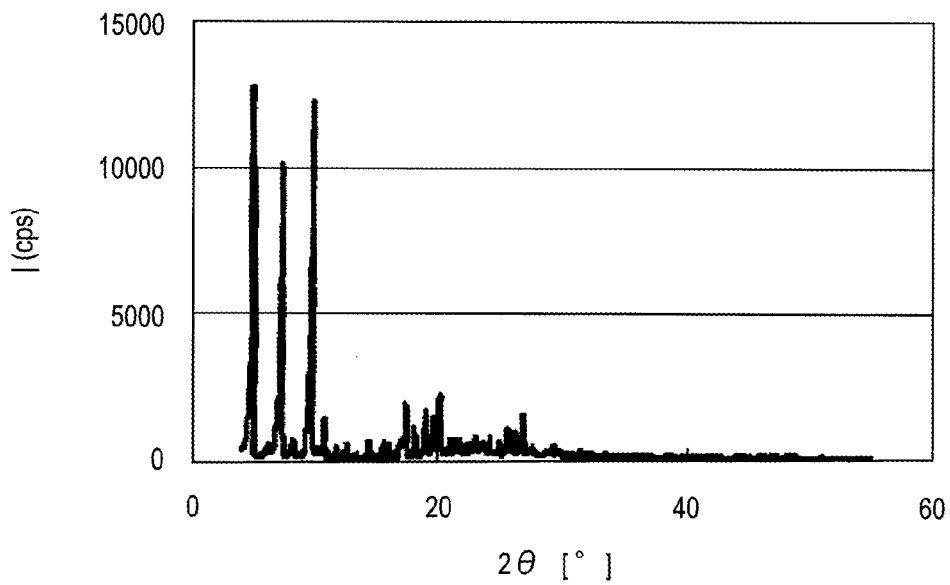
FIG. 17 is a graph of an X-ray diffraction of a δ-type crystal form azo pigment δ-(1)-4, which is synthesized in Synthesis Example δ-4.
Figure 18:
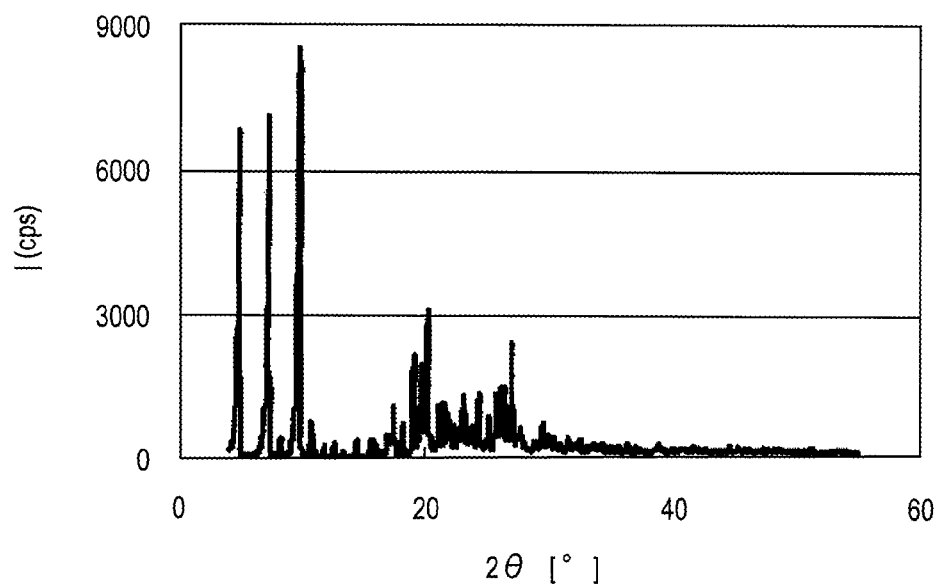
FIG. 18 is a graph of an X-ray diffraction of a δ-type crystal form azo pigment δ-(1)-5, which is synthesized in Synthesis Example δ-5.
Figure 19:
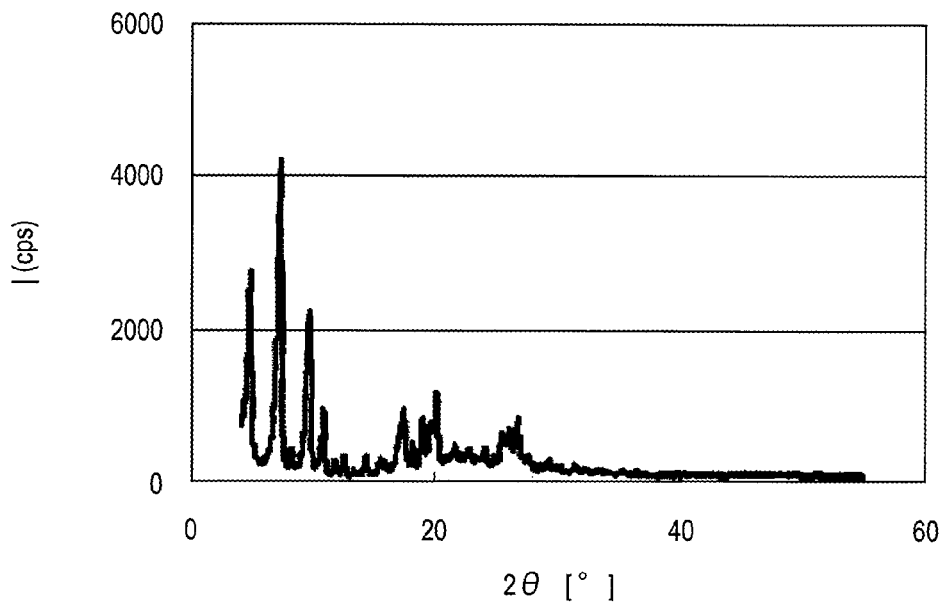
FIG. 19 is a graph of an X-ray diffraction of a δ-type crystal form azo pigment δ-(1)-3-A, which is synthesized in Example δ-6.
Figure 20:
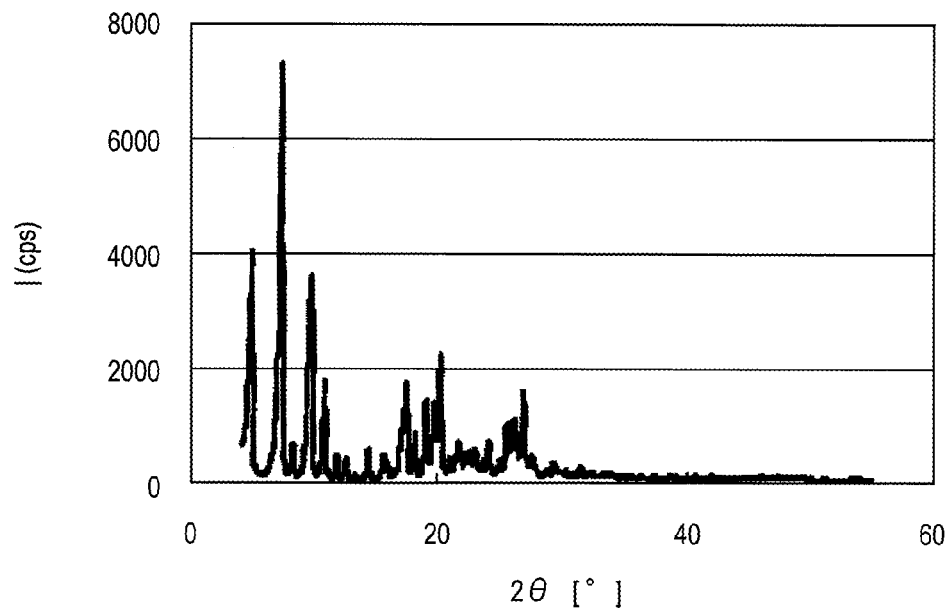
FIG. 20 is a graph of an X-ray diffraction of a δ-type crystal form azo pigment δ-(1)-7-A, which is synthesized in Example δ-7.
Figure 21:
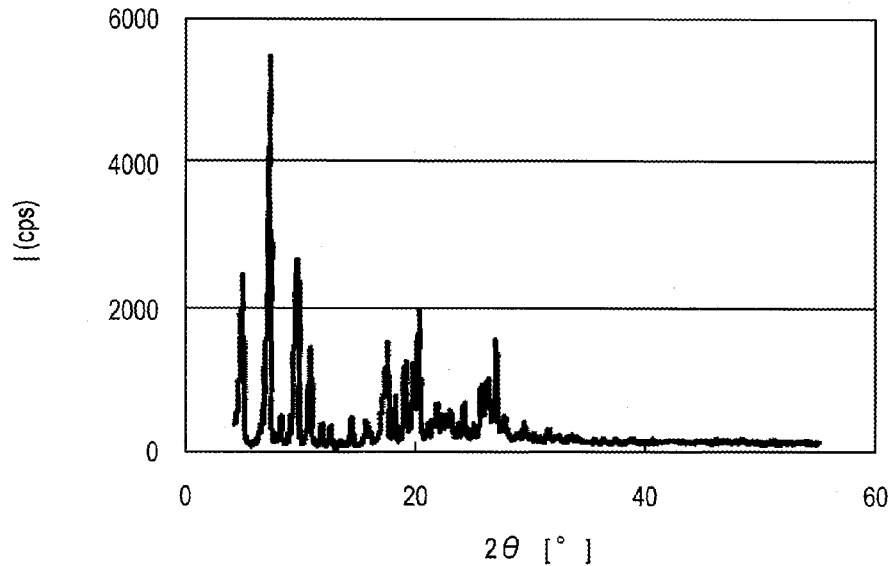
FIG. 21 is a graph of an X-ray diffraction of a δ-type crystal form azo pigment δ-(1)-1-A, which is synthesized in Synthesis Example δ-8.
Figure 22:
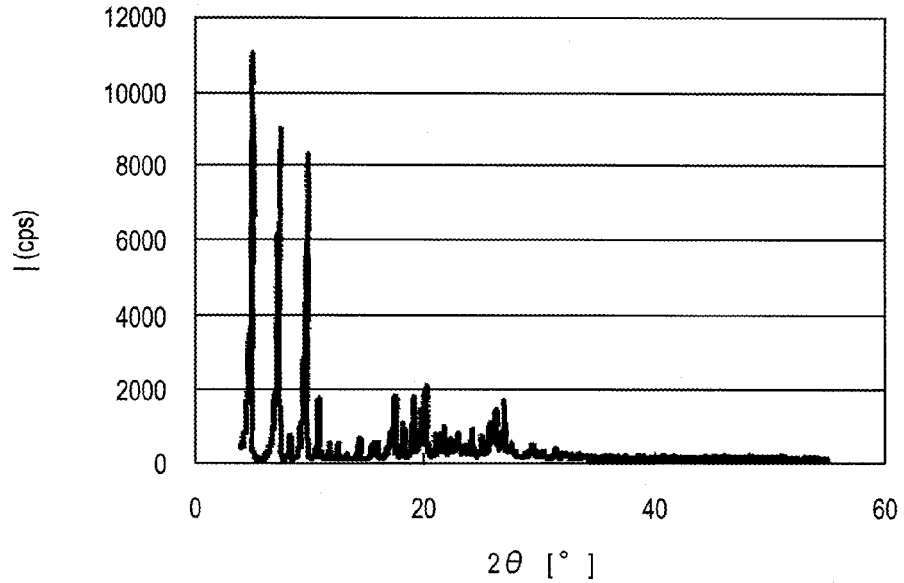
FIG. 22 is a graph of an X-ray diffraction of a δ-type crystal form azo pigment δ-(1)-5-A, which is synthesized in Example δ-9.
Figure 23:
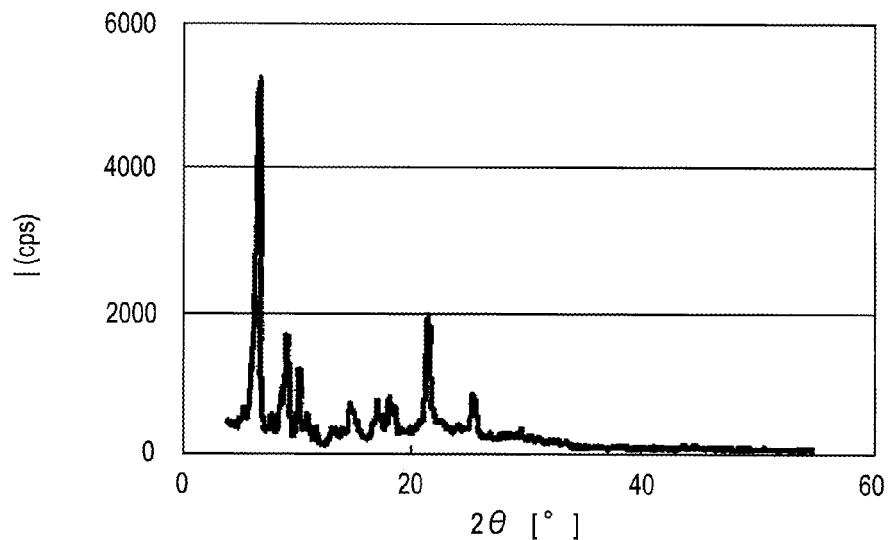
FIG. 23 is a graph of an X-ray diffraction of a ζ-type crystal form azo pigment δ-(1)-101-A, which is synthesized in Comparative Example δ-3.
Figure 24:
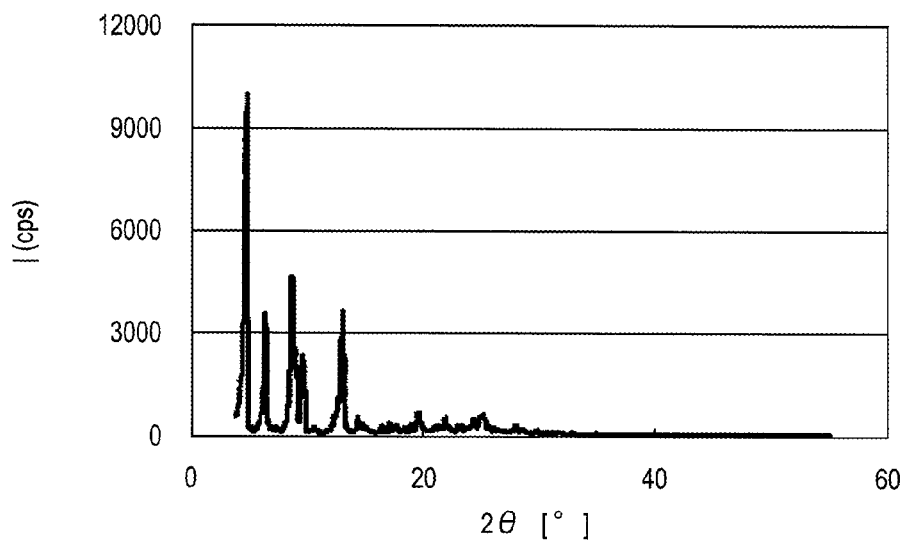
FIG. 24 is a graph of an X-ray diffraction of an ε-type crystal form azo pigment ε-(1)-1, which is synthesized in Synthesis Example ε-1.
Figure 25:
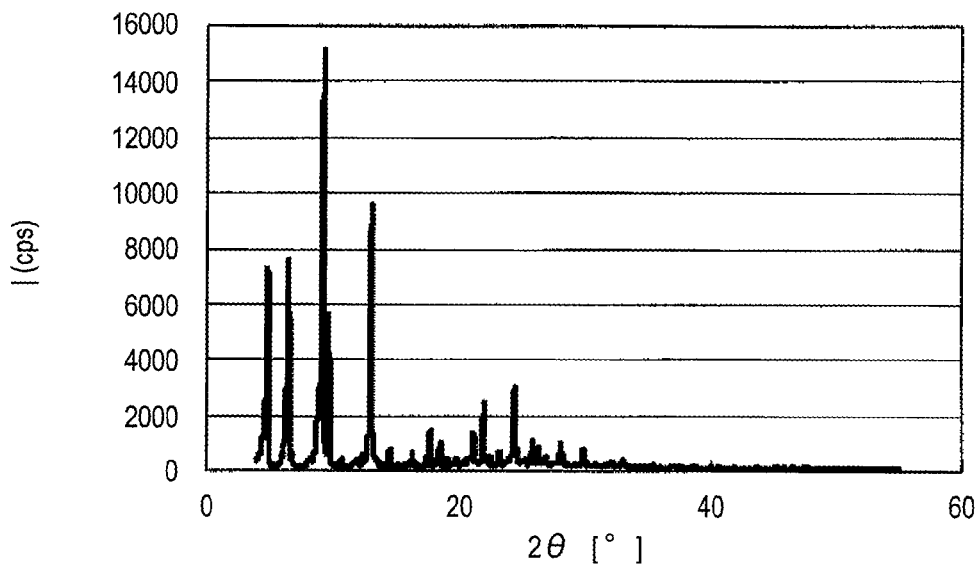
FIG. 25 is a graph of an X-ray diffraction of an η-type crystal form azo pigment η-(1)-2, which is synthesized in Synthesis Example ε-2.
Figure 26:
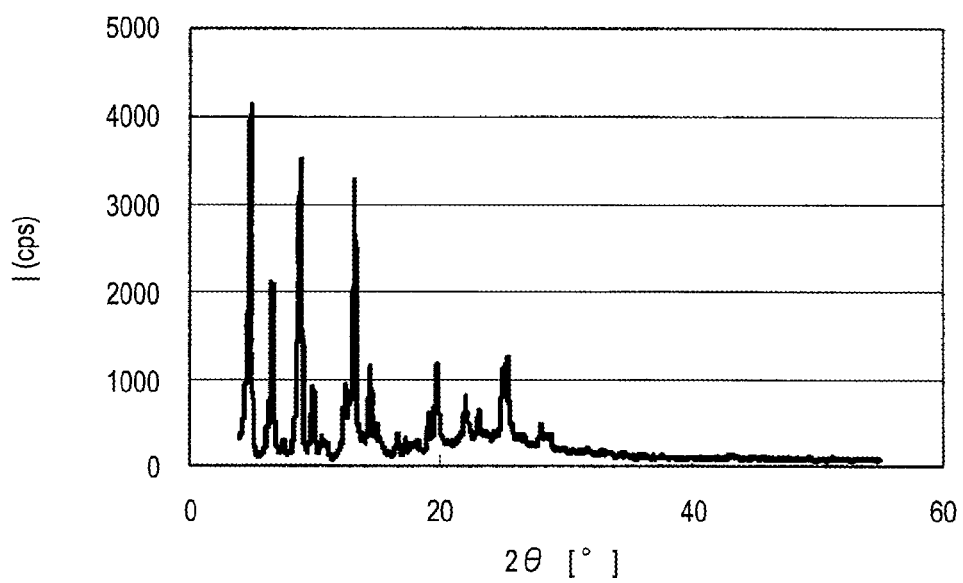
FIG. 26 is a graph of an X-ray diffraction of an ε-type crystal form azo pigment ε-(1)-2, which is synthesized in Synthesis Example ε-2.
Figure 27:
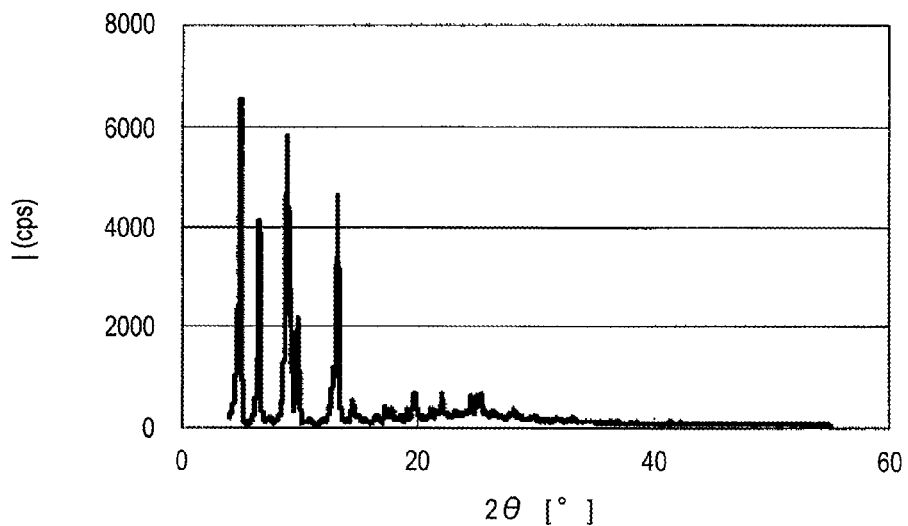
FIG. 27 is a graph of an X-ray diffraction of an ε-type crystal form azo pigment ε-(1)-3, which is synthesized in Synthesis Example ε-3.
Figure 28:
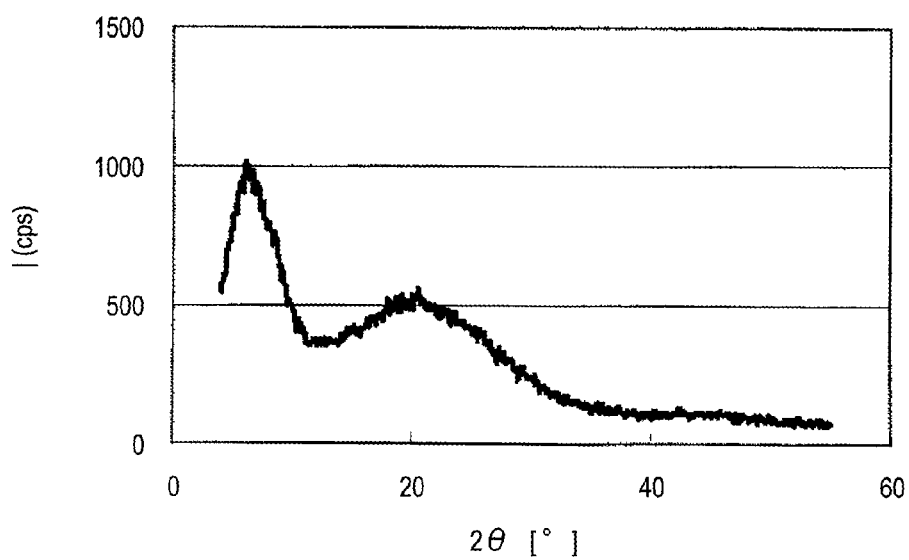
FIG. 28 is a graph of an X-ray diffraction of an amorphous azo compound 5-(1)-4, which is synthesized in Comparative Synthesis Example ε-1.
Figure 29:
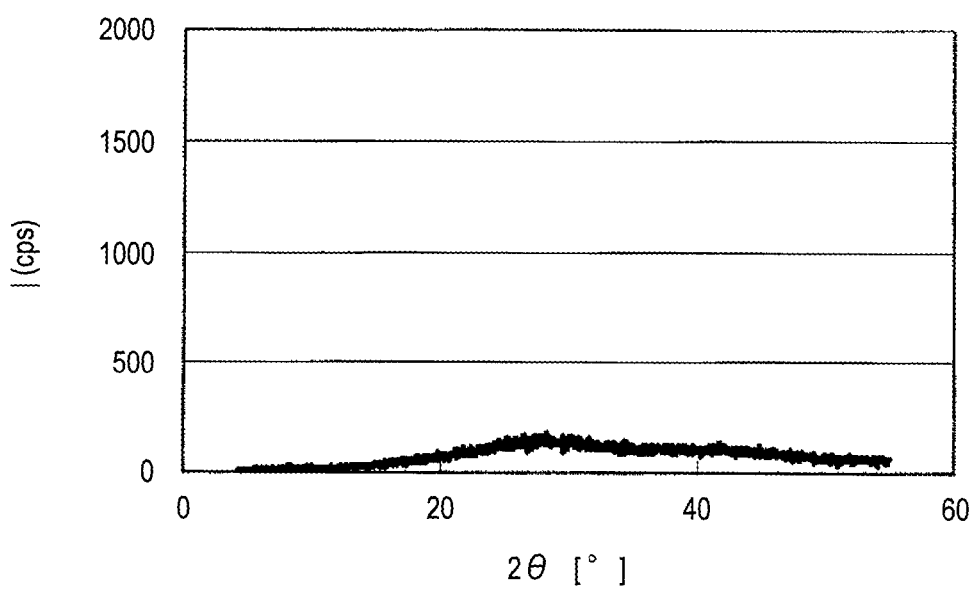
FIG. 29 is a graph of an X-ray diffraction of an amorphous azo compound 5-(1)-5, which is synthesized in Comparative Synthesis Example ε-2.
Figure 30:
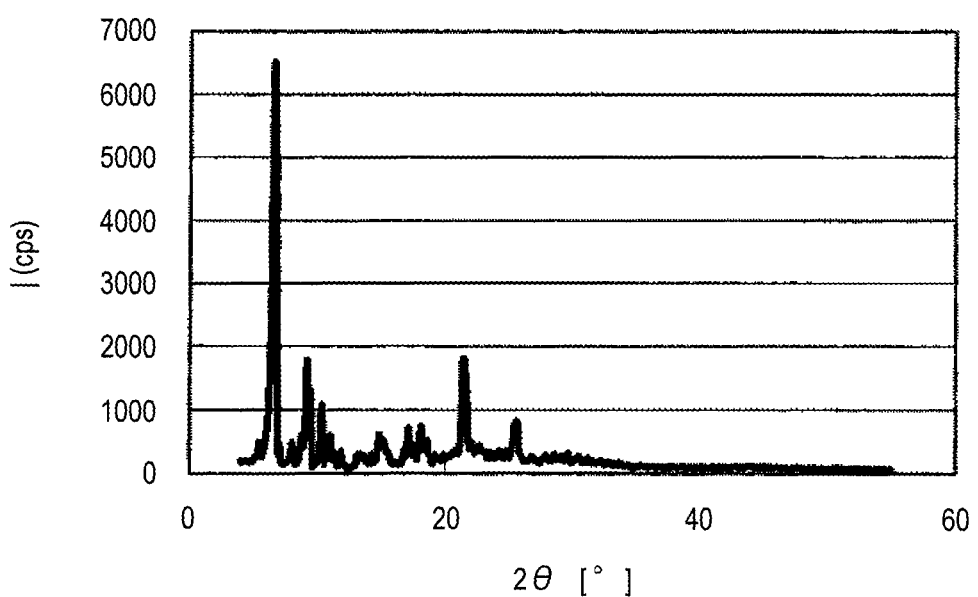
FIG. 30 is a graph of an X-ray diffraction of a ζ-type crystal form pigment ζ-(1)-1, which is synthesized according to Synthesis Example ζ-1.
Figure 31:
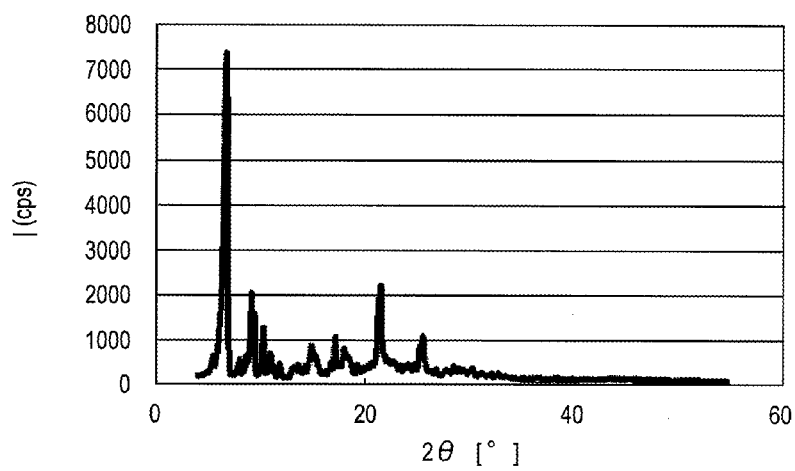
FIG. 31 is a graph of an X-ray diffraction of a ζ-type crystal form pigment ζ-(1)-2, which is synthesized according to Synthesis Example ζ-2.
Figure 32:
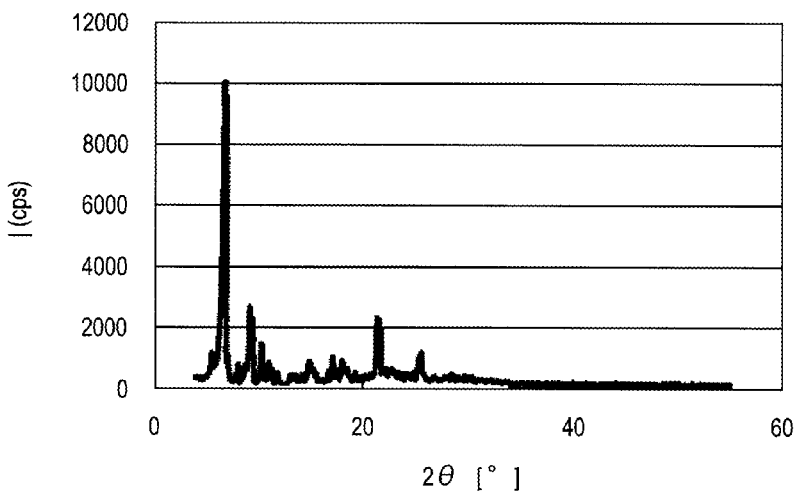
FIG. 32 is a graph of an X-ray diffraction of a ζ-type crystal form pigment ζ-(1)-3, which is synthesized according to Synthesis Example ζ-3.
Figure 33:
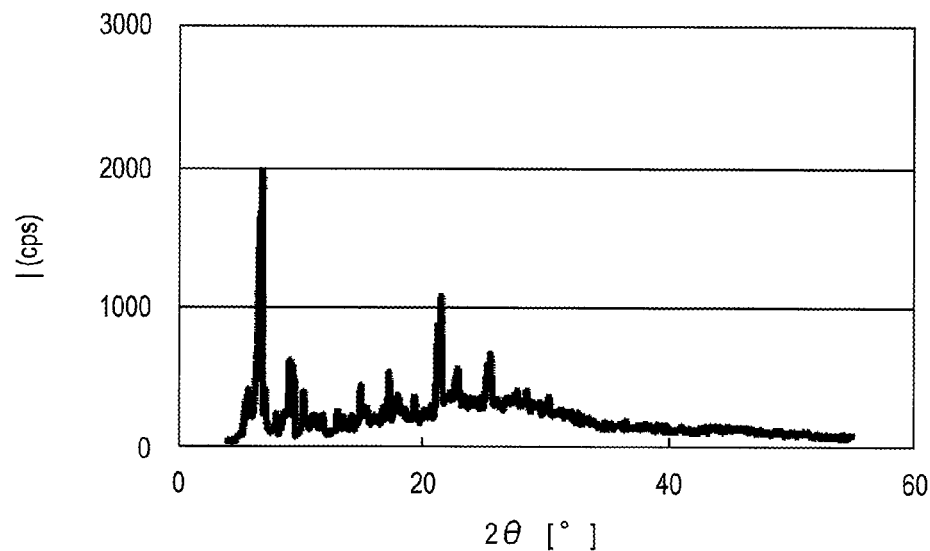
FIG. 33 is a graph of an X-ray diffraction of a ζ-type crystal form pigment ζ-(1)-4, which is synthesized according to Synthesis Example ζ-4.
Figure 34:
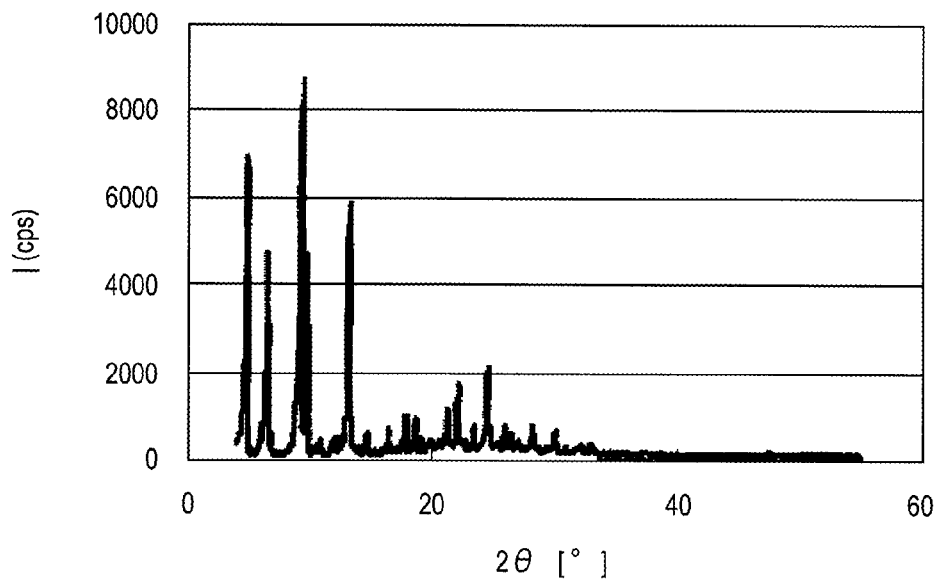
FIG. 34 is a graph of an X-ray diffraction of an η-type crystal form azo pigment η-(1)-1, which is synthesized in Synthesis Example η-1.
Figure 35:
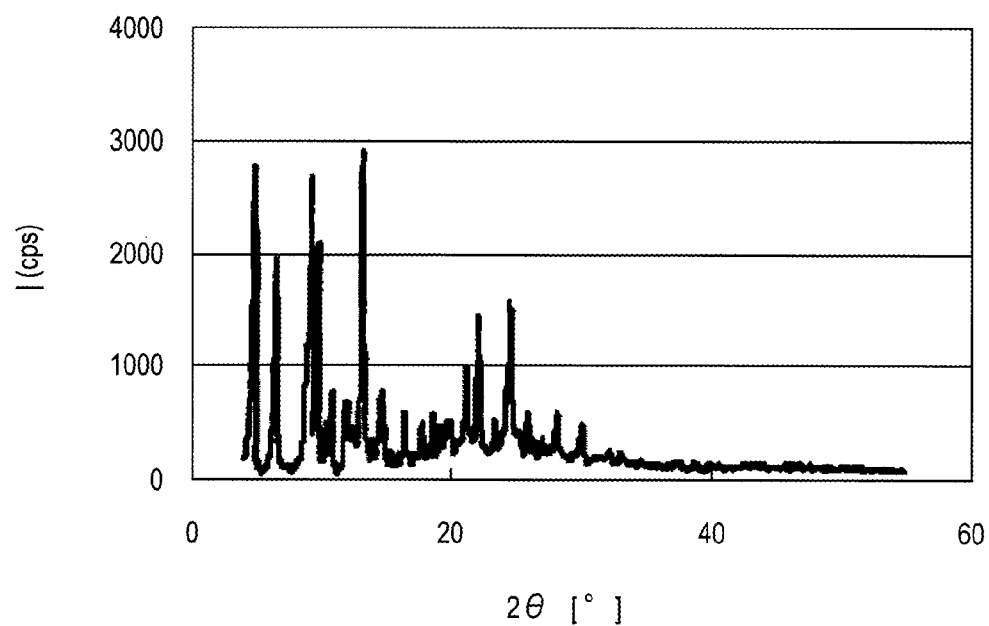
FIG. 35 is a graph of an X-ray diffraction of an η-type crystal form azo pigment η-(1)-3, which is synthesized in Synthesis Example η-3.

A CuKα characteristic X-ray diffraction diagram is illustrated in FIG. 5-7.

Comparative Synthesis Example ε-2

Synthesis of Amorphous Azo Compound 5-(1)-5

16.2 g of a 43% nitrosylsulfuric acid solution was added to a mixed solvent composed of 50 g of acetic acid and 8 g of sulfuric acid over 20 minutes. The solution was cooled down to 3° C., and a diazotization reaction was performed by adding 11.55 g of a compound represented by the following Formula (2) as a powder thereto. After the mixture was stirred at the same temperature for 1 hour, a diazonium compound liquid preparation was obtained by deactivating the excess nitrosylsulfuric acid with 0.094 g of urea.

10 g of a compound represented by the following Formula (3) was dividedly added as a powder to the above-described diazonium compound liquid preparation at 5° C. or less. After the addition was completed, an azo compound dissolved solution was obtained by increasing the temperature to 20° C. and reacting the mixture for 4 hours. Meanwhile, the precipitation of the pigment was not observed during the coupling reaction, and the azo compound dissolved solution was in a state of completely dissolving the azo compound obtained.

A poor solvent composed of 150 mL of water was prepared and stirred at 5° C. and 200 rpm. The above-described azo compound dissolved solution was added dropwise to the poor solvent.

The resulting solution was stirred as it was for 15 minutes, and then a solid precipitated was filtered off.

A solution with a pH of 6.0 was prepared by suspending the solid obtained in 200 mL of water and adding a 28% ammonia water thereto. 23.8 g (yield 94.3%) of an amorphous azo compound 5-(1)-5 was obtained by filtering off the crystal precipitated and washing the crystal sufficiently with water.

The amorphous azo compound 5-(1)-5 obtained was observed by visual inspection using a transmission microscope (manufactured by JEOL Ltd.: JEM-1010 electron microscope), and as a result, the length of primary particles in a long axis direction was about 500 nm.

The X-ray diffraction of the amorphous azo compound 5-(1)-5 was measured by the aforementioned conditions, and as a result, no characteristic X-ray diffraction peak may be confirmed.

A CuKα characteristic X-ray diffraction diagram is illustrated in FIG. 5-8.

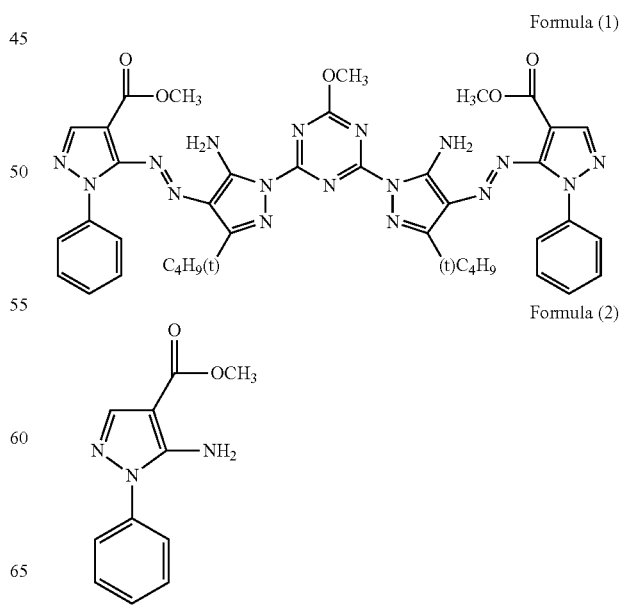

-continued

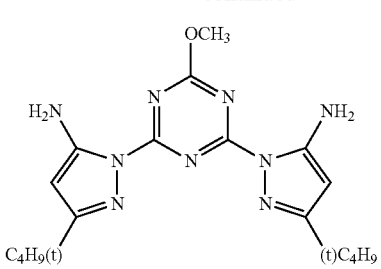

Formula (3)

Example ε-1

Manufacture of Pigment Dispersion ε-1

2.5 parts by mass of the ε-type crystal form azo pigment ε-(1)-1 synthesized in Synthesis Example ε-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 8 hours. After the dispersion was completed, a yellow pigment dispersion ε-1 (volume average particle diameter; Mv≈120.3 nm: measured using Nanotrac 150 (UPA-EX150) manufactured by Nikkiso Co., Ltd.) was obtained by separating the zirconia bead.

Example ε-2

Manufacture of Pigment Dispersion ε-2

2.5 parts by mass of the ε-type crystal form azo pigment ε-(1)-2 synthesized in Synthesis Example ε-2 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 7 hours. After the dispersion was completed, a yellow pigment dispersion ε-2 (volume average particle diameter; Mv≈105.2 nm: measured using Nanotrac 150 (UPA-EX150) manufactured by Nikkiso Co., Ltd.) was obtained by separating the zirconia bead.

Example ε-3

Manufacture of Pigment Dispersion ε-3

2.5 parts by mass of the ε-type crystal form azo pigment ε-(1)-3 synthesized in Synthesis Example ε-3 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 5 hours. After the dispersion was completed, a yellow pigment dispersion ε-3 (volume average particle diameter; Mv≈118.8 nm: measured using Nanotrac 150 (UPA-EX150) manufactured by Nikkiso Co., Ltd.) was obtained by separating the zirconia bead.

Comparative Example ε-1

Manufacture of Comparative Pigment Dispersion ε-1

2.5 parts by mass of the amorphous azo compound 5-(1)-4 synthesized in Comparative Synthesis Example E-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 8 hours. After the dispersion was completed, a yellow comparative pigment dispersion ε-1 (volume average particle diameter; Mv □ 207.5 nm: measured using Nanotrac 150 (UPA-EX150) manufactured by Nikkiso Co., Ltd.) was obtained by separating the zirconia bead.

Comparative Example ε-2

Manufacture of Comparative Pigment Dispersion ε-2

2.5 parts by mass of the amorphous azo compound 5-(1)-5 synthesized in Comparative Synthesis Example E-2 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 8 hours. After the dispersion was completed, a yellow comparative pigment dispersion ε-2 (volume average particle diameter; Mv≈229.3 nm: measured using Nanotrac 150 (UPA-EX150) manufactured by Nikkiso Co., Ltd.) was obtained by separating the zirconia bead.

Comparative Example ε-3

Manufacture of Comparative Pigment Dispersion ε-3

2.5 parts by mass of the C.I. Pigment Yellow 155 (INKJET YELLOW 4G VP2532 manufactured by Clariant Corporation) was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 3 hours. After the dispersion was completed, a yellow comparative pigment dispersion ε-3 (volume average particle diameter; Mv≈83.3 nm: measured using Nanotrac 150 (UPA-EX150) manufactured by Nikkiso Co., Ltd.) was obtained by separating the zirconia bead.

[Evaluation of Performance of Pigment Dispersion]
<Evaluation of Tinctorial Strength>

Each of the pigment dispersions obtained in the Examples and Comparative Examples was applied on Photo Matte Paper manufactured by EPSON Inc., using a No. 3 bar coater. An image concentration of each of the applied products obtained was measured using a reflection densitometer (X-Rite 938 manufactured by X-Rite Co.), and the "tinctorial strength (OD: Optical Density)" was evaluated in accordance with the following criteria. Samples showing an OD of 1.4 or more were ranked A, samples showing an OD of 1.2 or more and less than 1.4 were ranked B, and samples showing an OD less than 1.2 were ranked C. The results were shown in Table ε-1.

<Evaluation of Hue>

Hue was evaluated by confirming the chromaticity of the applied product obtained above with the eyes and ranking the chromaticity as A which has slight reddishness and clear vividness, B which has negligible reddishness and C (defective) which has no reddishness but greenishness. The results were shown in Table ε-1.

<Evaluation of Light Fastness>

The applied products having an image concentration of 1.0 used in the evaluation of hue were prepared and irradiated for 28 days with a xenon light (99,000 lux; in the presence of a TAC filter) using a fadeometer, the image concentration thereof was measured before and after irradiation with the xenon light using a reflection densitometer, and evaluation was performed by ranking samples with a colorant residual ratio [(concentration after irradiation/concentration before irradiation)×100%] of 95% or more as A, samples with a colorant residual ratio of 80% or more and less than 95% as B, and samples with a colorant residual ratio less than 80% as C. The results were shown in Table ε-1.

<Evaluation of Purity>

The purity of the azo pigment represented by Formula (1) was measured by performing measurement by high-speed liquid chromatoFig.y. Evaluation was performed by ranking samples with a purity of 95%, with a purity of 90% or more and less than 95%, and with a purity less than 90% as A, B and C, respectively. The results were shown in Table ε-1.

TABLE ε-1

| | Color material | Tinctorial strength | Hue | Light resistance | Purity | Evaluation of purity |
|---|---|---|---|---|---|---|
| Example ε-1 | ε-type crystal form azo pigment ε-(1)-1 | A | A | A | 97.4% | A |
| Example ε-2 | ε-type crystal form azo pigment ε-(2)-1 | A | A | A | 96.3% | A |
| Example ε-3 | ε-type crystal form azo pigment ε-(3)-1 | A | A | A | 96.1% | A |
| Comp. Example ε-1 | Amorphous azo compound 5-(1)-4 | A | B | A | 91.2% | B |
| Comp. Example ε-2 | Amorphous azo compound 5-(1)-5 | A | B | B | 84.2% | C |
| Comp. Example ε-3 | C.I. Pigment Yellow-155 | B | C | C | — | — |

From the results in Table ε-1, it can be seen that the ε-type crystal form azo pigment represented by Formula (1) has excellent tinctorial strength, hue, light resistance and purity.

Example of Sixth Aspect

Synthesis Example ζ-1

Synthesis of ζ-Type Crystal Form Azo Pigment ζ-(1)-1

5.6 parts of a 43% nitrosylsulfuric acid solution was added to a mixed solvent composed of 37.2 parts of acetic acid and 14.3 parts of sulfuric acid over 10 minutes. The solution was cooled down to 3° C., and a diazotization reaction was performed by adding 3.7 parts of a compound represented by the following Formula (2) as a powder thereto. After the mixture was stirred at the same temperature for 1 hour, a diazonium compound liquid preparation was obtained by deactivating the excess nitrosylsulfuric acid with urea.

3.0 parts g of a compound represented by the following Formula (3) was dividedly added as a powder to the above-described diazonium compound liquid preparation at 5° C. or less. After the addition was completed, an azo compound dissolved solution was obtained by increasing the temperature to 20° C. and reacting the mixture for 2 hours. Meanwhile, the precipitation of the pigment was not observed during the coupling reaction, and the azo compound dissolved solution was in a state of completely dissolving the azo compound obtained.

A poor solvent composed of 130 parts of methanol was prepared and stirred at 5° C. and 200 rpm. The above-described azo compound dissolved solution was added dropwise to the poor solvent.

After the resulting solution was stirred for 15 minutes, the pH was adjusted to 6.2 by filtering off the powder produced, washing the powder with 100 mL of methanol, suspending the powder in 100 mL of water, and using a 28% ammonia water. An azo pigment ζ-(1)-1 having a ζ-type crystal form was obtained by filtering off the crystal precipitated and washing the crystal sufficiently with water.

The ζ-type crystal form azo pigment ζ-(1)-1 obtained was observed by visual inspection using a transmission microscope (manufactured by JEOL Ltd.: JEM-1010 electron microscope), and as a result, the length of primary particles in a long axis direction was about 150 nm to about 300 nm.

The X-ray diffraction of the ζ-type crystal form azo pigment ζ-(1)-1 was performed by the aforementioned conditions, and as a result, characteristic X-ray diffraction peaks were shown at Bragg angles (2θ±0.2°) of 6.6°, 9.2°, 10.3°, 21.5° and 25.6°.

A CuKα characteristic X-ray diffraction diagram is illustrated in FIG. 6-1.

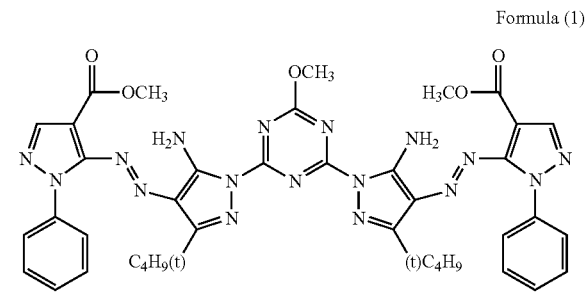

Formula (1)

Formula (2)

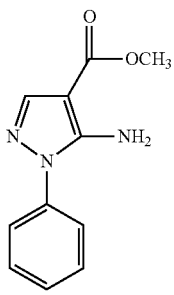

Formula (3)

OCH₃

H₂N—[pyrazole]—N—[triazine]—N—[pyrazole]—NH₂

C₄H₉(t)                                    (t)C₄H₉

Synthesis Example ζ-2

Synthesis of ζ-Type Crystal Form Azo Pigment
ζ-(1)-2

11.8 g of the compound of Formula (2) was dissolved in 50 g of acetic acid and 16 g of sulfuric acid, and the internal temperature was set to 5° C. by ice-cooling the solution. 16.9 g of a 43% sulfuric acid solution of nitrosylsulfuric acid was added dropwise thereto such that the internal temperature was 10° C. or less. After the solution was stirred at an internal temperature of 5° C. for 1 hour, a diazonium salt solution was obtained by adding 0.2 g of urea thereto and stirring the resulting mixture at the same temperature for 15 minutes. Apart from the aforementioned preparation, 10 g of the compound of Formula (3) was suspended in 350 mL of methanol, and was completed dissolved by stirring the suspension under reflux for 30 minutes by increasing the temperature. The solution was cooled down to an internal temperature of 5° C. by ice-cooling the solution, and the above-described diazonium salt solution was added thereto over 10 minutes such that the internal temperature was 10° C. or less. The resulting solution was stirred at an internal temperature of 10° C. for 2 hours, and the crystal precipitated was filtered off and washed with 200 mL of methanol. The crystal was suspended in 300 mL of water, and the pH was adjusted to 6.2 using a 28% ammonia water. 19.8 g of an azo pigment ζ-(1)-2 having ζ-type crystal form was obtained by filtering off the crystal precipitated and washing the crystal sufficiently with water.

The ζ-type crystal form azo pigment ζ-(1)-2 obtained was observed by visual inspection using a transmission microscope (manufactured by JEOL Ltd.: JEM-101.0 electron microscope), and as a result, the length of primary particles in a long axis direction was about 300 nm to about 600 nm.

The X-ray diffraction of the ζ-type crystal form azo pigment ζ-(1)-2 was performed by the aforementioned conditions, and as a result, characteristic X-ray diffraction peaks were shown at Bragg angles (2θ±0.2°) of 6.6°, 9.2°, 10.3°, 21.5° and 25.6°.

A CuKα characteristic X-ray diffraction diagram is illustrated in FIG. 6-2.

Synthesis Example ζ-3

Synthesis of ζ-Type Crystal Form Azo Pigment
ζ-(1)-3

The internal temperature was set to −3° C. by dissolving 6.7 g of the compound of Formula (2) in 53 mL of an 85% aqueous solution of phosphoric acid, and ice-cooling the resulting solution. 2.1 g of sodium nitrite was slowly added thereto such that the temperature was 3° C. or less. After the addition was completed, the resulting solution was stirred at an internal temperature of 0° C. for 40 minutes, and then 1.8 g of urea was added thereto over 15 minutes. After the addition was completed, a diazonium salt solution was obtained by stirring the resulting solution at the same temperature for 5 minutes. Apart from the aforementioned preparation, 1.67 mL of methanol was heated, and the compound of Formula (3) was slowly added thereto at an internal temperature of 60° C., and then was completely dissolved by stirring the mixture under reflux for 30 minutes by increasing the temperature. After the internal temperature was cooled down to −3° C., the above-described diazonium salt solution was added thereto at an internal temperature of 10° C. or less over 5 minutes. After the addition was completed, the resulting solution was stirred at an internal temperature of 5° C. for 2 hours, and the crystal precipitated was filtered off and washed with 200 mL of methanol. The crystal was suspended in 120 mL of water, and the pH was adjusted to 6.1 with a 28% ammonia water. The crystal precipitated was filtered off, washed sufficiently with water, and dried at 60° C. for 24 hours. The crystal was suspended in 120 mL of methanol, and 9.8 g of an azo pigment ζ-(1)-3 having a ζ-type crystal form was obtained by filtering off the crystal precipitated by stirring the suspension under reflux for 2 hours by increasing the temperature.

The ζ-type crystal form azo pigment ζ-(1)-3 obtained was observed by visual inspection using a transmission microscope (manufactured by JEOL Ltd.: JEM-1010 electron microscope), and as a result, the length of primary particles in a long axis direction was about 450 nm to about 1 μm.

The X-ray diffraction of the ζ-type crystal form azo pigment ζ-(1)-3 was performed by the aforementioned conditions, and as a result, characteristic X-ray diffraction peaks were shown at Bragg angles (2θ±0.2°) of 6.6°, 9.2°, 10.3°, 21.5° and 25.6°.

A CuKα characteristic X-ray diffraction diagram is illustrated in FIG. 6-3.

Synthesis Example ζ-4

Synthesis of ζ-Type Crystal Form Azo Pigment
ζ-(1)-4

11.5 g of the compound of Formula (2) was dissolved by adding 4.5 g of sulfuric acid to 50 g of acetic acid. The internal temperature was cooled down to 5° C. by ice-cooling the solution, and a 43% sulfuric acid solution of nitrosylsulfuric acid was added thereto such that the internal temperature was 8° C. or less. After the resulting solution was stirred at an internal temperature of 5° C. for 1 hour, 0.2 g of urea was added thereto, and the resulting solution was stirred at the same temperature for 15 minutes. 10 g of the compound of Formula (3) was added as a powder thereto such that the internal temperature was 10° C. or less, and a solution of the azo compound of Formula (1) was obtained by stirring the resulting solution at an internal temperature of 10° C. for 2 hours. Apart from the aforementioned preparation, 120 mL of water was prepared, and the above-described solution was added thereto at an internal temperature of 25° C. while being stirred. After the resulting solution was stirred at the same temperature for 20 minutes, the solid precipitated was filtered off and washed with 100 mL of water. The solid was suspended in 200 mL of water, and the pH was adjusted to 6.0 with a 28% ammonia water. 20.3 g of an amorphous azo compound δ-(1)-4 was obtained by filtering off the solid.

5 g of the above-described amorphous azo compound 6-(1)-4 was suspended in 100 mL of phosphoric acid and was completely dissolved by heating the suspension to 60° C., and then a uniform solution of the azo compound (1) was obtained by cooling the resulting solution to an internal temperature of 15° C. Apart from the aforementioned preparation, 500 mL of methanol was prepared, and the above-described uniform solution of the azo compound (1) was added thereto such that the internal temperature was 20° C. or less. After the resulting solution was stirred at an internal temperature of 20° C. for 20 minutes, the crystal precipitated was filtered off and washed with 400 mL of methanol. The crystal was suspended in 100 mL of water, and the pH was adjusted to 6.1 using a 28% ammonia water. 4.2 g of an azo pigment ζ-(1)-4 having a ζ-type crystal form was obtained by filtering off the crystal precipitated and washing the crystal sufficiently with water.

The ζ-type crystal form azo pigment ζ-(1)-4 obtained was observed by visual inspection using a transmission microscope (manufactured by JEOL Ltd.: JEM-1010 electron microscope), and as a result, the length of primary particles in a long axis direction was about 400 nm to about 850 nm n.

The X-ray diffraction of the ζ-type crystal form azo pigment ζ-(1)-4 was performed by the aforementioned conditions, and as a result, characteristic X-ray diffraction peaks were shown at Bragg angles (2θ±0.2°) of 6.6°, 9.2°, 10.3°, 21.5° and 25.6°.

A CuKα characteristic X-ray diffraction diagram is illustrated in FIG. 6-4.

Example ζ-1

Manufacture of Pigment Dispersion ζ-1

2.5 parts by mass of the ζ-type crystal form azo pigment ζ-(1)-1 synthesized in Synthesis Example ζ-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 7 hours. After the dispersion was completed, a yellow pigment dispersion ζ-1 (volume average particle diameter; Mv≈98 nm: measured using Nanotrac 150 (UPA-EX150) manufactured by Nikkiso Co., Ltd.) was obtained by separating the zirconia bead.

Example ζ-2

Manufacture of Pigment Dispersion ζ-2

2.5 parts by mass of the ζ-type crystal form azo pigment ζ-(1)-2 synthesized in Synthesis Example ζ-2 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 7 hours. After the dispersion was completed, a yellow pigment dispersion ζ-2 (volume average particle diameter; Mv≈110 nm: measured using Nanotrac 150 (UPA-EX150) manufactured by Nikkiso Co., Ltd.) was obtained by separating the zirconia bead.

Example ζ-3

Manufacture of Pigment Dispersion ζ-3

2.5 parts by mass of the ζ-type crystal form azo pigment ζ-(1)-3 synthesized in Synthesis Example ζ-3 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 7 hours. After the dispersion was completed, a yellow pigment dispersion ζ-3 (volume average particle diameter; Mv≈92 nm: measured using Nanotrac 150 (UPA-EX150) manufactured by Nikkiso Co., Ltd.) was obtained by separating the zirconia bead.

Example ζ-4

Manufacture of Pigment Dispersion ζ-4

2.5 parts by mass of the ζ-type crystal form azo pigment ζ-(1)-4 synthesized in Synthesis Example ζ-4 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 5 hours. After the dispersion was completed, a yellow pigment dispersion ζ-4 (volume average particle diameter; Mv≈84 nm: measured using Nanotrac 150 (UPA-EX150) manufactured by Nikkiso Co., Ltd.) was obtained by separating the zirconia bead.

Comparative Example ζ-1

2.5 parts by mass of the amorphous azo compound 6-(1)-4 synthesized in Synthesis Example ζ-4 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 8 hours. After the dispersion was completed, a yellow comparative pigment dispersion ζ-1 (volume average particle diameter; Mv≈207.5 nm: measured using Nanotrac 150 (UPA-EX150) manufactured by Nikkiso Co., Ltd.) was obtained by separating the zirconia bead.

Comparative Example ζ-2

Manufacture of Comparative Pigment Dispersion ζ-2

2.5 parts by mass of the C.I. Pigment Yellow 74 (manufactured by Clariant Corporation) was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 3 hours. After the dispersion was completed, a yellow comparative pigment dispersion ζ-2 (volume average particle diameter; Mv≈83.3 nm: measured using Nanotrac 150 (UPA-EX150) manufactured by Nikkiso Co., Ltd.) was obtained by separating the zirconia bead.

[Evaluation of Performance of Pigment and Pigment Dispersion]

<Evaluation of Tinctorial Strength>

Each of the pigment dispersions obtained in the Examples and Comparative Examples was applied on Photo Matte Paper manufactured by EPSON Inc., using a No. 3 bar coater. An image concentration of each of the applied products obtained was measured using a reflection densitometer (X-Rite 938 manufactured by X-Rite Co.), and the "tinctorial strength (OD: Optical Density)" was evaluated in accordance with the following criteria. Samples showing an OD of 1.4 or more were ranked A, samples showing an OD of 1.2 or more and less than 1.4 were ranked B, and samples showing an OD less than 1.2 were ranked C. The results were shown in Table ζ-1.

<Evaluation of Hue>

Hue was evaluated by confirming the chromaticity of the applied product obtained above with the eyes and ranking the chromaticity as A which has slight reddishness and clear vividness and C (defective) in which any one of the reddishness and vividness was not suitable. The results were shown in Table ζ-1.

<Evaluation of Light Fastness>

The applied products having an image concentration of 1.0 used in the evaluation of hue were prepared and irradiated for 28 days with a xenon light (99,000 lux; in the presence of a TAC filter) using a fadeometer, the image concentration thereof was measured before and after irradiation with the xenon light using a reflection densitometer, and evaluation was performed by ranking samples with a colorant residual ratio [(concentration after irradiation/concentration before irradiation)×100%] of 95% or more as A, samples with a colorant residual ratio of 80% or more and less than 95% as B, and samples with a colorant residual ratio less than 80% as x. The results were shown as light resistance in Table ζ-1.

<Evaluation of Heat Resistance>

The melting temperature of each of the ζ-type crystal form azo pigments ζ-(1)-1 to ζ-(1)-4 obtained in Synthesis Examples ζ-1 to ζ-4 and the amorphous azo compound 6-(1)-4 obtained in Synthesis Example ζ-4 was measured by differential thermal calorimetry simultaneous measurement (TG/DTA). The results evaluated by ranking samples with a melting temperature of 200° C. or more as A and samples with a melting temperature of 200° C. or less as C were shown in Table ζ-1.

TABLE ζ-1

| | Color Material | Tinctorial strengh | Hue | Light fastness | Heat resistance |
|---|---|---|---|---|---|
| Example ζ-1 | ζ-type crystal form azo pigment α-(1)-1 | A | A | A | A |
| Example ζ-2 | ζ-type crystal form azo pigment α-(1)-2 | A | A | A | A |
| Example ζ-3 | ζ-type crystal form azo pigment α-(1)-3 | A | A | A | A |
| Example ζ-4 | ζ-type crystal form azo pigment α-(1)-4 | A | A | A | A |
| Comp. Example ζ-1 | Amorphous azo compound 6-(1) | A | A | A | C |
| Comp. Example ζ-2 | C.I. Pigment Yellow-74 | A | A | C | A |

Example of Seventh Aspect

Synthesis Example η-1

Synthesis of η-Type Crystal Form Azo Pigment η-(1)-1

16.2 g of a 43% nitrosylsulfuric acid solution was added to a mixed solvent composed of 50 g of acetic acid and 8 g of sulfuric acid over 20 minutes. The solution was cooled down to 3° C., and a diazotization reaction was performed by adding 11.55 g of a compound represented by the following Formula (2) as a powder thereto. After the mixture was stirred at the same temperature for 1 hour, a diazonium compound liquid preparation was obtained by deactivating the excess nitrosylsulfuric acid with 0.094 g of urea.

10 g of a compound represented by the following Formula (3) was dividedly added as a powder to the above-described diazonium compound liquid preparation at 5° C. or less. After the addition was completed, an azo compound dissolved solution was obtained by increasing the temperature to 20° C. and reacting the mixture for 2 hours. Meanwhile, the precipitation of the pigment was not observed during the coupling reaction, and the azo compound dissolved solution was in a state of completely dissolving the azo compound obtained.

A poor solvent composed of 150 mL of methanol was prepared and stirred at 5° C. and 200 rpm. The above-described azo compound dissolved solution was added dropwise to the poor solvent.

After the mixture was stirred as it was for 15 minutes, a ζ-type crystal form azo pigment ζ-(1)-101 was obtained by filtering off the crystal produced.

A solution with a pH of 6.0 was prepared by suspending the ζ-type crystal obtained in 200 mL of water and adding a 28% ammonia water thereto. The crystal (ζ-type) precipitated was filtered off, washed sufficiently with water, and dried at 60° C. for 24 hours. The crystal (ζ-type) obtained was suspended in 200 mL of acetone, and the resulting solution was stirred under reflux for 2 hours by increasing the temperature. 19.7 g of an η-type crystal form azo pigment η-(1)-1 represented by the following general Formula (1) was obtained by cooling down the suspension to room temperature, and filtering off the crystal and washing the crystal sufficiently with acetone.

The ζ-type crystal form azo pigment ζ-(1)-101 obtained was observed by visual inspection using a transmission microscope (manufactured by JEOL Ltd.: JEM-1010 electron microscope), and as a result, the length of primary particles in a long axis direction was about 15 μm.

The X-ray diffraction of the ζ-type crystal form azo pigment ζ-(1)-101 was performed by the aforementioned conditions, and as a result, characteristic X-ray diffraction peaks were shown at Bragg angles (2θ±0.2°) of 6.6°, 9.2°, 10.3°, 21.5° and 25.6°.

A CuKα characteristic X-ray diffraction diagram is illustrated in FIG. 1-1.

The η-type crystal form azo pigment η-(1)-1 obtained was observed by visual inspection using a transmission microscope (manufactured by JEOL Ltd.: JEM-1010 electron microscope), and as a result, the length of primary particles in a long axis direction was about 25 μm.

The X-ray diffraction of the η-type crystal form azo pigment η-(1)-1 was measured by the aforementioned conditions, and as a result, characteristic X-ray diffraction peaks were shown at Bragg angles (2θ±0.2°) of 4.8°, 6.5°, 9.2°, 9.7°, 13.0° and 24.4°.

A CuKα characteristic X-ray diffraction diagram is illustrated in FIG. 7-2.

Synthesis Example η-2

Synthesis of η-Type Crystal Form Azo Pigment
η-(1)-2

67.5 g of a compound represented by the following (2) was dissolved in 530 mL of phosphoric acid, and the internal temperature was cooled down to 3° C. by ice-cooling the solution. 26.9 g of sodium nitrite was dividedly added to the solution over 15 minutes such that the internal temperature was 4° C. or less. After the addition was completed, a diazonium salt solution was obtained by stirring the solution at the same temperature for 50 minutes, and dividedly adding 18.6 g of urea thereto. Apart from the aforementioned preparation, 47.9 g of a compound represented by the following (3) was added to 1,680 mL of methanol, and was completely dissolved under reflux. The internal temperature was cooled down to 0° C. by ice-cooling the solution, and the above-described diazonium salt solution was added thereto over 30 minutes such that the internal temperature was 10° C. or less. After stirring was performed at an internal temperature of 5° C. for 1 hour and 30 minutes, 1.6 L of water was added thereto, and stirring was performed for 30 minutes. The crystal precipitated was filtered off, and then washed with 1 L of water. A solution with a pH of 6.1 was prepared by suspending the crystal obtained in 2.5 L of water and adding a 28% ammonia water thereto. A γ-type crystal form azo pigment γ-(1)-102 represented by the following Formula (1) was obtained by filtering off the crystal, washing the crystal sufficiently with water and drying the crystal at 60° C. for 24 hours. The γ-type crystal form azo pigment γ-(1)-102 obtained was suspended in 1.5 L of acetone, and the suspension was stirred under reflux for 2 hours by increasing the temperature. 101.8 g of an η-type crystal form azo pigment η-(1)-2 represented by the following Formula (1) was obtained by filtering the crystal at a thermal time and washing the crystal sufficiently with acetone.

The γ-type crystal form azo pigment γ-(1)-102 obtained was observed by visual inspection using a transmission microscope (manufactured by JEOL Ltd.: JEM-1010 electron microscope), and as a result, the length of primary particles in a long axis direction was about 2 μm.

The X-ray diffraction of the γ-type crystal form azo pigment γ-(1)-102 was measured by the aforementioned conditions, and as a result, characteristic X-ray diffraction peaks were shown at Bragg angles (2θ±0.2°) of 5.9°, 7.0° and 8.9°.

A CuKα characteristic X-ray diffraction diagram is illustrated in FIG. 2-3.

The η-type crystal form azo pigment η-(1)-2 obtained was observed by visual inspection using a transmission microscope (manufactured by JEOL Ltd.: JEM-1010 electron microscope), and as a result, the length of primary particles in a long axis direction was about 15 μm.

The X-ray diffraction of the η-type crystal form azo pigment η-(1)-2 was measured by the aforementioned conditions, and as a result, characteristic X-ray diffraction peaks were shown at Bragg angles (2θ±0.2°) of 4.8°, 6.5°, 9.2°, 9.7°, 13.0° and 24.4°.

A CuKα characteristic X-ray diffraction diagram is illustrated in FIG. 5-4.

Synthesis Example η-3

Synthesis of η-Type Crystal Form Azo Pigment
η-(1)-3

5.8 g of a compound represented by the following (2) was dissolved in 50 mL of a 12 N hydrochloric acid, and the internal temperature was cooled down to −5° C. by ice-cooling the solution. 30 mL of water in which 2.21 g of sodium nitrite was dissolved was added dropwise thereto such that the temperature was 0° C. or less. A diazonium salt solution was obtained by stirring the resulting solution at an internal temperature of 0° C. for 1 hour, and dividedly adding 0.5 g of urea thereto. Apart from the aforementioned preparation, 5 g of a compound represented by the following (3) was added to 40 mL of acetic acid, and was completely dissolved at an internal temperature of 50° C., the internal temperature was cooled down to 20° C., and the resulting solution was added dropwise to the above-described diazonium salt solution such that the internal temperature was 5° C. or less. After the dropwise addition was completed, the solution was heated to an internal temperature of 10° C., and was stirred at the same temperature for 3 hours. The crystal precipitated was filtered off, and then washed with 500 mL of water. A solution with a pH of 6.2 was prepared by suspending the crystal obtained in 200 mL of water and adding a 28% ammonia water thereto. The crystal was filtered off, washed sufficiently with water, and then dried at 80° C. for 12 hours. The crystal obtained was suspended in 100 mL of acetone, and the resulting suspension was stirred under reflux for 2 hours by increasing the temperature. 8.5 g of an η-type crystal form azo pigment η-(1)-3 represented by the following Formula (1) was obtained by cooling down the suspension to room temperature, and filtering off the crystal and washing the crystal sufficiently with acetone.

The η-type crystal form azo pigment η-(1)-3 obtained was observed by visual inspection using a transmission microscope (manufactured by JEOL Ltd.: JEM-1010 electron microscope), and as a result, the length of primary particles in a long axis direction was about 20 μm.

The X-ray diffraction of the η-type crystal form azo pigment η-(1)-3 was measured by the aforementioned conditions, and as a result, characteristic X-ray diffraction peaks were shown at Bragg angles (2θ±0.2°) of 4.8°, 6.5°, 9.2°, 9.7°, 13.0° and 24.4°.

A CuKα characteristic X-ray diffraction diagram is illustrated in FIG. 7-5.

Comparative Synthesis Example η-1

Synthesis of Amorphous Azo Compound 1-(1)-4

16.2 g of a 43% nitrosylsulfuric acid solution was added to a mixed solvent composed of 50 g of acetic acid and 8 g of sulfuric acid over 20 minutes. The solution was cooled down to 3° C., and a diazotization reaction was performed by adding 11.55 g of a compound represented by the following Formula (2) as a powder thereto. After the mixture was stirred at the same temperature for 1 hour, a diazonium compound liquid preparation was obtained by deactivating the excess nitrosylsulfuric acid with 0.094 g of urea.

10 g of a compound represented by the following Formula (3) was dividedly added as a powder to the above-described diazonium compound liquid preparation at 5° C. or less. After the addition was completed, an azo compound dissolved solution was obtained by increasing the temperature to 20° C. and reacting the mixture for 2 hours. Meanwhile, the precipitation of the pigment was not observed during the coupling reaction, and the azo compound dissolved solution was in a state of completely dissolving the azo compound obtained.

A poor solvent composed of 150 mL of water was prepared and stirred at 5° C. and 200 rpm. The above-described azo compound dissolved solution was added dropwise to the poor solvent.

The resulting solution was stirred as it was for 15 minutes, and then a solid precipitated was filtered off.

A solution with a pH of 6.0 was prepared by suspending the solid obtained in 200 mL of water and adding a 28% ammonia water thereto. 23.8 g (yield 94.3%) of an amorphous azo compound 1-(1)-4 was obtained by filtering off the crystal and washing the crystal sufficiently with water. The amorphous azo compound 1-(1)-4 obtained was observed by visual inspection using a transmission microscope (manufactured by JEOL Ltd.: JEM-1010 electron microscope), and as a result, the length of primary particles in a long axis direction was about 500 nm.

The X-ray diffraction of the amorphous azo compound 1-(1)-4 was measured by the aforementioned conditions, and as a result, no characteristic X-ray diffraction peak may be confirmed.

A CuKα characteristic X-ray diffraction diagram is illustrated in FIG. 1-7.

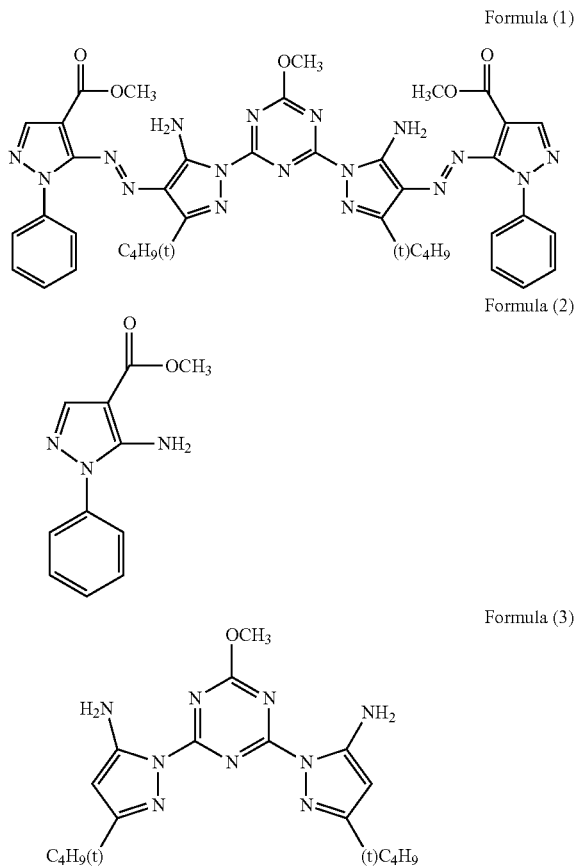

Formula (1)

Formula (2)

Formula (3)

Example η-1

Manufacture of Pigment Dispersion η-1

2.5 parts by mass of the η-type crystal form azo pigment η-(1)-1 synthesized in Synthesis Example η-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 8 hours. After the dispersion was completed, a yellow pigment dispersion η-1 (volume average particle diameter; Mv≈120.3 nm: measured using Nanotrac 150 (UPA-EX150) manufactured by Nikkiso Co., Ltd.) was obtained by separating the zirconia bead.

Example η-2

Manufacture of Pigment Dispersion η-2

2.5 parts by mass of the η-type crystal form azo pigment η-(1)-2 synthesized in Synthesis Example η-2 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 7 hours. After the dispersion was completed, a yellow pigment dispersion η-2 (volume average particle diameter; Mv≈105.2 nm: measured using Nanotrac 150 (UPA-EX150) manufactured by Nikkiso Co., Ltd.) was obtained by separating the zirconia bead.

Example η-3

Manufacture of Pigment Dispersion η-3

2.5 parts by mass of the η-type crystal form azo pigment η-(1)-3 synthesized in Synthesis Example η-3 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 5 hours. After the dispersion was completed, a yellow pigment dispersion η-3 (volume average particle diameter; Mv≈118.8 nm: measured using Nanotrac 150 (UPA-EX150) manufactured by Nikkiso Co., Ltd.) was obtained by separating the zirconia bead.

Comparative Example η-1

Manufacture of Comparative Pigment Dispersion η-1

2.5 parts by mass of the amorphous azo compound 1-(1)-4 synthesized in Comparative Synthesis Example η-1 was mixed with 0.5 parts by mass of sodium oleate, 5 parts by mass of glycerin and 42 parts by mass of water, and the mixture was dispersed together with 100 parts by mass of a zirconia bead having a diameter of 0.1 mm by means of a planetary ball mill at 300 revolutions per minute for 8 hours. After the dispersion was completed, a yellow comparative pigment dispersion η-1 (volume average particle diameter; Mv≈207.5 nm: measured using Nanotrac 150 (UPA-EX150) manufactured by Nikkiso Co., Ltd.) was obtained by separating the zirconia bead.

Comparative Example η-2

Manufacture of Comparative Pigment Dispersion η-2

2.5 parts of the C.I. Pigment Yellow 155 (INKJET YELLOW 4G VP2532 manufactured by Clariant Corporation) was mixed with 0.5 parts of sodium oleate, 5 parts of glycerin and 42 parts of water, and the mixture was dispersed together with 100 parts by mass of a zirconia bead having a diameter of 0.1 mm by means of a planetary ball mill at 300 revolutions per minute for 3 hours. After the dispersion was completed, a yellow comparative pigment dispersion η-2 (volume average particle diameter; Mv≈83.3 nm: measured using Nanotrac 150 (UPA-EX150) manufactured by Nikkiso Co., Ltd.) was obtained by separating the zirconia bead.

[Evaluation of Performance of Pigment Dispersion]

<Evaluation of Tinctorial Strength>

Each of the pigment dispersions obtained in the Examples and Comparative Examples was applied on Photo Matte Paper manufactured by EPSON Inc., using a No. 3 bar coater. An image concentration of each of the applied products obtained was measured using a reflection densitometer (X-Rite 938 manufactured by X-Rite Co.), and the "tinctorial strength (OD: Optical Density)" was evaluated in accordance with the following criteria. Samples showing an OD of 1.4 or more were ranked A, samples showing an OD of 1.2 or more and less than 1.4 were ranked B, and samples showing an OD less than 1.2 were ranked C. The results were shown in Table η-1.

<Evaluation of Hue>

Hue was evaluated by confirming the chromaticity of the applied product obtained above with the eyes and ranking the chromaticity as A which has slight reddishness and clear vividness and C (defective) in which any one of the reddishness and vividness was not suitable. The results were shown in Table η-1.

<Evaluation of Light Fastness>

The applied products having an image concentration of 1.0 used in the evaluation of hue were prepared and irradiated for 28 days with a xenon light (99,000 lux; in the presence of a TAC filter) using a fadeometer, the image concentration thereof was measured before and after irradiation with the xenon light using a reflection densitometer, and evaluation was performed by ranking samples with a colorant residual ratio [(concentration after irradiation/concentration before irradiation)×100%] of 95% or more as A, samples with a colorant residual ratio of 80% or more and less than 95% as B, and samples with a colorant residual ratio less than 80% as C. The results were shown in Table η-1.

<Evaluation of Filterability>

When 100 g of each of the azo pigments or azo compounds obtained in the Synthesis Examples and Comparative Examples was suction filtered using a Nutsche with a diameter of 12.5 cm, evaluation was performed by ranking samples with time taken for the filtrate to exit being within 5 minutes as A, samples with time taken for the filtrate to exit being within 10 minutes as B, and samples with time taken for the filtrate to exit being 10 minutes or more as C. The results were shown in Table η-1.

<Dispersibility>

When 2.5 parts of the pigment was mixed with 0.5 parts of sodium oleate, 5 parts by mass of glycerin and 42 parts of water, and the mixture was dispersed together with 100 parts of a zirconia bead having a diameter of 0.1 mm by means of a planetary ball mill at 300 revolutions per minute for 8 hours, evaluation was performed by ranking samples reaching a volume average particle diameter of 200 nm or less as A and samples not reaching a volume average particle diameter of 200 nm or less as C. The results were shown in Table η-1.

TABLE η-1

|  | Color material | Tinctorial strength | Hue | Light resistance | Filterability | Dispersibility |
| --- | --- | --- | --- | --- | --- | --- |
| Example η-1 | η-type crystal form azo pigment η-(1)-1 | A | A | A | A | A |
| Example η-2 | η-type crystal form azo pigment η-(2)-1 | A | A | A | A | A |
| Example η-3 | η-type crystal form azo pigment η-(3)-1 | A | A | A | A | A |
| Comp. Example η-1 | Amorphous azo compound 7-(1)-3 | A | A | A | B | C |
| Comp. Example η-2 | — | | B | C | C | — | A |

From the above results, it can be seen that an azo pigment having a specific crystal structure obtained by the preparation method of the present invention was a pigment having high productivity because the azo pigment may be filtered in a shorter time than by a method in the related art.

INDUSTRIAL APPLICABILITY

According to the present invention, provided are an azo pigment which has a novel crystal form and connects pyrazole rings having a specific substituent through an azo group and a triazine ring, a dispersion of the azo pigment, and a coloring composition. Further, a printed matter having excellent water resistance or fastness is provided by using the azo pigment as an inkjet recording ink.

Although the present invention has been described with reference to detailed and specific embodiments, it is obvious to those skilled in the art that various changes or modifications may be made without departing from the spirit and scope of the present invention.

The present application is based on Japanese Patent Application (Patent Application No. 2011-167824) filed on Jul. 29, 2011, Japanese Patent Application (Patent Application No. 2011-167825) filed on Jul. 29, 2011, Japanese Patent Application (Patent Application No. 2011-167826) filed on Jul. 29, 2011, Japanese Patent Application (Patent Application No. 2011-167827) filed on Jul. 29, 2011, Japanese Patent Application (Patent Application No. 2011-167828) filed on Jul. 29, 2011, Japanese Patent Application (Patent Application No. 2011-167829) filed on Jul. 29, 2011, Japanese Patent Application (Patent Application No. 2011-167830) filed on Jul. 29, 2011 and Japanese Patent Application (Patent Application No. 2012-033393) filed on Feb. 17, 2012, the contents of which are incorporated herein by reference.

What is claimed is:

1. A pigment dispersion comprising:
an azo pigment or a tautomer thereof represented by Formula (1), and having characteristic X-ray diffraction peaks at Bragg angles (2θ±0.2°) of 6.5°, 7.1° and 21.8° in a CuKα characteristic X-ray diffraction

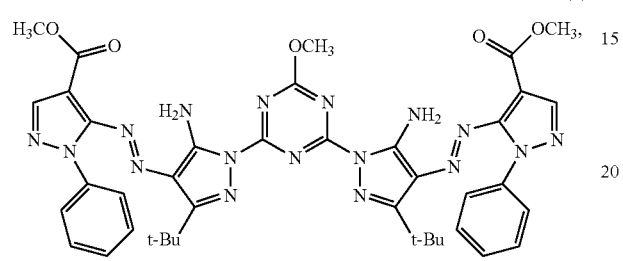

Formula (1)

wherein a volume average particle diameter of pigment particles in the pigment dispersion is 0.01 μm to 0.2 μm.

2. The pigment dispersion according to claim 1,
wherein the azo pigment has characteristic X-ray diffraction peaks at Bragg angles (2θ±0.2°) of 6.5°, 7.1°, 14.4°, 21.8° and 23.6° in the CuKα characteristic X-ray diffraction.

3. A pigment dispersion comprising:
an azo pigment or a tautomer thereof represented by Formula (1), and having characteristic X-ray diffraction peaks at Bragg angles (2θ±0.2°) of 6.3°, 6.4° and 22.3° in a CuKα characteristic X-ray diffraction

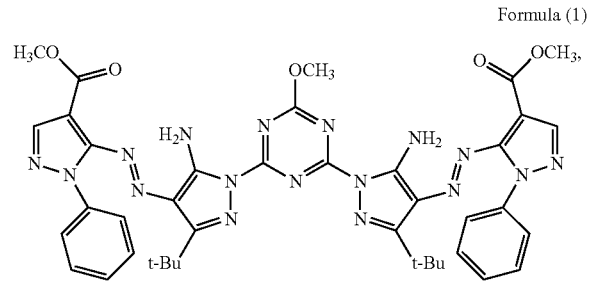 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

Formula (1)

wherein a volume average particle diameter of pigment particles in the pigment dispersion is 0.01 μm to 0.2 μm.

4. The pigment dispersion according to claim 3,
wherein the azo pigment has characteristic X-ray diffraction peaks at Bragg angles (2θ±0.2°) of 6.3°, 6.4°, 12.6°, 13.0° and 22.3° in the CuKα characteristic X-ray diffraction.

5. A pigment dispersion comprising:
an azo pigment or a tautomer thereof represented by Formula (1), and having characteristic X-ray diffraction peaks at Bragg angles (2θ±0.2°) of 5.9° and 7.0° in a CuKα characteristic X-ray diffraction

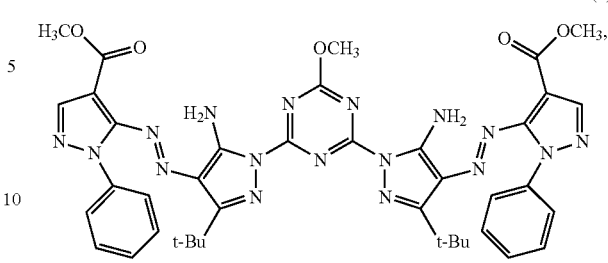

Formula (1)

wherein a volume average particle diameter of pigment particles in the pigment dispersion is 0.01 μm to 0.2 μm.

6. The pigment dispersion according to claim 5,
wherein the azo pigment has characteristic X-ray diffraction peaks at Bragg angles (2θ±0.2°) of 5.9°, 7.0°, 10.4° and 23.5° in the CuKα characteristic X-ray diffraction.

7. A pigment dispersion comprising:
an azo pigment or a tautomer thereof represented by Formula (1), and having characteristic X-ray diffraction peaks at Bragg angles (2θ±0.2°) of 4.8°, 7.2° and 9.7° in a CuKα characteristic X-ray diffraction

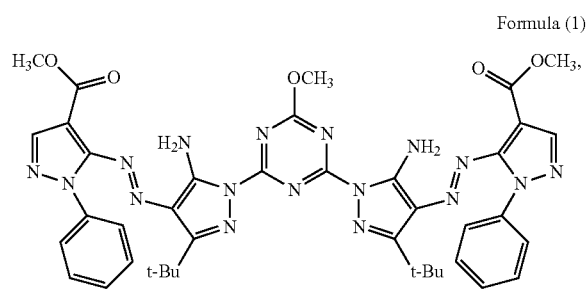 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

Formula (1)

wherein a volume average particle diameter of pigment particles in the pigment dispersion is 0.01 μm to 0.2 μm.

8. The pigment dispersion according to claim 7,
wherein the azo pigment has characteristic X-ray diffraction peaks at Bragg angles (2θ±0.2°) of 4.8°, 7.2°, 9.7°, 20.1° and 26.8° in the CuKα characteristic X-ray diffraction.

9. The pigment dispersion according to claim 7,
wherein a BET specific surface area by a nitrogen adsorption method is 50 m²/g or more.

10. A pigment dispersion comprising:
an azo pigment or a tautomer thereof represented by Formula (1), and having characteristic X-ray diffraction peaks at Bragg angles (2θ±0.2°) of 4.9°, 8.8° and 13.1° in a CuKα characteristic X-ray diffraction

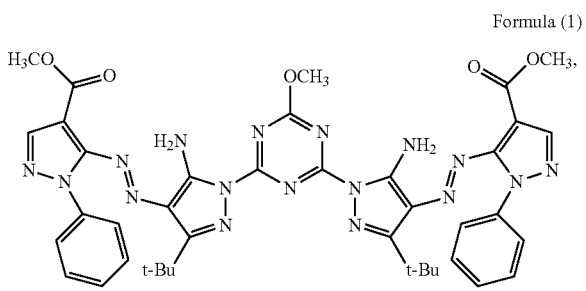 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

Formula (1)

wherein a volume average particle diameter of pigment particles in the pigment dispersion is 0.01 μm to 0.2 μm.

11. The pigment dispersion according to claim 10,
wherein the azo pigment has characteristic X-ray diffraction peaks at Bragg angles (2θ±0.2°) of 4.9°, 8.8°, 13.1°, 19.7° and 25.2° in the CuKα characteristic X-ray diffraction.

12. A pigment dispersion comprising:
an azo pigment or a tautomer thereof represented by Formula (1), and having characteristic X-ray diffraction peaks at Bragg angles (2θ±0.2°) of 6.6°, 9.2° and 21.5° in a CuKα characteristic X-ray diffraction

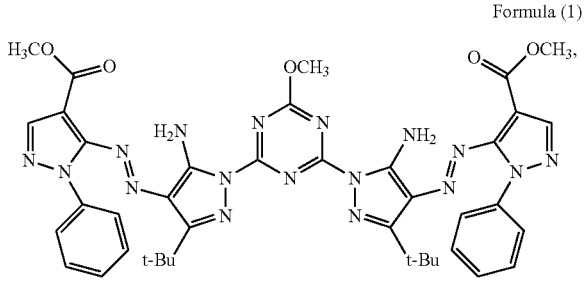 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

Formula (1)

wherein a volume average particle diameter of pigment particles in the pigment dispersion is 0.01 μm to 0.2 μm.

13. The pigment dispersion according to claim 12,
wherein the azo pigment has characteristic X-ray diffraction peaks at Bragg angles (2θ±0.2°) of 6.6°, 9.2°, 10.3°, 21.5° and 25.6° in the CuKα characteristic X-ray diffraction.

14. A pigment dispersion comprising:
an azo pigment or a tautomer thereof represented by the following Formula (1), and having characteristic X-ray diffraction peaks at Bragg angles (2θ±0.2°) of 4.8°, 9.2° and 13.0° in a CuKα characteristic X-ray diffraction

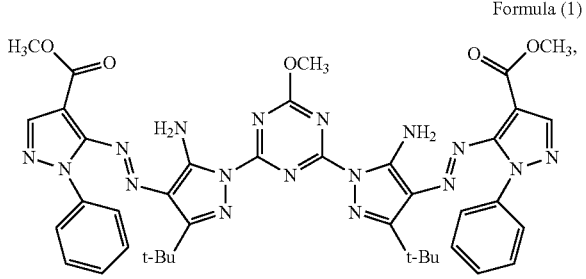 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

Formula (1)

wherein a volume average particle diameter of pigment particles in the pigment dispersion is 0.01 μm to 0.2 μm.

15. The pigment dispersion according to claim 14,
wherein the azo pigment has characteristic X-ray diffraction peaks at Bragg angles (2θ±0.2°) of 4.8°, 6.5°, 9.2°, 9.7°, 13.0° and 24.4° in the CuKα characteristic X-ray diffraction.

16. A method for preparing an azo pigment or a tautomer thereof represented by Formula (1), and having characteristic X-ray diffraction peaks at Bragg angles (2θ±0.2°) of 6.5°, 7.1 and 21.8° in a CuKα characteristic X-ray diffraction, the method comprising:
desolvating a solvate of an azo compound or a tautomer thereof represented by Formula (1), and having characteristic X-ray diffraction peaks at Bragg angles (2θ±0.2°) of 6.3°, 6.4° and 22.3° in the CuKα characteristic X-ray diffraction

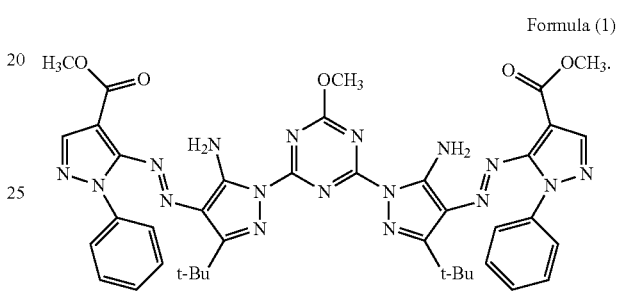

Formula (1)

17. The method according to claim 16,
wherein desolvation is performed by heating the solvate at 60° C. or more.

18. A method for preparing an azo pigment or a tautomer thereof represented by Formula (1), and having characteristic X-ray diffraction peaks at Bragg angles (2θ±0.2°) of 6.3°, 6.4° and 22.3° in a CuKα characteristic X-ray diffraction, the method comprising:
subjecting an azo compound or a tautomer thereof, which is represented by Formula (1), and has characteristic X-ray diffraction peaks at Bragg angles (2θ±0.2°) of any one of (i) 6.6°, 9.2° and 21.5°, (ii) 4.8°, 7.2° and 9.7°, and (iii) 5.9°, 7.0° and 8.9° in the CuKα characteristic X-ray diffraction, to solvent heating treatment

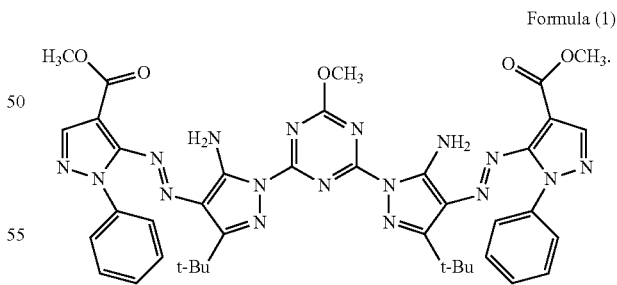

Formula (1)

19. The method according to claim 18,
wherein the solvent heating treatment is performed by heating and stirring the azo compound or the tautomer thereof, which is represented by Formula (1), and has characteristic X-ray diffraction peaks at Bragg angles (2θ±0.2°) of any one of (i) 6.6°, 9.2° and 21.5°, (ii) 4.8°, 7.2° and 9.7°, and (iii) 5.9°, 7.0° and 8.9° in the CuKα characteristic X-ray diffraction, at 20° C. or more in an organic solvent.

20. The method according to claim 19,
wherein the organic solvent is an alcohol-based organic solvent, a ketone-based organic solvent or an aprotic organic solvent.

21. A method for preparing an azo pigment or a tautomer thereof represented by Formula (1), and having characteristic X-ray diffraction peaks at Bragg angles (2θ±0.2°) of 4.8°, 7.2°, 9.5°, 9.7°, 10.7°, 17.4°, 19.0°, 20.1° and 26.8° in a CuKα characteristic X-ray diffraction, the method comprising:
heating and stirring the azo pigment or the tautomer thereof represented by Formula (1) at 60° C. or more in an organic solvent Formula (1)

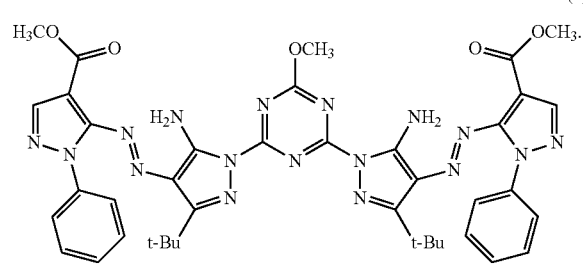

22. The method according to claim 21,
wherein the organic solvent is an alcohol-based organic solvent or a glycol-based organic solvent.

23. A method for preparing an azo pigment or a tautomer thereof represented by Formula (1), the method comprising:
kneading a mixture comprising the azo pigment or the tautomer thereof represented by Formula (1), a water-soluble inorganic salt and a water-soluble organic solvent, wherein the azo pigment or the tautomer thereof has characteristic X-ray diffraction peaks at Bragg angles (2θ±0.2°) of 4.8°, 7.2° and 9.7° in a CuKα characteristic X-ray diffraction, and a BET specific surface area by a nitrogen adsorption method is 50 m²/g or more Formula (1)

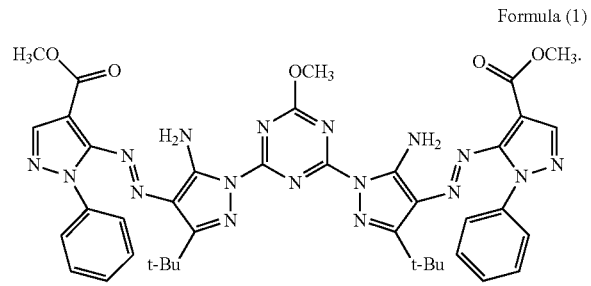 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

24. The method according to claim 23,
wherein the azo pigment or the tautomer thereof represented by Formula (1), which is included in the mixture, has characteristic X-ray diffraction peaks at Bragg angles (2θ±0.2°) of 4.8°, 7.2° and 9.7° in the CuKα characteristic X-ray diffraction.

25. A method for preparing an azo pigment or a tautomer thereof represented by Formula (1), and having characteristic X-ray diffraction peaks at Bragg angles (2θ±0.2°) of 4.9°, 8.8° and 13.1° in a CuKα characteristic X-ray diffraction, the method comprising:
desolvating a solvate of an azo compound or a tautomer thereof represented by Formula (1), and having characteristic X-ray diffraction peaks at Bragg angles (2θ±0.2°) of 4.8°, 9.2°, 13.0° and 24.4° in the CuKα characteristic X-ray diffraction Formula (1)

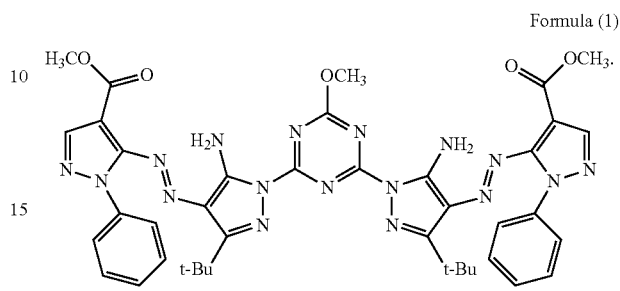

26. The method according to claim 25,
wherein desolvation is performed by heating the solvate at 60° C. or more.

27. A method for preparing an azo pigment or a tautomer thereof represented by Formula (1), and having characteristic X-ray diffraction peaks at Bragg angles (2θ±0.2°) of 4.8°, 9.2° and 13.0° in a CuKα characteristic X-ray diffraction, the method comprising:
subjecting an azo compound or a tautomer thereof, which is represented by Formula (1), and has characteristic X-ray diffraction peaks at Bragg angles (2θ±0.2°) of any one of (i) 6.6°, 9.2° and 21.5°, (ii) 4.8°, 7.2° and 9.7°, and (iii) 5.9°, 7.0° and 8.9° in the CuKα characteristic X-ray diffraction, to solvent heating treatment Formula (1)

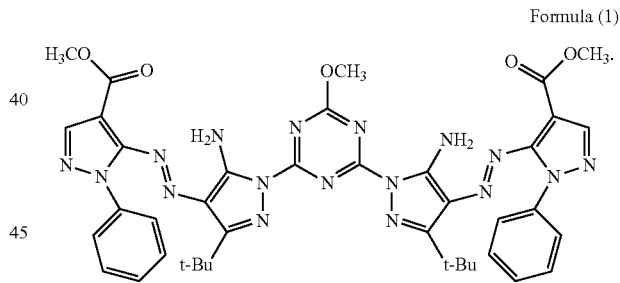

28. An azo pigment or the tautomer thereof, prepared by the method according to claim 16.

29. An azo pigment or the tautomer thereof, prepared by the method according to claim 18.

30. An azo pigment or the tautomer thereof, prepared by the method according to claim 21.

31. An azo pigment or the tautomer thereof, prepared by the method according to claim 23.

32. An azo pigment or the tautomer thereof, prepared by the method according to claim 25.

33. An azo pigment or the tautomer thereof, prepared by the method according to claim 27.

34. A pigment dispersion comprising:
a solvate of an azo compound or a tautomer thereof represented by Formula (1), and having characteristic X-ray diffraction peaks at Bragg angles (2θ±0.2°) of 6.3°, 6.4° and 22.3° in a CuKα characteristic X-ray diffraction

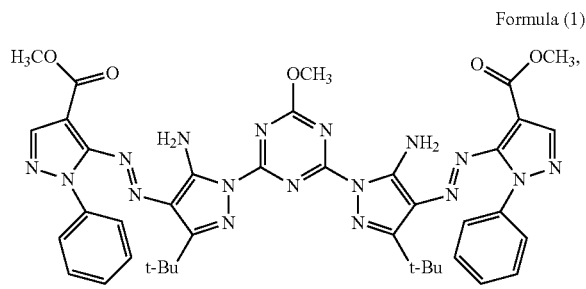 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

wherein a volume average particle diameter of pigment particles in the pigment dispersion is 0.01 μm to 0.2 μm.

35. A pigment dispersion comprising:
a solvate of an azo compound or a tautomer thereof represented by Formula (1), and having characteristic X-ray diffraction peaks at Bragg angles (2θ±0.2°) of 4.8°, 9.2°, 13.0° and 24.4° in a CuKα characteristic X-ray diffraction Formula (1)

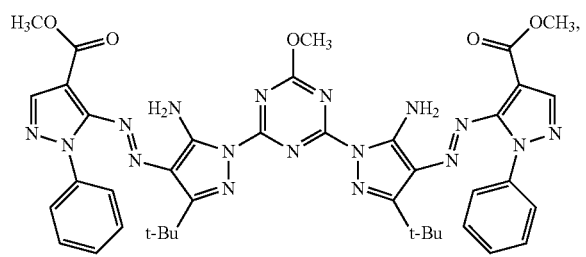

wherein a volume average particle diameter of pigment particles in the pigment dispersion is 0.01 μm to 0.2 μm.

36. A pigment dispersion comprising:
an acetone solvate of an azo compound or a tautomer thereof represented by the following Formula (1), and having characteristic X-ray diffraction peaks at Bragg angles (2θ±0.2°) of 6.6°, 9.2° and 21.5° in a CuKα characteristic X-ray diffraction Formula (1)

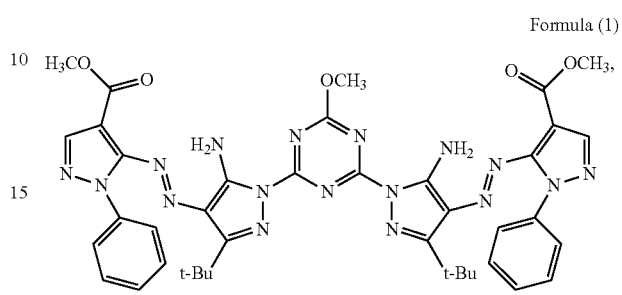

wherein a volume average particle diameter of pigment particles in the pigment dispersion is 0.01 μm to 0.2 μm.

37. The aqueous pigment dispersion according to claim 7, comprising a water-soluble polymer as a dispersing agent.

38. The aqueous pigment dispersion according to claim 37, wherein the water-soluble polymer dispersing agent comprises at least one carboxyl group and has an acid value of at least 50 mgKOH/g or more.

39. The aqueous pigment dispersion according to claim 37, wherein the aqueous pigment dispersion is cross-linked by a crosslinking agent.

40. A coloring composition comprising the pigment dispersion comprising the azo pigment or the tautomer thereof according to claim 1.

41. An ink comprising the pigment dispersion comprising the azo pigment or the tautomer thereof according to claim 1.

42. An inkjet recording ink comprising the pigment dispersion comprising the azo pigment or the tautomer thereof according to claim 1.

* * * * *